United States Patent
Yoguchi et al.

(10) Patent No.: US 7,979,871 B2
(45) Date of Patent: Jul. 12, 2011

(54) DISK APPARATUS AND DRIVING CONTROL SECTION

(75) Inventors: Aki Yoguchi, Tokyo (JP); Takamasa Araki, Tokyo (JP); Takeshi Igarashi, Kanagawa (JP); Masaho Morita, Tokyo (JP); Isao Okuyama, Chiba (JP)

(73) Assignee: Sony Computer Entertainment Inc., Tokyo (JP)

( * ) Notice: Subject to any disclaimer, the term of this patent is extended or adjusted under 35 U.S.C. 154(b) by 1049 days.

(21) Appl. No.: 11/748,608

(22) Filed: May 15, 2007

(65) Prior Publication Data

US 2007/0271574 A1 Nov. 22, 2007

(30) Foreign Application Priority Data

May 16, 2006 (JP) ................................ 2006-137101
May 16, 2006 (JP) ................................ 2006-137109
May 16, 2006 (JP) ................................ 2006-137110

(51) Int. Cl.
*G11B 17/04* (2006.01)
(52) U.S. Cl. ....................... 720/623; 720/626
(58) Field of Classification Search .......... 720/620–623, 720/626, 645
See application file for complete search history.

(56) References Cited

U.S. PATENT DOCUMENTS

| | | | | |
|---|---|---|---|---|
| 5,255,255 A | * | 10/1993 | Kaneda et al. | 720/621 |
| 2004/0008602 A1 | * | 1/2004 | Suzuki | 369/77.1 |
| 2005/0028179 A1 | * | 2/2005 | Ho et al. | 720/621 |
| 2005/0050564 A1 | * | 3/2005 | Araki | 720/623 |
| 2006/0190949 A1 | * | 8/2006 | Shimomae | 720/621 |

FOREIGN PATENT DOCUMENTS

| | | |
|---|---|---|
| JP | 5-282762 | 10/1993 |
| JP | 9-17171 | 1/1997 |
| JP | 11-162058 | 6/1999 |
| JP | 2001-35142 | 2/2001 |
| JP | 2002-260318 | 9/2002 |
| JP | 2003151193 A | 5/2003 |
| JP | 2005-251362 | 9/2005 |
| JP | 2005289366 | 4/2007 |

OTHER PUBLICATIONS

Notification of Reasons for Rejection dated Mar. 9, 2010, from the corresponding Japanese Application.
Notification of Reasons for Refusal dated Apr. 13, 2010, from the corresponding Japanese Application.

* cited by examiner

*Primary Examiner* — Craig A. Renner
*Assistant Examiner* — Adam B Dravininkas
(74) *Attorney, Agent, or Firm* — Katten Muchin Rosenman LLP

(57) ABSTRACT

A disk apparatus for preventing a disk from being dropped while being inserted or removed therein, including a housing on which an opening through which a disk is inserted into and extracted from is formed; a carrying unit for performing carrying-in and carrying-out of the disk into the housing; first and second motors for driving the carrying means, and for rotating the disk; an optical unit for reading and recording information to/from the disk; and a control unit for controlling the entire apparatus; the carrying unit including a pair of arms disposed in a substantially symmetrical relationship with respect to the carrying direction of the disk in the proximity of the ends of the opening such that the arms pivot around end portions thereof adjacent to the opening in synchronism with each other in directions toward and away from each other.

16 Claims, 79 Drawing Sheets

DISK APPARATUS AND DRIVING CONTROL SECTION

BACKGROUND OF THE INVENTION

1. Field of the Invention

This invention relates to a disk apparatus.

2. Description of the Related Art

A disk apparatus is known which reproduces information recorded on a disk such as a CD (Compact Disc), a DVD (Digital Versatile Disc), a BD (BLU-RAY DISC: Registered Trademark) or the like and/or recording information on a disk in the past. Such a disk apparatus as just mentioned has a turntable for contacting with a disk and includes a motor for rotating the disk. The disk apparatus further includes a pickup serving as information reading/recording means for irradiating light as a spot on an information recording face of a rotating disk to record information and detecting reflected light from the disk to read information of the disk.

As such a disk apparatus as described above, a tray type disk apparatus and a slot-in type disk apparatus whose carrying mechanisms of a disk into the inside of a disk apparatus are different from each other are known.

The tray type disk apparatus includes a tray on which a disk is to be placed. The tray is fed into the inside of and carried out from the disk apparatus to carry a disk into the inside and back to the outside of the apparatus body.

On the other hand, in the slot-in type disk apparatus, a disk inserted through an opening for disk accommodation formed on a housing of the disk apparatus in accordance with the size of the disk is carried into the inside and back to the outside of the apparatus.

As one of such slot-in type disk apparatus, a disk apparatus is known which includes arms for carrying a disk as disclosed, for example, in Japanese Patent Laid-Open No. 2005-251362 (hereinafter referred to as Patent Document 1).

The disk apparatus disclosed in the Patent Document 1 includes a pair of sliders provided in the proximity of an opening for disk accommodation (disk insertion and extraction opening) in such a manner as to slidably move in the disk insertion direction to the opening and also in a direction perpendicular to the insertion direction. A pair of arms is provided individually the sliders in an inclined state with respect to the insertion direction of a disk and each has two rotatable rollers at the opposite ends thereof. Each of the arms is provided for pivotal motion around the axis of the roller adjacent the opening such that free end portions of the arms move in directions toward and away from each other.

In the disk apparatus disclosed the Patent Document 1, when a disk inserted through the opening is to be carried, an end edge of the disk is contacted with the rollers provided on the opening side of the arms. Thereupon, the two sliders slidably move in directions to be spaced away from each other in accordance with the diametrical size of the disk. Further, the arms provided on the sliders are pivoted in directions wherein the ends thereof remote from the opening move away from each other while the disk is being dragged. Then, as the sliders slidably move in the disk insertion direction in a state wherein the rollers of the arms grip the disk, the disk is accommodated into the inside of the apparatus.

On the other hand, when the disk is to be carried out, the rollers, arms and sliders move reversely to those upon carrying-in of the disk. Then, the disk is pushed out through the opening.

By such a configuration as described above, the disk apparatus disclosed in the Patent Document 1 allows disks, whose diameter sizes are different from each other, to be carried in and carried out appropriately.

Incidentally, in such a slot-in type disk apparatus as described above, the opening for disk accommodation is in a normally open state and a cloth curtain having a cut formed therein is provided so as to cover the opening. The cloth curtain grips a disk carried out through the opening and prevents invasion of dust into the inside of the apparatus.

However, the disk apparatus disclosed in the Patent Document 1 has a problem that, since the rollers and the disk move away from each other upon carrying-out of the disk, the disk drops from the opening for disk accommodation. Therefore, it is necessary for a cloth curtain, on which a cut for inserting and extracting a disk therethrough is formed, or the like to be provided for the opening to retain the disk so that the disk may not drop from the opening. However, the disk apparatus has another problem that, since a cloth curtain is abraded by secular change, retaining force for a disk decreases. The disk apparatus further has a problem that, where the disk apparatus is placed in a vertical posture, since the weight of a disk itself has to be supported, the disk is more likely to drop from the opening.

The disk apparatus has a still further problem that, if a cloth curtain is provided for the opening, then the pushing out force for pushing the disk toward the opening is reduced by friction of the cloth curtain, and, if the cut is formed in an enlarged size to prevent reduction of the pushing out force, then dust is likely to invade into the inside of the apparatus through the cut and the opening.

Further, while the opening of such a slot-in type disk apparatus as described above is covered with a cloth curtain, the opening is usually in an open state. Therefore, the disk apparatus further has a yet further problem that invasion of dust into the inside of the disk apparatus may not be prevented with certainty.

Particularly, in a disk apparatus in recent years, it is necessary to rotate a disk at a high speed. Therefore, the disk apparatus has a problem that, if dust or the like advances into the inside of the apparatus, then reading and recording of information from and on a disk may not be performed normally. The disk apparatus has also another problem that, since damage to and failure of a disk or the apparatus become more likely to be caused by invasion of dust, the configuration of the disk apparatus is complicated in that a configuration for removing dust admitted in the inside or the like is requisite.

In addition, in the disk apparatus disclosed in the Patent Document 1, there is the possibility that, if a disk having a small diameter size (for example, a disk whose diameter is 8 cm) is inserted into a position rather near to one end portion of the opening for disk accommodation, then the disk may not be carried appropriately.

In particular, where a disk having a small diameter size is inserted to a substantially central position of the opening for disk accommodation which is formed in accordance with a disk having a large diameter size (for example, a disk whose diameter is 12 cm), the sliders on which the arms are provided move in a direction in which they approach the disk and the rollers of the arms rotate while gripping the disk to carry the disk into the inside of the apparatus. However, there is the possibility that, if the disk whose diameter size is small is inserted to a position rather near to an end of the opening, then the disk may be carried into the inside of the apparatus in a state wherein the disk is gripped by one of the rollers. In such a case as just described, there is the possibility that the disk may not be disposed at a disk chucking position by the turntable and chucking of the disk may not be performed appropriately.

SUMMARY OF THE INVENTION

It is desirable to provide a disk apparatus wherein dropping of a disk upon carrying out can be prevented.

It is also desirable to provide a disk apparatus wherein invasion of dust through an opening for disk accommodation can be prevented with a simple configuration.

It is also desirable to provide a disk apparatus wherein disks having different diametrical dimensions from each other can be carried in appropriately and with certainty.

According to an embodiment of the present invention, there is provided a disk apparatus including a housing on which an opening through which a disk is inserted into and extracted from the housing is formed, carrying means for performing carrying-in of the disk into the housing and carrying-out of the disk to the outside of the housing, driving means for driving the carrying means, rotating means for rotating the disk inserted in the housing, information reading/recording means for performing at least one of reading and recording of information from and on the disk rotated by the rotating means, and control means for controlling the entire apparatus, the carrying means including a pair of arms disposed in a substantially symmetrical relationship with respect to the carrying direction of the disk in the proximity of the ends of the opening such that the arms pivot around end portions thereof adjacent the opening in synchronism with each other in directions toward and away from each other, the arms individually having rollers provided thereon and configured to grip and carry the disk to a predetermined position, at least one of the rollers driven by said driving means to rotate thereby to carry the disk, the control means including a state decision section configured to decide a carrying state of the disk by the carrying means and a driving control section configured to stop, if it is decided by the state decision section that part of the disk is carried out to the outside of the housing through the opening, the driving of the driving means in a state wherein the rollers grip the disk.

The predetermined position may be, for example, a position corresponding to the rotating means.

The rotating means may be a motor having a turntable for contacting with and rotating the disk. The information reading/recording means may be a pickup which irradiates light as a spot on the rotating disk to perform reading or recording of information on or from the disk.

It is to be noted that the carrying may be carrying into the housing or carrying out from the housing.

DETAILED DESCRIPTION OF THE PREFERRED EMBODIMENT

1. First Embodiment

In the following, a first embodiment of the present invention is described with reference to the drawings.

(1) Outside Appearance Configuration of the Disk Apparatus 1

Figure 1:
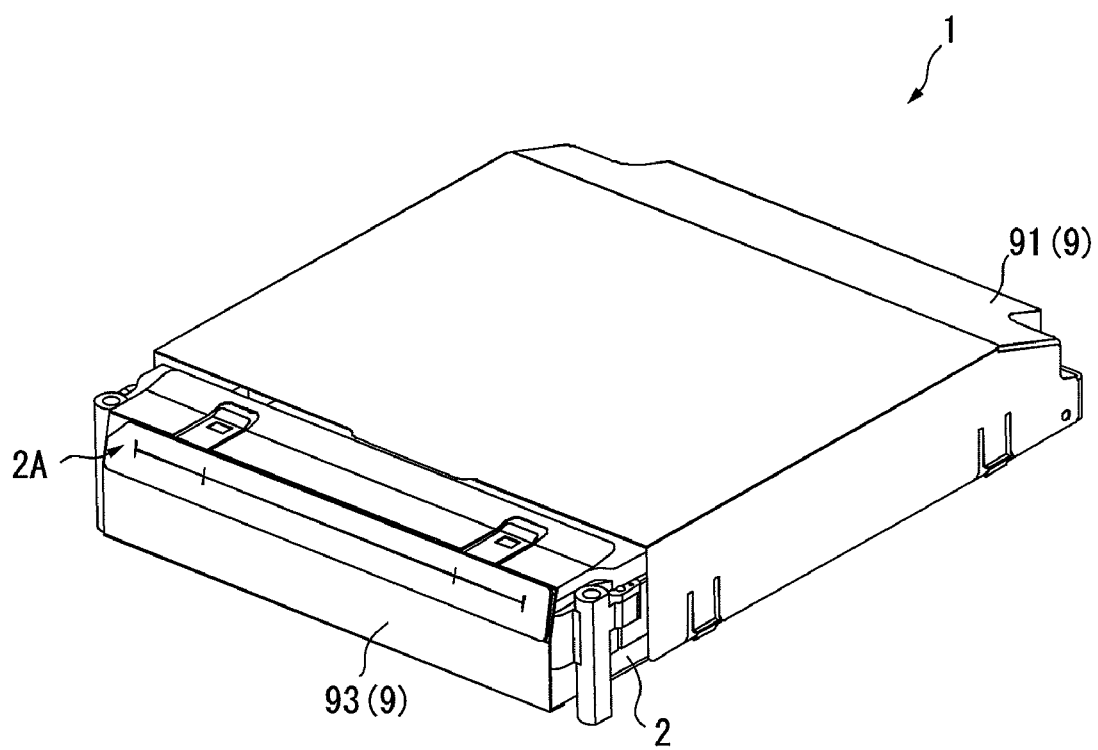
FIG. 1 is a perspective view showing an outside appearance of a disk apparatus according to a first embodiment of the present invention.
Figure 2:
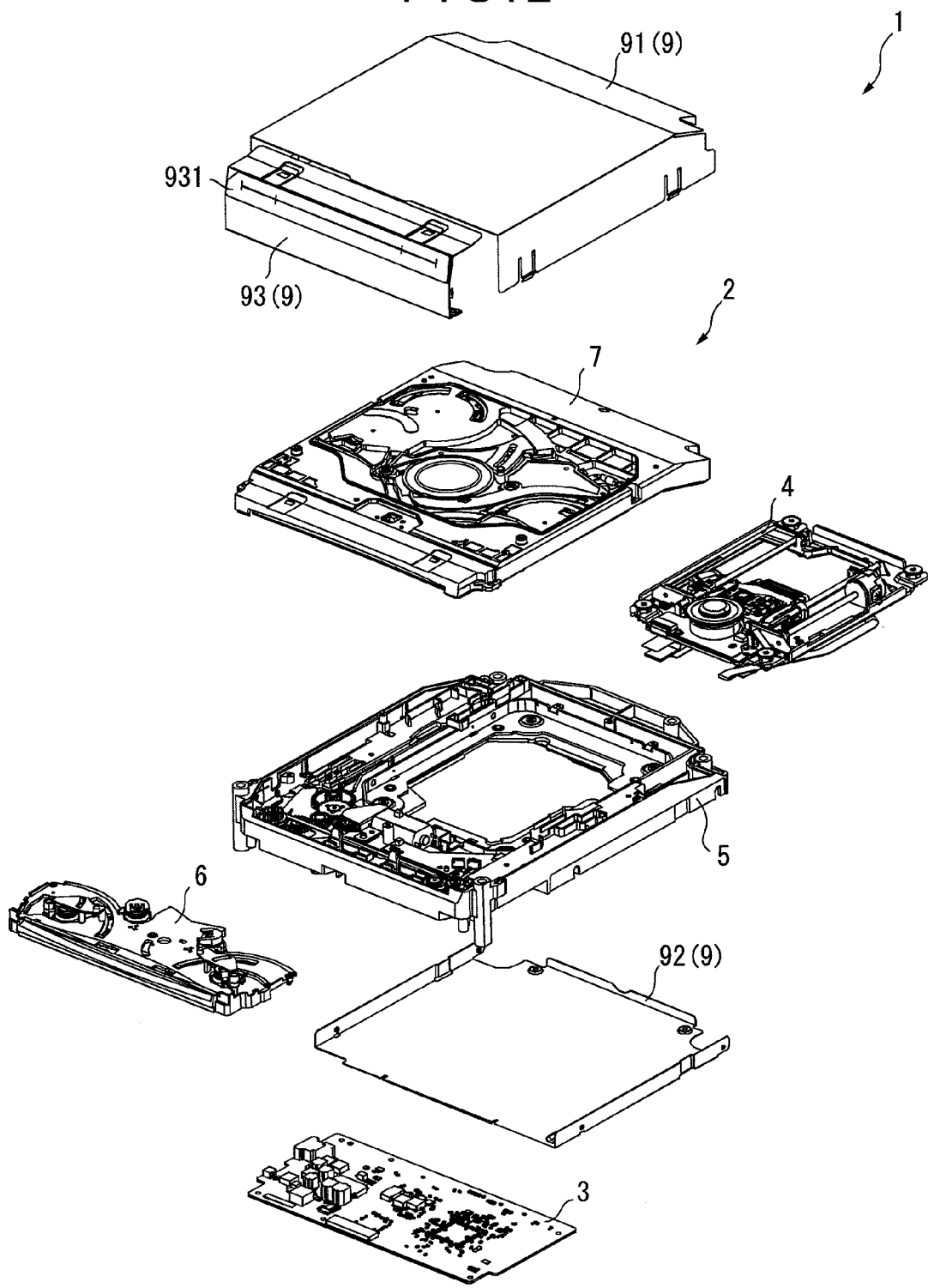
FIG. 2 is an exploded perspective view showing the disk apparatus.

FIG. 1 is a perspective view showing an outside appearance of a disk apparatus 1 according to the present embodiment. FIG. 2 is an exploded perspective view of the disk apparatus 1.

The disk apparatus 1 is formed as a slot-in type disk apparatus configured to accommodate a disk such as a CD, a DVD, a BD (BLU-RAY DISC: Registered Trademark) or a like disk into the inside thereof to perform reading of information recorded on the disk and recording of information on the disk. The disk apparatus 1 can accommodate, for example, a first disk D1 having a diameter of 12 cm and a second disk D2 having another diameter of 8 cm smaller than the diametrical size of the first disk D1 as a disk D. Further, the disk apparatus 1 can execute reading and recording of information individually from and on the first and second disks D1 and D2.

As shown in FIGS. 1 and 2, the disk apparatus 1 includes an apparatus body 2 for accommodating the disk D and a cover member 9 for covering the apparatus body 2.

As shown in FIG. 2 the cover member 9 includes a top cover 91 for covering the top face of the apparatus body 2, a bottom cover 92 for covering the bottom face of the apparatus body 2 and a front cover 93 for covering the front face of the apparatus body 2. The substantially overall faces of the apparatus body 2 are covered with the cover member 9 composed of the covers 91 to 93. Such a cover member 9 as just described is formed from a metal material in order to prevent electromagnetic interference (EMI).

Though not particularly shown, the front cover 93 has an opening which is formed at a position corresponding to an opening 2A for disk accommodation formed from a top frame 701 and a bracket 63 hereinafter described and has a size substantially same as that of the opening 2A. The front cover 93 includes a cloth curtain 931 mounted at a position corresponding to the opening thereof and formed from felt or the like on which a cut for inserting and extracting the disk D therethrough is formed.

(2) Apparatus Body 2

If a disk D is inserted through the opening 2A, then the apparatus body 2 carries and accommodates the disk D into the inside thereof and performs reading or recording of information from or on the disk D. Further, if a switch not shown is inputted by the user, then the apparatus body 2 carries out the disk D accommodated therein to the outside through the opening 2A.

As shown in FIG. 2, the apparatus body 2 includes a control unit 3, an optical unit 4, a lower unit 5, a carrying unit 6 and an upper unit 7.

(3) Optical Unit 4

Figure 3:
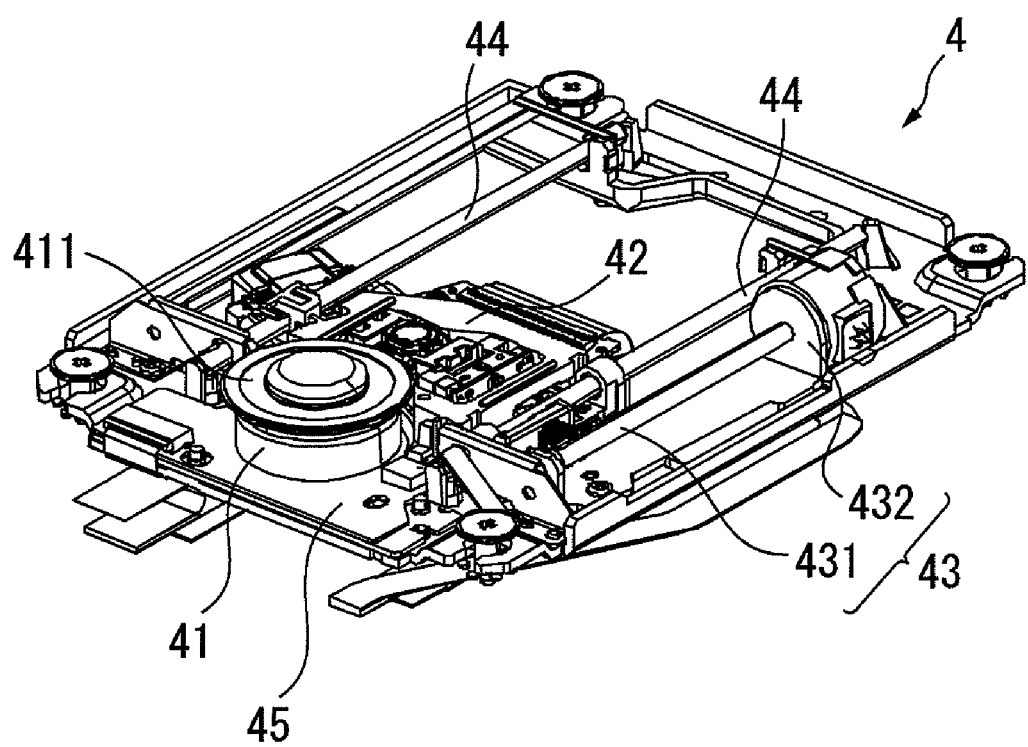
FIG. 3 is a perspective view showing an optical unit in the disk apparatus.

FIG. 3 is a perspective view showing the optical unit 4.

The optical unit 4 is attached to a holder 52 disposed on a base frame 51 which forms the lower unit 5 hereinafter described, and engages with the disk D by upward movement of the holder 52 by carrying-in of the disk D into the inside of the apparatus body 2. Then, the optical unit 4 irradiates laser light on the disk D accommodated in the apparatus body 2 to perform reading of information recorded on the disk D or recording of information on the disk D.

As shown in FIG. 3, such an optical unit 4 as described above includes a motor 41 for rotating the disk D, a pickup 42, a motor 43 for moving the pickup 42, a pair of guides 44 for guiding movement of the pickup 42 by the motor 43, and a control board 45 for controlling driving of the motors 41 and 43 and the pickup 42.

The motor 41 corresponds to the rotating means and the driving means in the present invention, and has a turntable 411 for fitting with a circular hole DC (refer to FIGS. 48, 62 and so forth) formed at a substantially central portion of the disk D upon upward movement of the holder 52. The turntable 411 is rotated by the motor 41 to rotate the disk D at a high speed.

The pickup 42 corresponds to the information reading/recording means in the present invention, and irradiates laser light on the disk D being rotated by driving of the motor 41 to record information on the disk D and receives the reflected light from the disk D to read information recorded on the disk D.

The motor 43 includes a spindle 431 on which a helical groove is formed along the axial direction, and a driving section 432 for rotating the spindle 431. The pickup 42 is held in meshing engagement at one end thereof with the helical groove of the spindle 431. Thus, if the driving section 432 rotates the spindle 431, then the pickup 42 moves in a direction along the diametrical direction of the rotated disk D in response to the rotation of the spindle 431. The movement of the pickup 42 is guided by the pair of guides 44 disposed across the pickup 42.

The control board 45 controls driving of the motor 41, pickup 42 and motor 43 based on a control signal inputted from the control unit 3. Further, the control board 45 outputs information read from the disk D by the pickup 42 to the control unit 3.

(4) Lower Unit 5

Figure 4:
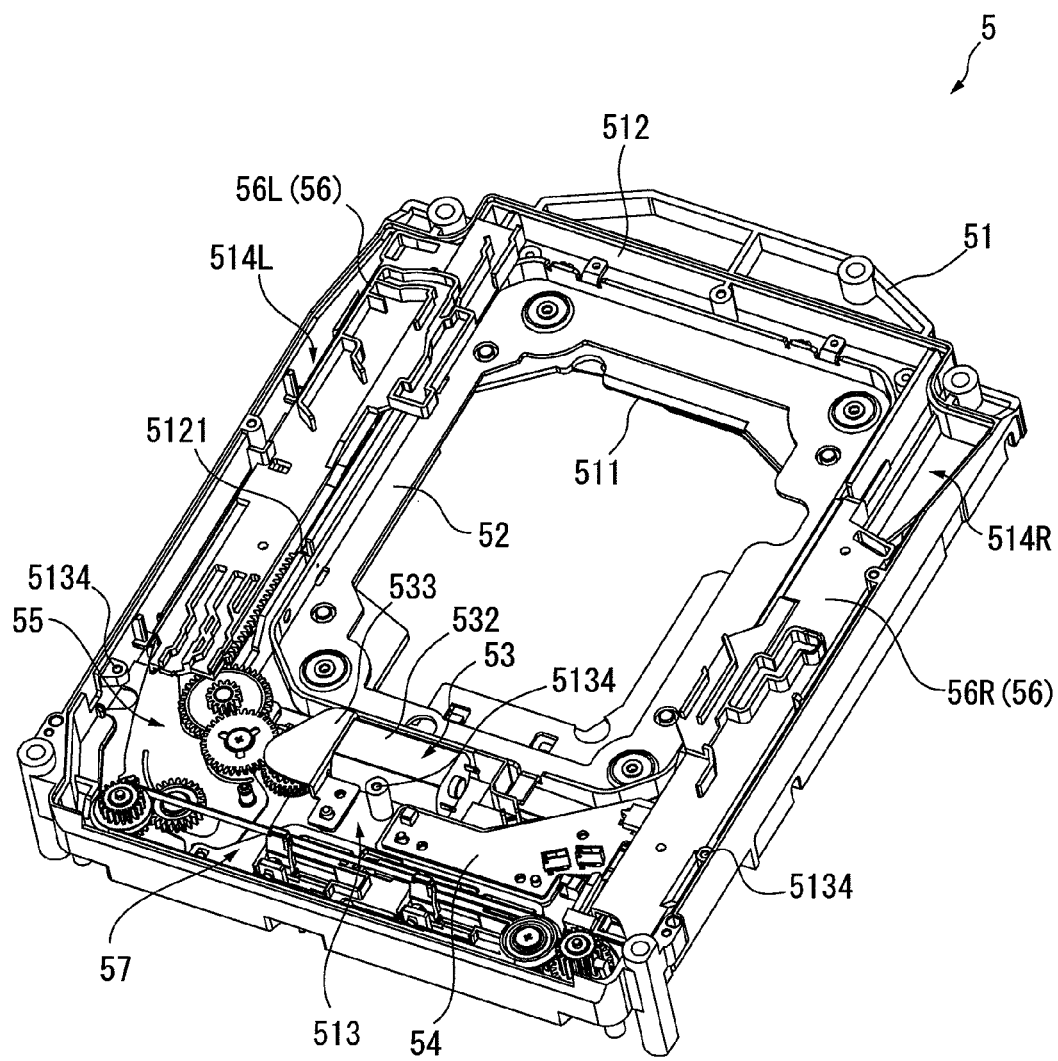
FIG. 4 is a perspective view showing a lower unit in the disk apparatus.
Figure 5:
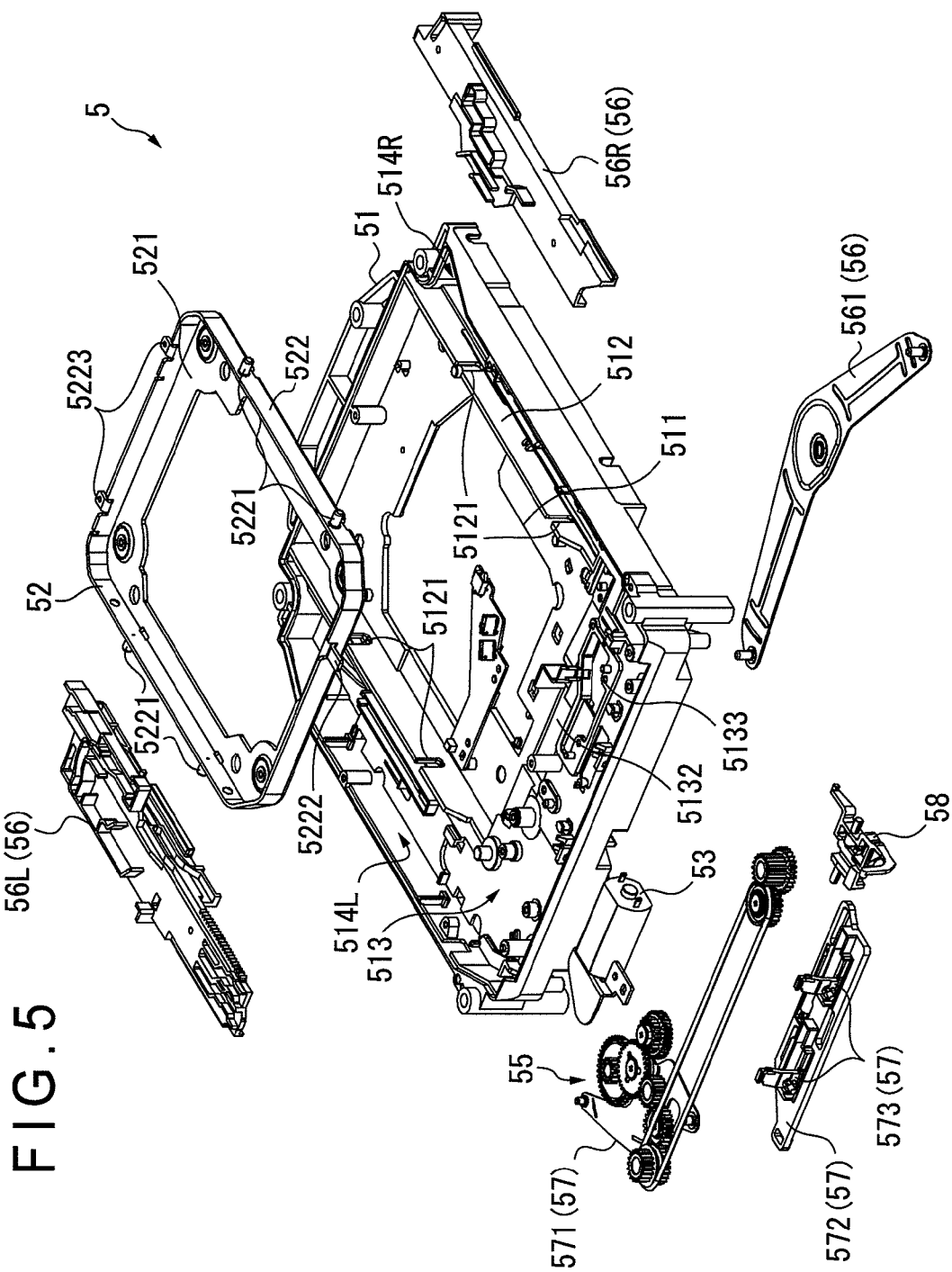
FIG. 5 is an exploded perspective view showing the lower unit in the disk apparatus.
Figure 6:
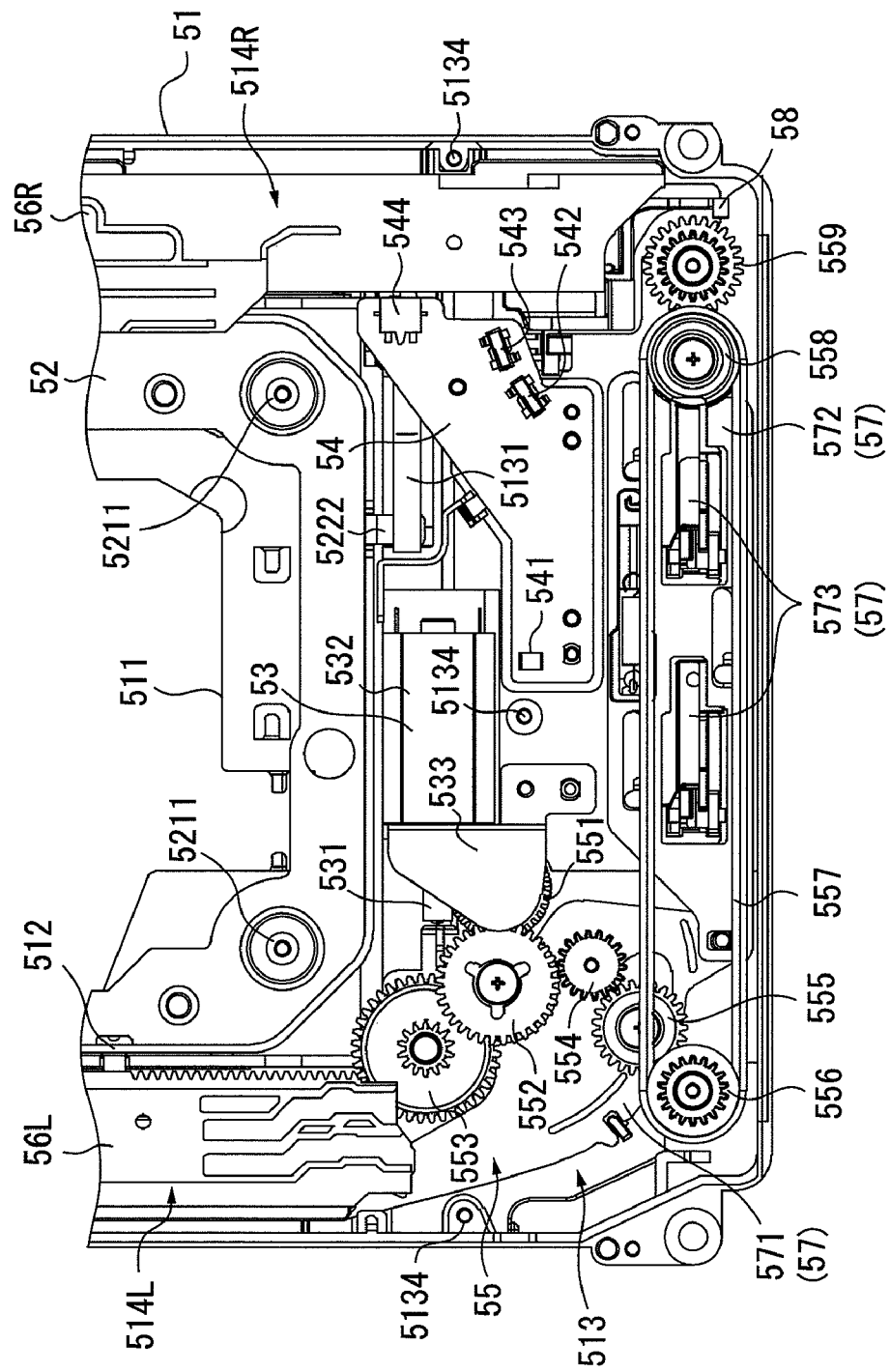
FIG. 6 is a top plan view showing part of the lower unit in the disk apparatus in an enlarged scale.

FIGS. 4 to 6 show the lower unit 5. More particularly, FIG. 4 is a perspective view of the lower unit 5 as viewed from above, and FIG. 5 is an exploded perspective view showing the lower unit 5. Further, FIG. 6 is a top plan view showing part of the lower unit 5 in an enlarged scale.

The lower unit 5 serves as a base on which the optical unit 4 described hereinabove is placed and on which a carrying unit 6 hereinafter described is placed.

The lower unit 5 includes a base frame 51 formed in a substantially rectangular shape in plan. The lower unit 5 further includes a holder 52, a motor 53, a control board 54 (not shown in FIG. 5), a transmission mechanism 55, a lifting mechanism 56, an insertion preventing mechanism 57 and a shutter lever 58 placed on the base frame 51.

It is to be noted that the configuration of the lifting mechanism 56, insertion preventing mechanism 57 and shutter lever 58 is hereinafter described in detail.

(4-1) Configuration of Base Frame 51

The base frame 51 has a box-shaped housing made of a synthetic resin material and formed in a substantially U shape in vertical section. An opening 511 is formed at a central portion of the base frame 51.

An upright portion 512 is formed around the opening 511 such that it stands uprightly from a lower wall of the base frame 51 in a substantially rectangular shape as viewed in plan. The holder 52 is placed in the upright portion 512. Two recesses 5121 are formed at substantially central portions of each of two major sides (sides in a direction along an insertion direction of a disk D) of the upright portion 512. Cylindrical portions 5221 of the holder 52 hereinafter described are individually fitted in the recesses 5121.

A transmission mechanism arrangement section 513 on which the transmission mechanism 55 and the carrying unit 6 are disposed is formed at a portion of the base frame 51 from the opening 2A to the upright portion 512.

Though not particularly shown, a plurality of projections or the like for rotatably supporting gears which form the transmission mechanism 55 are formed on the transmission mechanism arrangement section 513. Further, a spring plate 5131 (refer to FIG. 6) for biasing the holder 52 downwardly, a motor installation portion 5132 (FIG. 5) on which the motor 53 is disposed and a substrate attachment portion 5133 (refer to FIG. 5) to which the control board 54 is attached are provided on the transmission mechanism arrangement section 513.

Further, cam arrangement portions 514L and 514R on which slide cams 56L and 56R which form the lifting mechanism 56 hereinafter described are disposed for sliding movement are formed at portions of the base frame 51 leftwardly and rightwardly of the upright portion 512 where the base frame 51 on the opening 2A side is positioned to this side.

Figure 7:
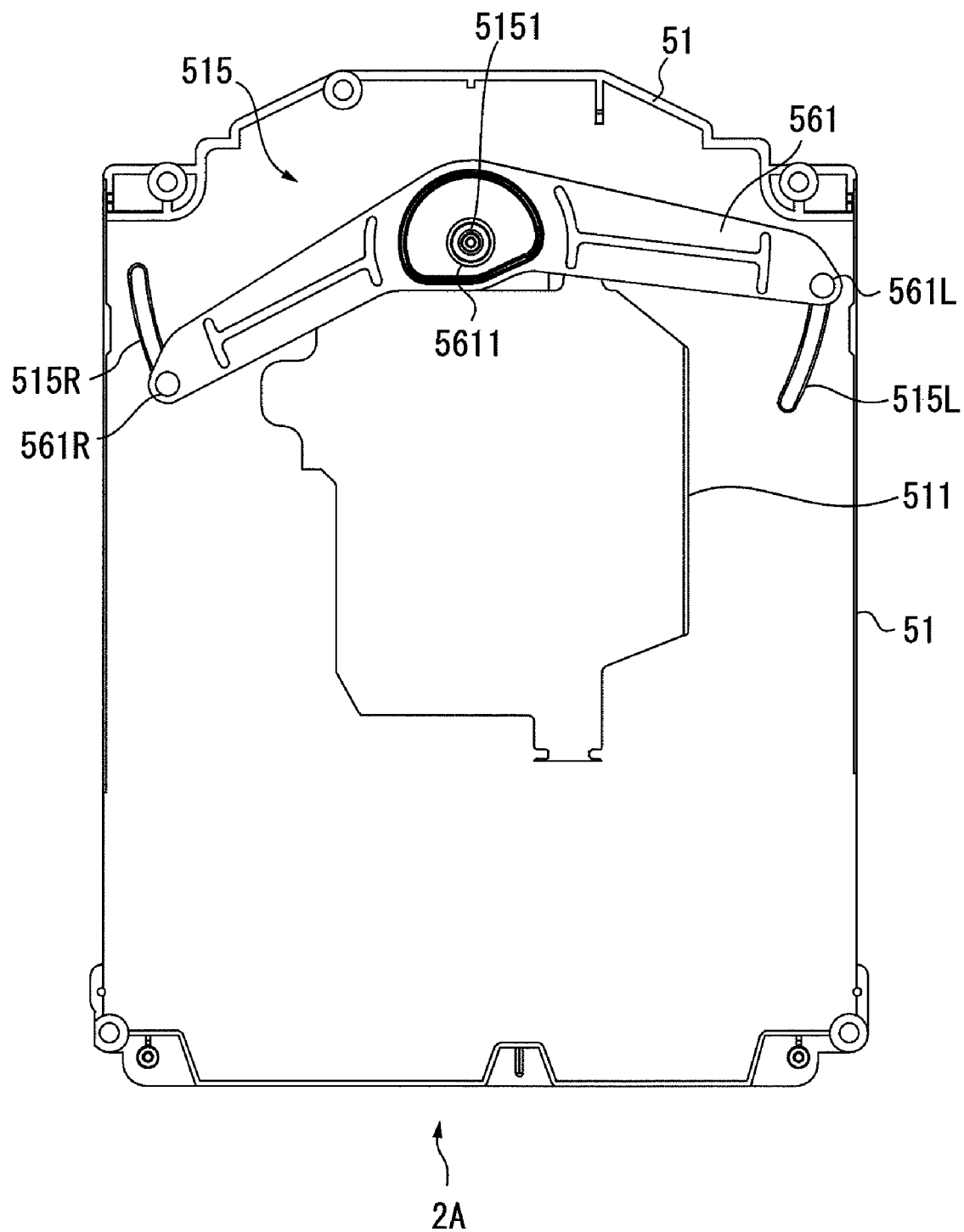
FIG. 7 is a view showing a bottom face of a base frame in the disk apparatus.

FIG. 7 shows a bottom face of the base frame 51.

A link arm arrangement portion 515 to which a link arm 561 which composes the lifting mechanism 56 is formed on the opposite side to the opening 2A side on the bottom face (face opposing to the bottom cover 92, refer to FIG. 2) of the base frame 51.

A screw hole 5151 into which a screw (not shown) for supporting the link arm 561 for pivotal motion is screwed is formed at a substantially central portion of the link arm arrangement portion 515. Further, arcuate openings 515L and 515R are formed at left and right portions of the link arm arrangement portion 515 and centered at the screw hole 5151.

It is to be noted that the link arm 561 is hereinafter described in detail together with description of the lifting mechanism 56.

(4-2) Configuration of the Holder 52

The holder 52 holds the optical unit 4 as described hereinabove.

As seen in FIG. 4, the holder 52 is a box-shaped member made of a metal material. The holder 52 moves upwardly and downwardly in response to sliding movement in the opposite directions in a horizontal direction of the slide cams 56L and 56R hereinafter described so that the turntable 411 of the optical unit 4 placed on the holder 52 is fitted into or removed from a hole DC (refer to FIGS. 48 and 62) of the disk D.

As shown in FIG. 5, the holder 52 includes a bottom 521 of a substantially rectangular shape as viewed in plan, and an upright portion 522 extending uprightly from the bottom 521 along end edges of the bottom 521. It is to be noted that the longitudinal direction of the bottom 521 is a direction along the longitudinal direction of the upright portion 512 formed on the base frame 51, and the longitudinal direction of the upright portion 512 is a direction along the insertion direction of the disk D.

Cylindrical portions 5221 are formed at portions of the opposite side faces (faces opposing to the slide cams 56L and 56R hereinafter described) of the upright portion 522 in the longitudinal direction in the proximity of the opposite ends in the longitudinal direction such that they extend perpendicularly from the side faces, that is, toward the outer sides of the holder 52. The four cylindrical portions 5221 extend through the recesses 5121 of the base frame 51 described hereinabove and engage with the slide cams 56L and 56R hereinafter described. Therefore, although movement of the holder 52 in the upward and downward directions (Y1 and Y2 directions hereinafter described) are permitted, movement of the holder 52 in horizontal directions (directions indicated by arrow marks A1 and A2 hereinafter described) is restricted.

Extensions 5222 and 5223 each in the form of a flat plate are formed on the opposite side faces of the upright portion 522 in the lateral direction (direction perpendicular to the longitudinal direction).

The spring plate 5131 described hereinabove contacts with the upright portion 5222 formed on the opening 2A side. Meanwhile, a tension spring (not shown) provided on the base frame 51 is attached to each of the extensions 5223 formed on the side face on the opposite side to the side face on which the extensions 5222 are formed. The holder 52 is held against and biased to the bottom face side of the base frame 51 by the spring plate 5131 (refer to FIG. 6) and the tension springs.

(4-3) Configuration of the Motor 53

The motor 53 corresponds to the driving means in the present invention and is provided on the motor installation portion 5132 formed on the transmission mechanism arrangement section 513. The motor 53 provides driving power for carrying (carrying in and carrying out) of the disk into and from the disk apparatus 1, up and down movement of the optical unit 4, prevention of insertion of another disk D and so forth.

As shown in FIGS. 4 to 6, the motor 53 includes a worm gear 531 (FIG. 6), a motor body 532 (FIGS. 4 to 6) for rotating the worm gear 531, and a bracket 533 (FIGS. 5 and 6) for protecting the worm gear 531.

(4-4) Configuration of the Control Board 54

The control board 54 is attached to the substrate attachment portion 5133 formed in the proximity of the motor installation portion 5132. The control board 54 includes a motor driver 545 (refer to FIG. 47) for controlling driving of the motor 53 in response to a control signal inputted from the control unit 3. Further, a light receiving element 541 for detecting insertion of a disk D is provided on the control board 54. The light receiving element 541 receives a flux of light emitted from a light emitting element of a photo-sensor 703 provided on the upper unit 7 hereinafter described and outputs a control signal based on the light reception state of the flux of light to the control unit 3. In other words, the control board 54 corresponds to the detection means in the present invention, and the light receiving element 541 corresponds to the disk detection section of the present invention.

Further, as shown in FIG. 6, a first switch 542, a second switch 543 and a third switch 544 are provided on the control board 54. The control board 54 outputs a control signal based on an off state of the first to third switches 542 to 544 to the control unit 3.

The first switch 542 and the second switch 543 correspond to the pivoting state detection section of the present invention and detect a carrying state of the disk D by detecting the position of a front arm 61R (refer to FIGS. 9 to 11) which forms the carrying unit 6 hereinafter described. The first switch 542 and the second switch 543 are disposed in parallel to each other within a range of pivotal motion of the front arm 61R along the leftward and rightward directions (leftward and rightward directions in FIG. 6) on the upper face side of the control board 54.

The third switch 544 detects completion of chucking of a carried-in disk D by detecting the position of a slide cam 56R (refer to FIGS. 33 to 36) which composes the lifting mechanism 56 hereinafter described. The third switch 544 is disposed on the control board 54 such that it projects toward the slide cam 56R side, and is pushed by the slide cam 56R when the slide cam 56R slidably moves upon carrying of the disk D.

It is to be noted that changeover between on/off states of the first switch 542, second switch 543 and third switch 544 is hereinafter described.

(4-5) Configuration of the Transmission Mechanism 55

Figure 8:
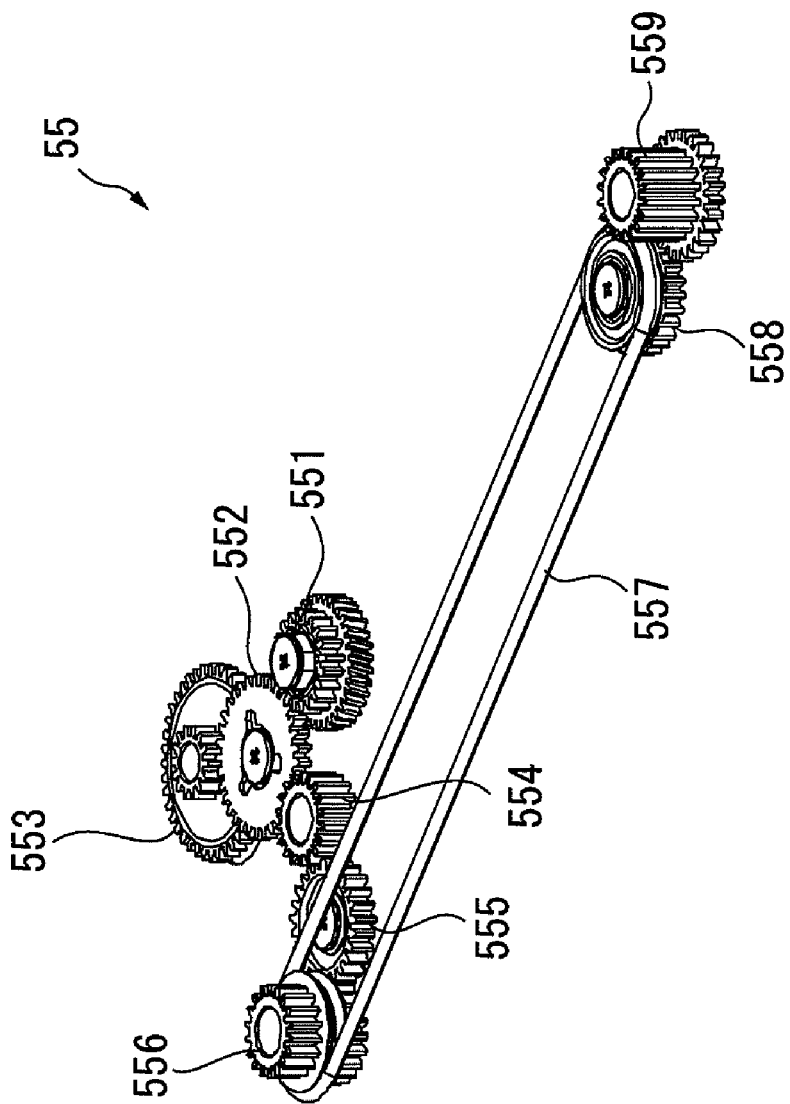
FIG. 8 is a perspective view showing a transmission mechanism in the disk apparatus.

FIG. 8 is a perspective view showing the transmission mechanism 55.

Referring to FIG. 8, the transmission mechanism 55 transmits driving force of the motor 53 to the carrying unit 6 and the lifting mechanism 56, and includes eight gears and one belt. In particular, as shown in FIGS. 6 and 8, the transmission mechanism 55 includes a worm wheel 551, first to fifth gears 552 to 556, sixth and seventh gears 558 and 559, and an annular belt 557 for interconnecting the fifth gear 556 and the sixth gear 558. The worm wheel 551, first gear 552, second gear 553, and fourth to seventh gears 555, 556, 558 and 559 are supported for rotation by respective projections formed on the transmission mechanism arrangement section 513 of the base frame 51.

The worm wheel 551 meshes with the worm gear 531 provided on the motor 53 and converts rotation around an axis of the worm gear 531 extending in a direction along the transmission mechanism arrangement section 513 into rotation around an axis extending in a direction upright from the transmission mechanism arrangement section 513.

The first gear 552 meshes with the worm wheel 551 and further meshes with the second gear 553 and the third gear 554.

The second gear 553 rotates as the first gear 552 rotates, and meshes with a rack portion 56L11 (refer to FIGS. 29 and 30) of the slide cam 56L which forms the lifting mechanism 56 hereinafter described to slidably move the slide cam 56L.

The third gear 554 and the fourth gear 555 are substantially cylindrical gears disposed in mesh with each other.

The third gear 554 transmits rotation of the first gear 552 to the fourth gear 555. Further, the third gear 554 is supported for rotation by a screw (not shown) in a screw hole 5714 (refer to FIG. 40) formed on a swing arm 571 which forms the insertion preventing mechanism 57 hereinafter described. The meshing engagement of the third gear 554 with the fourth gear 555 is canceled as the swing arm 571 pivots.

The fifth gear 556 is disposed at a corner portion of the base frame 51 adjacent the opening 2A. The fifth gear 556 meshes with the fourth gear 555 such that it rotates as the fourth gear 555 rotates and transmits the rotating force to the belt 557 wrapped around the fifth gear 556.

The belt 557 is disposed along the face of the base frame 51 on which the opening 2A is formed. The belt 557 is wrapped around the fifth gear 556 and the sixth gear 558 and transmits rotation of the fifth gear 556 to the sixth gear 558.

The sixth gear 558 transmits the rotating force transmitted thereto from the belt 557 to the seventh gear 559.

The seventh gear 559 transmits the rotating force transmitted thereto from the sixth gear 558 to a gear 61R2 which forms the carrying unit 6 hereinafter described and forms the front arm 61R which is disposed on the right side of the base frame 51. The diametrical dimensions of the sixth gear 558 and the seventh gear 559 are set such that the speed of rotation of the seventh gear 559 per unit time is equal to the speed of rotation of the fifth gear 556 per unit time.

(5) Carrying Unit 6

Here, the configuration of the carrying unit 6 is described.

Figure 9:
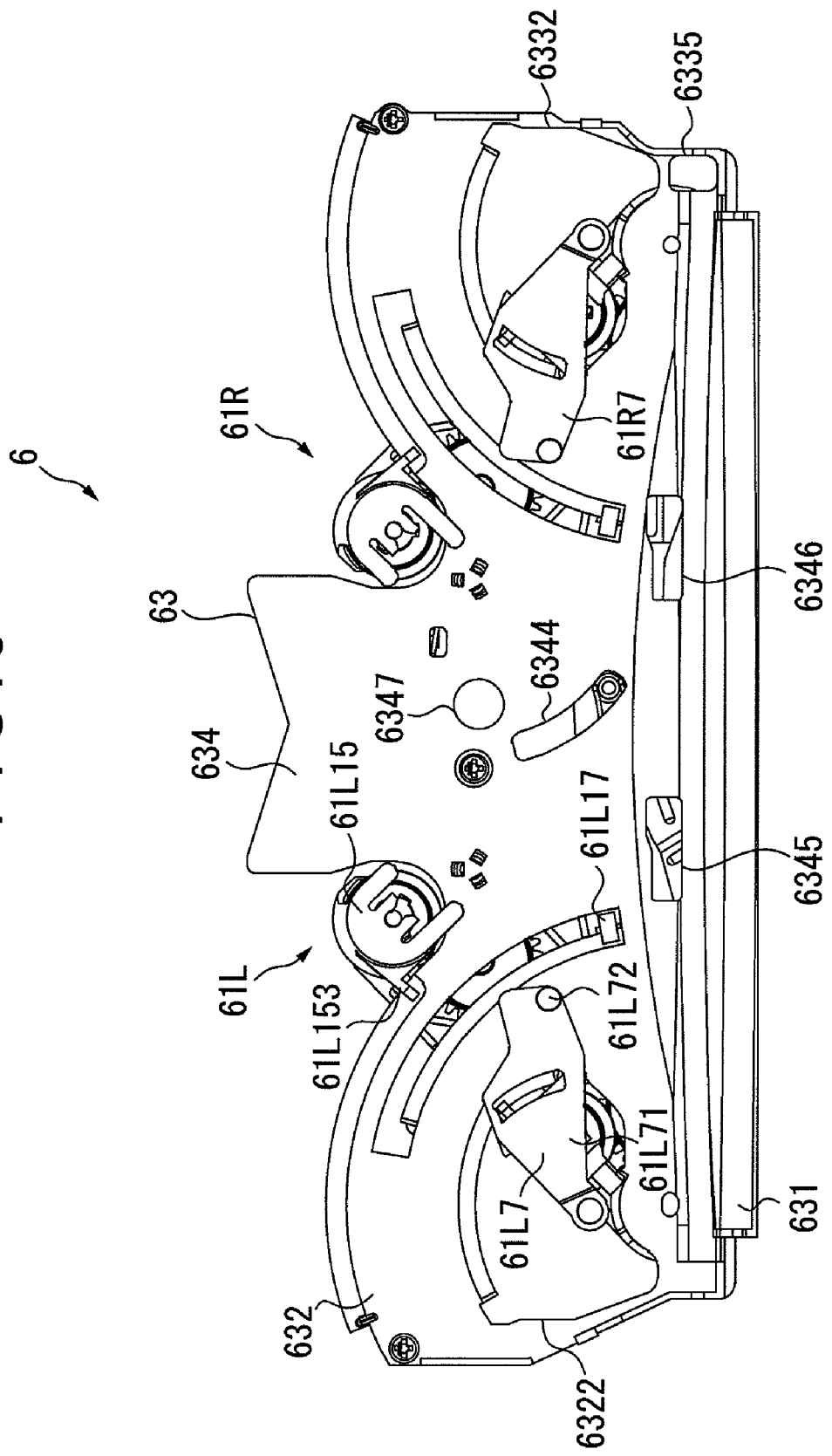
FIG. 9 is a view showing a carrying unit in the disk apparatus as viewed from above.
Figure 10:
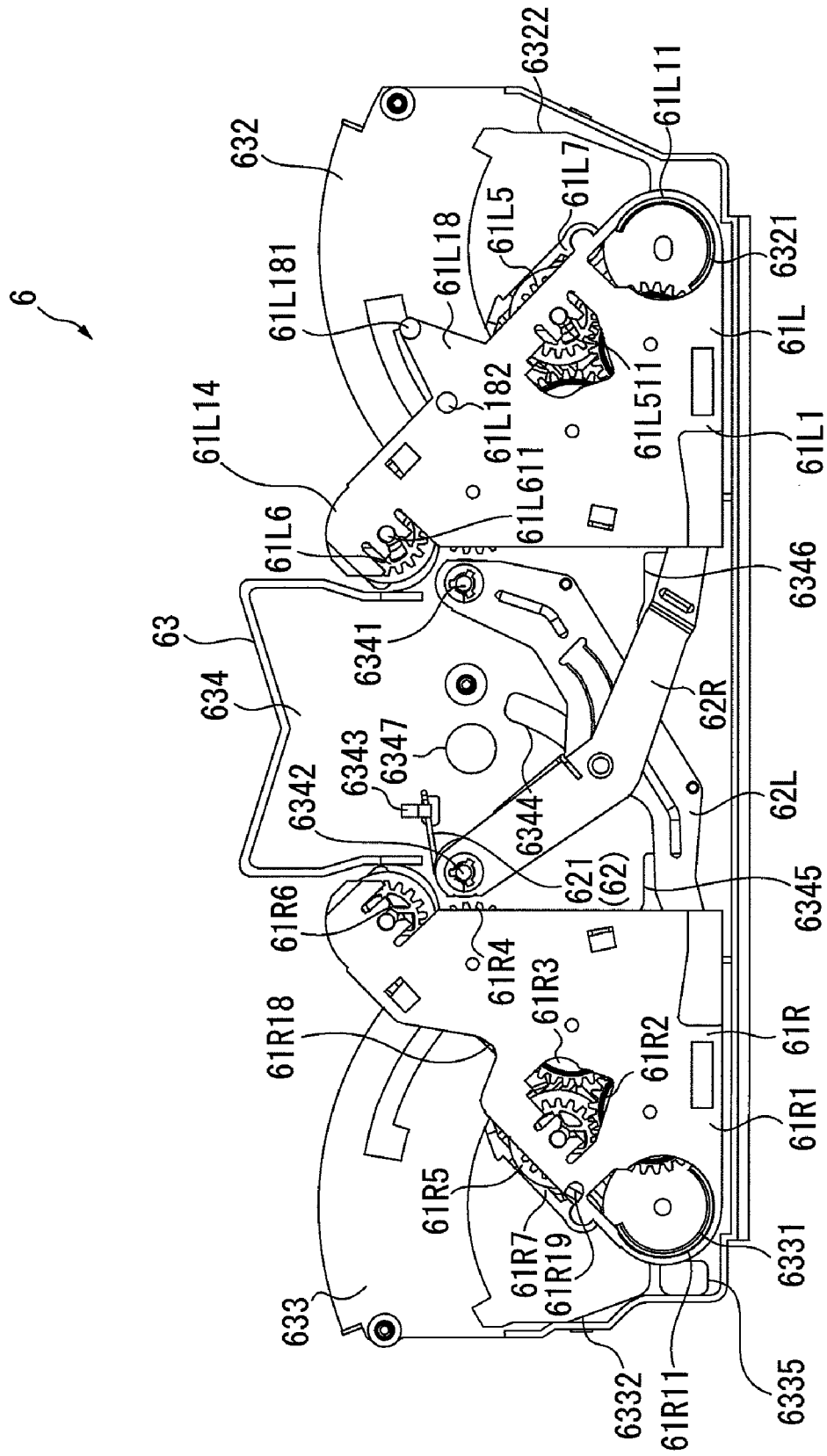
FIG. 10 is a view showing the carrying unit in the disk apparatus as viewed from below.
Figure 11:
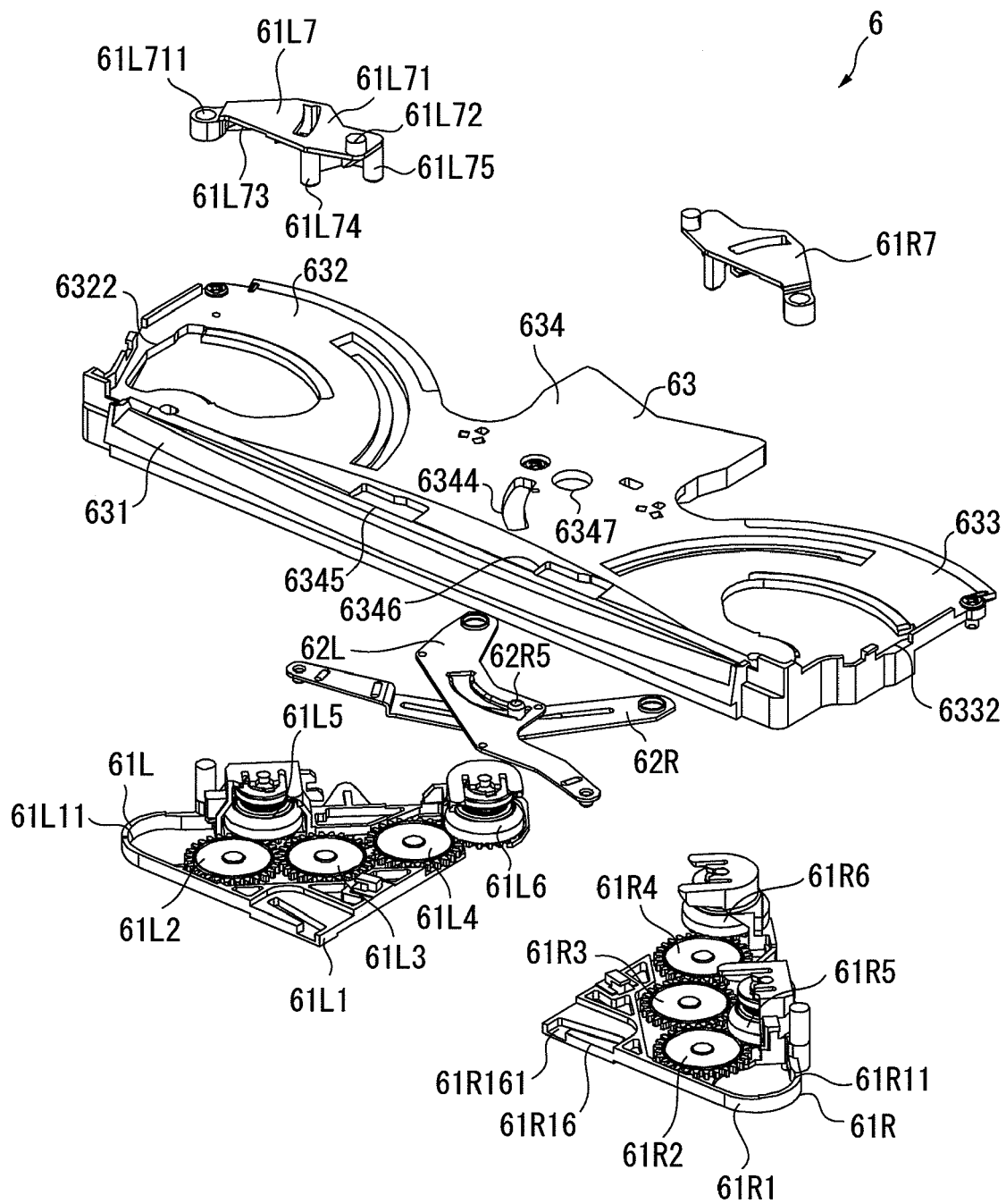
FIG. 11 is an exploded perspective view showing the carrying unit in the disk apparatus.

FIGS. 9 to 11 show the carrying unit 6. More particularly, FIG. 9 shows the carrying unit 6 as viewed from above, and FIG. 10 shows the carrying unit 6 as viewed from below. FIG. 11 is an exploded perspective view showing the carrying unit 6.

Referring to FIGS. 9 to 11, the carrying unit 6 is disposed on the base frame 51 such that it covers the transmission mechanism 55. The carrying unit 6 carries the disk D inserted through the opening 2A into the inside of the apparatus body 2 and carries the disk D accommodated therein to the outside of the apparatus body 2 through the opening 2A. In other words, the carrying unit 6 corresponds to the carrying means in the present invention.

As shown in FIGS. 9 to 11, the carrying unit 6 includes two front arms 61L and 61R, two link arms 62L and 62R, and a bracket 63 for supporting the front arms 61L and 61R and the link arms 62L and 62R.

(5-1) Configuration of the Bracket 63

The bracket 63 is a member in the form of a flat plate formed from a synthetic resin material or the like and having a substantially leftwardly and rightwardly symmetrical shape. A concave portion 631 is formed on the lower side in FIGS. 9 and 10 of the bracket 63 such that it projects perpendicularly from the opposite left and right ends thereof. The concave portion 631 forms a lower end of the opening 2A as the bracket 63 is attached to the base frame 51. The concave portion 631 is formed in accordance with the diametrical dimension of the first disk D1. In other words, the bracket 63 corresponds to the support member of the present invention.

Arm attachment portions 632 and 633 to which the front arms 61L and 61R are attached, respectively, are formed on the opposite left and right sides of the bracket 63 as seen in FIGS. 9 to 11. A link attachment portion 634 to which the link arms 62L and 62R are attached is formed at a substantially central portion of the bracket 63.

The arm attachment portions 632 and 633 have an outer profile of a substantially sectoral shape. As shown in FIG. 10, substantially semi-arcuate support portions 6321 and 6331 are formed in the proximity of the opposite left and right ends of the bracket 63 and in the proximity of the concave portion 631 in such a manner as to project perpendicularly on the rear face side (side opposing to the base frame 51) of the arm attachment portions 632 and 633.

The support portions 6321 and 6331 are fitted in openings 61L11 and 61R11 (refer to FIG. 11) of the front arms 61L and 61R, respectively. The front arms 61L and 61R are mounted for pivotal motion around the support portions 6321 and 6331 such that they slidably move on the bracket 63, respectively. Further, in the inside of the support portion 6321 from between the support portions 6321 and 6331, a second gear portion 5562 of the fifth gear 556 which forms the transmission mechanism 55 described hereinabove is positioned, and in the inside of the support portion 6331, a second gear portion 5592 of the seventh gear 559 is positioned.

In addition, openings 6322 and 6332 are formed on the arm attachment portions 632 and 633, respectively.

The opening 6322 is formed in the proximity of the support portion 6321. A first roller support portion 61L13 (refer to FIG. 12) and a lock arm 61L7 of the front arm 61L which is exposed to an upper face of the bracket 63 (face remote from the face of the bracket 63 opposing to the base frame 51) are fitted in the opening 6322. The opening 6322 is formed in such a size that it does not interfere with the first roller support portion 61L13 and the lock arm 61L7 when the front arm 61L is pivoted.

An opening 6332 is formed in the arm attachment portion 633 such that it is substantially leftwardly and rightwardly symmetrical to the opening 6322 formed in the arm attachment portion 632.

In addition, a substantially rectangular opening 6335 is formed in the arm attachment portion 633 in a neighboring relationship with the support portion 6331 on the outer side of the support portion 6331 such that the shutter lever 58 hereinafter described is fitted therein. The opening 6335 corresponds to an angular portion on the right side of the apparatus body 2 rather near to the opening 2A as the bracket 63 is attached to the base frame 51.

The link attachment portion 634 is formed at a substantially central portion of the bracket 63 such that it is sandwiched by the arm attachment portions 632 and 633 as seen in FIGS. 9 to 11.

As shown in FIG. 10, projections 6341 and 6342 which project perpendicular to the rear face of the link attachment portion 634, a hooked portion 6343, a hole 6344, substantially rectangular openings 6345 and 6346 and a substantially circular opening 6347 are formed on the rear face side of the link attachment portion 634.

The two projections 6341 and 6342 are formed in a juxtaposed relationship with a predetermined distance left therebetween in the leftward and rightward direction. The link arms 62L and 62R are supported for pivotal motion on the projections 6341 and 6342, respectively.

The hooked portion 6343 is formed in the proximity of the projection 6342 such that it projects in a substantially L-shaped cross section to the rear face side of the bracket 63. The hooked portion 6343 anchors a torsion spring 621 wrapped around the projection 6342.

The hole 6344 is formed in an arcuate shape centered at the projection 6342 at a substantially central portion of the link attachment portion 634. A projection 62R5 formed on the link arm 62R hereinafter described is fitted in the hole 6344.

The substantially rectangular openings 6345 and 6346 are formed in a leftwardly and rightwardly juxtaposed relationship with each other on the link attachment portion 634 in the proximity of the concave portion 631 as seen in FIGS. 9 to 11. A lock lever 573 which forms the insertion preventing mechanism 57 hereinafter described is exposed to the openings 6345 and 6346 after the disk D is accommodated.

The substantially circular opening 6347 is formed between the projections 6341 and 6342. The opening 6347 is provided so as to allow a flux of light emitted from the light emitting element of the photo-sensor 703 provided on the upper unit 7 hereinafter described to pass therethrough. The flux of light passes through the opening 6347 and is received by the light receiving element 541 provided on the control board 54 described hereinabove.

(5-2) Configuration of the Front Arm 61L

Figure 12:
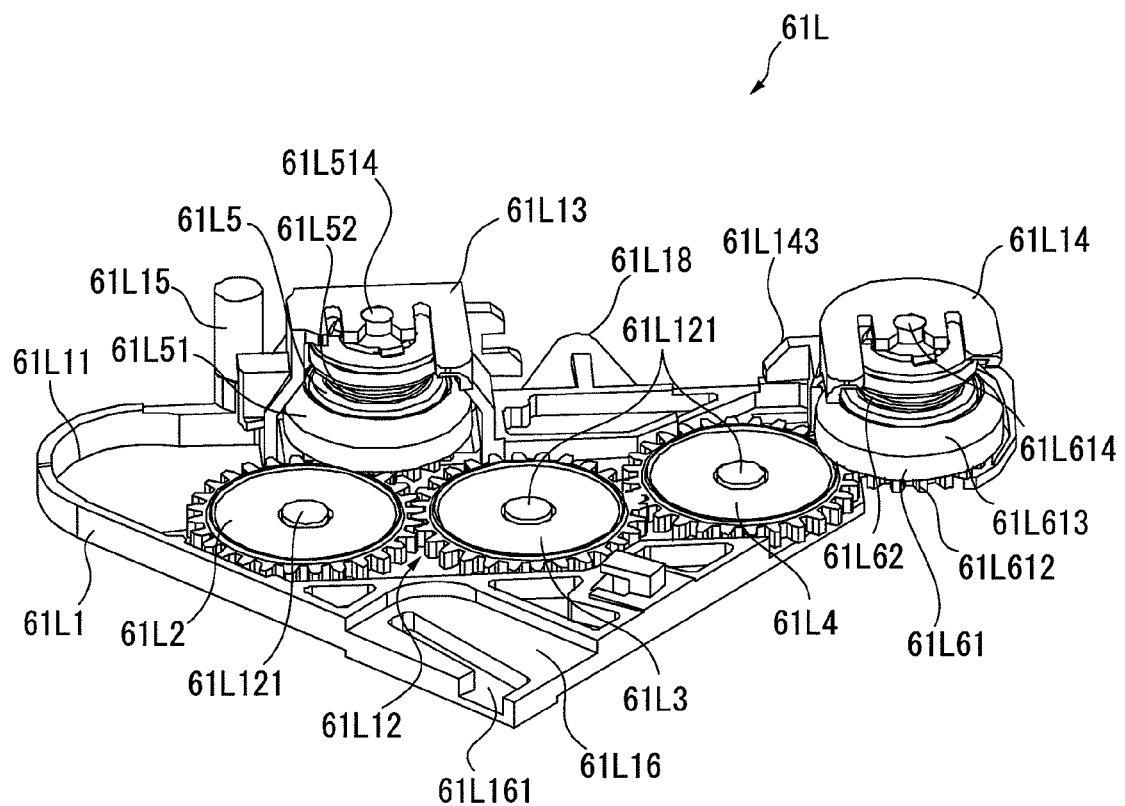
FIG. 12 is a perspective view showing a front arm in the disk apparatus.

FIG. 12 is a perspective view showing the front arm 61L.

The front arms 61L and 61R (that front arm which is disposed on the left side where the opening 2A is disposed on the lower side as viewed in plan is denoted by 61L and the front arm disposed on the right side is denoted by 61R) correspond to the arms in the present invention which carry, upon disk accommodation, the disk D inserted through the opening 2A into the inside of the apparatus body 2, but carry, upon disk carrying out, the disk D mounted on the optical unit 4 to the outside of the opening 2A. The front arms 61L and 61K are attached to the arm attachment portions 632 and 633 formed on the bracket 63, respectively, as seen in FIGS. 9 and 10.

Referring to FIG. 12, the front arm 61L includes an arm body 61L1 attached for pivotal motion to the bracket 63, three gears 61L2 to 61L4, a first roller 61L5 and a second roller 61L6, and a lock arm 61L7.

The arm body 61L1 has a substantially right-angled triangular shape as viewed in plan and is attached from the rear face side of the bracket 63 such that one of the sides which define the right angle extends along the concave portion 631.

A substantially circular opening 61L11, a recess 61L12, a first roller support portion 61L13, a second roller support portion 61L14, an arm attachment portion 61L15, an offset portion 61L16 and an extension 61L18 are formed on the arm body 61L1.

The opening 61L11 is formed at one of angle portions of the arm body 61L1 which is not substantially right-angled. The support portion 6321 formed on the arm attachment portion 632 of the bracket 63 is fitted in the inside of the opening 61L11 such that the arm body 61L1 is pivoted within the region of the arm attachment portion 632 around the support portion 6321.

Further, when the carrying unit 6 is attached to the base frame 51 of the lower unit 5, the fifth gear 556 of the transmission mechanism 55 is accommodated in the opening 61L11.

The recess 61L12 is formed at a substantially central portion of the upper face (face opposing to the bracket 63) of the arm body 61L1.

Three projections 61L121 are formed in the recess 61L12 and support the gears 61L2 to 61L4 for rotation thereon, respectively.

The first roller support portion 61L13 and the second roller support portion 61L14 are formed at a substantially central portion of an oblique side portion of the arm body 61L1 and at an end portion of the oblique side portion remote from the side on which the opening 61L11 is formed, respectively. The first roller support portion 61L13 and the second roller support portion 61L14 support the first roller 61L5 and the second roller 61L6 for rotation thereon, respectively.

The first roller support portion 61L13 and the second roller support portion 61L14 are formed in a substantially semicircular shape in such a manner as to cover portions of the first roller 61L5 and the second roller 61L6 supported for rotation on the support portions 61L13 and 61L14 which are remote from the side opposing to the right-angled portion of the arm body 61L1, respectively.

The arm attachment portion 61L15 is formed in the form of a pin at a portion displaced from the first roller support portion 61L13 toward the opening 61L11. The arm attachment portion 61L15 supports the lock arm 61L7 hereinafter described for pivotal motion thereon. Also a torsion spring (not shown) for biasing the lock arm 61L7 toward the first roller support portion 61L13 side is attached to the arm attachment portion 61L15 such that, in a normal state, the lock arm 61L7 contacts with the side of the first roller support portion 61L13 remote from the side to which the first roller 61L5 is exposed.

The offset portion 61L16 is formed at the right-angled portion of the arm body 61L1. A groove 61L161 of a substantially L shape as viewed in plan is formed on the offset portion 61L16. A projection 62R2 formed on the link arm 62R hereinafter described is fitted in the groove 61L161.

The extension 61L18 is formed between the first roller support portion 61L13 on the oblique side portion of the arm body 61L1 and the second roller support portion 61L14 such that it extends in a substantially triangular shape as viewed in plan in a direction away from the oblique side portion.

Referring to FIG. 10, two projections 61L181 and 61L182 are formed on the extension 61L18 such that they project toward the rear face side (remote from the side opposing to the bracket 63).

The gear 61L2 meshes with the fifth gear 556 exposed from the opening 61L11 of the arm body 61L1 and is rotated by rotation of the fifth gear 556. Further, the gear 61L2 meshes with the first roller 61L5 and transmits rotation of the fifth gear 556 to the first roller 61L5.

The gear 61L3 and the gear 61L4 mesh with each other, and as the gear 61L2 rotates, the gear 61L3 rotates in the opposite direction to that of rotation of the gear 61L2, and the gear 61L4 rotates in the same direction as that of rotation of the gear 61L2.

The gear 61L4 meshes with the second roller 61L6 and rotates the second roller 61L6 at an equal speed in the same direction as that of rotation of the first roller 61L5.

The first roller 61L5 and the second roller 61L6 grip and carry the disk D, and the second roller 61L6 corresponds to the roller in the present invention while the first roller 61L5 corresponds to the different roller in the present invention.

The second roller 61L6 includes a roller body 61L61 and a rubber roller 61L62.

The roller body 61L61 includes a projection 61L611 (refer to FIG. 10) and another projection 61L614 supported on the second roller support portion 61L14 described hereinabove, a gear portion 61L612, a drill-shaped portion 61L613 and a shaft portion (not shown).

The gear portion 61L612 meshes with the gear 61L4 and rotates the second roller 61L6 when the gear 61L4 rotates.

The drill-shaped portion 61L613 is formed in a substantially truncated conical shape inclined in such a manner as to interconnect the gear portion 61L612 and the rubber roller 61L62.

The shaft portion is formed in a substantially cylindrical shape though not particularly shown in the drawings, and the rubber roller 61L62 is fitted on the shaft portion.

Figure 13:
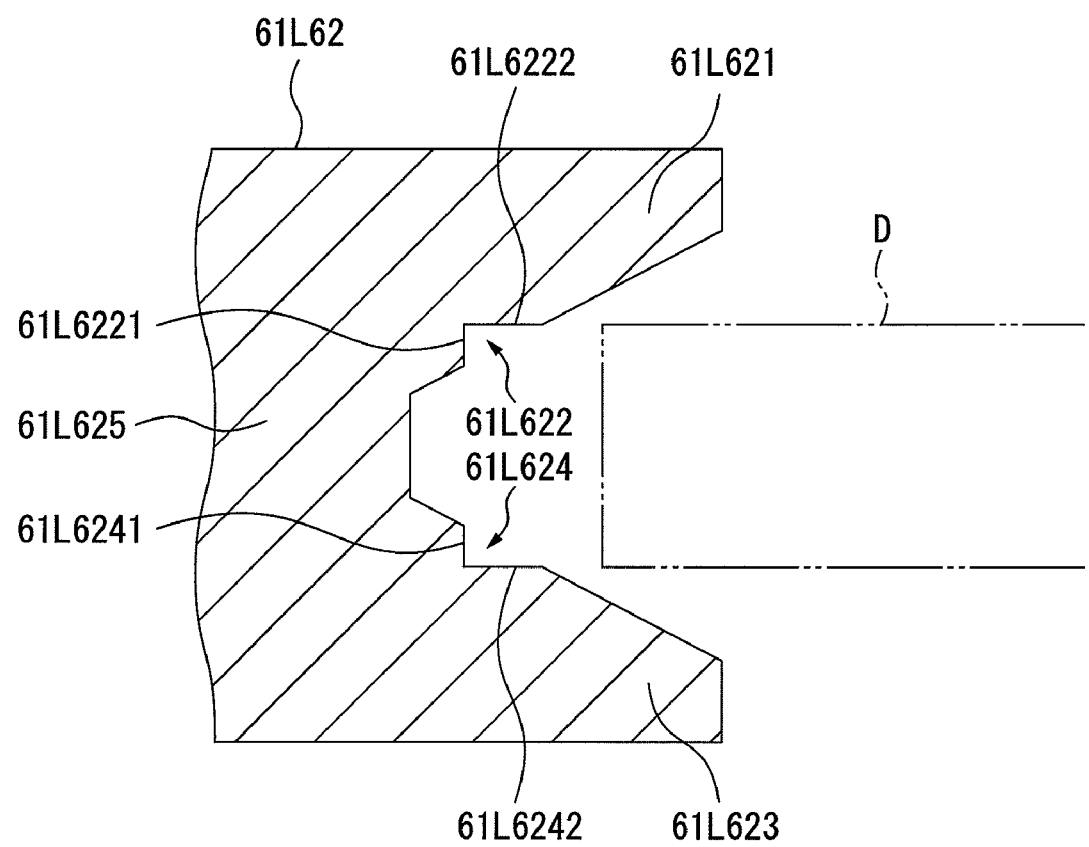
FIG. 13 is a view showing a cross section of a rubber roller in the disk apparatus.

FIG. 13 shows a vertical section of the rubber roller 61L62.

Referring to FIG. 13, the rubber roller 61L62 has a hole (not shown) formed at a substantially central portion thereof as viewed in plan, and the shaft portion of the roller body 61L61 is fitted in the hole to mount the rubber roller 61L62 on the roller body 61L61 such that the rubber roller 61L62 rotates together with the roller body 61L61.

A pair of gripping portions 61L621 and 61L623 of a substantially truncated conical shape is formed at the opposite ends of the rubber roller 61L62 in the direction of the axis of rotation of the rubber roller 61L62 as seen in FIG. 13. Further, a cylindrical connection portion 61L625 is formed on the rubber roller 61L62 such that it interconnects the gripping portions 61L621 and 61L623. The gripping portions 61L621 and 61L623 are formed such that end portions thereof having a smaller diametrical dimension are opposed to each other.

Notches 61L622 and 61L624 of a substantially L shape in vertical section are formed along an outer periphery of the gripping portions 61L621 and 61L623 on the gripping portions 61L621 and 61L623, respectively.

In particular, the notches 61L622 and 61L624 are formed such that the right-angled portions thereof having a substantially L shape in vertical section oppose to each other on the gripping portions 61L621 and 61L623 and the distance between the notches 61L622 and 61L624 is substantially equal to the thicknesswise dimension of the disk D (dimension of the disk D in the direction of the axis of rotation). The disk D is fitted between the notches 61L622 and 61L624 such that side faces of the disk D (faces of the disk D along the direction of the axis of rotation) contact with vertical portions 61L6221 and 61L6241 of the notches 61L622 and 61L624 (portions of the rubber roller 61L62 along the direction of the axis of rotation) while an upper face and a lower face of the disk D contact with horizontal portions 61L6222 and 61L6242 (portions of the rubber roller 61L62 along the direction of the axis of rotation), respectively. Thus, the disk D is sandwiched by the horizontal portions 61L6222 and 61L6242 of the notches 61L622 and 61L624, and rotational force is applied to the disk D from the vertical portions 61L6221 and 61L6241 together with the horizontal portions 61L6222 and 61L6242.

By such a configuration of the rubber roller 61L62 as described above, abrasion of the rubber roller 61L62 can be suppressed without reducing the gripping force for the disk D.

In particular, if such notches 61L622 and 61L624 as described above are not formed on the gripping portions 61L621 and 61L623, then an end edge of the disk D contacts with inclined portions of the gripping portions 61L621 and 61L623. In such an instance, although the gripping force for the disk D by the gripping portions 61L621 and 61L623 is raised, the inclined portions of the gripping portions 61L621 and 61L623 are planed by angular portions of the disk D, resulting in a problem that the gripping portions 61L621 and 61L623 are liable to be abraded.

On the other hand, where the entire rubber roller 61L62 is formed in a substantially cylindrical shape, since a side face of the disk D contacts with a side face of the cylindrical portion, abrasion of the rubber roller 61L62 is suppressed. However, in such an instance as just described, there is the possibility that the rubber roller 61L62 may not grip the disk D appropriately and the disk D may move in upward and downward directions upon rotation of the rubber roller 61L62.

In contrast, with the rubber roller 61L62 in the present embodiment, since an end edge of the disk D is fitted in the notches 61L622 and 61L624 of the gripping portions 61L621 and 61L623 of a substantially truncated conical shape opposing to each other, the upper face and the lower face of the disk D can be held by the horizontal portions 61L6222 and 61L6242 of the notches 61L622 and 61L624, respectively. Consequently, the disk D can be gripped appropriately. In this instance, since angle portions of the disk D are fitted in the right-angled portions of the notches 61L622 and 61L624 (portions defined by the vertical portions 61L6221 and 61L6241 and the horizontal portions 61L6222 and 61L6242), the planing of the rubber roller 61L62 by the angle portions of the disk D can be suppressed. Further, since side faces of the disk D contact with the vertical portions 61L6221 and 61L6241 of the notches 61L622 and 61L624, rotating force can be applied appropriately to the disk D.

Accordingly, elongation of the life of the rubber roller 61L62 can be anticipated. Further, since broken pieces of the rubber roller 61L62 produced by abrasion can be prevented from dispersing in the inside of the disk apparatus 1, the inside of the disk apparatus 1 can be kept in a clean state. Furthermore, since the rubber roller 61L62 can grip and carry the disk D appropriately, the pressing force of the rubber roller 61L62 against the disk D can be reduced. Consequently, the resistance upon insertion of the disk D can be reduced, and therefore, an impression and a feeling that the disk D is drawn in naturally can be provided to the user.

The first roller 61L5 has a configuration similar to that of the second roller 61L6.

In particular, the first roller 61L5 has a configuration similar to that of the second roller 61L6 and includes a roller body 61L51 and a rubber roller 61L52.

The lock arm 61L7 is attached for pivotal motion on the arm attachment portion 61L15 formed on the arm body 61L1 as described hereinabove. The lock arm 61L7 similarly utilizes the biasing force of a torsion spring (not shown) attached to the arm attachment portion 61L15 to center the disk D (particularly the second disk D2 having the smaller diameter) inserted from an end portion of the opening 2A with respect to the opening 2A so that the second disk D2 is accommodated into the apparatus body 2 appropriately. In other words, the lock arm 61L7 corresponds to the lever member in the present invention.

Referring to FIG. 11, the lock arm 61L7 includes a plate-like portion 61L71, a projection 61L72 projecting upwardly from the plate-like portion 61L71, and a regulation portion 61L73 and two contacting portions 61L74 and 61L75 depending from the plate-like portion 61L71.

A substantially circular hole 61L711 is formed on one end side of the plate-like portion 61L71 such that the arm attachment portion 61L15 of the arm body 61L1 described hereinabove is inserted therein.

The projection 61L72 is formed so as to project from an upper face of the plate-like portion 61L71 and engages with a groove 7016L formed on the top frame 701 of the upper unit 7 hereinafter described to guide the lock arm 61L7 for pivotal motion.

The regulation portion 61L73 contacts with the first roller support portion 61L13 to regulate the lock arm 61L7 so as not to pivot to the forward side (side on which the first roller 61L5 is exposed) farther than the first roller support portion 61L13. Further, the aforementioned torsion spring contacts with the side of the regulation portion 61L73 remote from the side opposing to the first roller support portion 61L13 such that it is acted upon by the biasing force from the torsion spring.

The contacting portions 61L74 and 61L75 are formed each in the form of a pin which depends from the bottom face (face on the side opposing to the front arm 61L1) of the plate-like portion 61L71. The contacting portion 61L75 is formed on the side remote from the hole 61L711 while the contacting portion 61L74 is formed at a position displaced toward the center from the contacting portion 61L75. Here, a straight line interconnecting the contacting portions 61L74 and 61L75 where the lock arm 61L7 is attached to the arm attachment portion 61L15 and the regulation portion 61L73 contacts with the first roller support portion 61L13 is set so as to extend substantially in parallel to another straight line which interconnects the first roller 61L5 and the second roller 61L6.

The contacting portion 61L74 contacts with an end edge of the first disk D1 having the larger diameter. Meanwhile, the contacting portion 61L75 contacts with an end edge of the second disk D2 of the smaller diameter. Since the contacting portions 61L74 and 61L75 push an end edge of the disk D toward the center of the carrying unit 6 under the biasing force of the torsion spring, centering of the disk D is performed smoothly.

The front arm 61R has a configuration similar to that of the front arm 61L described hereinabove.

More particularly, the front arm 61R has an arm body 61R1, gears 61R2 to 61R4, a first roller 61R5, a second roller 61R6 and a lock arm 61R7 as seen in FIG. 10. It is to be noted that the arm body 61R1 and the lock arm 61R7 have configurations leftwardly and rightwardly symmetrical to the arm body 61L1 and the lock arm 61L7, respectively. In particular, in the front arm 61R, the first roller 61R5 corresponds to the different roller in the present invention, and the second roller 61R6 corresponds to the roller in the present invention while the lock arm 61R7 corresponds to the lever member in the present invention.

A pressing portion 61R18 cut away in a substantially L shape as viewed in plan is formed at a position of the arm body 61R1 which corresponds to the extension 61L18 of the arm body 61L1. The pressing portion 61R18 contacts, upon pivotal motion of the front arm 61R upon carrying of the disk D, with the first switch 542 and the second switch 543 to change over the first and second switches 542 and 543 into an on state. On the other hand, when the front arm 61R is pivoted upon carrying out of the disk D, the pressing portion 61R18 is spaced away from the first switch 542 and the second switch 543 to change over the first switch 542 and the second switch 543 into an off state.

Further, a projection 61R19 is formed in the proximity of the opening 61R11 on the lower face (face opposing to the base frame 51) side of the arm body 61R1. The projection 61R19 contacts with an inclined portion 587 (refer to FIGS. 44 to 46) of the shutter lever 58 to pivot the shutter lever 58.

It is to be noted that the configuration of the shutter lever 58 is hereinafter described, and description of the configuration of the other part of the slide cam 56R is omitted herein since it is similar to that of the front arm 61L.

(5-3) Configuration of the Link Arms 62L and 62R

The link arms 62L and 62R are attached to the lower face side of the bracket 63 as seen in FIGS. 10 and 11. The link arms 62L and 62R correspond to the links in the present invention which are connected to the front arms 61L and 61R, respectively, to move the front arms 61L and 61R in a direction in which they approach each other and in another direction in which they are spaced away from each other.

The link arm 62L is attached to the left side of the link attachment portion 634 of the bracket 63 (side near to the arm attachment portion 632 (refer to FIG. 10)). Meanwhile, the link arm 62R is attached to the right side (side near to the arm attachment portion 633 (refer to FIG. 10)). The link arms 62L and 62R are disposed such that they intersect with each other at substantially central portions thereof.

The torsion spring 621 (refer to FIG. 10) corresponds to the biasing means in the present invention and applies biasing force to the link arm 62R to bias the front arm 61L toward the concave portion 631 side through the link arm 62R and bias the front arm 61R, which engages with the link arm 62R, toward the concave portion 631 side.

Figure 14:
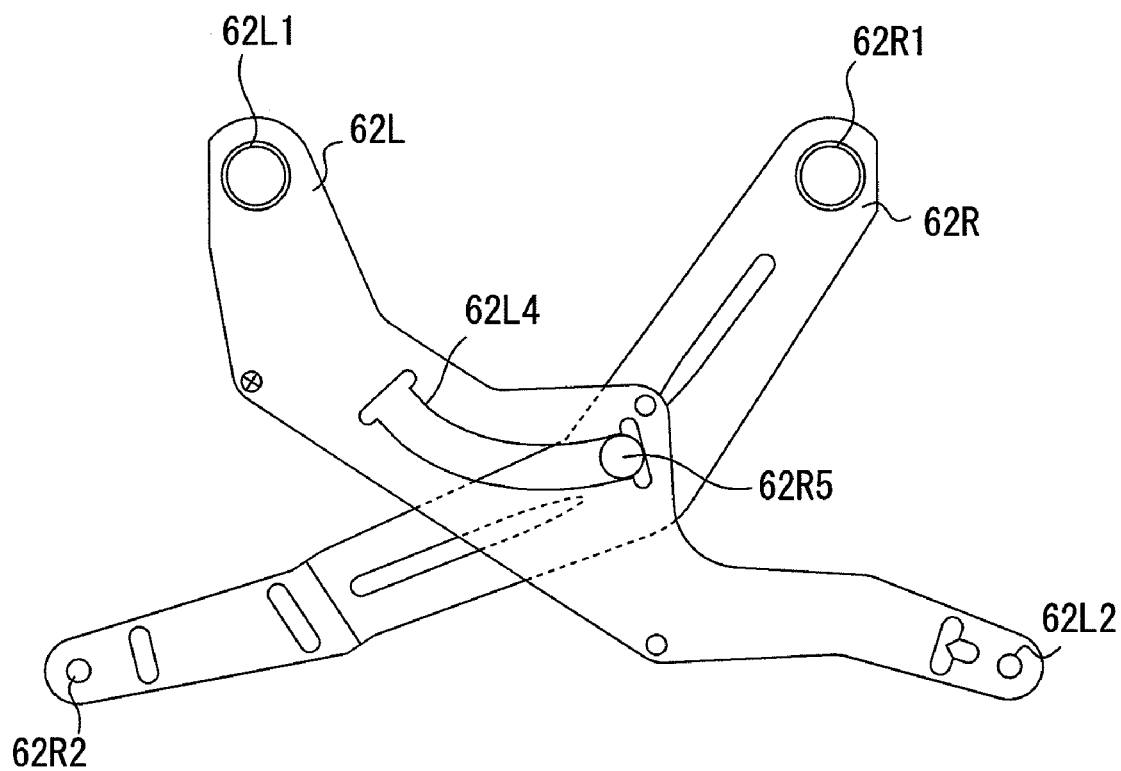
FIG. 14 is a top plan view showing link arms in the disk apparatus.

FIG. 14 is a plan view of the link arms 62L and 62R as viewed from the side opposing to the bracket 63.

Referring to FIG. 14, the link arm 62R is an elongated plate-like member made of a metal material and bent a little. A hole 62R1 is formed at an end portion of the link arm 62R while a substantially cylindrical projection 62R2 is formed at the other end portion of the link arm 62R such that it projects in a perpendicular direction (direction opposing to the bracket 63). The hole 62R1 is mounted on the projection 6342 (refer to FIG. 10) formed on the link attachment portion 634 of the bracket 63 together with the torsion spring 621 (refer to FIG. 10). Consequently, the link arm 62R is supported for pivotal motion around the projection 6342 (refer to FIG. 10).

Further, the projection 62R2 is disposed in the groove 61L161 (refer to FIG. 12) of the arm body 61L1 which forms the front arm 61L described hereinabove. Consequently, pivotal motion of the link arm 62R and pivotal motion of the front arm 61L correspond to each other.

A substantially cylindrical projection 62R5 is formed at a substantially central portion of the link arm 62R. The projection 62R5 is fitted in an arcuate hole 62L4 of the link arm 62L hereinafter described and also in a hole 6344 (refer to FIG. 10) formed in the link attachment portion 634.

The link arm 62L is a plate-like member made of a metal material and bent on the opposite side to that of the link arm 62R as seen in FIG. 14. A hole 62L1 is formed on one end side of the link arm 62L, and a projection 6341 (refer to FIG. 10) of the link attachment portion 634 is fitted in the hole 62L1. Consequently, the link arm 62L is supported for pivotal motion around the projection 6341.

Further, a projection 62L2 is formed at an end portion of the link arm 62L on the opposite side to the end portion at which the hole 62L1 is formed, and slidably moves in the groove 61R161 (refer to FIG. 11) formed in the front arm 61R1 which forms the front arm 61R. Consequently, pivotal motion of the front arm 61L and pivotal motion of the front arm 61R correspond to each other.

An arcuate hole 62L4 is formed at a substantially central portion of the link arm 62L, and a projection 62R5 formed on the link arm 62R is fitted in the arcuate hole 62L4. The range in which the arcuate hole 62L4 is formed is set to the rage of movement of the projection 62R5 upon pivotal motion of the link arm 62R. Since the projection 62R5 is fitted in the hole 62L4, operation of one of the link arms 62L and 62R is transmitted to the other one of the link arms 62L and 62R.

Here, the arrangement positions of the front arms 61L and 61R are described.

As shown in FIGS. 9 and 10, the front arms 61L and 61R are attached so as to have axes of pivotal motion in the proximity of the opposite end portions of the concave portion 631 of the bracket 63. The front arms 61L and 61R pivot in synchronism with each other in directions toward and away from each other by the link arms 62L and 62R. Further, the front arms 61L and 61R are disposed such that, in a state wherein the disk D is inserted, they are inclined by approximately 45° with respect to the insertion direction of the disk D into the opening 2A so that end portions thereof on the side on which the second rollers 61L6 and 61R6 approach each other. Therefore, the intersecting angle between a straight line interconnecting the centers of the first roller 61L5 and the second roller 61L6 provided on the front arm 61L and another straight line interconnecting the centers of the first roller 61R5 and the second roller 61R6 provided on the front arm 61R is approximately 90°.

Further, the front arms 61L and 61R are disposed such that the distance between the second rollers 61L6 and 61R6 when the front arms 61L and 61R do not rotate is smaller than the diametrical dimension of the second disk D2. The front arms 61L and 61R are biased in a mutually approaching direction through the link arms 62L and 62R by the torsion spring 621 attached to a bracket 62. Therefore, the distance between the second rollers 61L6 and 61R6 when the second rollers 61L6 and 61R6 carry the disk D does not exceed the diametrical dimension of the first disk D1 also upon carrying of the first disk D1 and does not exceed the diametrical dimension of the second disk D2 upon carrying of the second disk D2.

(5-4) Operation of the Carrying Unit 6

Operation of the carrying unit 6 is described with reference to FIGS. 9 to 14.

In the carrying unit 6, when rotating force of the motor 53 is transmitted to the gear 61L2 of the front arm 61L from the fifth gear 556 (refer to FIG. 6) of the transmission mechanism 55, the first roller 61L5 is rotated by rotation of the gear 61L2. Further, the second roller 61L6 is rotated in the same direction as that of rotation of the first roller 61L5 through the gears 61L3 and 61L4.

Meanwhile, the gear 61R2 of the front arm 61R is rotated by rotation of the seventh gear 559 to rotate the first roller 61R5 and further rotate the second roller 61R6 through the gears 61R3 and 61R4 in the same direction as that of the first roller 61R5.

In this instance, the first roller 61L5 and the second roller 61L6 provided on the front arm 61L and the first roller 61R5 and the second roller 61R6 provided on the front arm 61R rotate in the opposite directions to each other.

On the other hand, when the front arm 61L is pivoted around the support portion 6321 in a direction in which it is spaced away from the concave portion 631 of the bracket 63, the link arm 62R is pivoted around the projection 6342 in a direction in which the end portion thereof at which the projection 62R2 is formed is spaced away from the concave portion 631 in such a manner that it is drawn by the front arm 61L. Thereupon, since the projection 62R5 formed on the link arm 62R moves along the hole 62L4 of the link arm 62L, the link arm 62L is pivoted around the projection 6341 in a direction in which the end portion thereof adjacent the projection 62L2 is spaced away from the concave portion 631. Therefore, the front arm 61R connected to the link arm 62L is pivoted around the support portion 6331 in a direction in which it is spaced away from the concave portion 631 in such a manner that it is pushed at the groove 61R161 hereof by the link arm 62L. When the front arm 61L is pivoted in a direction in which it is spaced away from the concave portion 631 in this manner, also the front arm 61R is pivoted in synchronism in a direction in which it is spaced away from the concave portion 631 similarly.

On the other hand, when the front arm 61L is pivoted around the support portion 6321 in a direction in which it approaches the concave portion 631, the link arms 62 described above acts reversely. Consequently, also the front arm 61R is pivoted in synchronism around the support portion 6331 in a direction in which it approaches the concave portion 631.

(6) Upper Unit 7

Now, the upper unit 7 is described.

Figure 15:
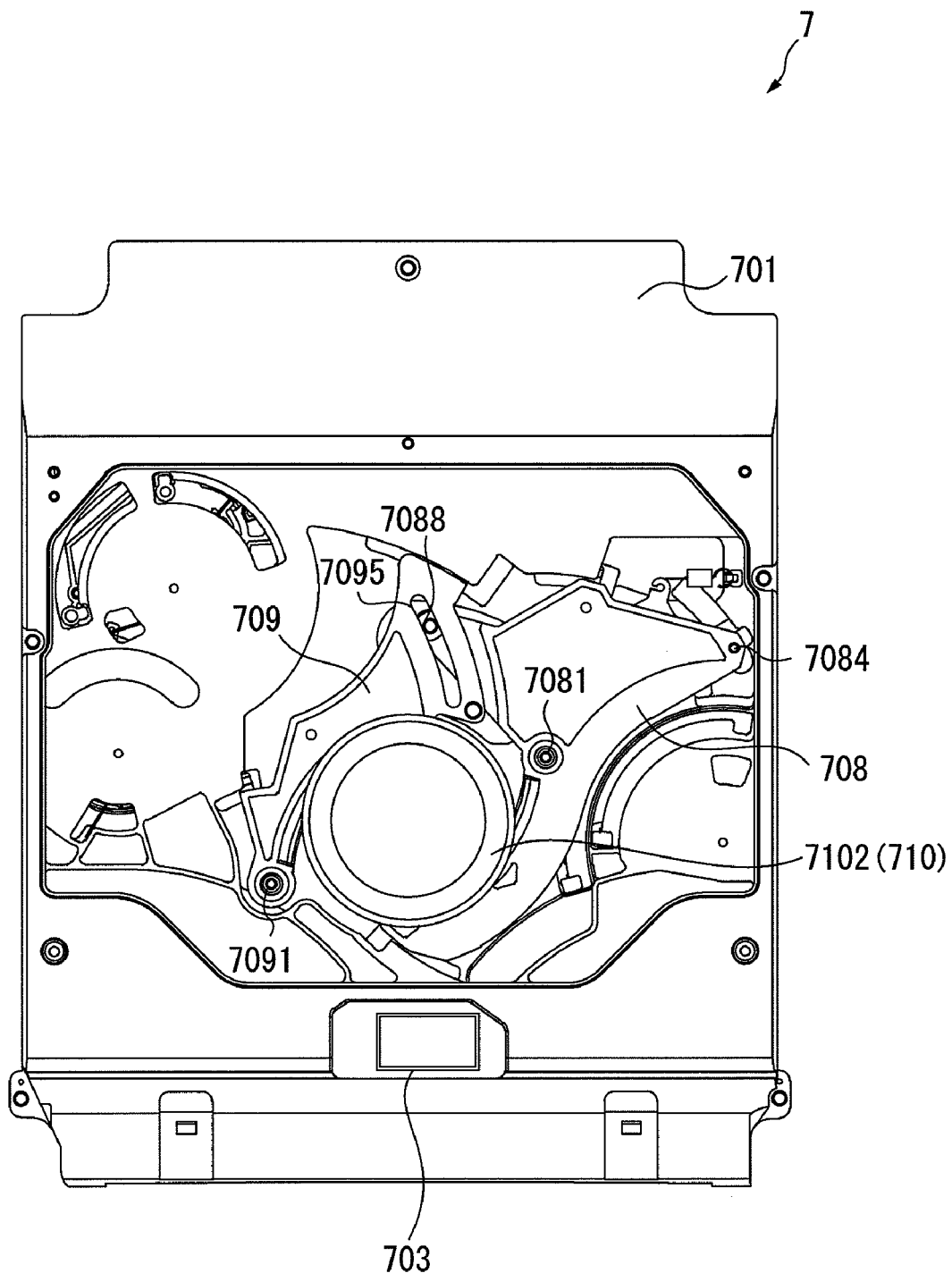
FIG. 15 is a view showing an upper unit in the disk apparatus as viewed from above.
Figure 16:
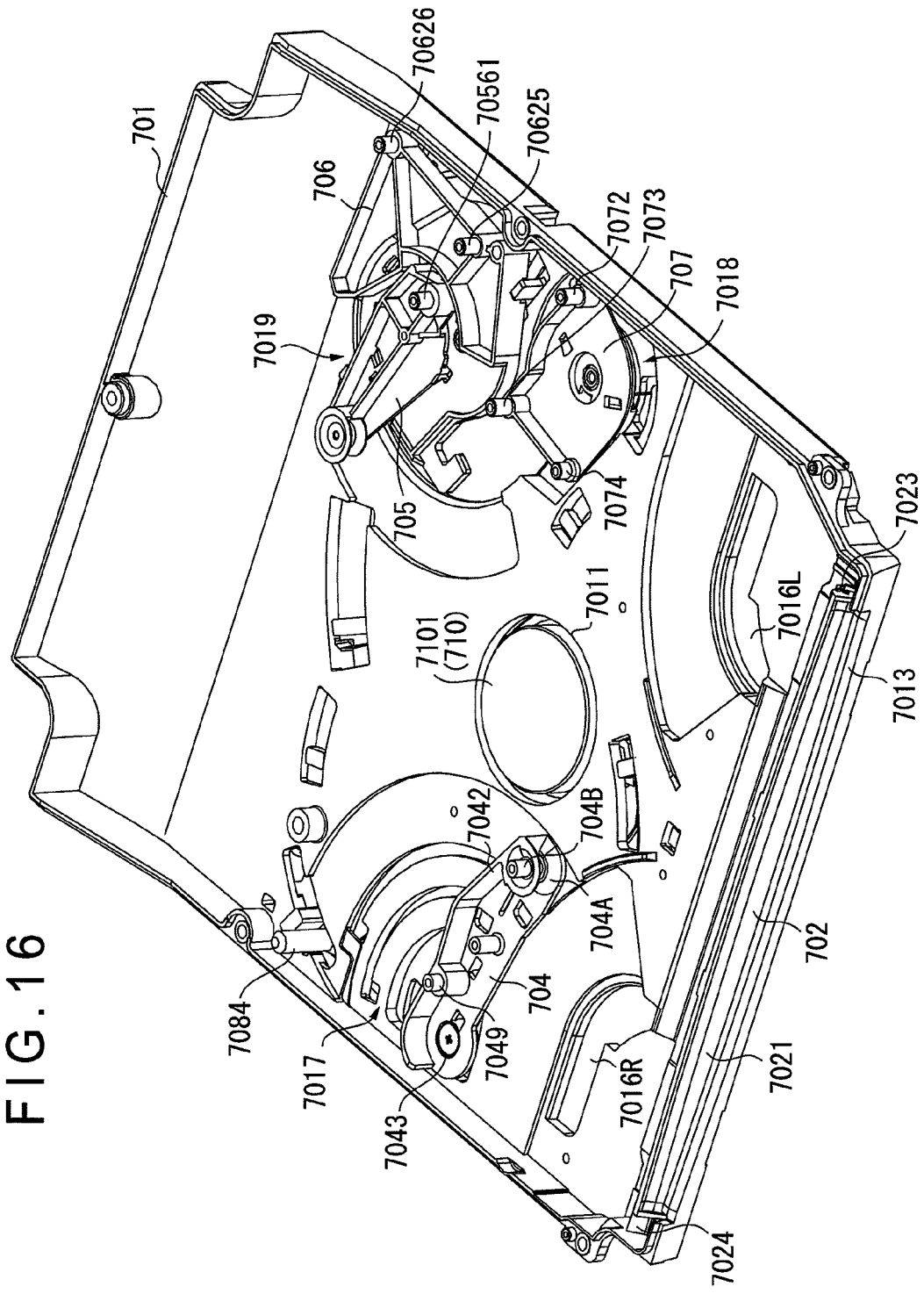
FIG. 16 is a perspective view showing the upper unit in the disk apparatus as viewed from below.
Figure 17:
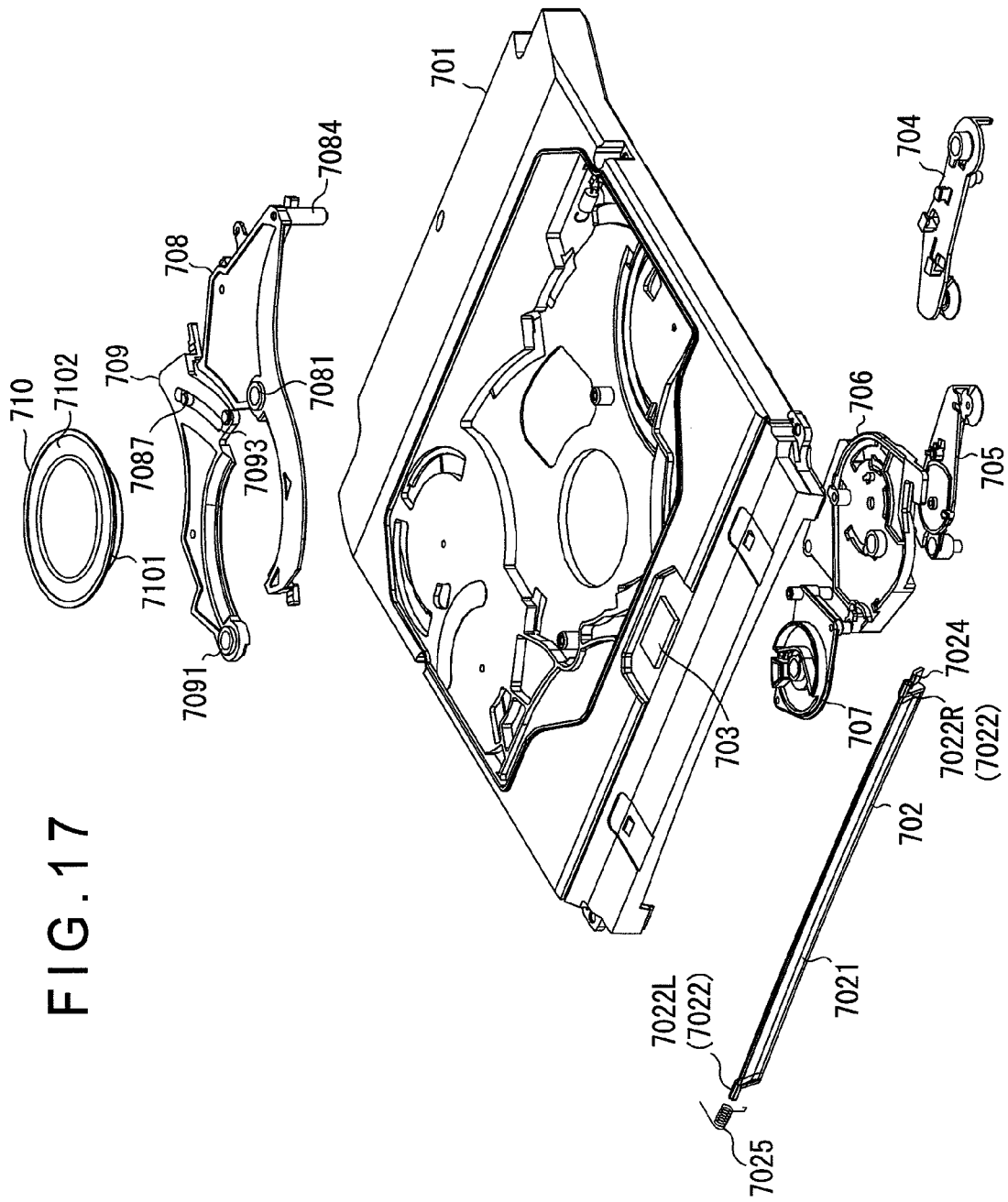
FIG. 17 is an exploded perspective view showing the upper unit in the disk apparatus.

FIGS. 15 to 17 show the upper unit 7. More particularly, FIG. 15 is a plan view of the upper unit 7 as viewed from above, and FIG. 16 is a perspective view of the upper unit 7 as viewed from below. Further, FIG. 17 is an exploded perspective view showing the upper unit 7.

The upper unit 7 forms an upper portion of the apparatus body 2.

Referring to FIGS. 15 to 17, the upper unit 7 includes a top frame 701, a shutter 702 attached to the top frame 701, a photo-sensor 703, a support arm 704, a detection arm 705, a guide arm 706, a guide lock 707, a pair of chuck arms 708 and 709, and a chuck pulley 710.

(6-1) Configuration of the Top Frame 701

Figure 18:
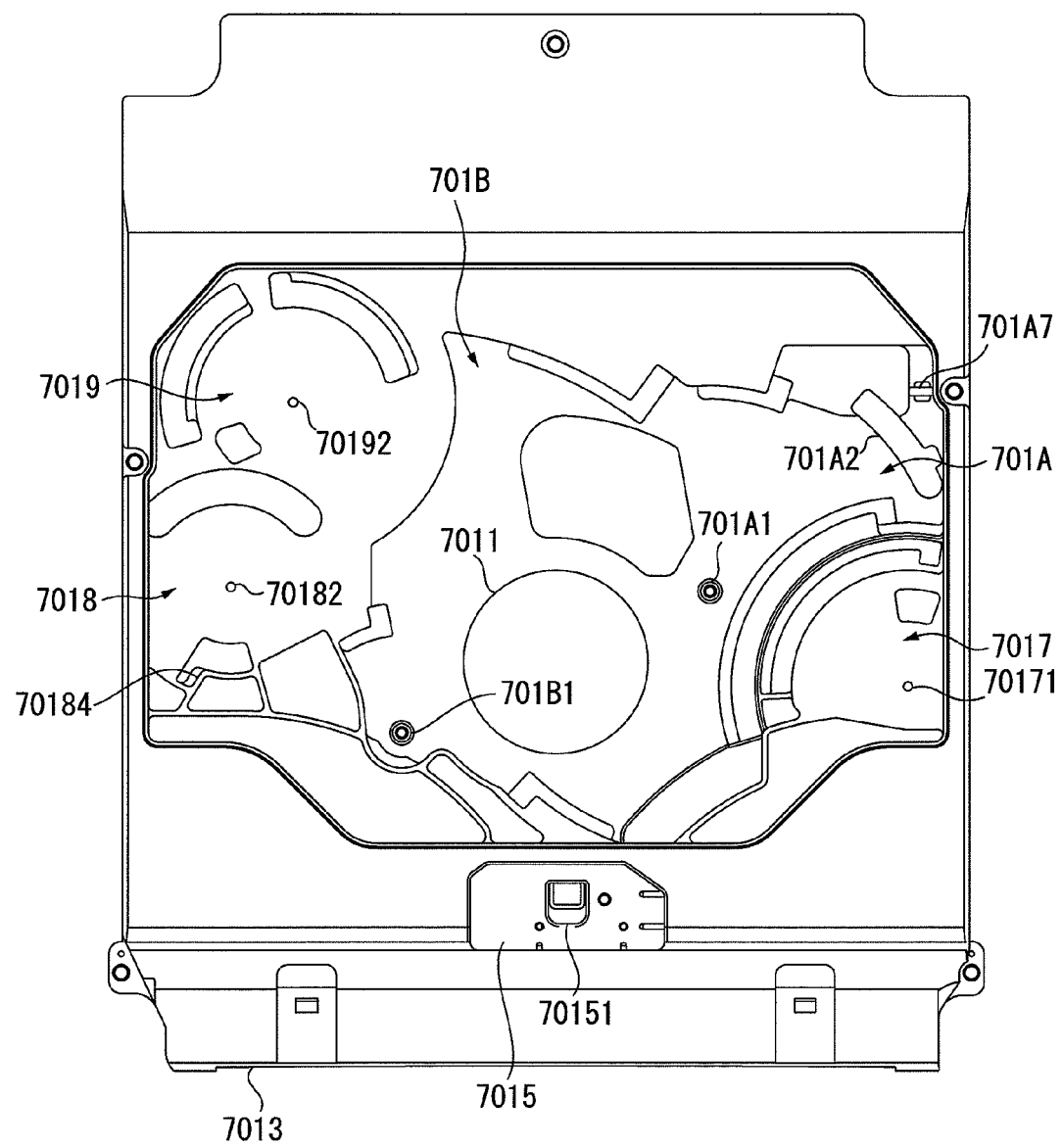
FIG. 18 is a view showing a top frame in the disk apparatus as viewed from above.
Figure 19:
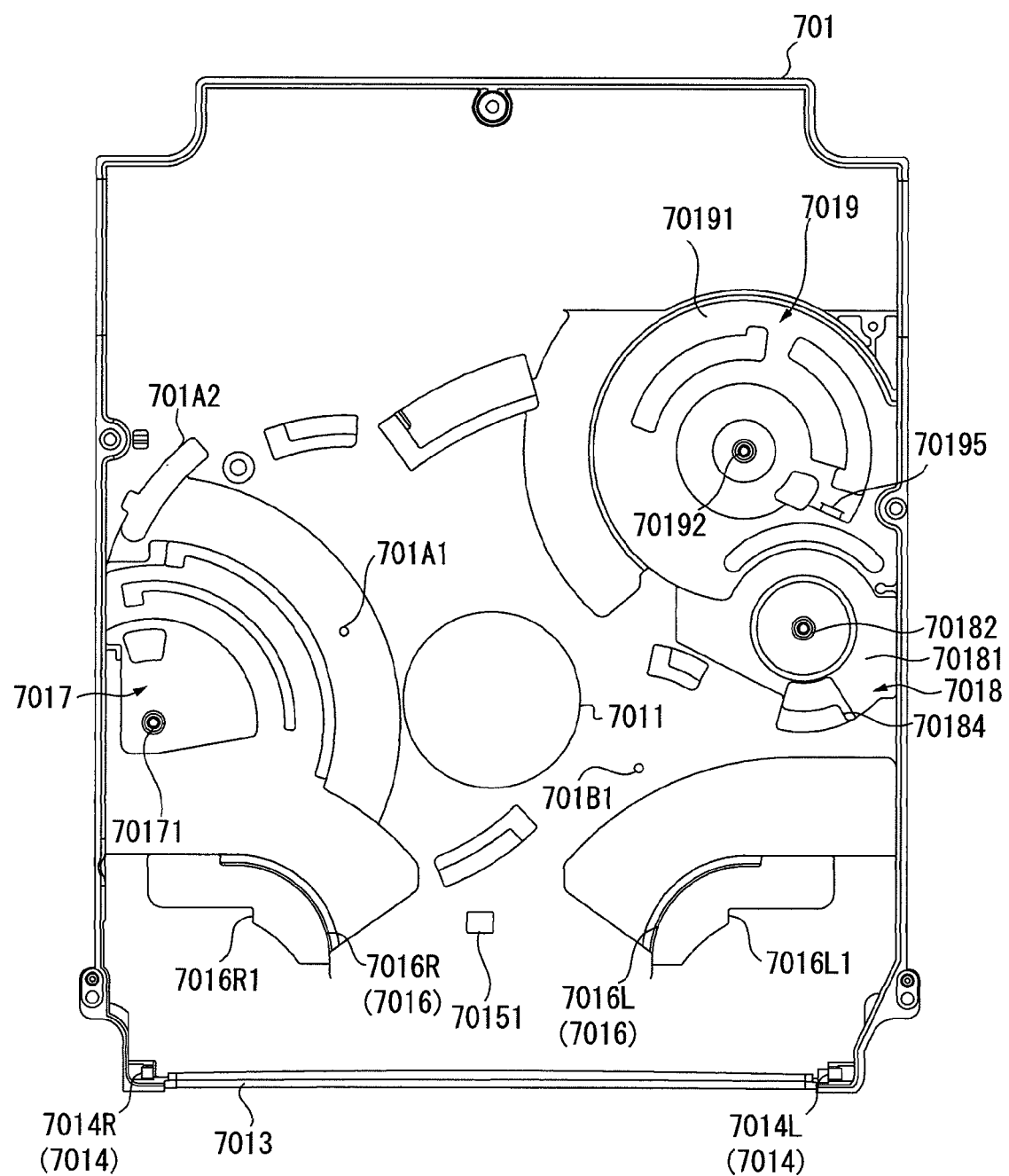
FIG. 19 is a view showing the top frame in the disk apparatus as viewed from below.

FIG. 18 is a view of the top frame 701 as viewed from above, and FIG. 19 is a view of the top frame 701 as viewed from below.

Referring to FIGS. 18 and 19, the top frame 701 is a lid-like member made of a synthetic resin material and attached above the base frame 51 (refer to FIG. 4) of the lower unit 5, and corresponds to the housing in the present invention together with the base frame 51. The top frame 701 is formed in a substantially rectangular shape as viewed in plan. Referring to FIGS. 17 to 19, the top frame 701 includes an opening 7011, a concave portion 7013, shutter attachment portion 7014, a sensor attachment portion 7015, guide grooves 7016, a support arm attachment portion 7017, a guide lock attachment portion 7018, a guide arm attachment portion 7019 and a pair of chuck arm attachment portions 701A and 701B.

The opening 7011 is formed in a substantially circular shape at a substantially central portion of the top frame 701 as seen in FIGS. 18 and 19. A smaller diameter portion 7101 (refer to FIG. 16) of the chuck pulley 710 hereinafter described is fitted in the opening 7011.

The concave portion 7013 is formed such that the opposite left and right ends of one side face of the top frame 701 extending along a lateral direction extend downwardly as seen in FIGS. 17 to 19. The concave portion 7013 is combined with the concave portion 631 (refer to FIG. 11) formed on the bracket 63 described hereinabove to form the opening 2A. It is to be noted that the concave portion 7013 is formed in accordance with the diametrical dimension of the first disk D1.

Referring to FIG. 19, the shutter attachment portion 7014 is composed of a holding portion 7014L formed on the left side (right side in FIG. 19) of the concave portion 7013 and a holding portion 7014R formed on the right side (left side in FIG. 19) of the concave portion 7013. The holding portions 7014L and 7014R individually support the shutter 702 hereinafter described for pivotal motion.

The sensor attachment portion 7015 is formed in a substantially recessed manner at a substantially central portion between the center of the concave portion 7013 and the opening 7011 as seen in FIG. 18. The photo-sensor 703 (refer to FIGS. 15 to 17) hereinafter described is attached to the sensor attachment portion 7015 from the upper face (face opposing to the top cover 91 described hereinabove) of the top frame 701. A substantially rectangular opening 70151 is formed in the sensor attachment portion 7015 such that a flux of light emitted from the light emitting element of the photo-sensor 703 passes therethrough.

The guide grooves 7016 are composed of a groove 7016L formed on the left side (right side in FIG. 19) of the top frame 701 and another groove 7016R formed on the right side (left side in FIG. 19) of the top frame 701. The grooves 7016L and 7016R are formed in such a concaved manner as to hold the sensor attachment portion 7015 therebetween along a lateral direction.

From between side wall portions of the top frame 701 which forms the grooves 7016L and 7016R, that side wall portion extending along the longitudinal direction (upward and downward direction in FIG. 19) of the top frame 701 has pivotal motion regulation portions 7016L1 and 7016R1 formed thereon. The pivotal motion regulation portions 7016L1 and 7016R1 are contacted by a projection 71L72 and another projection not shown of the lock arms 61L7 and 61R7 described hereinabove to regulate pivotal motion of the front arms 61L and 61R, respectively.

It is to be noted that regulation of pivotal motion of the front arms 61L and 61R by the pivotal motion regulation portions 7016L1 and 7016R1 when the second disk D2 is inserted to a position rather near to an end portion of the opening 2A is hereinafter described in detail.

The support arm attachment portion 7017 is a portion to which the support arm 704 (refer to FIG. 16) hereinafter described is attached. The support arm attachment portion 7017 is formed on the right side (right side in FIG. 18 and left side in FIG. 19) of the opening 7011 as seen in FIGS. 18 and 19. A screw hole 70171 is formed in the support arm attachment portion 7017, and a screw (not shown) is screwed in the screw hole 70171 and attaches the support arm 704 for pivotal motion to the support arm attachment portion 7017 from the lower face side.

The guide lock attachment portion 7018 is formed on the left side of the opening 7011. A concave portion 70181 is formed on the guide lock attachment portion 7018, and the guide lock 707 (refer to FIG. 16) is attached to the concave portion 70181 from the lower face side.

A screw hole 70182 is formed at a substantially central portion of the concave portion 70181, and a screw (not shown) for supporting the guide lock 707 for pivotal motion is screwed in the screw hole 70182.

Further, an locking portion 70184 is formed on the recessed portion 7013 side of the concave portion 70181 and anchors an end of a torsion spring (not shown) which engages at the other end thereof with the guide lock 707.

As seen in FIG. 19, the guide arm attachment portion 7019 is formed adjacent the guide lock attachment portion 7018 and remotely from the side adjacent the recessed portion 7013, and the guide arm 706 (refer to FIG. 16) hereinafter described is attached from the lower face side of the top frame 701 to the guide arm attachment portion 7019. A substantially circular concave portion 70191 is formed on the guide arm attachment portion 7019.

A screw hole 70192 is formed on the concave portion 70191, and a screw (not shown) fitted in the guide arm 706 is screwed in the screw hole 70192.

A locking portion 70195 is formed at the concave portion 70191 and anchors a torsion spring (not shown) which engages at an end thereof with the guide arm 706. The guide arm 706 is biased toward the opening 7011 by the torsion spring.

The chuck arm attachment portion 701A is formed on the right side of the opening 7011 of the top frame 701 as seen in FIG. 18. A chuck arm 708 (refer to FIG. 17) is attached from the upper face side of the top frame 701 on the chuck arm attachment portion 701A.

The chuck arm attachment portion 701A is formed in a concaved form on the upper face side of the top frame 701, and a screw hole 701A1, a guide hole 701A2 and a hooked portion 701A7 are formed on the chuck arm attachment portion 701A as seen in FIGS. 18 and 19.

The screw hole 701A1 is formed at a position obliquely rightwardly upwardly of the opening 7011 (obliquely rightwardly upwardly of the opening 7011 in FIG. 18) as viewed from above. A screw (not shown) for attaching the chuck arm 708 to the chuck arm attachment portion 701A is screwed in the screw hole 701A1.

The guide hole 701A2 is formed in a substantially arcuate shape centered at the screw hole 701A1. A cylindrical portion 7084 and a projection 7085 formed on the chuck arm 708 are fitted in the guide hole 701A2 (refer to FIG. 27).

As shown in FIG. 18, the hooked portion 701A7 is formed in the proximity of the guide hole 701A2 in such a manner as to project in a substantially L shape in a direction perpendicular to the plane of FIG. 18 from the upper face of the top frame 701. A tension spring (not shown) is secured at one end thereof to the chuck arm 708 and secured at the other end thereof to the hooked portion 701A7, and the chuck arm 708 is biased toward an end edge of the top frame 701 on the side on which the hooked portion 701A7 is formed by the tension spring. In other words, the chuck arm 708 is biased in a direction in which it contacts with the chuck pulley 710 hereinafter described by the tension spring.

As shown in FIG. 18, the chuck arm attachment portion 701B is formed adjacent an offset portion 70196 of the guide arm attachment portion 7019 on the left side (left side in FIG. 18) of the opening 7011 of the top frame 701. The chuck arm attachment portion 701B is formed in a concaved form on the upper face side of the top frame 701, and the chuck arm 709 (refer to FIGS. 17 and 28) hereinafter described is attached from the upper face side of the top frame 701 to the chuck arm attachment portion 701B.

A screw hole 701B1 is formed on the chuck arm attachment portion 701B.

The screw hole 701B1 is formed on the opposite side to the screw hole 701A1 formed in the chuck arm attachment portion 701A with respect to the opening 7011. A screw (not shown) for attaching the chuck arm 709 to the chuck arm attachment portion 701B is screwed in the screw hole 701B1.

(6-2) Configuration of the Shutter 702

The shutter 702 is attached for pivotal motion to the shutter attachment portion 7014 of the top frame 701 described hereinabove, and corresponds to the lid member in the present invention which opens and closes the opening 2A of the apparatus body 2.

As shown in FIGS. 16 and 17, the shutter 702 includes a shutter body 7021 substantially in the form of a flat plate having a dimension sufficient to cover the opening 2A, a pair of shaft portions 7022 (7022L and 7022R) formed on the shutter body 7021, a locking portion 7023 (refer to FIG. 16) and an contacting portion 7024 (refer to FIG. 17).

The shaft portions 7022 (7022L and 7022R) are formed in such a substantially cylindrical shape as to extend in directions in which they are spaced away from each other along the longitudinal direction of the shutter body 7021 from the opposite ends in the longitudinal direction of the shutter body 7021. The shaft portion 7022L which is that one of the shaft portions 7022 which is formed on the left side of the shutter body 7021 (right side in FIG. 16 and left side in FIG. 17) is held for rotation by the holding portion 7014L of the shutter attachment portion 7014. Meanwhile, the shaft portion 7022R formed on the right side of the shutter body 7021 (left side in FIG. 16 and right side in FIG. 17) is held for rotation on the holding portion 7014R.

Referring to FIG. 16, the locking portion 7023 is formed at the end portion of the shutter body 7021 adjacent which the shaft portion 7022L is formed in such a manner as to project in a substantially L shape. The locking portion 7023 anchors a torsion spring 7025 (refer to FIG. 17) attached to the shaft portion 7022L and serving as biasing means for biasing the shutter body 7021 in a direction in which the opening 2A is closed.

The contacting portion 7024 is formed at the end portion of the shutter body 7021 adjacent which the shaft portion 7022R is formed in such a manner as to extend in a direction along the longitudinal direction of the shutter body 7021 as seen in FIG. 17. The shutter lever 58 hereinafter described contacts with the contacting portion 7024.

(6-3) Configuration of the Photo-Sensor 703

The photo-sensor 703 is formed as a circuit board for emitting a flux of light toward the light receiving element 541 of the control board 54 attached to the base frame 51 and is secured to the sensor attachment portion 7015 of the top frame 701. The photo-sensor 703 includes a light emitting element for emitting a flux of light. The flux of light emitted from the light emitting element successively passes through the opening 70151 (refer to FIG. 18) formed in the sensor attachment portion 7015 and the opening 6347 (refer to FIGS. 9 and 10) formed in the bracket 63 of the carrying unit 6 and is received by the light receiving element 541 of the control board 54.

(6-4) Configuration of the Support Arm 704

Figure 20:
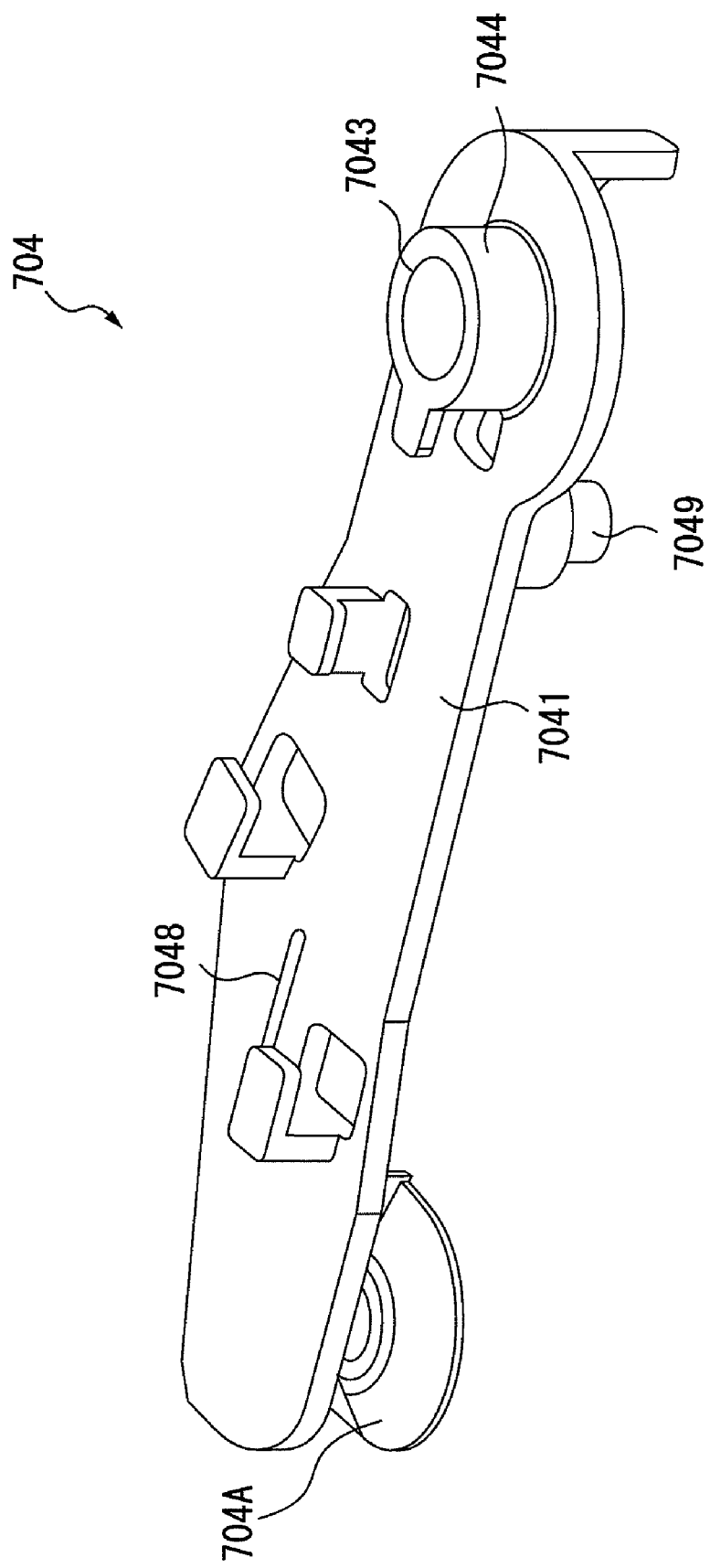
FIG. 20 is a perspective view showing a support arm in the disk apparatus.

FIG. 20 is a perspective view showing the support arm 704.

Referring to FIG. 20, the support arm 704 picks up, when the disk D is inserted, an end edge of the disk D so as not to contact with the turntable 411 of the optical unit 4 and maintains the posture of the disk D so that the disk D, optical unit 4 and holder 52 may extend substantially in parallel to one another.

Referring to FIG. 20, the support arm 704 is a unitary molded article of a substantially L-shaped cross section having a upper face portion 7041 and a side face portion 7042 (refer to FIG. 16) extending substantially perpendicularly to the upper face portion 7041. A hole 7043, a boss 7044 surrounding the hole 7043 and an opening 7048 are formed on the upper face portion 7041.

The hole 7043 is formed in a substantially circular shape as viewed in plan at one of the opposite ends of the upper face portion 7041 in the longitudinal direction. A screw (not shown) is fitted in the hole 7043 and attaches the support arm 704 to the support arm attachment portion 7017.

The boss 7044 is formed such that it surrounds the hole 7043 and projects substantially cylindrically in a direction perpendicular to the plane of the upper face portion 7041 from the upper face portion 7041. A torsion spring (not shown) is wound on the boss 7044. The torsion spring is anchored at one end thereof to the support arm attachment portion 7017 and engages at the other end thereof with the opening 7048. The support arm 704 is biased to a position rather near to the concave portion 7013 (refer to FIG. 16) on the support arm attachment portion 7017 by the biasing force of the torsion spring.

A cylindrical portion 7049 is formed on the lower face side of the upper face portion 7041 (side opposing to the base frame 51) and projects in a perpendicular direction from the lower face. The cylindrical portion 7049 locks the support arm 704 in a state wherein the support arm 704 is spaced away from the disk D when the disk D is engaged with the slide cam 56R (refer to FIG. 34) and accommodated into the inside of the apparatus body 2.

A contacting portion 704A and a cylindrical portion 704B (refer to FIG. 16) for contacting with an end edge of the disk D are formed at an end portion of the support arm 704 remote from the end portion at which the hole 7043 is formed.

Though not particularly shown, the contacting portion 704A has a pair of guide portions of a substantially truncated conical shape whose smaller diameter sides thereof are opposed to each other and a cylindrical portion for interconnecting the smaller end sides of the guide portions. The pair of guide portions guide an end edge of the disk D to contact with the cylindrical portion. The cylindrical portion contacts with an end edge of the disk D, and the lengthwise dimension thereof substantially coincides with the dimension of the disk D in the axial direction (thicknesswise dimension of the disk D).

The cylindrical portion 704B is provided in a projecting manner on the lower face (face opposing to the base frame 51) of the contacting portion 704A. The cylindrical portion 704B engages with a groove 56R1B or another groove 56R1C (refer to FIGS. 33 and 34) of the slide cam 56R hereinafter described thereby to lock the support arm 704.

(6-5) Configuration of the Detection Arm 705

Figure 21:
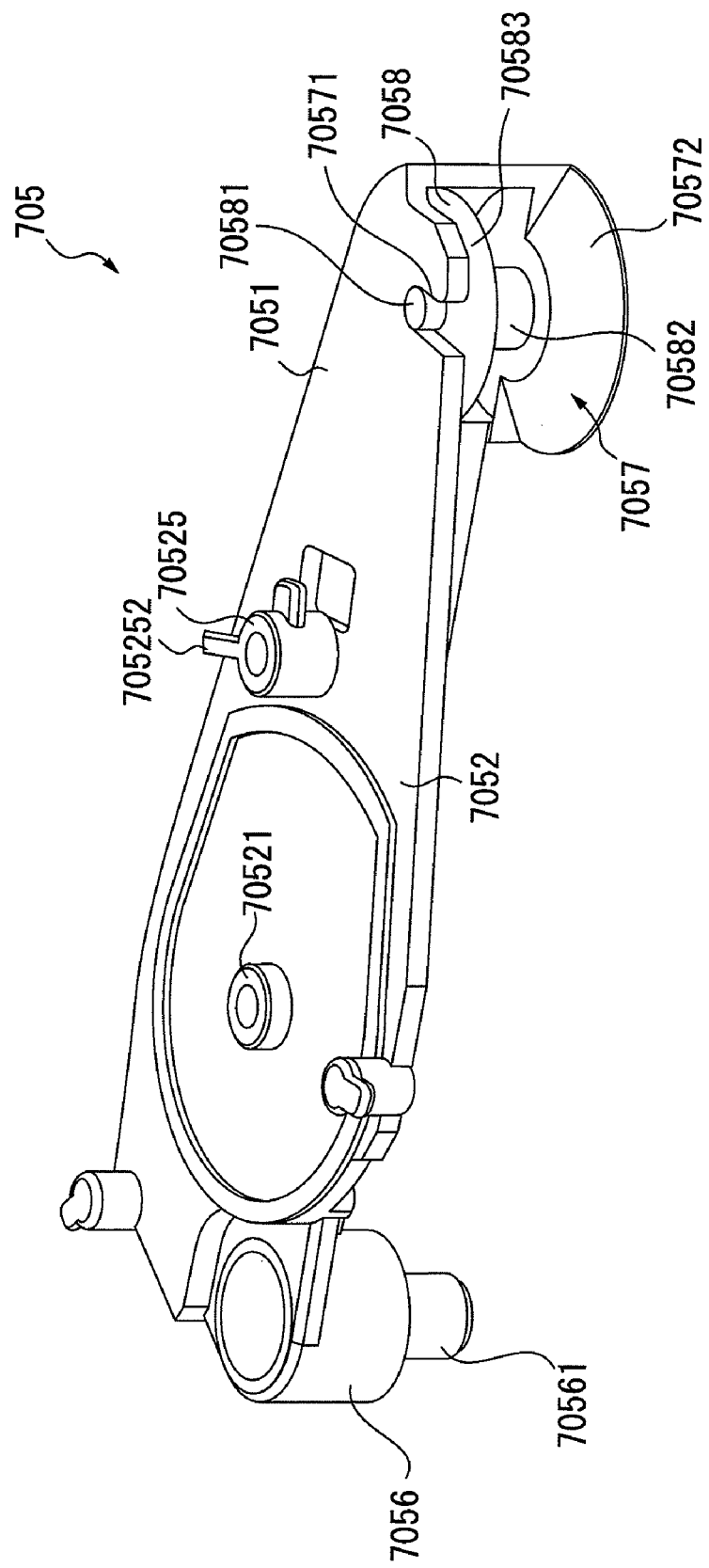
FIG. 21 is a perspective view showing a detection arm in the disk apparatus.
Figure 22:
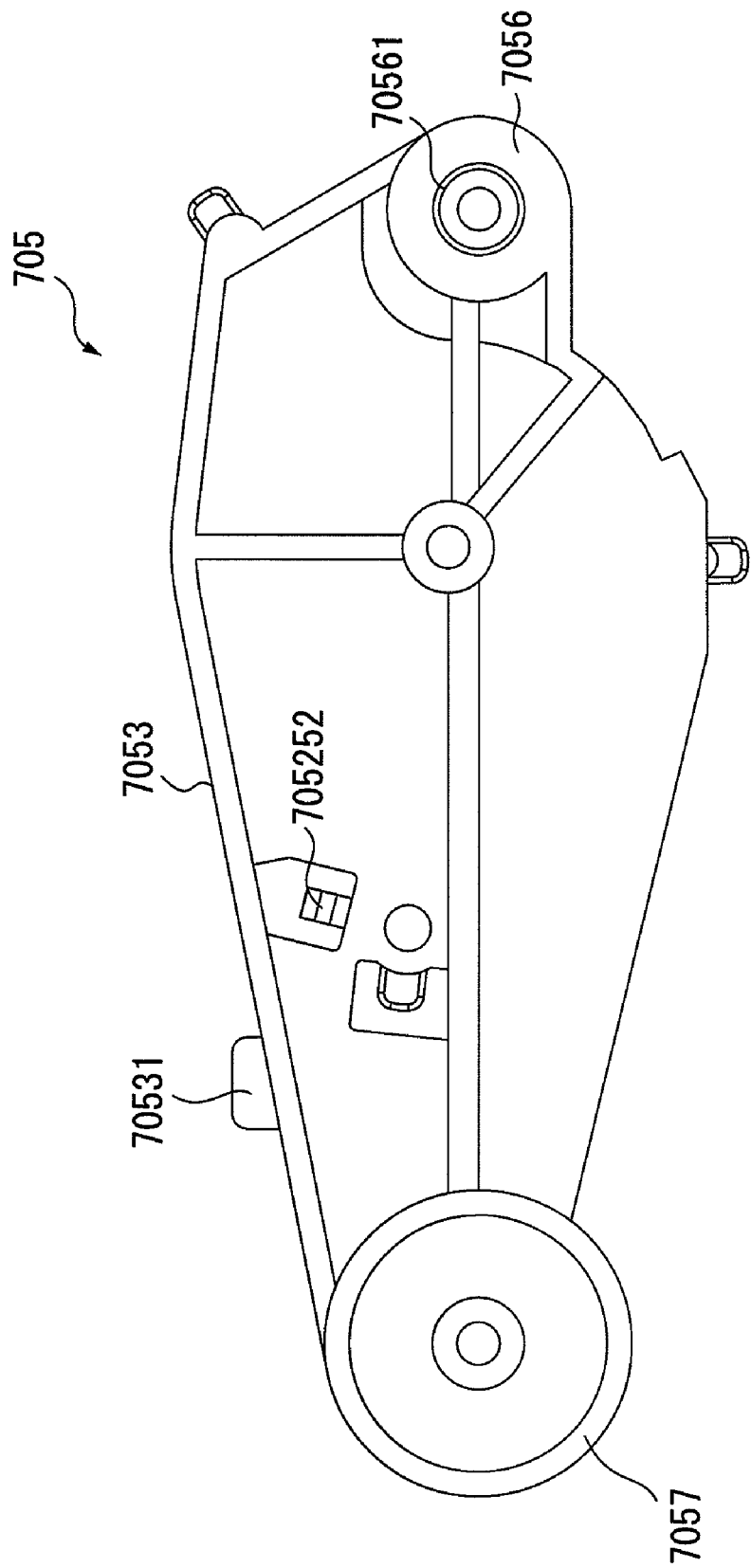
FIG. 22 is a view showing the detection arm in the disk apparatus as viewed from below.

FIG. 21 is a perspective view showing the detection arm 705. Meanwhile, FIG. 22 is a view of the detection arm 705 as viewed from below.

Referring to FIG. 16, the detection arm 705 is attached for pivotal motion to the guide arm 706 hereinafter described and contacts, upon insertion of the disk D into the apparatus body 2, with an end edge of the disk D to move the slide cam 56L (refer to FIG. 29) hereinafter described.

The detection arm 705 includes an arm body 7051, and a top member 7058 attached for rotation to the arm body 7051 as seen in FIG. 21.

The arm body 7051 has a substantially triangular shape as viewed in plan. As seen in FIGS. 21 and 22, the arm body 7051 includes an upper face portion 7052 opposing to the lower face of the guide arm 706 hereinafter described and the top frame 701, and a side face portion 7053 depending from an end edge of the upper face portion 7052. The arm body 7051 further includes a projection 7056 formed on one end side of the upper face portion 7052 in the longitudinal direction, and a support portion 7057 for supporting the top member 7058 for pivotal motion.

A projection 70521 is formed at a substantially central portion of the upper face portion 7052. As shown in FIG. 21, the projection 70521 projects substantially cylindrically in a perpendicular direction from the upper face portion 7052 and has a hole formed at a central portion thereof. The projection 70521 is fitted in a hole 70611 (refer to FIGS. 23 and 24) formed in the guide arm 706 hereinafter described. The detection arm 705 is supported for pivotal motion around the projection 70521 on the guide arm 706.

A substantially cylindrical projection 70525 is formed at a substantially central portion of the upper face portion 7052. An extension 705252 is formed on the projection 70525 and anchors an end portion of a torsion spring (not shown). The torsion spring is wrapped around the guide arm 706 hereinafter described and is anchored at the other end thereof to the locking portion 70195 of the guide arm attachment portion 7019. When the detection arm 705 is in a state wherein it is attached to the guide arm 706, it is biased in a direction in which it approaches the opening 7011 (refer to FIG. 19) of the top frame 701 by the torsion spring.

A regulation portion 70531 of a substantially rectangular shape in side elevation is formed on the side face portion 7053 and projects in a perpendicular direction from the side face portion 7053 as seen in FIG. 22. The regulation portion 70531 is contacted, at an end of pivotal motion of the detection arm 705, with the guide arm 706 to regulate the pivotal motion only of the detection arm 705.

The projection 7056 is engaged with the slide cam 56L hereinafter described to move the slide cam 56L in response to pivotal motion of the detection arm 705. A cylindrical portion 70561 is formed at an end of the projection 7056 and contacts with an upright portion 56L16 (refer to FIGS. 29 and 30) of the slide cam 56L.

A holding portion 70571 for holding the top member 7058 for rotation and a guide portion 70572 for guiding an end edge of the disk D to the side face portion 7053 are formed on the support portion 7057.

The guide portion 70572 is formed in a substantially truncated conical shape such that a smaller diameter portion thereof is opposed to the holding portion 70571.

The top member 7058 is supported for rotation by the support portion 7057 and is contacted with and rotated by an end edge of the disk D. A substantially cylindrical shaft portion 70581 held by the holding portion 70571, a substantially cylindrical contacting portion 70582 and a guide portion 70583 for guiding the end edge of the disk D to the contacting portion 70582 are formed on the top member 7058.

The guide portion 70583 is formed in a substantially truncated conical shape and is connected at a greater diameter portion thereof to the shaft portion 70581 and at a smaller diameter portion thereof to the contacting portion 70582.

(6-6) Configuration of the Guide Arm 706

Figure 23:
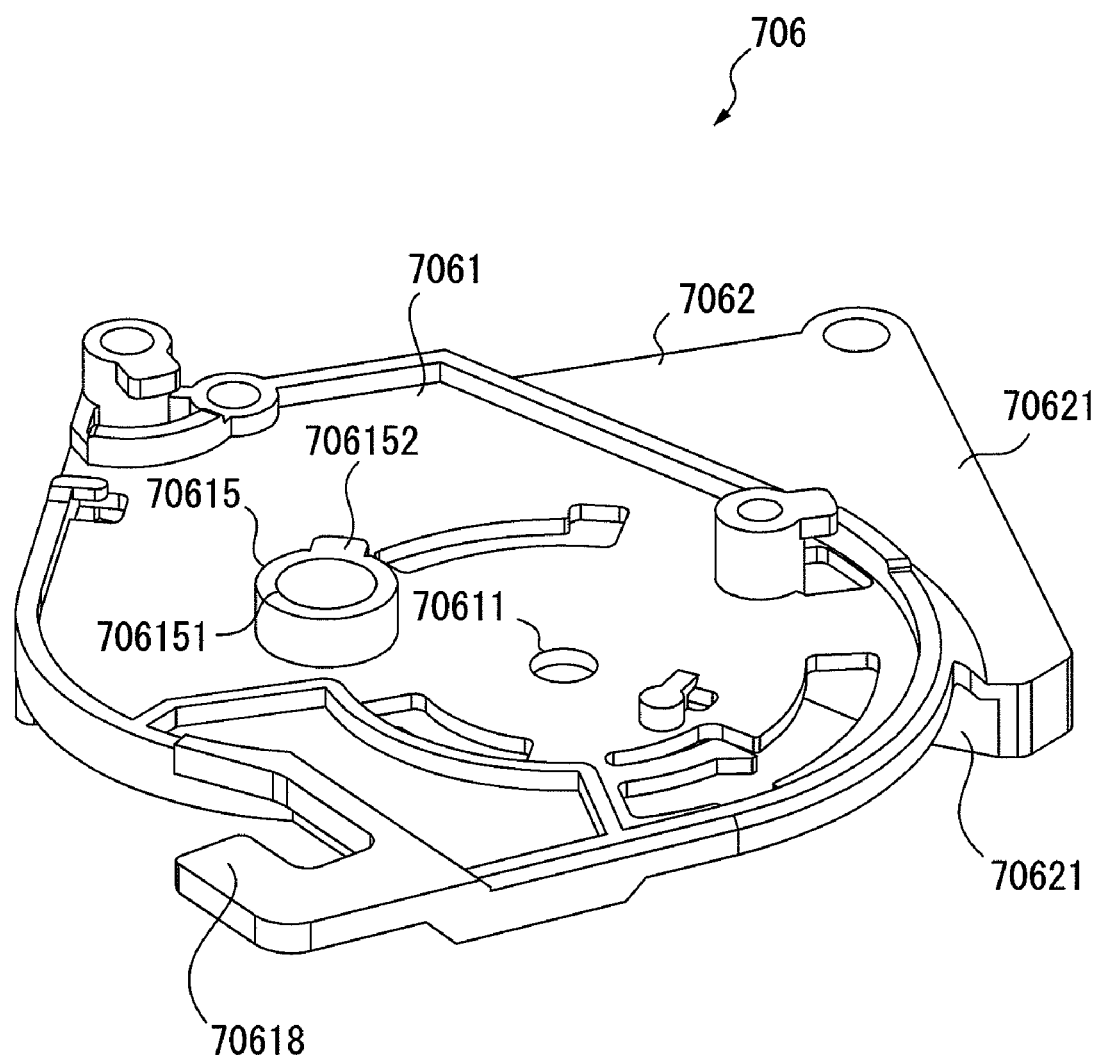
FIG. 23 is a perspective view showing a guide arm in the disk apparatus.
Figure 24:
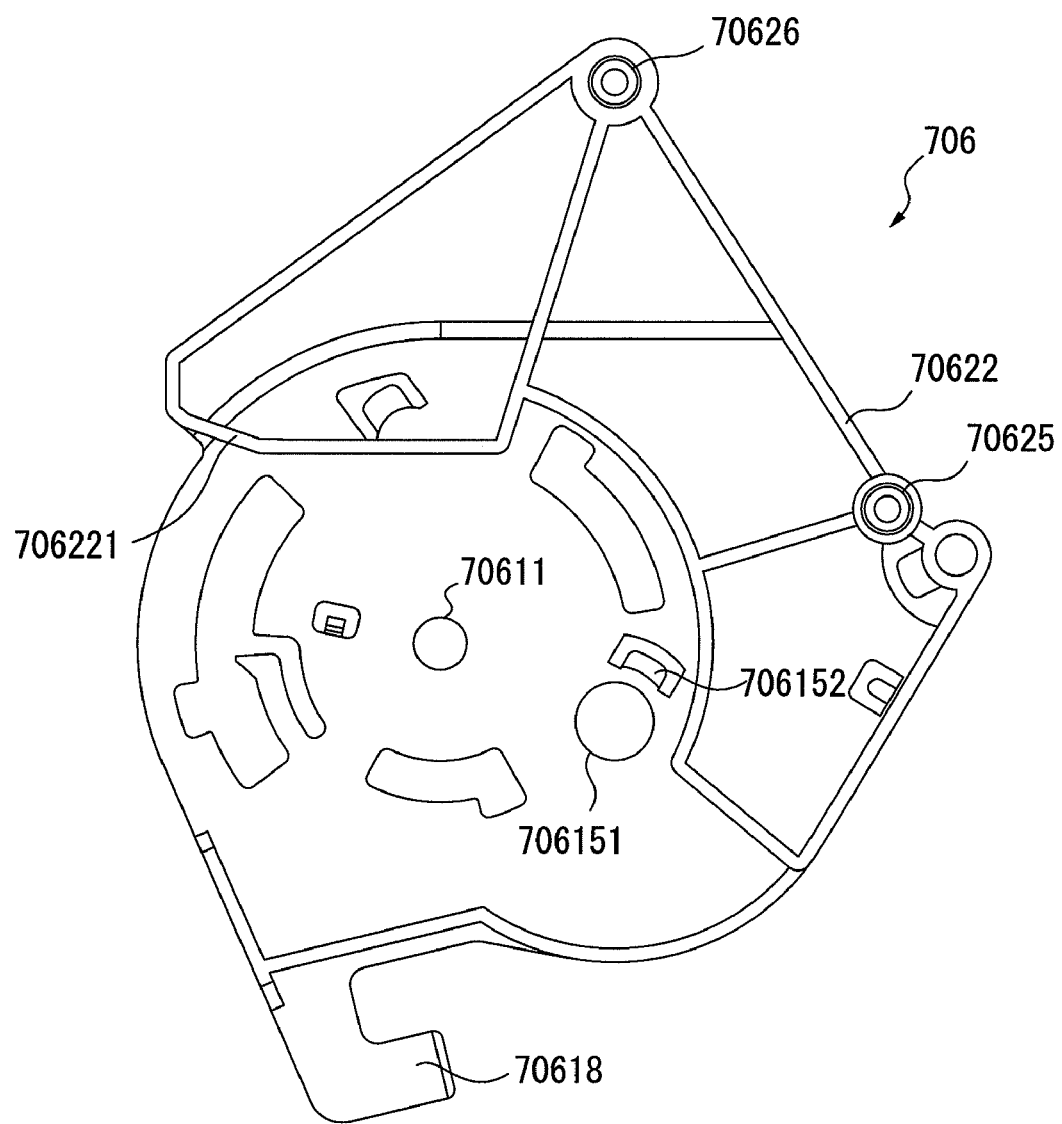
FIG. 24 is a view showing the guide arm in the disk apparatus as viewed from below.

FIG. 23 is a perspective view showing the guide arm 706. FIG. 24 is a view of the guide arm 706 as viewed from below.

The guide arm 706 has the detection arm 705 (refer to FIGS. 16, 21 and 22) described hereinabove attached thereto and is engaged with the slide cam 56L (refer to FIG. 29) hereinafter described to pivot in response to sliding movement of the slide cam 56L.

A detection arm attachment portion 7061 and an engaging portion 7062 for engaging with the slide cam 56L hereinafter described to pivot the guide arm 706 are formed on the guide arm 706.

The detection arm attachment portion 7061 supports the detection arm 705 described hereinabove for pivotal motion.

Referring to FIG. 23, a substantially circular hole 70611 is formed at a substantially central portion of the detection arm attachment portion 7061. Further, a cylindrical portion 70615 having a hole 706151 and a regulation portion 70618 for engaging with the guide lock 707 hereinafter described to regulate pivotal motion of the guide arm 706 are formed on the detection arm attachment portion 7061.

The projection 70521 is formed on the detection arm 705 described hereinabove and fitted for rotation in the hole 70611.

The hole 706151 of a substantially circular shape as viewed in plan is formed at a substantially central portion of the cylindrical portion 70615. A screw (not shown) is fitted in the hole 706151. The screw is fitted in the guide arm 706 and screwed in the screw hole 70192 (refer to FIG. 19) formed in the guide arm attachment portion 7019.

An extension 706152 is formed at an end of the cylindrical portion 70615 and extends in a direction perpendicular to the axial direction of the cylindrical portion 70615. The extension 706152 acts to prevent a torsion spring (not shown) wrapped around the cylindrical portion 70615 from coming off the cylindrical portion 70615. The torsion spring engages at an end thereof with the detection arm 705 and is anchored at the other end thereof to the locking portion 70195 of the guide arm attachment portion 7019.

Referring to FIGS. 23 and 24, the regulation portion 70618 is formed in a substantially L shape as viewed in plan such that it extends from an end edge of the detection arm attachment portion 7061 and is bent substantially at the right angle at an end portion thereof in the extension direction. The regulation portion 70618 engages with a cylindrical portion 70717 (refer to FIG. 25) formed on the guide lock 707 hereinafter described to regulate the pivotal motion of the guide arm 706. In other words, the pivotal motion of the guide arm 706 is not permitted unless the guide lock 707 is pivoted until the engagement between the guide lock 707 and the guide arm 706 is canceled.

The engaging portion 7062 is formed on the outer side of the detection arm attachment portion 7061 as seen in FIG. 24. An upper face portion 70621, a side face portion 70622 and two cylindrical portions 70625 and 70626 are formed on the engaging portion 7062. The side face portion 70622 is formed along an end edge of the upper face portion 70621 and depends substantially downwardly from the end edge. The cylindrical portions 70625 and 70626 project in a perpendicular direction from the face of the engaging portion 7062 remote from the upper face portion 70621.

The regulation portion 70531 (refer to FIG. 22) formed on the detection arm 705 contacts with a face 706221 of the side face portion 70622 opposing to the detection arm 705 to regulate the pivotal motion of the detection arm 705.

The cylindrical portions 70625 and 70626 engage with a groove 56L1D or another groove 56L1E (refer to FIG. 30) and a further groove 56L1F (refer to FIG. 30) formed on the slide cam 56L hereinafter described, respectively.

(6-7) Configuration of the Guide Lock 707

Figure 25:
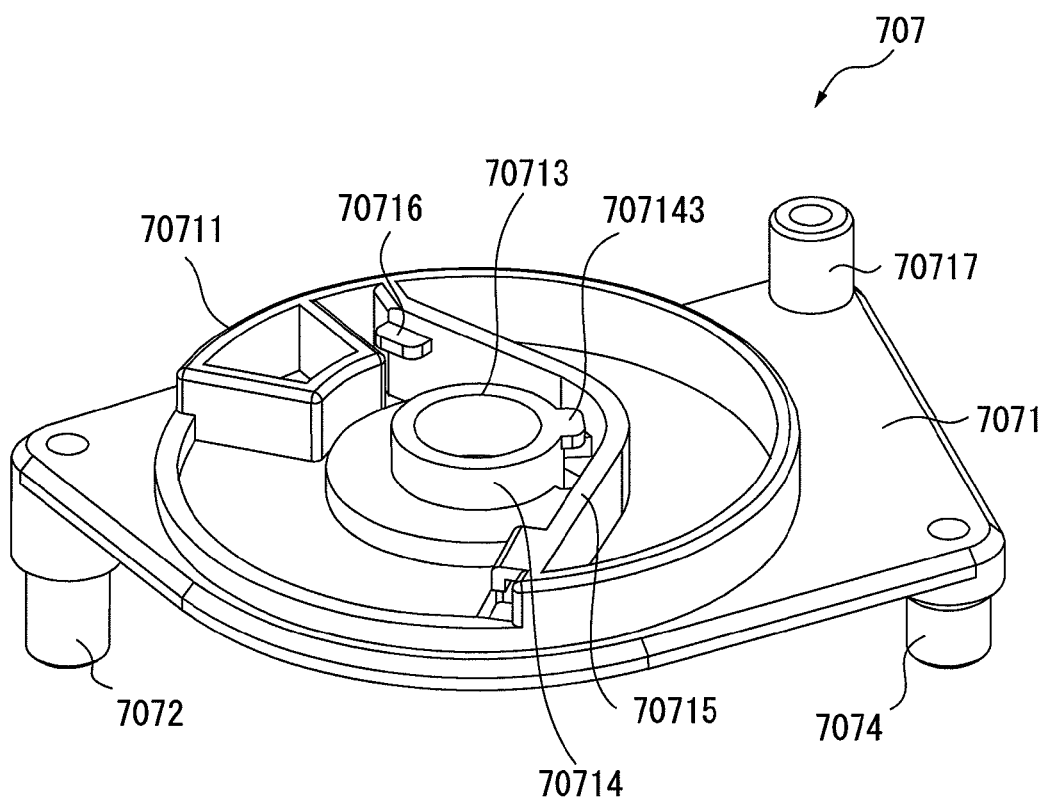
FIG. 25 is a perspective view showing a guide lock in the disk apparatus.
Figure 26:
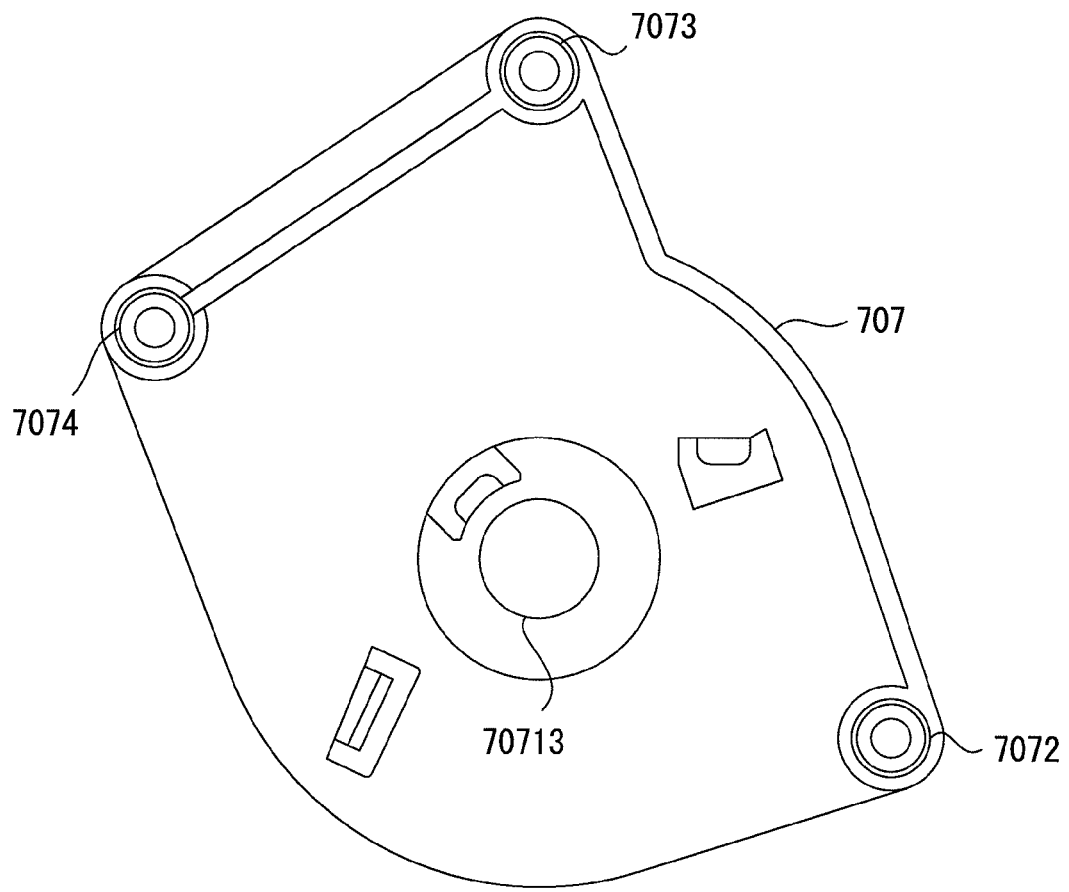
FIG. 26 is a view showing the guide lock in the disk apparatus as viewed from below.

FIG. 25 is a perspective view showing the guide lock 707. FIG. 26 is a view of the guide lock 707 as viewed from below.

The guide lock 707 regulates pivotal motion of the guide arm 706 (refer to FIGS. 23 and 24) and engages with the slide cam 56L (refer to FIG. 30) hereinafter described. When the guide lock 707 is contacted with and pivoted by an end edge of the first disk D1 or is pivoted by sliding movement of the slide cam 56L, it cancels the regulation of the pivotal motion of the guide arm 706.

A flat face portion 7071 of a substantially rectangular shape as viewed in plan and cylindrical portions 7072, 7073 and 7074 are formed on the guide lock 707 as seen in FIGS. 25 and 26. The cylindrical portions 7072, 7073 and 7074 are provided in a projecting manner on the lower face side of the flat face portion 7071 (face opposing to the base frame 51).

As seen in FIG. 26, the cylindrical portion 7072 is formed at a corner portion of the flat face portion 7071 which is positioned in the proximity of an end edge of the top frame 701 when the guide lock 707 is attached to the guide lock attachment portion 7018. The cylindrical portion 7073 is formed at another corner portion of the flat face portion 7071 which is the side adjacent the guide arm 706 described hereinabove. The cylindrical portion 7074 is formed at a further corner of the flat face portion 7071 which is positioned on the opposite side to the cylindrical portion 7072 with respect to a hole 70713 of the flat face portion 7071.

When the second disk D2 is inserted into the apparatus body 2, the cylindrical portion 7072 is contacted with an upright portion 56L15 (refer to FIG. 30) formed on the slide cam 56L hereinafter described to pivot the guide lock 707.

On the other hand, when the first disk D1 is inserted, the cylindrical portion 7073 is engaged with a groove 56L1B (refer to FIG. 30), and when the second disk D2 is inserted, the cylindrical portion 7073 is engaged with another groove 56L1C (refer to FIG. 30), to lock the pivotal motion of the guide lock 707.

The cylindrical portion 7074 is contacted with an end edge of the first disk D1 to pivot, as the first disk D1 is inserted into the apparatus body 2, the guide lock 707 to cancel the regulation of pivotal motion of the guide arm 706 by the guide lock 707.

Referring to FIG. 25, an annular portion 70711 is formed on the flat face portion 7071 such that it projects in a perpendicular direction from an upper face of the flat face portion 7071. The cylindrical portion 70717 is formed on the flat face portion 7071 such that it projects in a perpendicular direction from the position corresponding to the cylindrical portion 7073.

The cylindrical portion 70717 engages with the regulation portion 70618 formed in a substantially L shape on the guide arm 706 described hereinabove to regulate the pivotal motion of the guide arm 706.

A substantially cylindrical boss 70714 is formed on the inner side of the annular portion 70711 and has a heightwise dimension substantially equal to the heightwise dimension of the annular portion 70711. Also a rib 70715 of a substantially L shape as viewed in plan is formed on the inner side of the annular portion 70711 such that it interconnects the opposite ends of the annular portion 70711 while bypassing the boss 70714.

A projection 70716 is formed on the rib 70715 such that it projects in a perpendicular direction from a portion of a side face of the rib 70715.

A screw (not shown) for attaching the guide lock 707 to the guide lock attachment portion 7018 is fitted in the hole 70713 formed by the boss 70714.

An extension 707143 is formed at an end of the boss 70714 such that it extends in a direction perpendicular to the axial direction of the boss 70714. A torsion spring (not shown) is wrapped around the boss 70714. The torsion spring is anchored at an end thereof to the projection 70716 and at the other end thereof to the locking portion 70184 (refer to FIG. 19) of the guide lock attachment portion 7018.

The guide lock 707 is biased by the torsion spring such that the cylindrical portion 7072 of the guide lock 707 is positioned on the end edge side of the top frame 701 and the cylindrical portion 7073 is positioned on the opening 7011 side of the top frame 701. As the guide lock 707 is maintained in this state, the pivotal motion of the guide arm 706 is regulated.

(6-8) Configuration of the Chuck Arm 708

Figure 27:
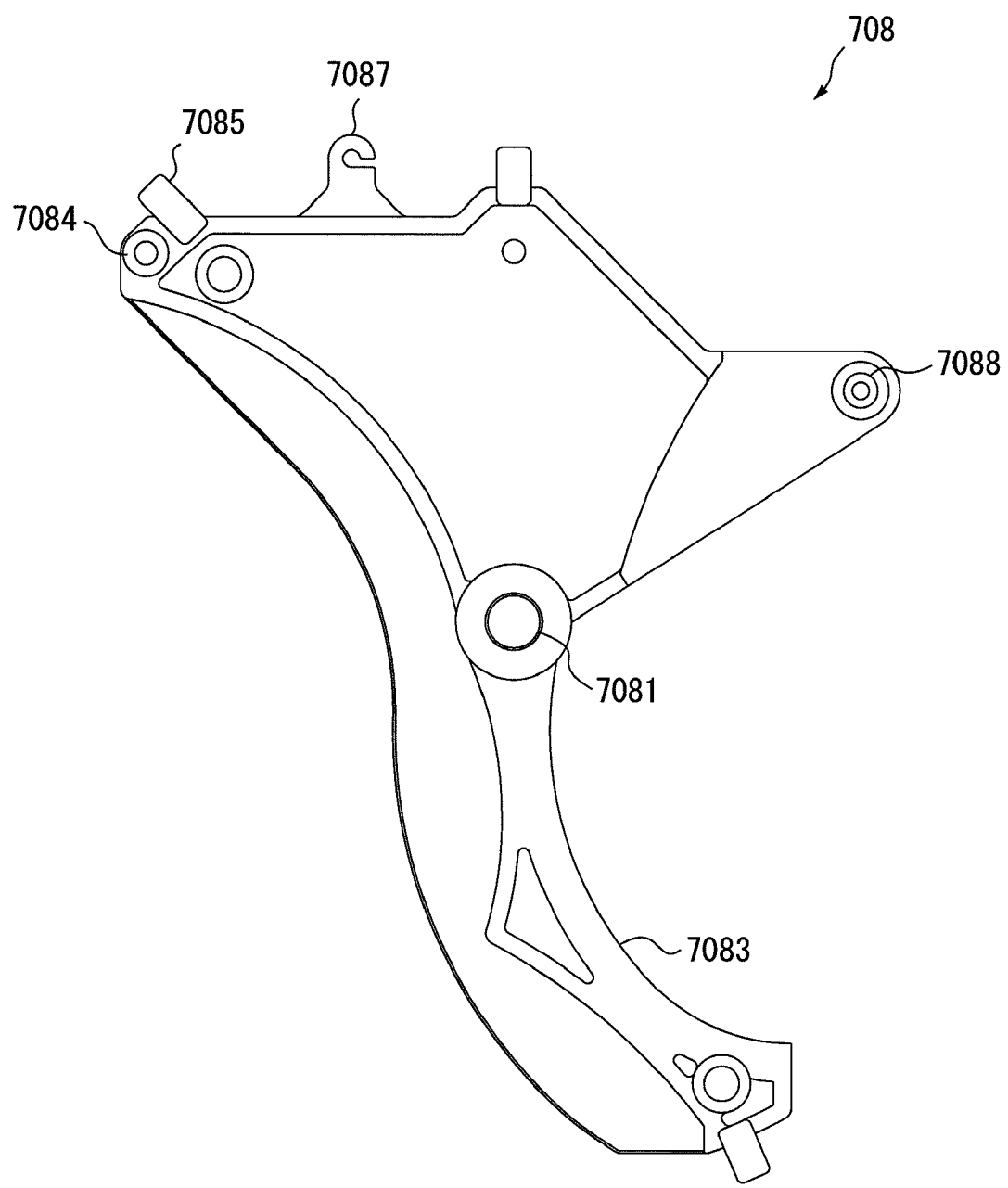
FIG. 27 is a view showing a chuck arm in the disk apparatus as viewed from below.

FIG. 27 is a view of the chuck arm 708 as viewed from below.

Referring to FIG. 27, the chuck arm 708 supports and releases the chuck pulley 710 (refer to FIG. 17) together with the chuck arm 709 (refer to FIGS. 17 and 28) hereinafter described.

The chuck arm 708 has a substantially Y shape as viewed in plan as seen in FIG. 27, and a hole 7081 is formed at a substantially central portion of the chuck arm 708. A screw (not shown) for attaching the chuck arm 708 to the chuck arm attachment portion 701A is fitted in the hole 7081.

A contacting portion 7083 for contacting with a larger diameter portion 7102 (refer to FIG. 17) of the chuck pulley 710 is formed between one of the three ends of the chuck arm 708 and the hole 7081. Though not particularly shown, the contacting portion 7083 has a tapering curved face which is formed in a substantially arcuate shape and the thicknesswise dimension thereof decreases toward the lower face side (side opposing to the top frame 701) and the free end side (side adjacent the chuck pulley 710). Therefore, when the contacting portion 7083 is contacted with the larger diameter portion 7102 of the chuck pulley 710, the chuck pulley 710 moves in such a manner as to move up away from the opening 7011.

The cylindrical portion 7084 and the projection 7085 are formed at one of the three ends of the chuck arm 708 which is positioned remotely from the end on the side on which the contacting portion 7083 is formed. The cylindrical portion 7084 and the projection 7085 are fitted in the guide hole 701A2 (refer to FIG. 19) formed in the chuck arm attachment portion 701A to guide the chuck arm 708 for pivotal motion. Further, the cylindrical portion 7084 is inserted in a groove 56R1D (refer to FIGS. 33 and 34) of the slide cam 56R hereinafter described to pivot the chuck arm 708 as the slide cam 56R slidably moves.

A locking portion 7087 of a substantially U shape as viewed in plan is formed in the proximity of the cylindrical portion 7084 and the projection 7085.

A tension spring (not shown) is attached at an end thereof to the locking portion 7087 and at the other end thereof to the hooked portion 701A7 of the chuck arm attachment portion 701A. Therefore, in an normal state, the chuck arm 708 remains biased in a direction in which the contacting portion 7083 contacts with the chuck pulley 710 (refer to FIG. 17) by the tension spring.

At the remaining one of the three ends of the chuck arm 708, a cylindrical portion 7088 is formed such that it is fitted in a guide hole 7095 (refer to FIG. 28) of the chuck arm 709 hereinafter described. The cylindrical portion 7088 slidably moves, when the chuck arm 708 pivots, within the guide hole 7095 to pivot the chuck arm 709.

(6-9) Configuration of the Chuck Arm 709

Figure 28:
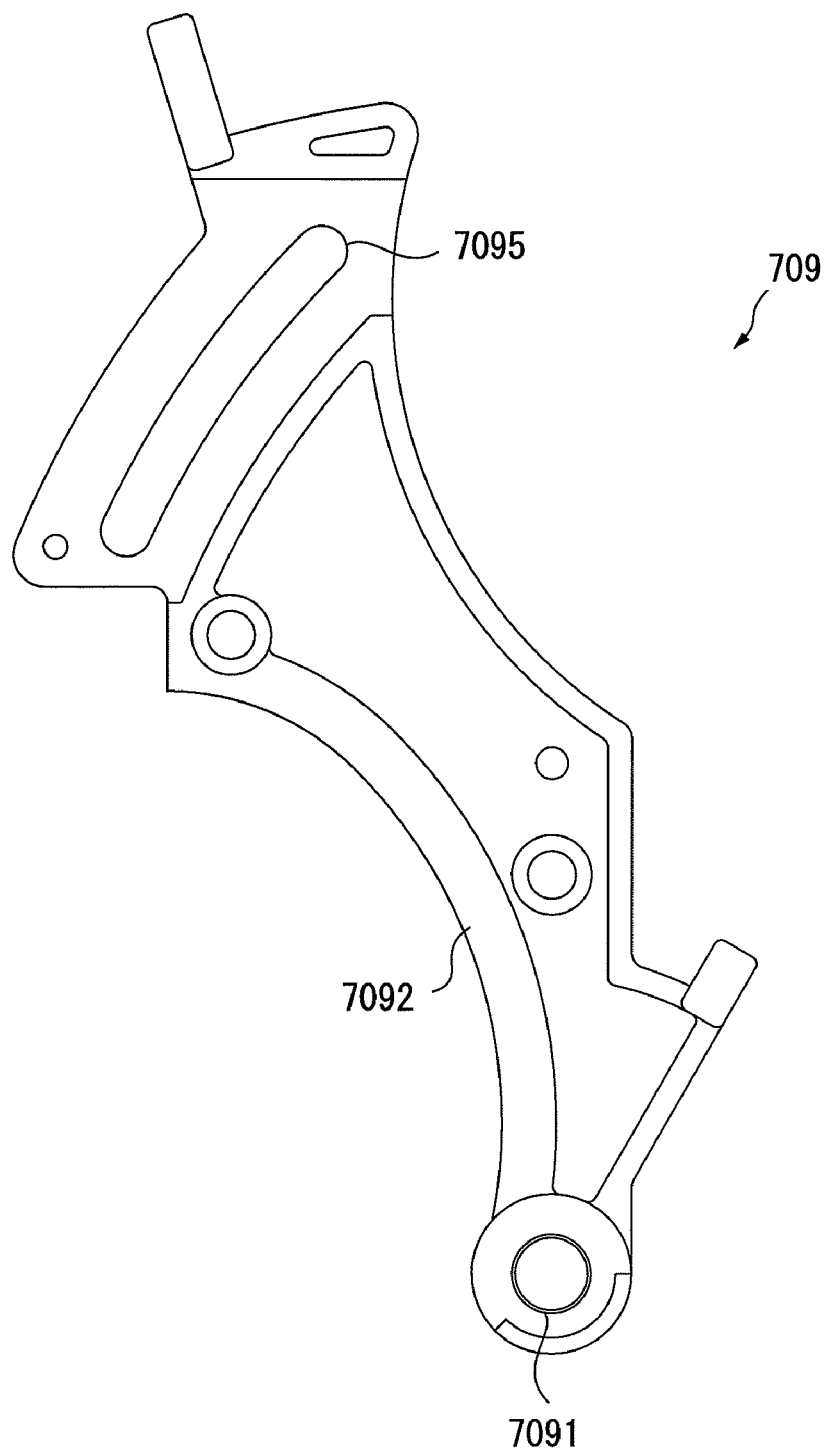
FIG. 28 is a view showing another chuck arm in the disk apparatus as viewed from below.

FIG. 28 shows the chuck arm 709 as viewed from below.

Referring to FIG. 28, the chuck arm 709 supports and releases the chuck pulley 710 together with the chuck arm 708 as described hereinabove.

The chuck arm 709 is formed as an elongated plate-like member. A hole 7091 is formed at one end of the chuck arm 709 and attaches the chuck arm 709 for pivotal motion to the chuck arm attachment portion 701B.

A contacting portion 7092 is formed on the side of the chuck arm 709 opposing to the chuck arm 708 described hereinabove for contacting with the chuck pulley 710 (refer to FIG. 17). The contacting portion 7092 is formed in a substantially arcuate shape as viewed in plan similarly to the contacting portion 7083 of the chuck arm 708. Further, the contacting portion 7092 is formed in a tapering manner such that the thicknesswise dimension thereof decreases toward the lower face side (side opposing to the top frame 701) and the free end side (side adjacent the chuck pulley 710).

The guide hole 7095 is formed at an end portion of the chuck arm 709 remote from the end portion at which the hole 7091 is formed.

The guide hole 7095 is formed in a substantially arcuate shape, and the cylindrical portion 7088 (refer to FIG. 17) formed on the chuck arm 708 described hereinabove is fitted in the guide hole 7095. When the chuck arm 708 pivots, the cylindrical portion 7088 pushes the chuck arm 709 to the outer side along the guide hole 7095 thereby to pivot the chuck arm 709 around the hole 7091. Thereupon, the engagement between the chuck arms 708 and 709 and the chuck pulley 710 is canceled.

(6-10) Configuration of the Chuck Pulley 710

The chuck pulley 710 cooperates with the turntable 411 of the motor 41 which forms the optical unit 4 described hereinabove to sandwich the disk D along a vertical direction with respect to the plane of the disk D. As shown in FIGS. 15 to 17, the chuck pulley 710 is fitted in the opening 7011 from the upper face side such that it covers the opening 7011 formed on the top frame 701 and is sandwiched by the chuck arms 708 and 709 described hereinabove.

A smaller diameter portion 7101 positioned in the opening 7011 and a larger diameter portion 7102 having a larger diametrical dimension than the opening 7011 are formed on the chuck pulley 710 as seen in FIG. 17.

A magnet (not shown) is provided in the inside of the smaller diameter portion 7101 in such a manner as to cooperate with the turntable 411 to sandwich the disk D.

Meanwhile, the larger diameter portion 7102 contacts with the contacting portions 7083 and 7092 formed on the chuck arms 708 and 709 as seen in FIG. 15. When the chuck arms 708 and 709 pivot, the engagement between the larger diameter portion 7102 and the contacting portions 7083 and 7092 is canceled thereby to place the chuck pulley 710 into a rotatable state.

(7) Lifting Mechanism 56

The lifting mechanism 56 is attached to the base frame 51 (refer to FIG. 5) as described hereinabove. The lifting mechanism 56 moves up the holder 52 when the disk D is to be carried into the apparatus body 2, but moves down the holder 52 when the disk D is to be carried out to the outside of the apparatus body 2.

The lifting mechanism 56 includes slide cams 56L and 56R as two cam members and a link arm 561 for interconnecting the two slide cams 56L and 56R as seen in FIGS. 4, 5 and 7.

(7-1) Configuration of the Slide Cam 56L

Figure 29:
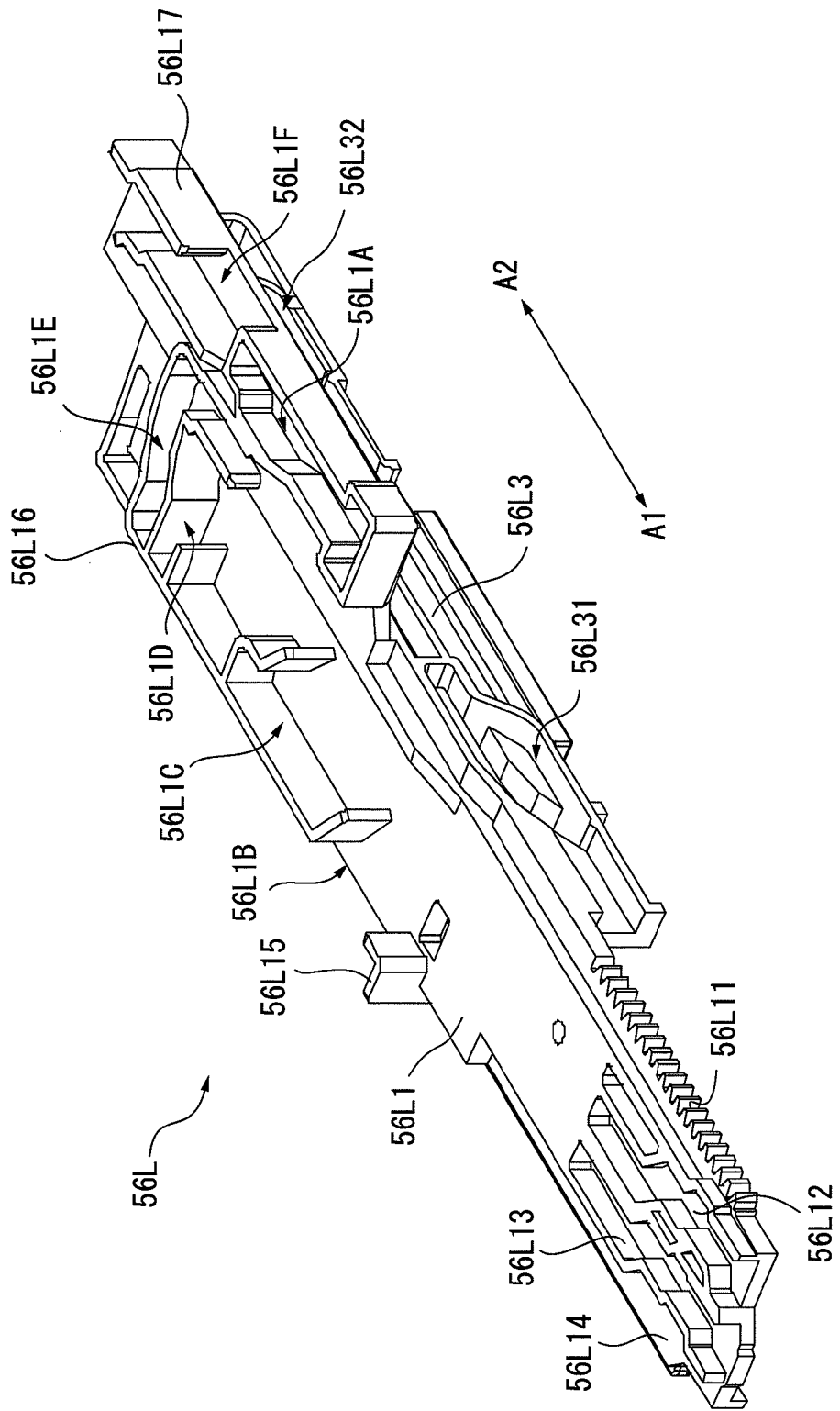
FIG. 29 is a perspective view showing a slide cam in the disk apparatus.
Figure 30:
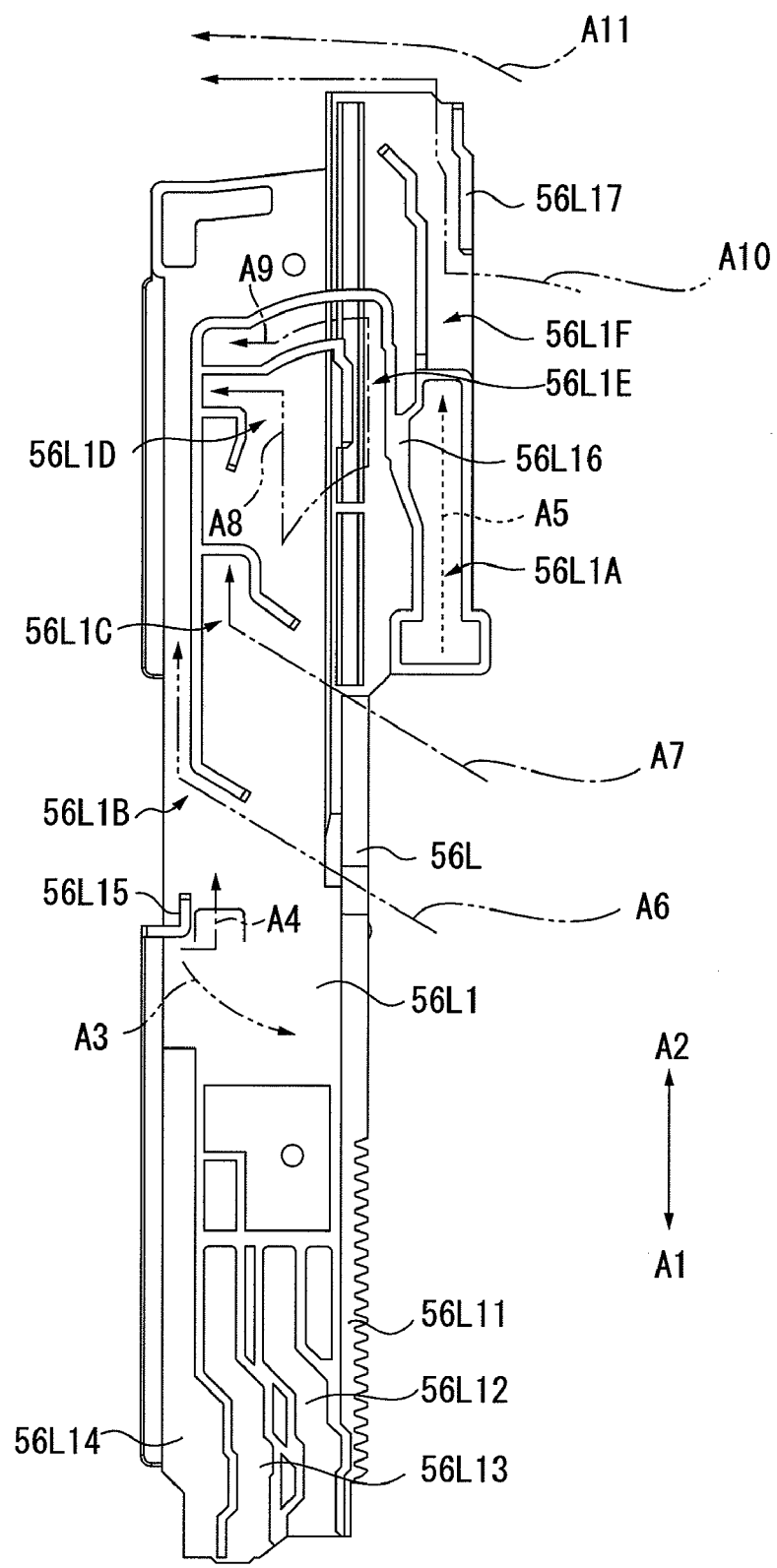
FIG. 30 is a view showing the slide cam in the disk apparatus as viewed from above.
Figure 31:
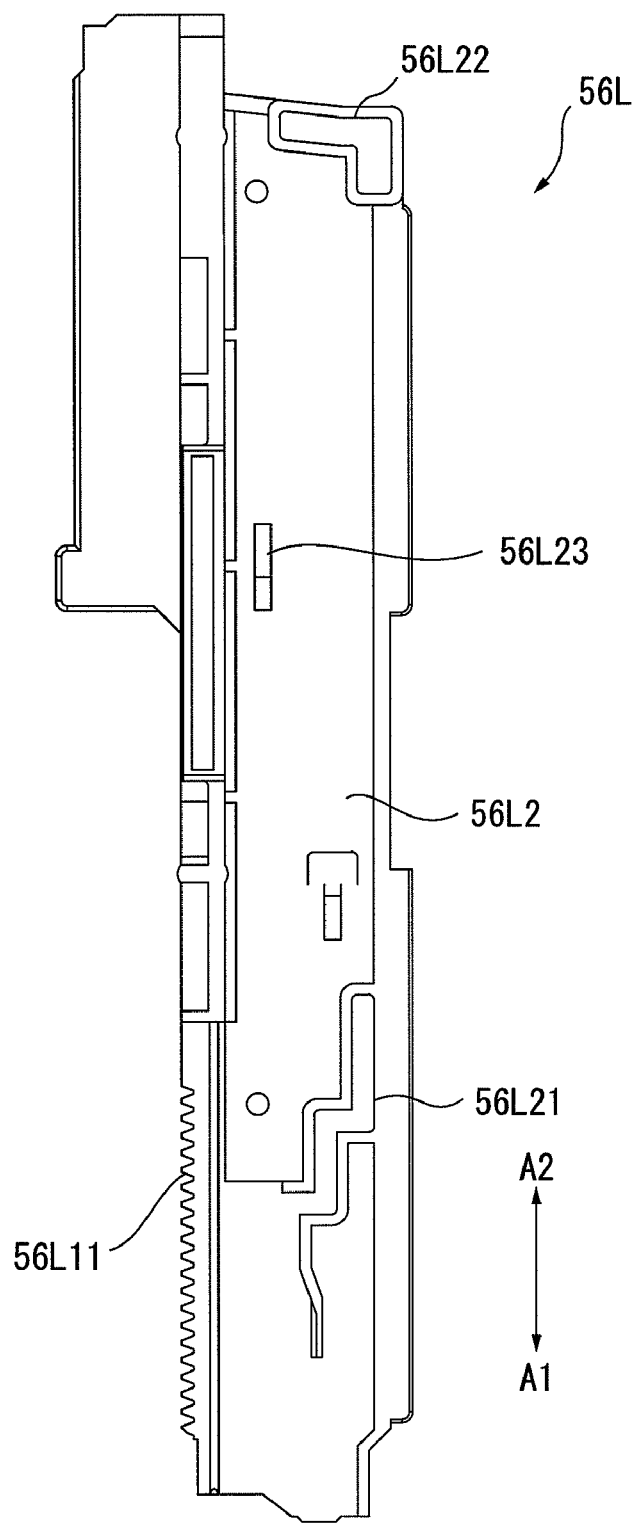
FIG. 31 is a view showing the slide cam in the disk apparatus as viewed from below.
Figure 32:
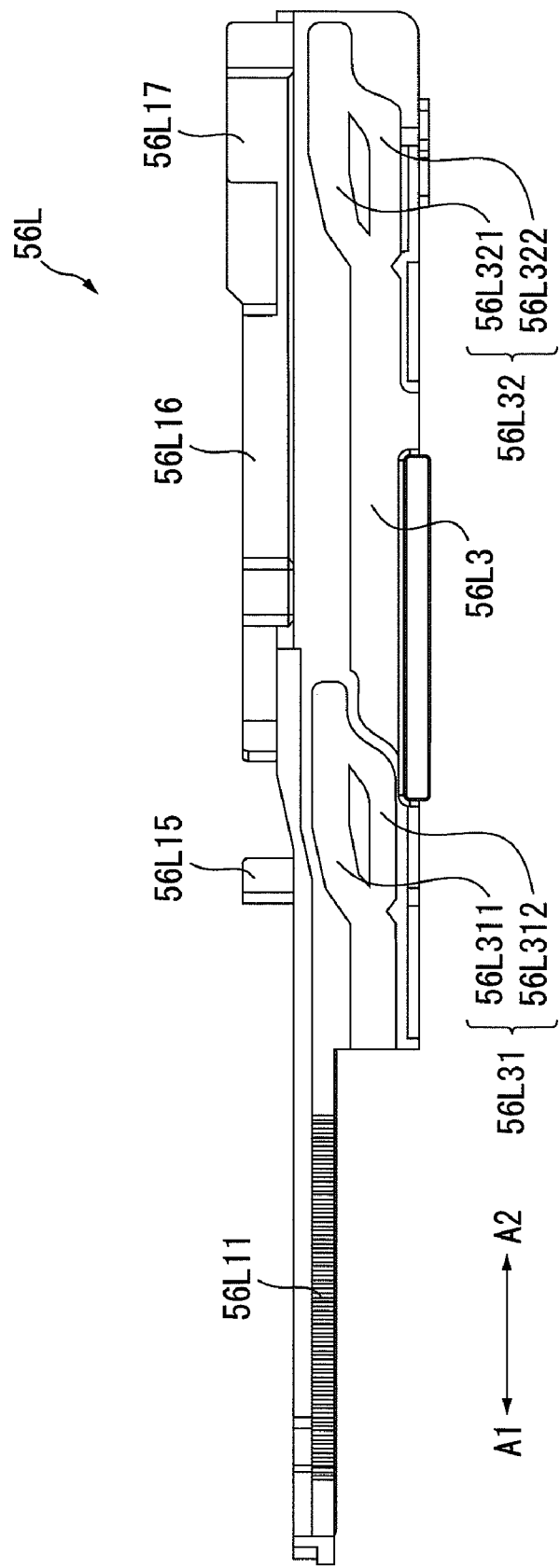
FIG. 32 is a view showing the slide cam in the disk apparatus as viewed from a side.

FIGS. 29 to 32 show the slide cam 56L. More particularly, FIG. 29 is a perspective view showing the slide cam 56L, and FIGS. 30 to 32 are views of the slide cam 56L from above, from below and from a side (side opposing to the holder 52), respectively.

As described hereinabove, the slide cam 56L is disposed for sliding movement on the cam arrangement portion 514L (refer to FIGS. 4 and 5) of the base frame 51. Upon accommodation of the disk D, the slide cam 56L slidably moves in a direction (direction indicated by an arrow mark A1 in FIGS. 29 to 32) in which it approaches the transmission mechanism 55 (refer to FIG. 6). However, upon carrying out of the disk D, the slide cam 56L slidably moves in a direction (direction indicated by an arrow mark A2 in FIGS. 29 to 32) in which it is spaced away from the transmission mechanism 55.

The slide cam 56L is a vertically elongated plate-like member made of a synthetic resin material. The slide cam 56L includes, as shown in FIGS. 29 to 32, an upper face portion 56L1 opposing to the top frame 701, a bottom face portion 56L2 opposing to the cam arrangement portion 514L of the base frame 51, and a side face portion 56L3 opposing to the holder 52.

As shown in FIGS. 29 and 30, a rack portion 56L11 and upright portions 56L15 to 56L17, and grooves 56L12 to 56L14 are formed on the upper face portion 56L1.

The rack portion 56L11 is formed along the longitudinal direction of the slide cam 56L at an end portion of the upper face portion 56L1 in the direction of the arrow mark A1. The rack portion 56L11 meshes with the second gear 553 (refer to FIG. 6) which composes the transmission mechanism 55 described hereinabove such that it slidably moves the slide cam 56L when the second gear 553 rotates.

The grooves 56L12 to 56L14 are formed along the longitudinal direction of the slide cam 56L at an end portion of the upper face portion 56L1 on the side on which the rack portion 56L11 is formed. The grooves 56L12 and 56L13 formed on the side nearer to the rack portion 56L11 extend along the longitudinal direction and then are bent so as to be spaced away from the rack portion 56L11 and extend outwardly along the longitudinal direction again.

The upright portions 56L15 to 56L17 are formed as side walls extending uprightly in a perpendicular direction from the upper face portion 56L1.

The upright portion 56L15 is formed in a substantially L shape as viewed in plan at a substantially central portion of the upper face portion 56L1. The upright portion 56L15 is contacted with the cylindrical portion 7072 (refer to FIGS. 16 and 26) formed on the guide lock 707 described hereinabove in response to sliding movement of the slide cam 56L in a direction in which it approaches the transmission mechanism 55 and then pivots the guide lock 707.

More particularly, when the first disk D1 is inserted into the apparatus body 2, the cylindrical portion 7072 disposed on the groove 56L14 side with respect to the upright portion 56L15 is positioned at a position spaced from the upright portion 56L15 by pivotal motion of the guide lock 707 as indicated by an arrow mark A3 of an alternate long and two short dashes line in FIG. 30.

On the other hand, when the second disk D2 is inserted into the apparatus body 2, the upright portion 56L15 is contacted with the cylindrical portion 7072 in response to sliding movement of the slide cam 56L and pivots the guide lock 707. Thereafter, the cylindrical portion 7072 moves in a direction indicated by the arrow mark A2 of the slide cam 56L along the upright portion 56L15 as indicated by an arrow mark A4 of an alternate long and short dashes line in FIG. 30.

The upright portions 56L16 and 56L17 are formed remotely from the side on which the grooves 56L12 to 56L14 are formed with respect to a substantially central portion of the upper face portion 56L1. Grooves 56L1A to 56L1F are defined by the upright portions 56L16 and 56L17.

In particular, the groove 56L1A is surrounded by the upright portion 56L16 on the side of the upper face portion 56L1 adjacent the side face portion 56L3 such that it has a substantially T shape as viewed in plan. The cylindrical portion 70561 (refer to FIGS. 16, 21 and 22) of the detection arm 705 is inserted into the groove 56L1A.

More particularly, when the detection arm 705 is contacted with and pivoted by an end edge of the disk D, the cylindrical portion 70561 is contacted with an end portion of the upright portion 56L16 in the groove 56L1A in the direction indicated by the arrow mark A1 in FIG. 30 and slidably moves the slide cam 56L in the direction indicated by the arrow mark A1. By the sliding movement, the rack portion 56L11 and the second gear 553 are brought into meshing engagement with each other, and the slide cam 56L is slidably moved further in the direction of the arrow mark A1. By this sliding movement of the slide cam 56L, the cylindrical portion 70561 is moved in the direction of the arrow mark A2 along the groove 56L1A and then contacted with an end portion of the upright portion 56L16 on the side in the direction of the arrow mark A2 in the groove 56L1A as indicated by the arrow mark A5 of a broken line shown in FIG. 30.

The grooves 56L1B and 56L1C are formed along the longitudinal direction on the opposite side of the upper face portion 56L1 to the groove 56L1A.

When the first disk D1 is inserted into the apparatus body 2, a cylindrical portion 7073 (refer to FIGS. 16 and 26) formed on the guide lock 707 described hereinabove advances into the groove 56L1B.

More particularly, when the slide cam 56L slidably moves in the direction of the arrow mark A1 and the guide lock 707 is pivoted, the cylindrical portion 7073 of the guide lock 707 is fitted into the groove 56L1B as indicated by an arrow mark A6 of an alternate long and two short dashes line in FIG. 30.

On the other hand, when the second disk D2 is inserted into the apparatus body 2, the cylindrical portion 7073 of the guide lock 707 is fitted into the groove 56L1C as indicated by an arrow mark A7 of an alternate long and short dashes line in FIG. 30.

Consequently, the guide lock 707 is locked in a state wherein it permits pivotal motion of the guide arm 706.

The groove 56L1D is formed in a substantially L shape as viewed in plan at a location rather near to the end portion in the direction of the arrow mark A2 with respect to the groove 56L1C. The cylindrical portion 70625 (refer to FIGS. 16 and 24) formed on the guide arm 706 advances into the groove 56L1D when the first disk D1 is inserted into the apparatus body 2.

More particularly, if the slide cam 56L is slidably moved in response to insertion of the first disk D1 to permit pivotal motion of the guide arm 706, then the detection arm 705 and the guide arm 706 are pivoted. Thereupon, the cylindrical portion 70625 of the guide arm 706 disposed in the proximity of the groove 56L1E is fitted into the groove 56L1D in response to pivotal motion of the guide arm 706 as indicated by an arrow mark A8 of an alternate long and short dashes line in FIG. 30. Consequently, the pivotal motion of the guide arm 706 is locked, and the detection arm 705 is locked in a state wherein it is spaced away from the first disk D1.

The groove 56L1E is formed in a substantially L shape as viewed in plan on the outer side with respect to the groove 56L1D. When the second disk D2 is inserted into the apparatus body 2, the cylindrical portion 70625 of the guide arm 706 advances into the groove 56L1E as indicated by an arrow mark A9 of an alternate long and short dashes line in FIG. 30 in response to sliding movement of the slide cam 56L in the direction indicated by the arrow mark A1. Consequently, the pivotal motion of the guide arm 706 is locked and the detection arm 705 is locked in a state wherein it is spaced away from the second disk D2.

The groove 56L1F is formed in a substantially L shape as viewed in plan at an end portion on the side of the direction of the arrow mark A2 with respect to the groove 56L1A. When the first disk D1 is inserted into the apparatus body 2, the cylindrical portion 70626 (refer to FIGS. 16 and 24) of the guide arm 706 advances into the groove 56L1F as indicated by an arrow mark A10 of an alternate long and two short dashes line in FIG. 30.

It is to be noted that, when the second disk D2 is inserted into the apparatus body 2, the cylindrical portion 70626 does not advance into the groove 56L1F but is positioned on the outside of the slide cam 56L as indicated by an arrow mark A11 of an alternate long and short dashes line in FIG. 30.

While, in the foregoing description, the disk D is inserted and the slide cam 56L slidably moves in the direction of the arrow mark A1, when the slide cam 56L slidably moves in the direction of the arrow mark A2 in order to carry out the disk D, the elements mentioned operate reversely to those described above.

Grooves 56L21 and 56L22 and a projection 56L23 are formed on the bottom face portion 56L2 of the slide cam 56L as seen in FIG. 31.

The groove 56L21 is formed in a staircase shape as viewed in plan in the proximity of the rack portion 56L11. The cylindrical portion 5712 provided on the swing arm 571 which composes the insertion preventing mechanism 57 hereinafter described is inserted into the groove 56L21.

The groove 56L22 is formed in a substantially L shape in plan at an end portion of the slide cam 56L on the side in the direction of the arrow mark A2. A cylindrical portion 561L is provided on the link arm 561 and inserted into the groove 56L22.

The projection 56L23 is formed at a substantially central portion of the bottom face portion 56L2 in the longitudinal direction. The projection 56L23 is engaged with a compression spring (not shown) provided on the cam arrangement portion 514L of the base frame 51 and is acted upon by a biasing force in the direction of the arrow mark A2 from the compression spring.

A groove 56L31 is formed at an end portion of the slide cam 56L on the side on which the rack portion 56L11 of the side face portion 56L3 is formed. Meanwhile, another groove 56L32 is formed at an end portion of the slide cam 56L remote from the first-mentioned end portion.

Lifting grooves 56L311 and 56L321 along which the cylindrical portion 5221 of the holder 52 slidably moves when the holder 52 described hereinabove is to be moved up and lowering grooves 56L312 and 56L322 along which the cylindrical portion 5221 slidably moves when the holder 52 is to be moved down are formed on the grooves 56L31 and 56L32, respectively. The lifting grooves 56L311 and 56L321 and the lowering grooves 56L312 and 56L322 have a shape similar to a magnetization curve and are formed in a substantially same shape but do not overlap with each other.

(7-2) Configuration of the Link Arm 561

The link arm 561 pivots in response to sliding movement of the slide cam 56L to slidably move the slide cam 56R in a direction opposite to the sliding direction of the slide cam 56L. The link arm 561 is a plate-like member made of a metal material and having a substantially V shape as viewed in plan as seen in FIG. 7.

A hole 5611 is formed at a substantially central portion of the link arm 561, and a screw (not shown) for attaching the link arm 561 for pivotal motion to the link arm arrangement portion 515 is inserted in the hole 5611.

Cylindrical portions 561L and 561R are provided at the opposite ends of the link arm 561 in such a manner as to project toward the base frame 51 side. The cylindrical portion 561L provided on the right side in FIG. 7 extends through the opening 515L and engages with the groove 56L22 of the slide cam 56L. Meanwhile, the cylindrical portion 561R provided on the left side in FIG. 7 extends through the opening 515R and engages with the groove 56R22 of the slide cam 56R.

(7-3) Configuration of the Slide Cam 56R

Figure 33:
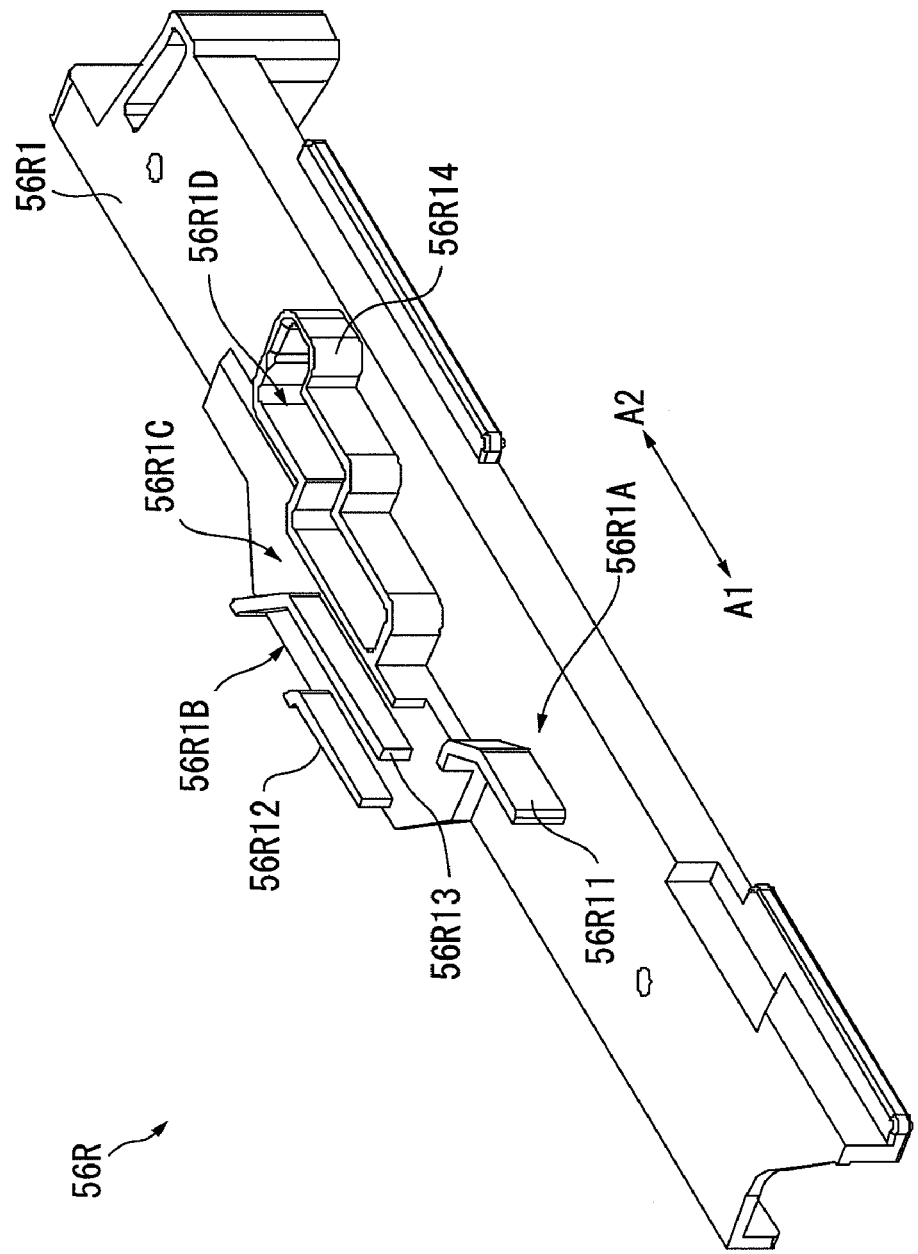
FIG. 33 is a perspective view showing a different slide cam in the disk apparatus.
Figure 34:
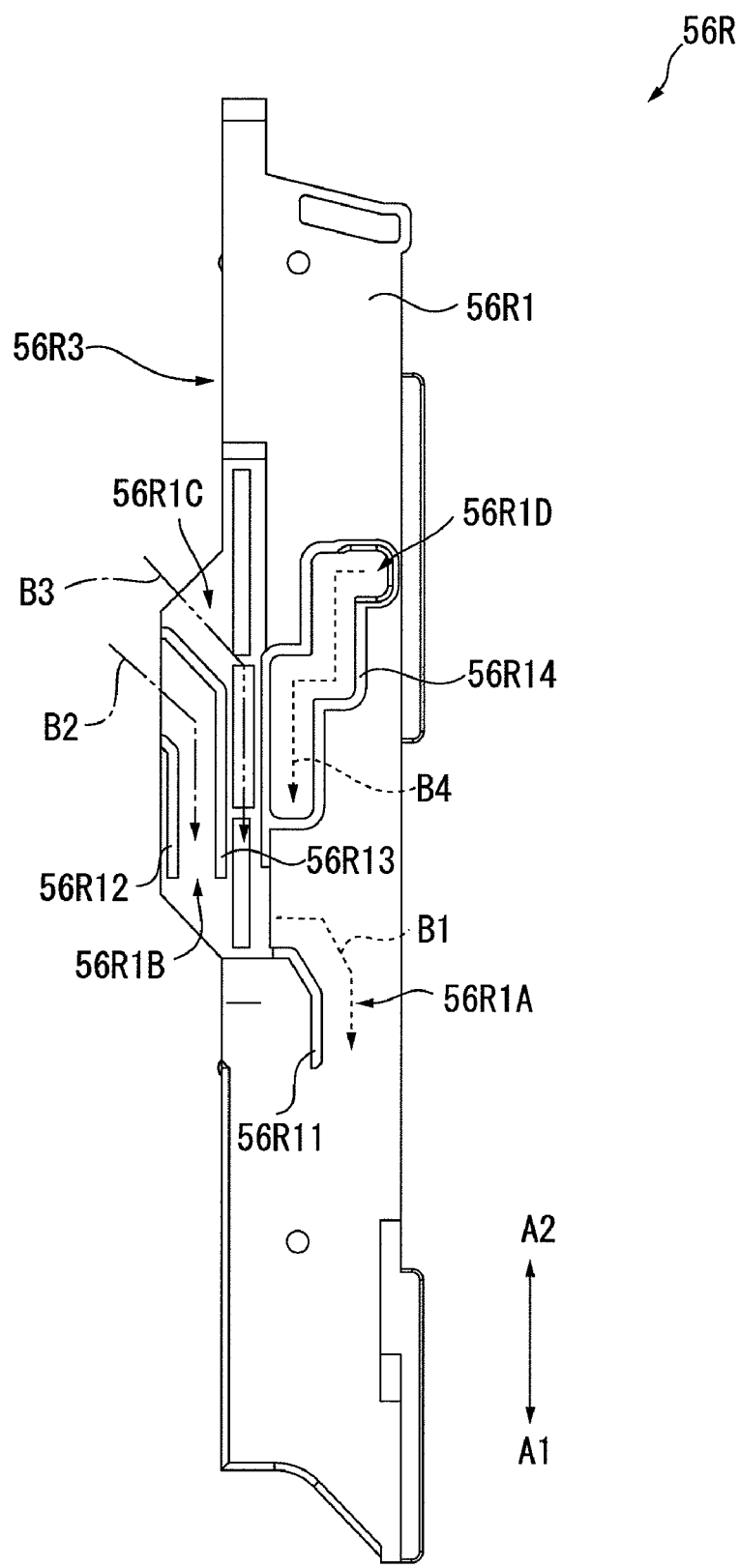
FIG. 34 is a view showing the different slide cam in the disk apparatus as viewed from above.
Figure 35:
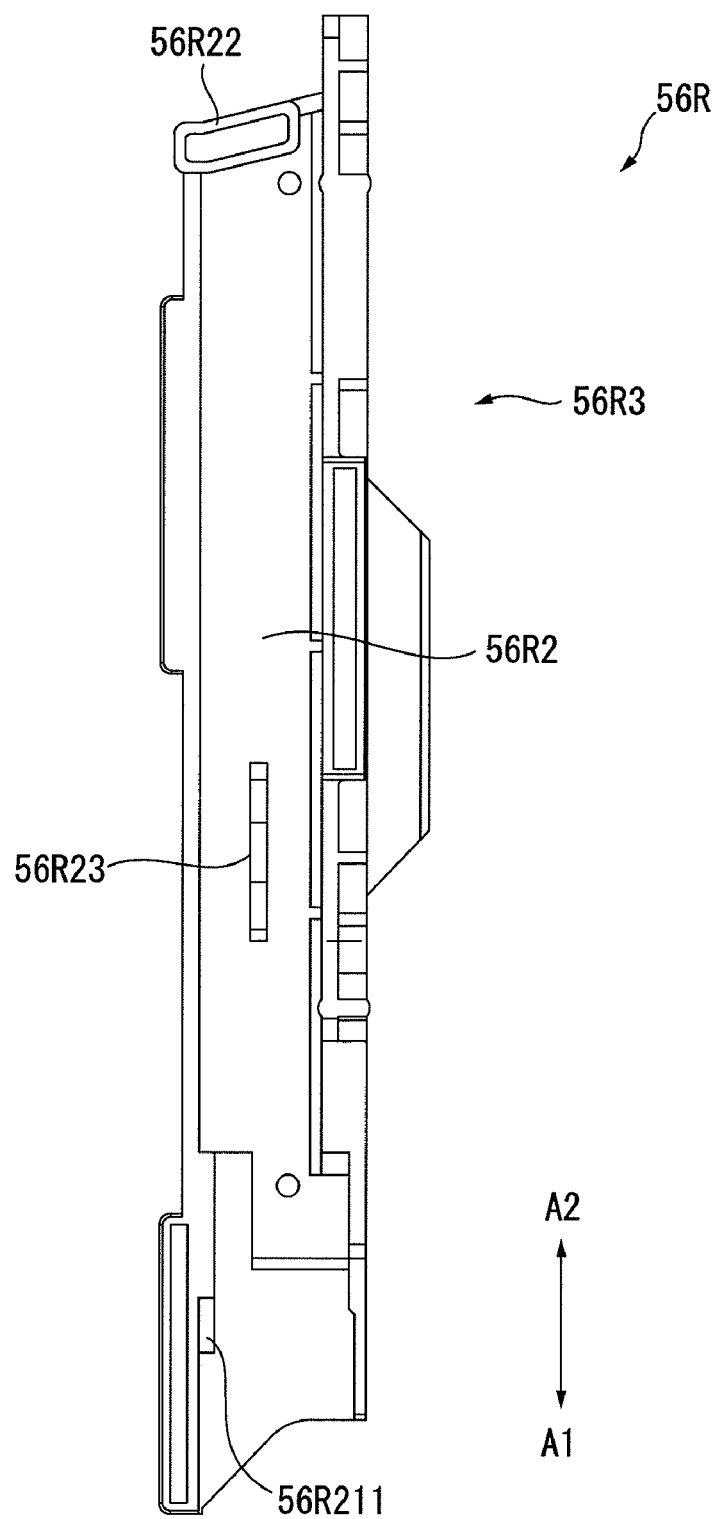
FIG. 35 is a view showing the different slide cam in the disk apparatus as viewed from below.
Figure 36:
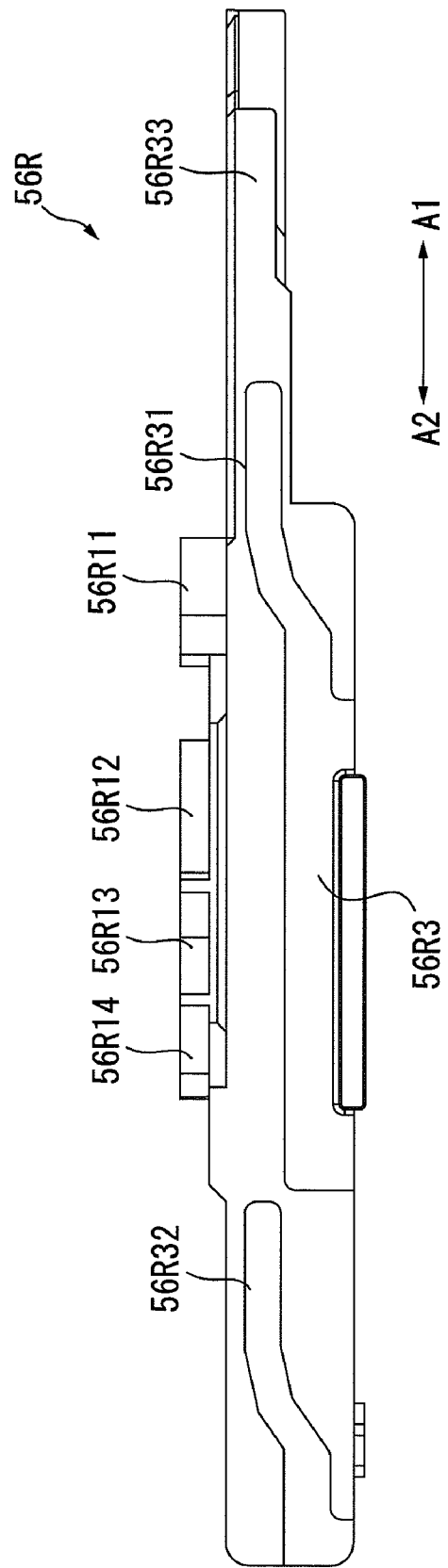
FIG. 36 is a view showing the different slide cam in the disk apparatus as viewed from a side.

FIG. 33 is a perspective view showing the slide cam 56R. Meanwhile, FIGS. 34 to 36 are views of the slide cam 56R as viewed from above, from below and from a side (side opposing to the holder 52), respectively. It is to be noted that the directions of arrow marks A1 and A2 shown in FIGS. 33 to 36 are same directions as the directions of the arrow marks A1 and A2 described hereinabove, respectively.

The slide cam 56R is a plate-like member made of a synthetic resin material and paired with the slide cam 56L. The slide cam 56R is disposed for sliding movement on the cam arrangement portion 514R (refer to FIGS. 4 and 5) formed on the base frame 51. Upon carrying-in of the disk D, the slide cam 56R slidably moves in a direction (direction indicated by the arrow mark A2) in which it is spaced away from the transmission mechanism 55 (refer to FIG. 6). However, upon carrying-out of the disk D, the slide cam 56R slidably moves in another direction (direction indicated by the arrow mark A1) in which it approaches the transmission mechanism 55.

Referring to FIGS. 33 to 36, the slide cam 56R includes an upper face portion 56R1 opposing to the top frame 701, a bottom face portion 56R2 opposing to the cam arrangement portion 514R of the base frame 51, and a side face portion 56R3 opposing to the holder 52.

As shown in FIGS. 33 and 34, upright portions 56R11 to 56R14 and grooves 56R1A to 56R1D are formed on the upper face portion 56R1. The upright portions 56R11 to 56R14 extend uprightly in a perpendicular direction from the upper face portion 56R1.

In particular, the upright portion 56R11 is formed in a substantially L shape as viewed in plan at a substantially central portion of the upper face portion 56R1. The cylindrical portion 7049 (refer to FIGS. 16 and 20) of the support arm 704 is contacted with the upright portion 56R11 when the second disk D2 is inserted. Then, upon pivotal motion of the support arm 704, the cylindrical portion 7049 moves along the groove 56R1A formed by the upright portion 56R11 as indicated by an arrow mark B1 of a broken line in FIG. 34.

The upright portions 56R12 and 56R13 are formed at a substantially central portion of the upper face portion 56R1 in such a manner as to be juxtaposed along the longitudinal direction. The upright portion 56R12 is formed adjacent the side face portion 56R3, and the upright portion 56R13 is formed such that an end portion thereof in the direction of the arrow mark A2 is bent in a direction in which it approaches the side face portion 56R3.

Into the groove 56R1B of a substantially L shape as viewed in plan which is defined by the upright portions 56R12 and 56R13, the cylindrical portion 704B (refer to FIG. 16) of the support arm 704 contacted with and pivoted by the second disk D2 advances as indicated by an arrow mark B2 of an alternate long and short dashes line in FIG. 34. Consequently, the support arm 704 is locked at a position spaced away from the end edge of the second disk D2.

The upright portion 56R14 is formed on the opposite side to the upright portion 56R12 with respect to the upright portion 56R13.

Into the groove 56R1C of a substantially L shape as viewed in plan which is defined by the upright portion 56R14 and the upright portion 56R13, the cylindrical portion 704B of the support arm 704 contacted with and pivoted by the first disk D1 advances as indicated by an arrow mark B3 of an alternate long and short dashes line in FIG. 34. Consequently, the support arm 704 is locked at a position spaced away from the end edge of the first disk D1.

The groove 56R1D is surrounded and defined by the upright portion 56R14 formed in a staircase shape as viewed in plan. In the groove 56R1D, the cylindrical portion 7084 (refer to FIGS. 16 and 27) of the chuck arm 708 is inserted. Consequently, as the slide cam 56R slidably moves in the direction indicated by the arrow mark A2, the cylindrical portion 7084 moves in the direction indicated by an arrow mark B4 of a broken line in FIG. 34 along the groove 56R1D. In response to the pivotal motion of the chuck arm 708, the chuck arm 709 (refer to FIG. 15) is pivoted to cancel the engagement between the chuck arms 708 and 709 and the chuck pulley 710 (refer to FIG. 15).

A tapering portion 56R211 is formed on one end (end in the direction of the arrow mark A1) side in the longitudinal direction of the bottom face portion 56R2 such that the thicknesswise dimension thereof decreases toward the direction of the arrow mark A1 as seen in FIG. 35. A bent portion 5851 (refer to FIGS. 44 and 45) formed on the shutter lever 58 hereinafter described contacts with the tapering portion 56R211.

The groove 56R22 of a substantially rectangular shape as viewed in plan is formed at an end portion of the bottom face portion 56R2 in the direction of the arrow mark A2, and the cylindrical portion 561R of the link arm 561 is inserted into the groove 56R22.

A projection 56R23 is formed at a substantially central portion of the bottom face portion 56R2. The projection 56R23 engages with a compression spring (not shown) which is provided on the cam arrangement portion 514R and exerts biasing force in the direction of the arrow mark A2.

Two grooves 56R31 and 56R32 are formed at the opposite ends in the longitudinal direction of the side face portion 56R3 opposing to the holder 52. The grooves 56R31 and 56R32 have a shape like a magnetization curve which is leftwardly and rightwardly symmetrical as viewed in side elevation to the lifting grooves 56L311 and 56L321 formed on the slide cam 56L as seen in FIG. 36. The cylindrical portion 5221 formed on the holder 52 engages with the grooves 56R31 and 56R32.

A pressing portion 56R33 is formed at an end portion of the side face portion 56R3 in the direction of the arrow mark A1. The pressing portion 56R33 contacts with the third switch 544 (refer to FIG. 6) formed on the control board 54 to press the third switch 544.

(7-4) Operation of the Lifting Mechanism 56

Upward and downward movement of the holder 52 by the lifting mechanism 56 is described.

Figure 37:
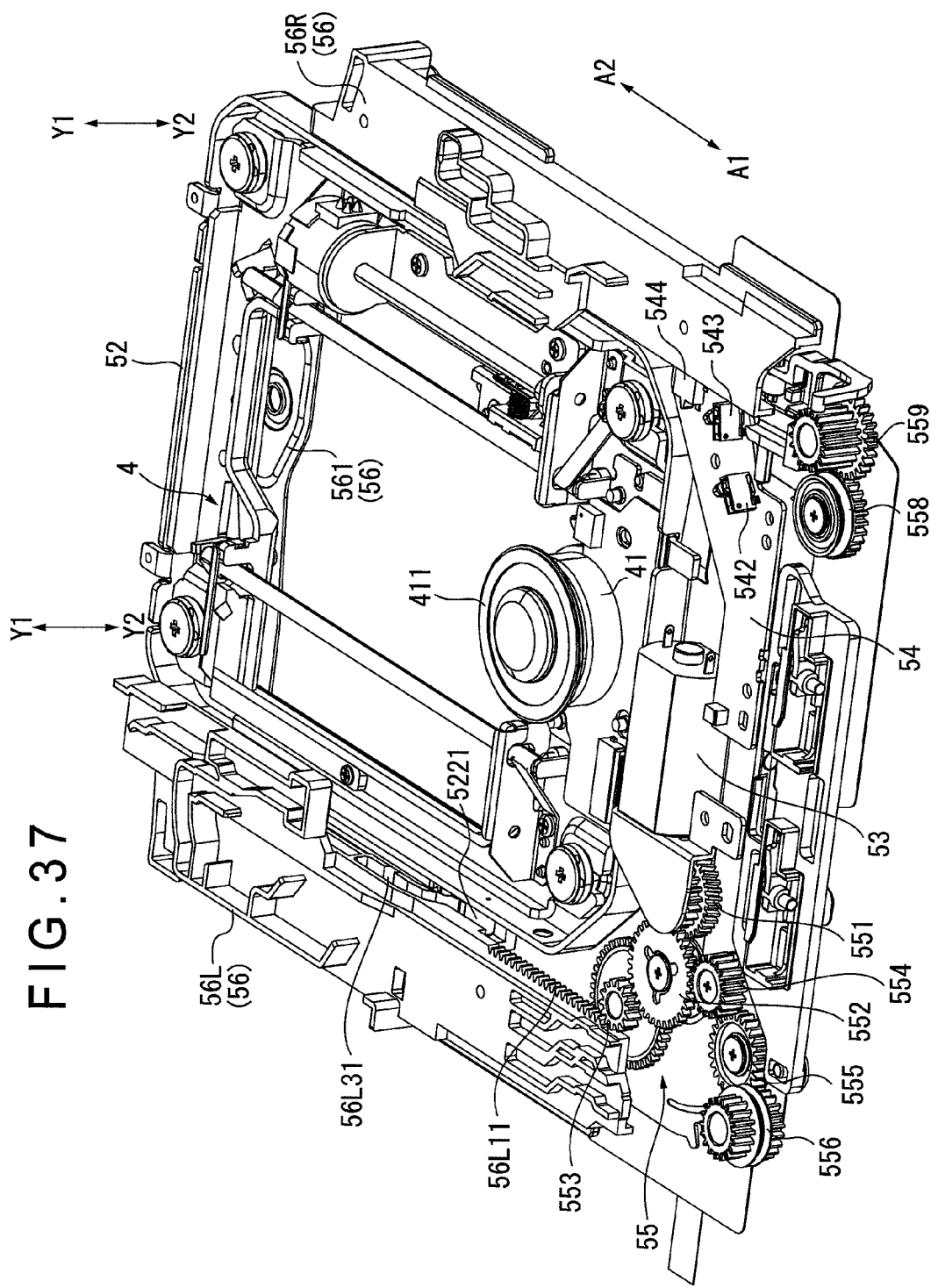
FIGS. 37 to 39 are views illustrating up and down movements of a holder and the optical unit by a lifting mechanism in the disk apparatus.
Figure 38:
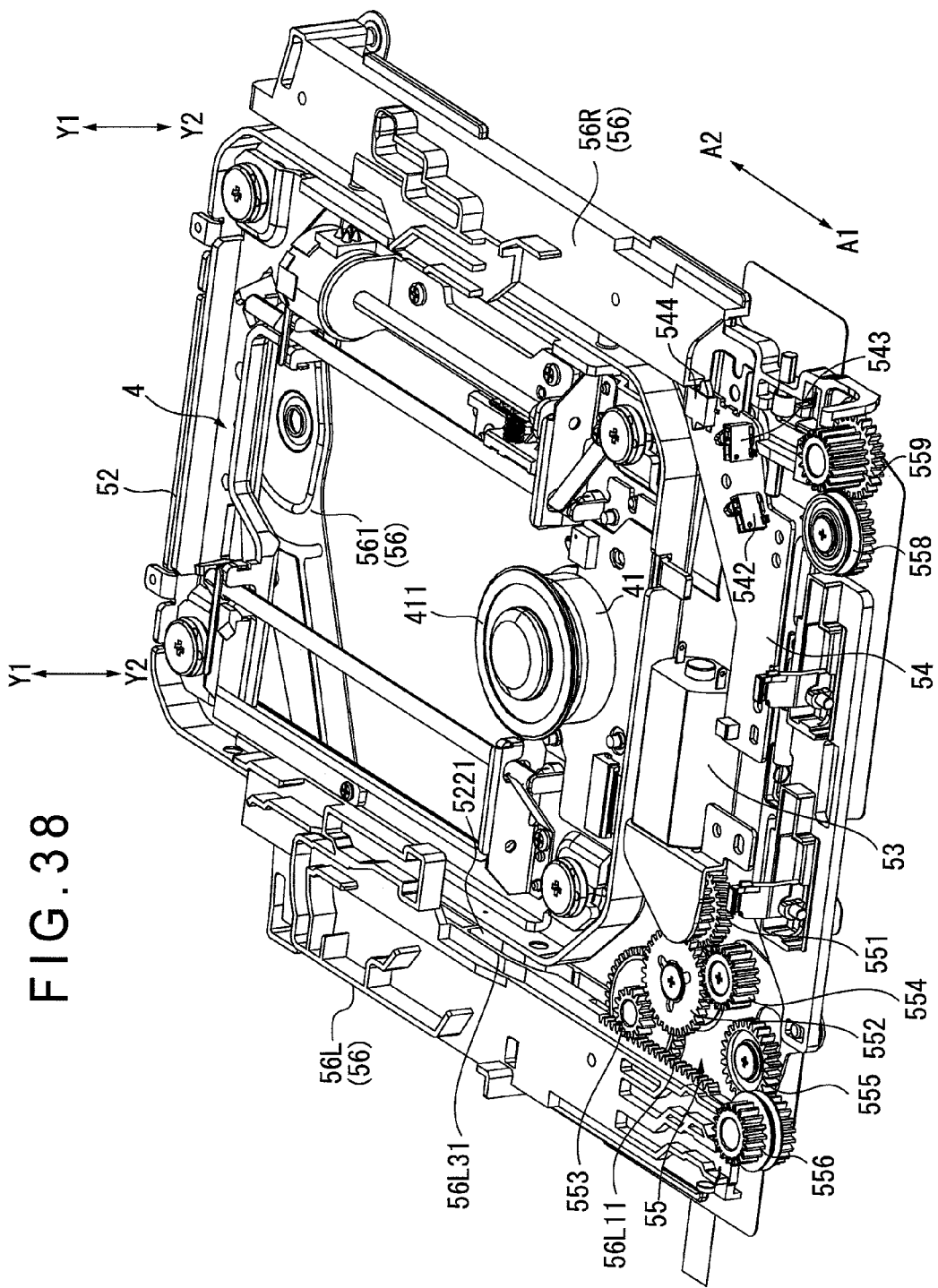
Figure 39:
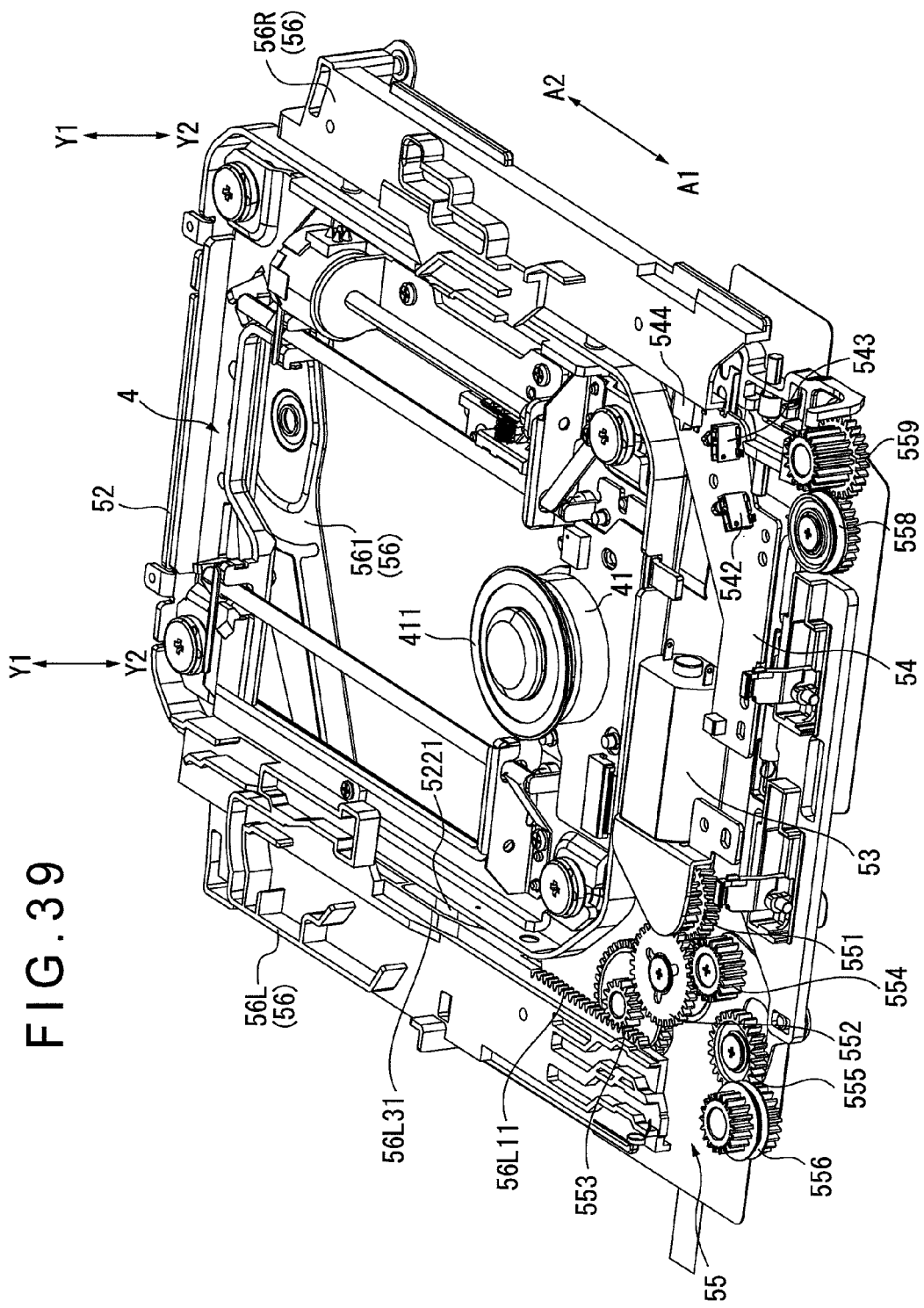

FIG. 37 shows the holder 52 at a downwardly moved position while FIG. 38 shows the holder 52 at an upwardly moved position. Further, FIG. 39 illustrates the holder 52 during downward movement. It is to be noted that the base frame 51 disk D and so forth are not shown in FIGS. 37 to 39. Further, the directions of arrow marks A1 and A2 shown in FIGS. 37 to 39 are same directions as the directions of the arrow marks A1 and A2 illustrated in FIGS. 29 to 36, respectively.

First, upward movement (movement in the direction of the arrow mark Y1) of the holder 52 and the optical unit 4 is described.

When the disk D is not inserted in the apparatus body 2, the slide cam 56L is disposed at a position in which the end portion of the slide cam 56L in the direction of the arrow mark A1 is spaced away from the transmission mechanism 55 and the rack portion 56L11 is not in meshing engagement with the second gear 553 which forms the transmission mechanism 55 as shown in FIG. 37.

In this instance, the four cylindrical portions 5221 (refer particularly to FIG. 5) of the holder 52 on which the optical unit 4 is supported are individually inserted in the grooves 56L31 and 56L32 formed on the side face portion 56L3 of the slide cam 56L and the grooves 56R31 and 56R32 formed on the side face portion 56R3 of the slide cam 56R.

It is to be noted that, in this state, the third switch 544 provided on the control board 54 is pressed by the pressing portion 56R33 (refer to FIG. 36) of the slide cam 56R and the third switch 544 is in an on state.

Here, if the disk D is inserted into the apparatus body 2 through the opening 2A and the detection arm 705 (refer to FIGS. 17 and 21) which forms the upper unit 7 described hereinabove is pivoted to move the slide cam 56L in the direction of the arrow mark A1, then the rack portion 56L11 and the second gear 553 of the transmission mechanism 55 are brought into meshing engagement with each other. Consequently, the slide cam 56L is further slidably moved in the direction of the arrow mark A1. In response to the movement of the slide cam 56L in the direction of the arrow mark A1, the link arm 561 is pivoted to slidably move the slide cam 56R in the direction indicated by the arrow mark A2.

In response to the sliding movement of the slide cams 56L and 56R, the end portion of the holder 52 adjacent the slide cam 56L and the end portion of the holder 52 adjacent the slide cam 56R are moved up (in the direction indicated by the arrow mark Y1) at the same time.

More particularly, that one of the cylindrical portions 5221 of the holder 52 which is formed adjacent the slide cam 56L moves along the lifting grooves 56L311 and 56L321 of the slide cam 56L while the cylindrical portion 5221 formed adjacent the slide cam 56R moves along the grooves 56R31 and 56R32 of the slide cam 56R.

Thereupon, since the grooves 56R31 and 56R32 have a shape of a magnetization curve leftwardly and rightwardly symmetrical to the lifting grooves 56L311 and 56L321, the end portion of the holder 52 adjacent the slide cam 56L and the end portion of the holder 52 adjacent the slide cam 56R move up simultaneously. In other words, the holder 52 and the optical unit 4 move upwardly perpendicularly to the plane of the disk D.

As a result of such upward movement of the holder 52, the turntable 411 of the optical unit 4 attached to the holder 52 and the chuck pulley 710 (refer to FIG. 17) cooperatively chuck the disk D.

In this state, the contacting relationship between the pressing portion 56R33 of the slide cam 56R and the third switch 544 is cancelled and the third switch 544 is in an off state.

Now, downward movement (movement in the direction indicated by an arrow mark Y2) of the holder 52 and the optical unit 4 is described.

If the motor 53 rotates reversely in the state illustrated in FIG. 38, then the slide cam 56L moves in the direction of the arrow mark A2 and the slide cam 56R moves in the direction of the arrow mark A1. Thereupon, the engaging state of the cylindrical portion 5221 on the slide cam 56L side of the holder 52 is changed over from the engagement with the lifting grooves 56L311 and 56L321 to the engagement with the lowering grooves 56L312 and 56L322 on the slide cam 56L. The shape of the lowering grooves 56L312 and 56L322 is different from that of the grooves 56R31 and 56R32 of the slide cam 56R, and while the grooves 56R31 and 56R32 have a shape for moderately moving down the cylindrical portion 5221, the lowering grooves 56L312 and 56L322 have another shape for quickly moving down the cylindrical portion 5221.

Therefore, a time difference appears between downward movements of the end portion of the holder 52 adjacent the slide cam 56L and the end portion of the holder 52 adjacent the slide cam 56R, and the end portion of the holder 52 adjacent the slide cam 56L moves down rapidly first and then the end portion of the holder 52 adjacent the slide cam 56R moves down moderately. In other words, the holder 52 and the optical unit 4 move down in an inclined state with respect to the downward direction (direction indicated by the arrow mark Y2).

Then, after the movement of the slide cams 56L and 56R ends and the downward movement of the holder 52 and the optical unit 4 ends, the holder 52 and the optical unit 4 return to the position at which they extend along the face of the disk D to be inserted as seen in FIG. 37. In this state, the third switch 544 is pressed by the pressing portion 56R33 of the slide cam 56R to change over the third switch 544 from an off state to an on state.

When the turntable 411 of the optical unit 4 is to be contacted with the disk D by the lifting mechanism 56, the optical unit 4 can be moved up perpendicularly to the plane of the disk D. Consequently, the turntable 411 of the optical unit 4 can be contacted and fitted appropriately with a high degree of accuracy with the hole DC formed at a substantially central portion of the disk D.

On the other hand, when the turntable 411 of the optical unit 4 is to be spaced away from the disk D, the optical unit 4 can be moved down in such a manner that it is inclined with respect to the plane of the disk D and also to the direction of downward movement. Consequently, the force required to move the disk D and the turntable 411 of the optical unit 4 away from each other can be reduced. Accordingly, cancellation of the contacting state between the disk D and the optical unit 4 can be performed readily.

(8) Insertion Preventing Mechanism 57

The insertion preventing mechanism 57 is a mechanism for preventing, where a disk D is accommodated already in the apparatus body 2, another disk D from being inserted into the apparatus body 2 and corresponds to the insertion prevention mechanism in the present invention. The insertion preventing mechanism 57 is disposed below the transmission mechanism 55 as seen in FIG. 4. The insertion preventing mechanism 57 includes a swing arm 571, a lock slider 572 and two lock levers 573.

(8-1) Configuration of the Swing Arm 571

Figure 40:
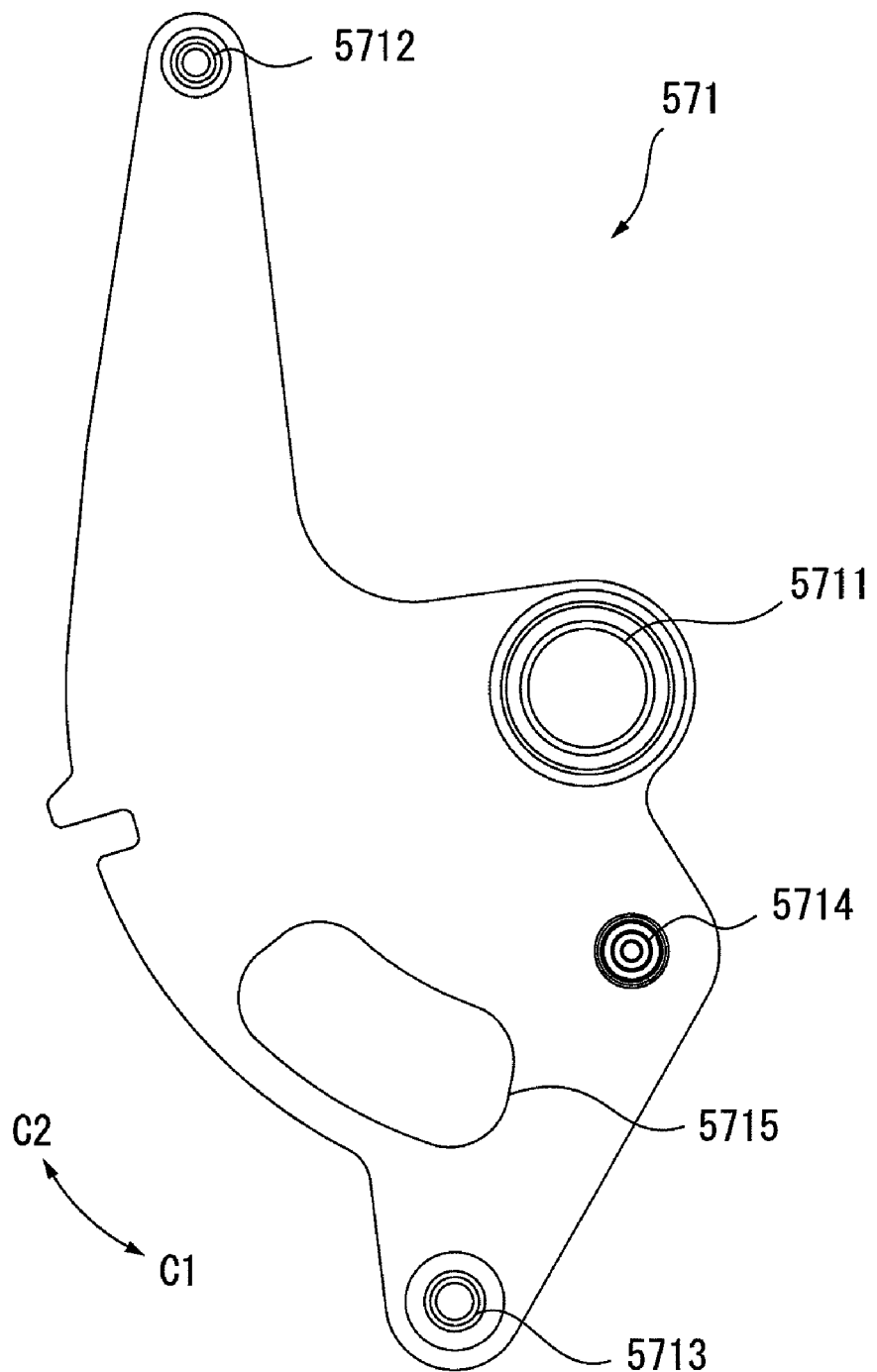
FIG. 40 is a view showing a swing arm in the disk apparatus as viewed from above.

FIG. 40 shows the swing arm 571 as viewed from above.

The swing arm 571 slidably moves the lock slider 572 upon sliding movement of the slide cam 56L and corresponds to the connection member in the present invention. The swing arm 571 is a plate-like member made of a metal material and having a substantially L shape as viewed in plan as seen in FIG. 40. The swing arm 571 has a hole 5711, a screw hole 5714 and an opening 5715 formed thereon and includes cylindrical portions 5712 and 5713.

The hole 5711 is formed at a substantially central portion of the swing arm 571. A screw (not shown) is inserted in the hole 5711. The screw supports the swing arm 571 for pivotal motion on the base frame 51 together with the first gear 552 which composes the transmission mechanism 55 described hereinabove.

The cylindrical portions 5712 and 5713 are provided at the opposite end portions in the longitudinal direction of the swing arm 571 in such a manner as to project in directions opposing to the transmission mechanism 55. The cylindrical portion 5712 engages with the groove 56L21 formed in the slide cam 56L to pivot, upon sliding movement of the slide cam 56L, the swing arm 571 in the direction indicated by an arrow mark C1 or the direction indicated by another arrow mark C2 around the hole 5711.

The cylindrical portion 5713 engages with an opening 5721 formed in the lock slider 572 to slidably move, upon pivotal motion of the swing arm 571, the lock slider 572 in a direction perpendicular to the insertion direction of the disk D.

The screw hole 5714 and the substantially arcuate opening 5715 are formed between the hole 5711 and the cylindrical portion 5713 of the swing arm 571.

A screw (not shown) is fitted in the screw hole 5714, and the third gear 554 which composes the transmission mechanism 55 is fitted in the screw hole 5714. Therefore, when the swing arm 571 is pivoted in the direction of the arrow mark C1, the meshing engagement between the third gear 554 and the fourth gear 555 is canceled and driving of the motor 53 (refer to FIG. 6) is not transmitted to the carrying unit 6.

A screw (not shown) is fitted in the opening 5715 and supports the fourth gear 555 on the base frame 51.

(8-2) Configuration of the Lock Slider 572

Figure 41:
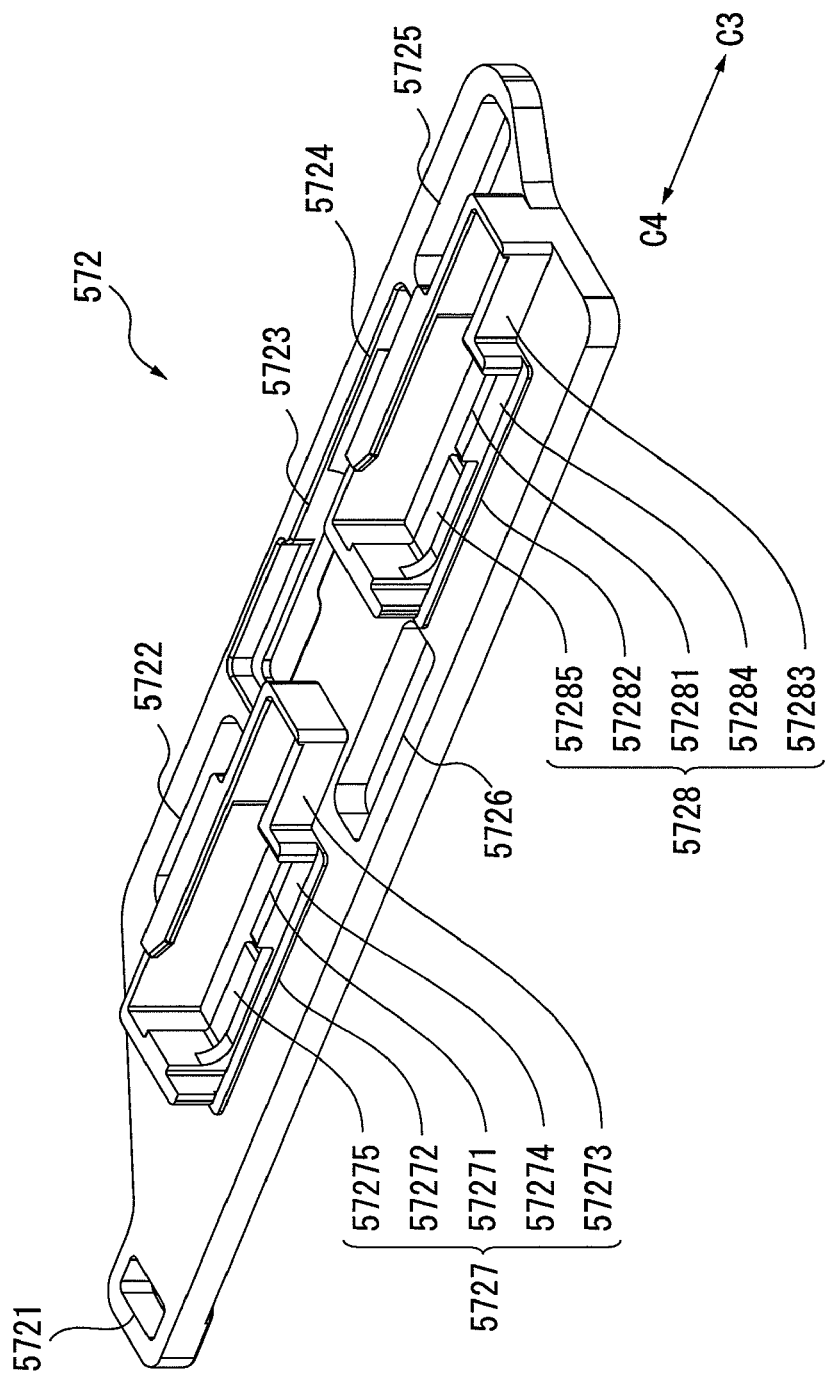
FIG. 41 is a perspective view showing a lock slider in the disk apparatus.
Figure 42:
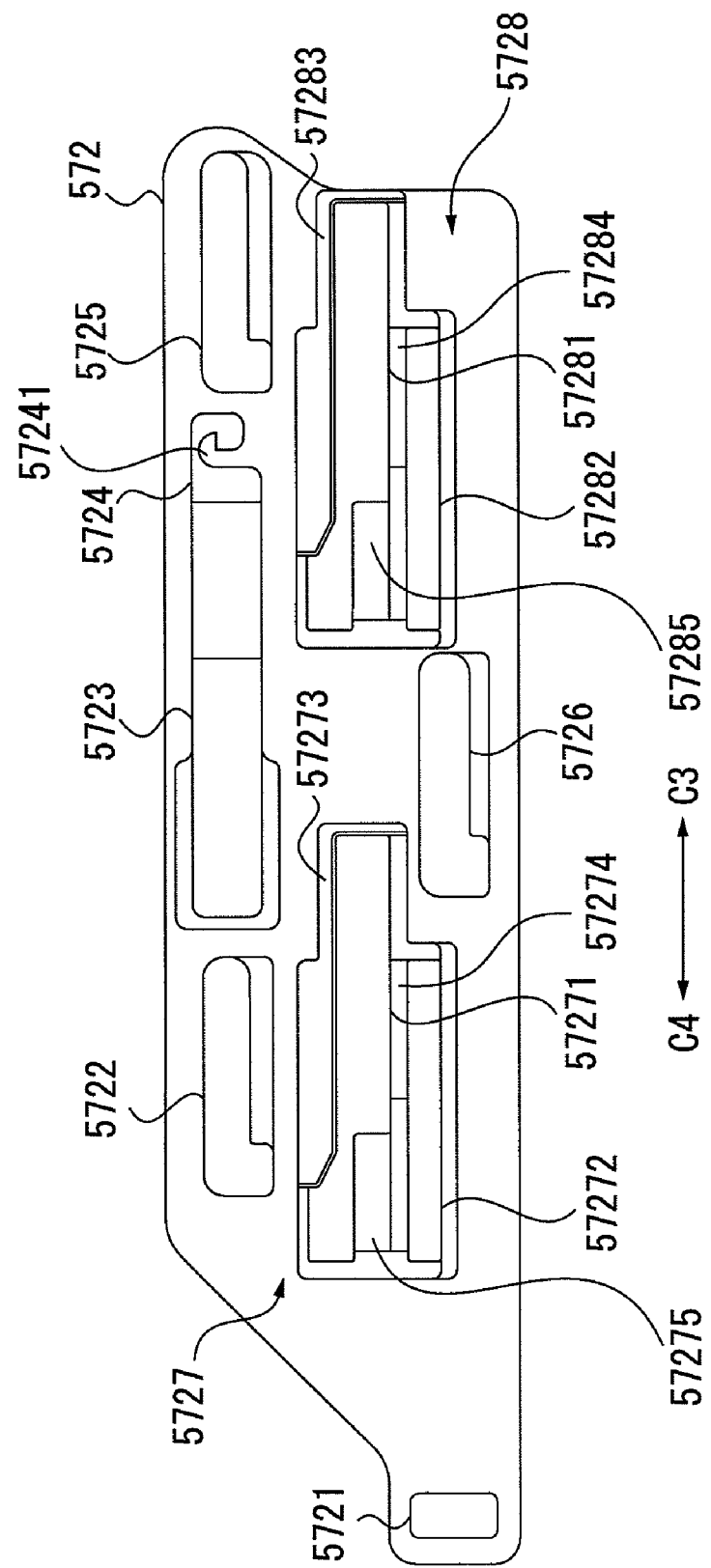
FIG. 42 is a view showing the lock slider in the disk apparatus as viewed from above.

FIG. 41 is a perspective view showing the lock slider 572. FIG. 42 is a view of the lock slider 572 as viewed from above.

The lock slider 572 corresponds to the slide member in the present invention, and is disposed below the belt 557 which composes the transmission mechanism 55 and pivots the two lock levers 573 so as to project and retreat. As shown in FIGS. 41 and 42, the lock slider 572 is formed as a plate-like member having a substantially rectangular shape as viewed in plan. The opening 5721 of a substantially rectangular shape as viewed in plan is formed at an end portion of the lock slider 572 on the side (end side in the direction of the arrow mark C4) on which the lock slider 572 is positioned adjacent the fifth gear 556 of the transmission mechanism 55. The cylindrical portion 5713 of the swing arm 571 is inserted in the opening 5721.

Four openings 5722 to 5725 of a substantially rectangular shape as viewed in plan are formed along the longitudinal direction of the lock slider 572 at one of the opposite ends portions of the lock slider 572 in a direction perpendicular to the longitudinal direction of the lock slider 572. Meanwhile, an opening 5726 of a substantially rectangular shape as viewed in plan is formed at a substantially central portion of the other end portion of the lock slider 572.

A support portion (not shown) is fitted in an opening 5723 and supports one end side of a tension spring (not shown) provided on the base frame 51. Further, a support portion 57241 (refer to FIG. 42) is formed in the opening 5724 and supports the other end portion of the tension spring. The lock slider 572 is biased in the direction indicated by an arrow mark C4 by the tension spring.

Further, lever exposure portions 5727 and 2728 are formed at a substantially central portion of the lock slider 572 and extend along the longitudinal direction of the lock slider 572.

Openings 57271 and 57272 of a substantially rectangular shape as viewed in plan are formed in parallel on the lever exposure portion 5727 of the opening 5721 side (side in the direction indicated by an arrow mark C4) and extend along the longitudinal direction. One of the lock levers 573 is positioned in the opening 57271 which has a comparatively great dimension, and the opening 57271 is surrounded by an upright portion 57273 which extends uprightly from an upper face of the lock slider 572. Meanwhile, a support portion (not shown) of the base frame 51 which supports the lock lever 573 for pivotal motion is fitted in an opening 57272.

Further, an offset portion 57274 is formed in a region of the lever exposure portion 5727 which is sandwiched by the openings 57271 and 57272. The offset portion 57274 pivots the lock lever 573 to maintain the posture of the lock lever 573 so as not to project from the lock slider 572.

Further, a pressing portion 57275 is formed adjacent the opening 57271 on the lever exposure portion 5727. The pressing portion 57275 presses the lock lever 573 so as to cause the lock lever 573 to project from the lever exposure portion 5727.

Openings 57281 and 57282, an upright portion 57283, an offset portion 57284 and a pressing portion 57285 are formed on a lever exposure portion 5728 on the side in the direction of the arrow mark C3 similarly as with the lever exposure portion 5727. The elements 57281 to 57285 mentioned are similar in configuration and action to those of the components 57271 to 57275 of the lever exposure portion 5727 described hereinabove, and therefore, description of them is omitted herein to avoid redundancy.

(8-3) Configuration of the Lock Lever 573

Figure 43:
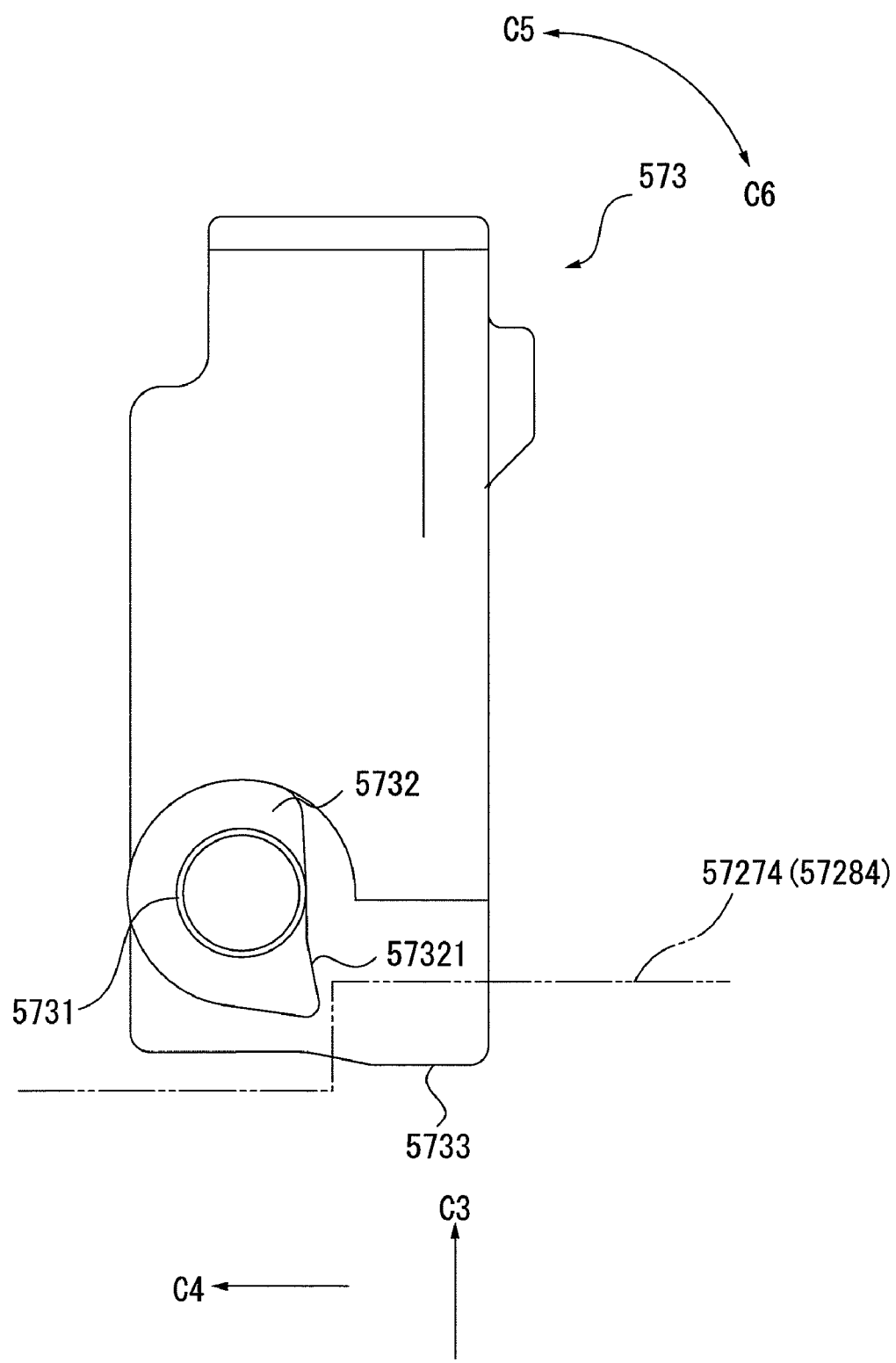
FIG. 43 is a view showing a lock lever in the disk apparatus.

FIG. 43 shows the lock lever 573 as viewed from the insertion direction of the disk D where the lock lever 573 is disposed on the base frame 51. It is to be noted that the directions of arrow marks C3 and C4 shown in FIG. 43 are same directions as the directions of the arrow marks C3 and C4 shown in FIGS. 41 and 42, respectively.

The lock levers 573 project, in response to sliding movement of the lock slider 572, from the lever exposure portions 5727 and 2728 (refer to FIGS. 41 and 42) of the lock slider 572 to prevent a disk D from being inserted through the opening 2A, and corresponds to the first lever in the present invention. The lock levers 573 are formed generally in a substantially parallelepiped shape as seen in FIG. 43.

A substantially cylindrical shaft portion 5731 is formed at a portion adjacent one of the opposite ends of each of the lock levers 573 in the longitudinal direction of the lock lever 573. The shaft portion 5731 is supported at a supporting portion (not shown) of the base frame 51 and projects to the front face side and the rear face side of the lock lever 573. The shaft portion 5731 supports the lock lever 573 on the base frame 51 for pivotal motion in the direction indicated by an arrow mark C5 and in the direction indicated by another arrow mark C6.

A posture maintaining section 5732 having a substantially circular shape centered at the shaft portion 5731 is formed on the front face side of each of the lock levers 573. The posture maintaining section 5732 has such a shape that it is cut away at a portion thereof on the right side in FIG. 43, that is, a lower portion thereof in a state wherein the longitudinal direction of the lock lever 573 coincides with the longitudinal direction of the lock slider 572 (state (non-locking state) wherein the lock lever 573 is not exposed from the lever exposure portion 5727 or 2728). When the lock slider 572 slidably moves in the direction indicated by the arrow mark C4 upon carrying-out of the disk D, the offset portions 57274 and 57284 contact with the cutaway portions 57321 to pivot the lock levers 573 in the direction indicated by an arrow mark C6. Thereupon, since the offset portions 57274 and 57284 stop at a position corresponding to the cutaway portions 57321, even where the disk apparatus 1 is inclined, pivotal motion of the lock lever 573 around the shaft portion 5731 is regulated.

A contacting portion 5733 is formed at an end portion of the lock lever 573 on the side on which the shaft portion 5731 and the posture maintaining section 5732 are formed. The contacting portion 5733 is pushed by the pressing portion 57275 or 57285 upon sliding movement of the lock slider 572 in the direction indicated by the arrow mark C3 to pivot the lock lever 573 in the direction indicated by the arrow mark C5 around the shaft portion 5731. Thereupon, the offset portion 57274 or 57284 is not positioned in the range of pivotal motion of the posture maintaining section 5732, and consequently, pivotal motion of the lock lever 573 is permitted.

(8-4) Operation of the Insertion Preventing Mechanism 57

Here, operation of the insertion preventing mechanism 57 is described.

When the slide cam 56L slidably moves in the direction indicated by the arrow mark A1, the swing arm 571 is pivoted in the direction indicated by the arrow mark C1 in FIG. 40 around the hole 5711. By the pivotal motion of the swing arm 571, the lock slider 572 slidably moves in the direction indicated by the arrow C3 shown in FIGS. 41 and 42. By the sliding movement of the lock slider 572, the pressing portions 57275 and 57285 push the contacting portion 5733 of the lock levers 573 to pivot the lock levers 573 in the direction indicated by the arrow mark C5 in FIG. 43 around the shaft portion 5731 to establish a locking state.

Consequently, the lock levers 573 project from the lock slider 572 until they are exposed upwardly from the carrying unit 6 through the openings 6346 and 6347 (refer to FIGS. 9 and 10) formed in the bracket 63 of the carrying unit 6. Therefore, the opening 2A is closed up to regulate insertion of the disk D through the opening 2A.

Further, when the slide cam 56L slidably moves in the direction indicated by the arrow mark A2, the swing arm 571 is pivoted in the direction indicated by the arrow mark C2 around the hole 5711 to slidably move the lock slider 572 in the direction indicated by the arrow mark C in FIGS. 41 and 42.

By the sliding movement of the lock slider 572, the offset portions 57274 and 57284 are contacted with the cutaway portion 57321 of the lock levers 573. Consequently, the lock levers 573 are pivoted in the direction indicated by the arrow mark C6 in FIG. 43 around the shaft portion 5731 to establish a non-locking state in which the lock levers 573 are accommodated in the openings 57271 and 57281 of the lock slider 572. As a result, the closing up of the opening 2A is canceled thereby to permit carrying out of the disk D to the outside of the opening 2A and insertion of the disk D through the opening 2A.

(9) Shutter Lever 58

(9-1) Configuration of the Shutter Lever 58

Figure 44:
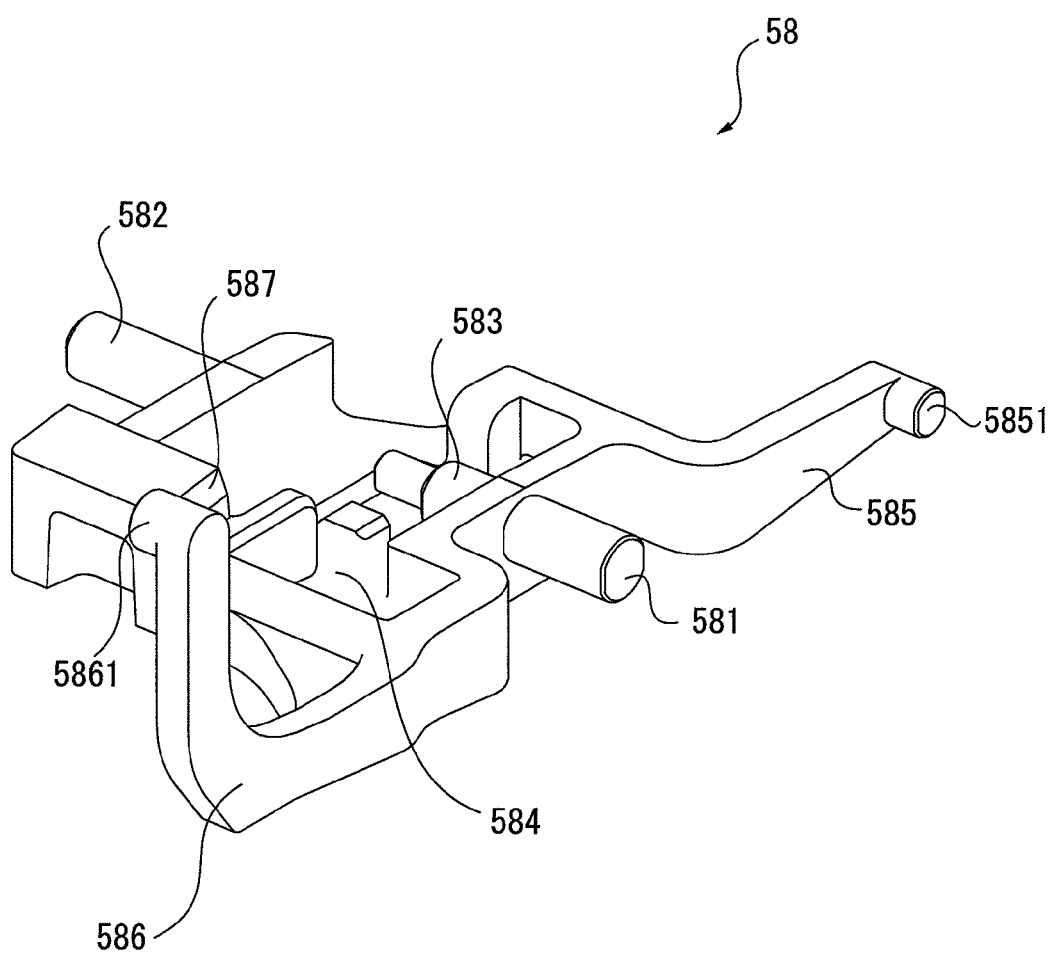
FIG. 44 is a perspective view showing a shutter lever in the disk apparatus.

FIG. 44 is a perspective view showing the shutter lever 58.

The shutter lever 58 corresponds to the second lever in the present invention and is a unitary molded part made of a synthetic resin material and operable to engage with the slide cam 56R to push up, upon carrying out of the disk D, the shutter 702 to open the opening 2A. The shutter lever 58 is disposed below the seventh gear 559 (adjacent the base frame 51) which configures the transmission mechanism 55 as seen in FIG. 6.

As shown in FIG. 44, the shutter lever 58 has a pair of shaft portions 581 and 582, an attachment portion 583, a locking portion 584, a pair of arm portions 585 and 586 and an inclination portion 587 formed thereon.

The shaft portions 581 and 582 are formed at a substantially central portion of the shutter lever 58 in such a manner as to project to the outside through the shutter lever 58. The shaft portions 581 and 582 are formed in a substantially cylindrical shape and supported for pivotal motion individually by support portions (not shown) formed on the base frame 51.

The attachment portion 583 is formed in a substantially cylindrical shape at a position between the shaft portions 581 and 582. A torsion spring (not shown in attached to the attachment portion 583. The torsion spring is anchored at one end thereof to the base frame 51 and at the other end thereof to the locking portion 584 formed in the proximity of the attachment portion 583. The torsion spring normally biases the shutter lever 58 in a direction along the base frame 51, that is, in a direction in which the shutter lever 58 does not contact with the shutter 702.

The arm portions 585 and 586 are provided at the opposite end portions of the shutter lever 58 across the shaft portion 581 and extend in a direction substantially perpendicular to the axial direction of the shaft portion 581.

A bent portion 5851 having a substantially L shape as viewed in plan is formed at an end of the arm portion 585. When the slide cam 56R slidably moves in a direction which it approaches the shutter lever 58 (direction indicated by the arrow mark A1 described hereinabove), the bent portion 5851 is contacted with the tapering portion 56R211 formed on the slide cam 56R to pivot the shutter lever 58 around the shaft portions 581 and 582.

The arm portion 586 extends from the shaft portion 581 in a direction away from the shaft portion 581 and is then bent substantially at the right angle toward upwardly so as to have a substantially L shape as viewed in side elevation. A pressing portion 5861 is formed at an end of the arm portion 586 such that it is bent substantially at the right angle at the end portion. The pressing portion 5861 pushes up the shutter 702 in response to pivotal motion of the shutter lever 58.

The inclination portion 587 is formed at a position displaced toward the arm portion 586 from the shaft portions 581 and 582 such that it is inclined with respect to the axial direction of the shaft portions 581 and 582. The projection 61R19 of the front arm 61R is contacted with the inclination portion 587.

(9-2) Operation of the Shutter Lever 58

Here, operation of the shutter lever 58 is described.

Figure 45:
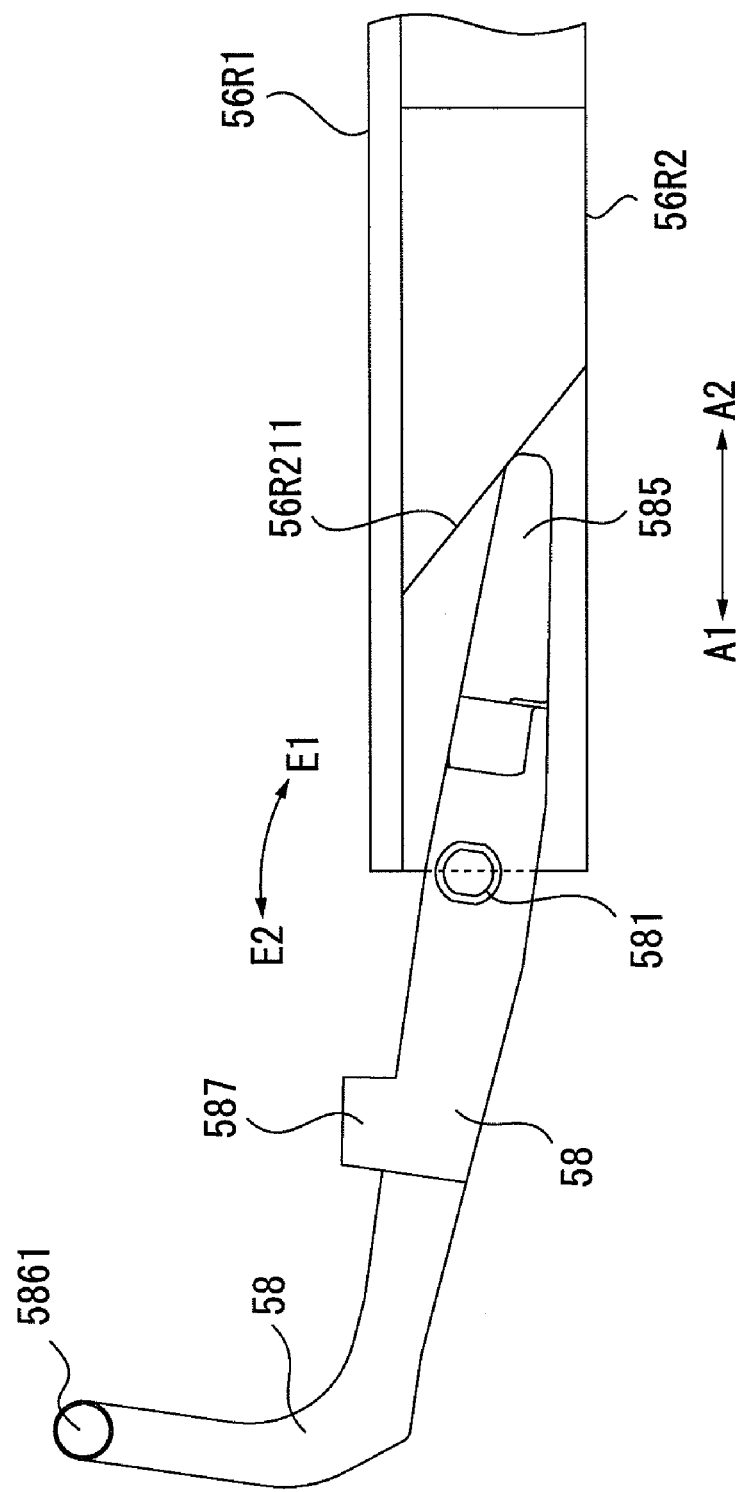
FIG. 45 is a view showing the shutter lever in the disk apparatus as viewed from a side.
Figure 46:
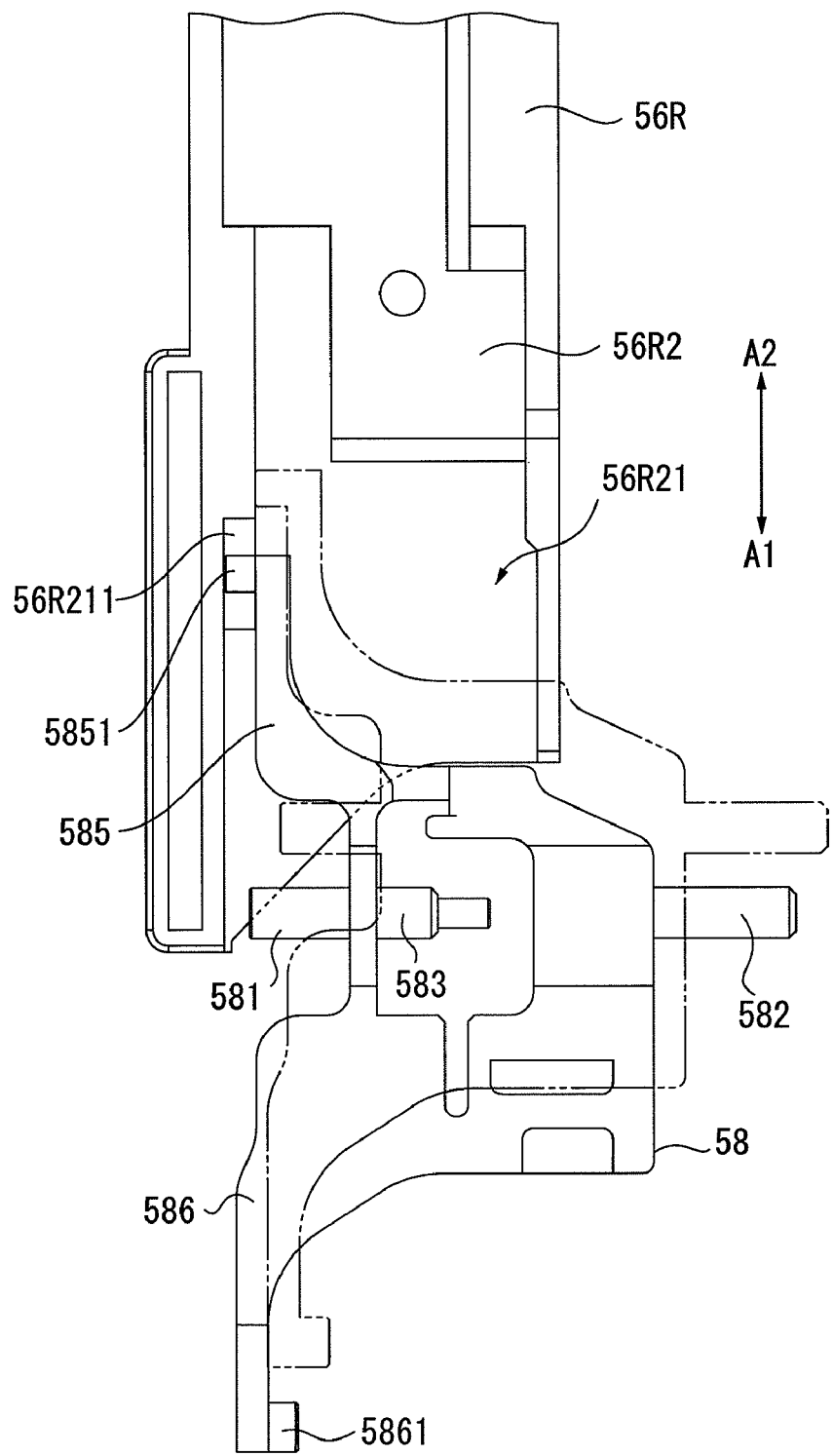
FIG. 46 is a view showing the shutter lever in the disk apparatus as viewed from below.

FIG. 45 shows the shutter lever 58 as viewed in side elevation. Meanwhile, FIG. 46 shows the shutter lever 58 as viewed from below. It is to be noted that the directions indicated by arrow marks A1 and A2 shown in FIGS. 45 and 46 are same directions as the directions of the arrow marks A1 and A2 described hereinabove, respectively.

When the slide cam 56R moves in the direction indicated by the arrow mark A1 upon carrying out of the disk D, the bent portion 5851 of the shutter lever 58 is contacted with the tapering portion 56R211 of the slide cam 56R as seen in FIGS. 45 and 46. The tapering portion 56R211 is formed such that the thicknesswise dimension thereof is smaller on the end side (side in the direction indicated by the arrow mark A1) of the slide cam 56R and increases toward the direction indicated by the arrow mark A2 as seen in FIG. 45. Therefore, when the slide cam 56R slidably moves further in the direction indicated by the arrow mark A1 in a state wherein the bent portion 5851 contacts with the tapering portion 56R211, then the shutter lever 58 is pivoted in the direction indicated by an arrow mark E1 in FIG. 45.

When the shutter lever 58 pivots, the pressing portion 5861 of the arm portion 586 projects from the opening 6335 formed in the bracket 63 of the carrying unit 6 described hereinabove and is contacted with the contacting portion 7024 of the shutter 702 provided above the bracket 63 to push up the shutter 702 thereby to open the opening 2A.

Thereafter, the projection 61R19 (refer to FIG. 10) of the front arm 61R is contacted with the inclination portion 587 to pivot the shutter lever 58 in the direction indicated by an arrow mark E2 in FIG. 45. Consequently, the bent portion 5851 is displaced from the tapering portion 56R211 as indicated by an alternate long and two short dashes line in FIG. 46.

By the pivotal motion of the shutter lever 58, the pressing portion 5861 which has pushed up the shutter 702 moves down and is positioned at a position lower than the bracket 63. At this time, the carrying of the disk D into the opening 2A has been completed. Consequently, if the disk D is taken out from the opening 2A, then the shutter 702 closes up the opening 2A under the biasing force of the torsion spring (not shown) attached to the shutter 702.

(10) Control Unit 3

The control unit 3 is configured as a circuit board for controlling the apparatus body 2 described above and corresponds to the control means in the present invention. The control unit 3 drives the motor 53 (refer to FIG. 6) based on on/off states of the light receiving element 541 (refer to FIG. 6), first switch 542, second switch 543 and third switch 544 of the control board 54 provided on the lower unit 5.

Figure 47:
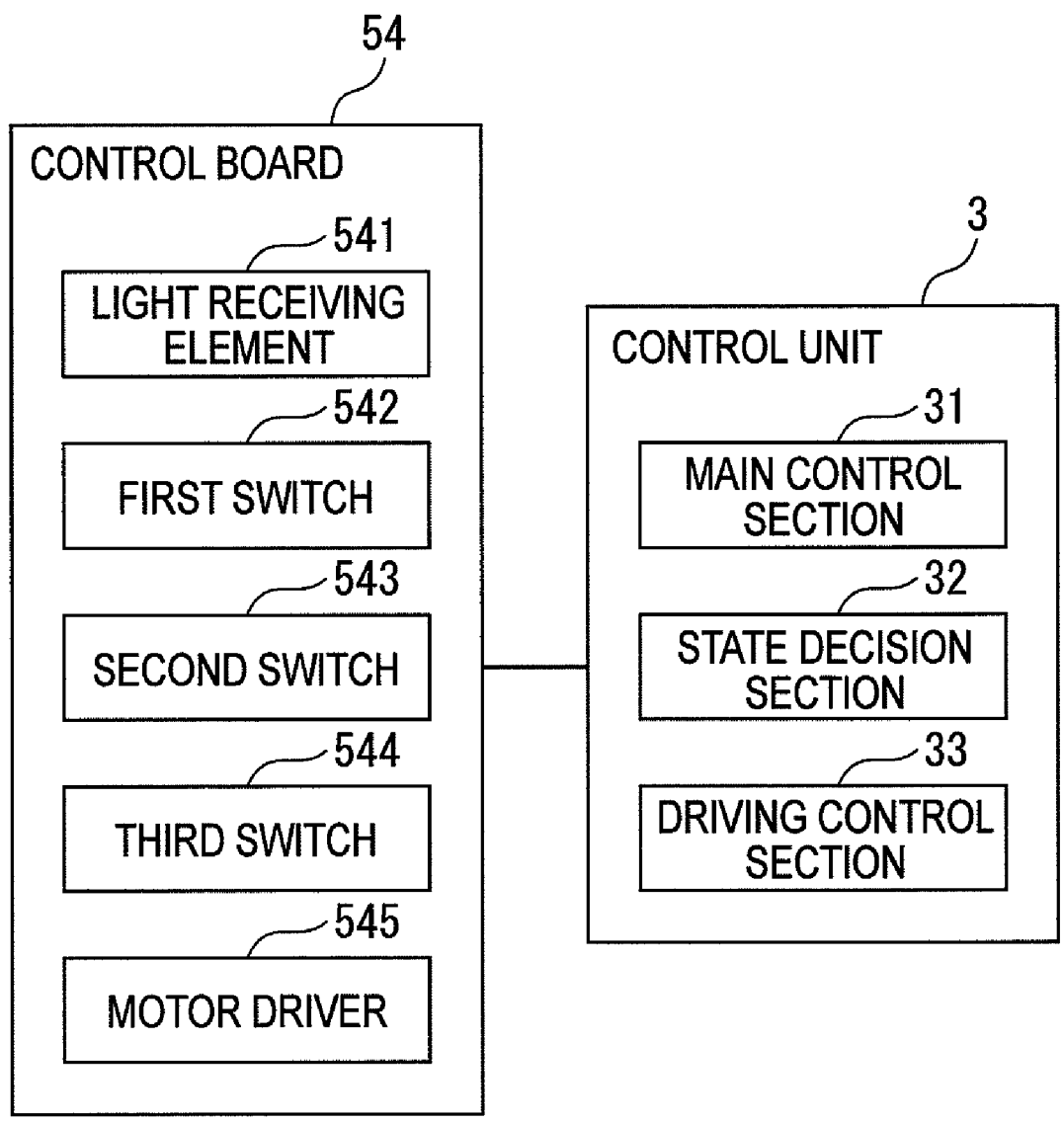
FIG. 47 is a block diagram showing a configuration of a control unit in the disk apparatus.

FIG. 47 shows a functional configuration of the control unit 3.

Referring to FIG. 47, the control unit 3 includes a main controller 31, a state decision section 32 and a driving control section 33.

The main controller 31 performs control of the entire apparatus body 2 including driving control of the optical unit 4. For example, the main controller 31 controls not only driving of the motors 41 and 43 and the pickup 42 but also outputting of information read from the disk D by the pickup 42 and so forth. Further, the main controller 31 performs also communication control of an apparatus connected to the apparatus body 2 and so forth.

The state decision section 32 acquires a control signal inputted from the control board 54, that is, an on/off signal which indicates an on/off state of each of the light receiving element 541, first switch 542, second switch 543 and third switch 544 and decides a carrying state of the disk D based on the on/off signals.

The driving control section 33 outputs a driving signal for the motor 53 to the motor driver 545 of the control board 54 based on a result of the decision of the carrying state of the disk D by the state decision section 32.

It is to be noted that a carrying-in process SA and a carrying-out process SB to be executed by the state decision section 32 and the driving control section 33 are hereinafter described in detail.

(11) Carrying of the Disk D

Operation of the apparatus body 2 upon carrying of the disk D into the apparatus body 2 is described below.

(11-1) Carrying of the First Disk D1

Figure 60:
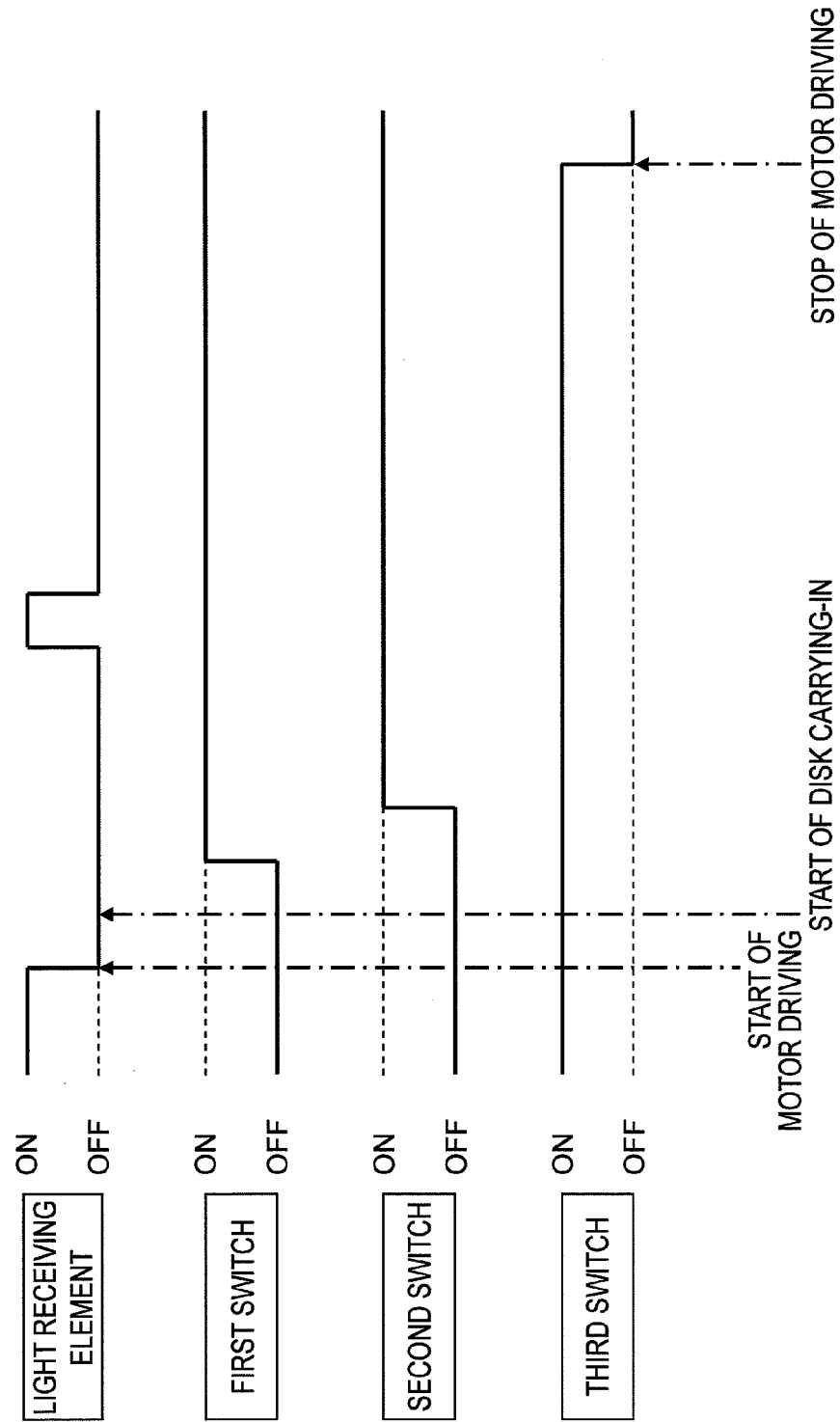
FIG. 60 is a time chart illustrating on/off states of a light reception section and first, second and third switches upon carrying-in of the first disk into the disk apparatus.
Figure 61:
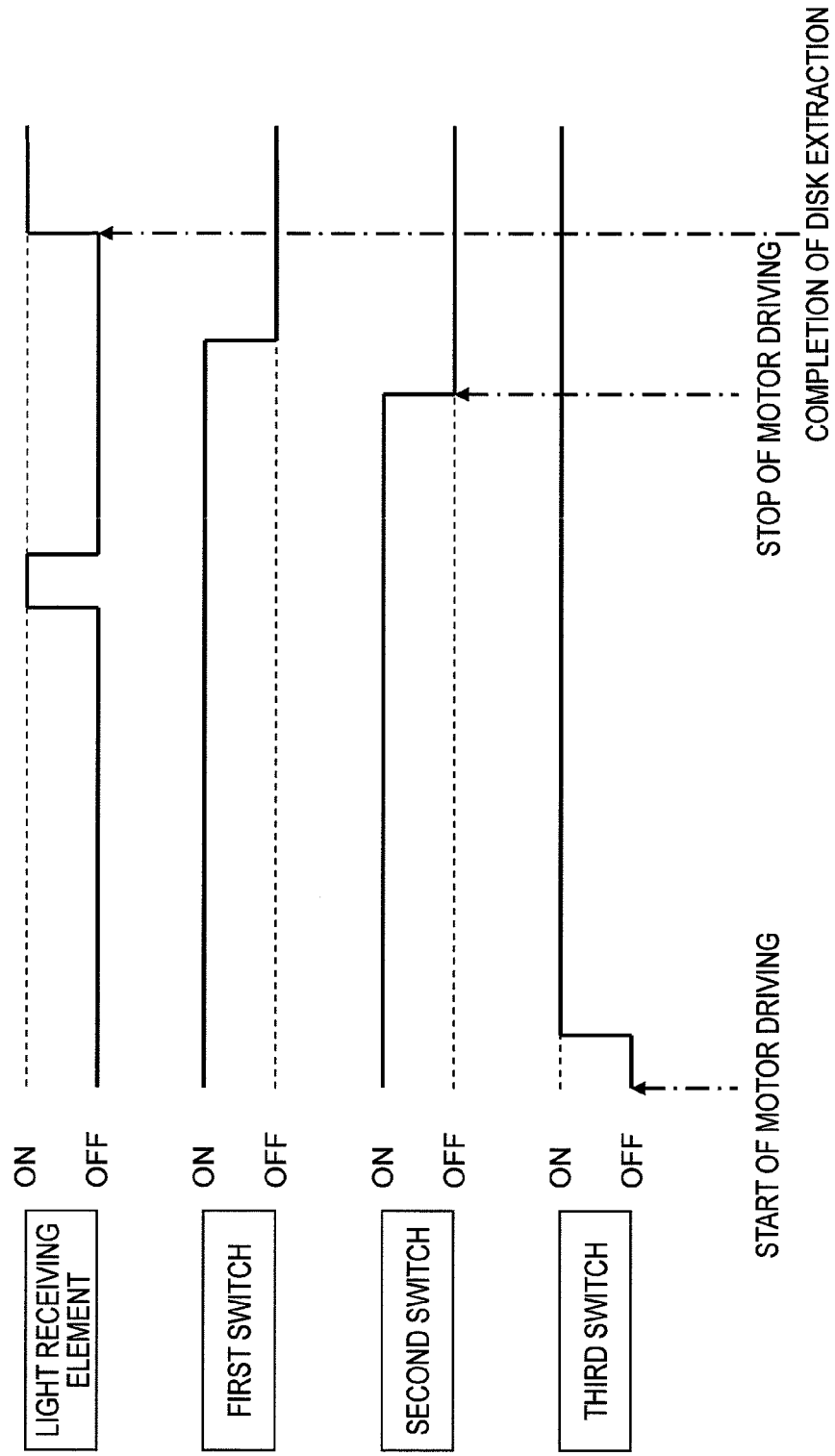
FIG. 61 is a time chart illustrating on/off states of the light reception section and first, second and third switches upon carrying-out of the first disk in the disk apparatus.

FIGS. 48 to 59 illustrate a carrying process of the first disk D1 into the apparatus body 2. FIGS. 60 and 61 illustrate on/off states of the light receiving element 541 and the switches 542 to 544 upon carrying in and carrying out of the first disk D1. It is to be noted that, in FIGS. 48 to 59, the apparatus body 2 is shown with the top frame 701 removed therefrom, and, in FIGS. 48 to 54, 56 and 58, the members 704 to 707 attached to the top frame 701 are indicated by alternate long and two short dashes lines. Further, in FIGS. 55, 57 and 59, the apparatus body 2 is shown with the carrying unit 6 omitted from that shown in FIGS. 54, 56 and 58. Further, in FIGS. 48 to 59, only the turntable 411 in the optical unit 4 is shown while the configuration of the other part is not shown.

The first disk D1 inserted into the apparatus body 2 through the opening 2A is accommodated into the apparatus body 2 through the processes illustrated in FIGS. 48 to 59.

Figure 48:
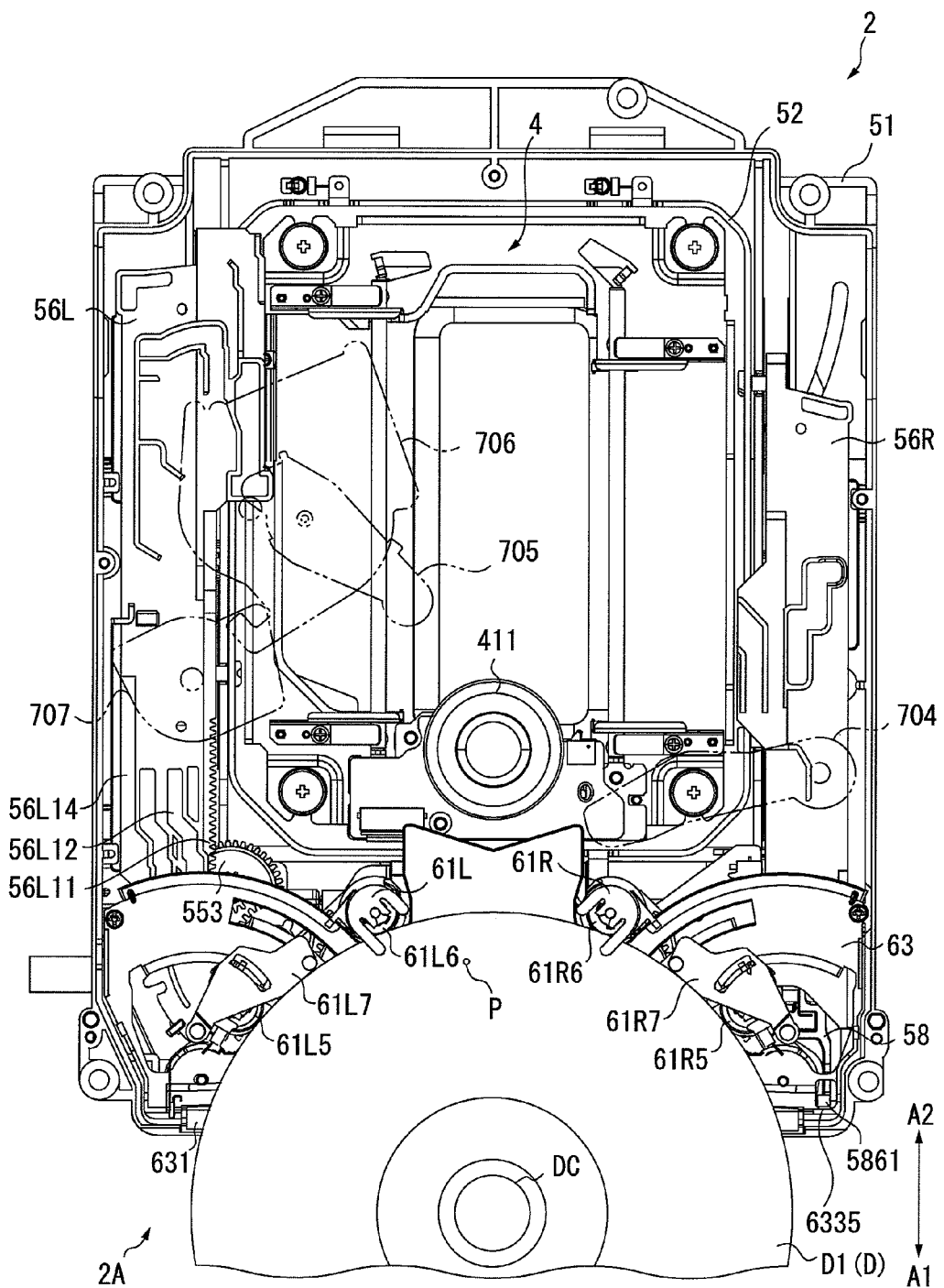
FIGS. 48 to 59 are views illustrating a carrying process of a first disk in the disk apparatus.
Figure 49:
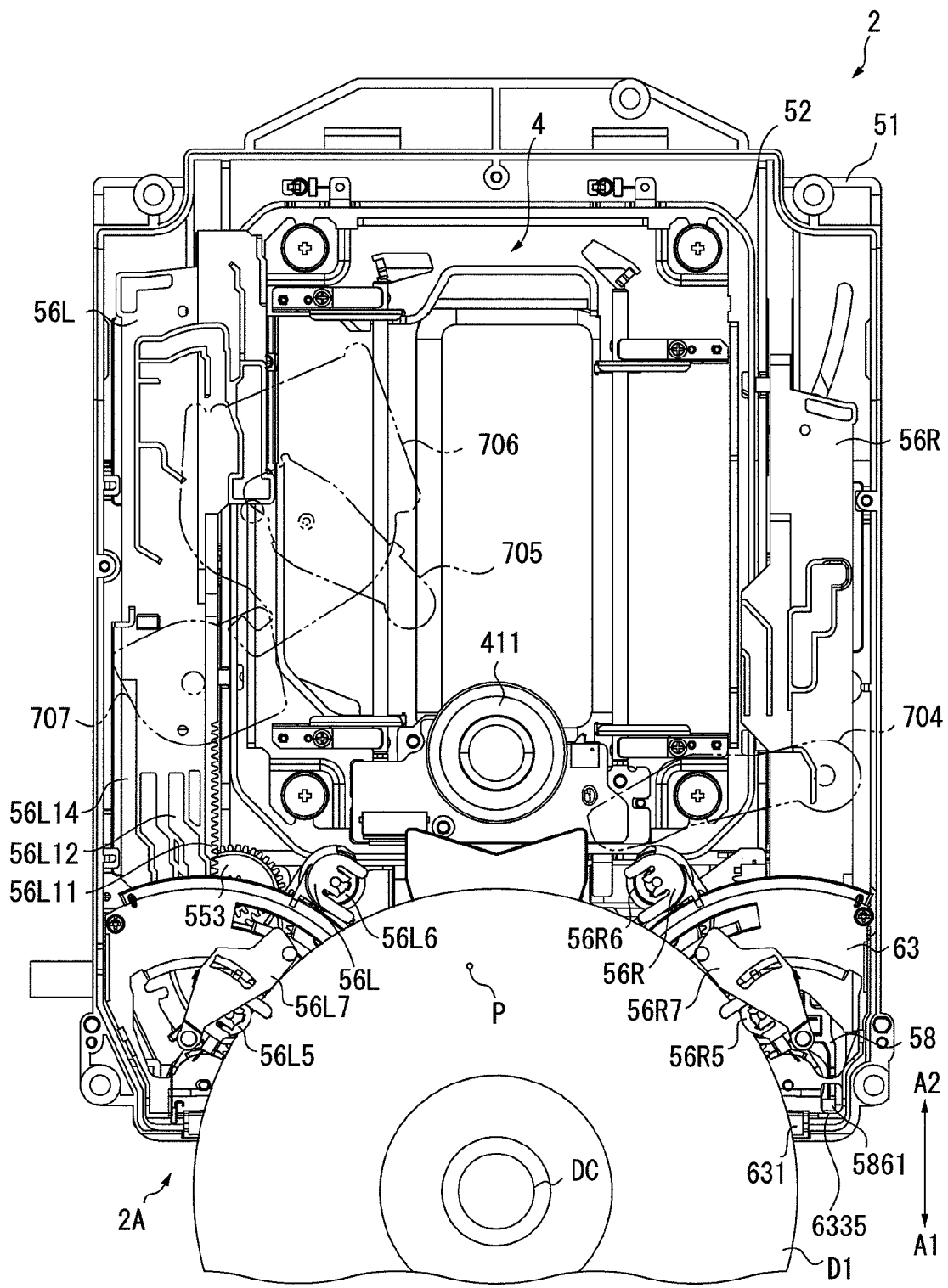

In particular, as shown in FIG. 48, if the first disk D1 is inserted through the opening 2A while pushing up the shutter 702 (refer to FIGS. 16 and 17), then light (for the irradiation point P of this light, refer to FIGS. 48 to 54, 56 and 58) from the light emitting element of the photo-sensor 703 is intercepted by the first disk D1. Consequently, the light receiving element 541 of the control board 54 may not receive the light and changes the state thereof into an off state as seen in FIG. 60. Consequently, the state decision section 32 of the control unit 3 detects insertion of the first disk D1 and the driving control section 33 drives the motor 53. The driving force of the motor 53 is transmitted to the carrying unit 6 through the transmission mechanism 55 to drive the carrying unit 6. It is to be noted that, in this state, the first and second switches 542 and 543 provided on the control board 54 (refer to FIG. 6) are in an off state while the third switch 544 is in an on state as seen in FIG. 60.

If the first disk D1 is inserted further deeply, then an end edge of the first disk D1 is gripped by the first rollers 61L5 and 61R5 of the front arms 61L and 61R. Here, since the first roller 61L5 is rotated in the counterclockwise direction while the first roller 61R5 is rotated in the clockwise direction in FIG. 48, the first disk D1 moves in the direction indicated by an arrow mark A2 and the front arms 61L and 61R are pivoted in synchronism with each other in the direction in which they move away from each other by the link arms 62L and 62R so as to open in a sectoral form. In this instance, since the pressing portion 61R18 formed on the front arm 61R contacts with and presses the first switch 542, the first switch 542 is changed over to an on state as seen in FIG. 60.

Figure 50:
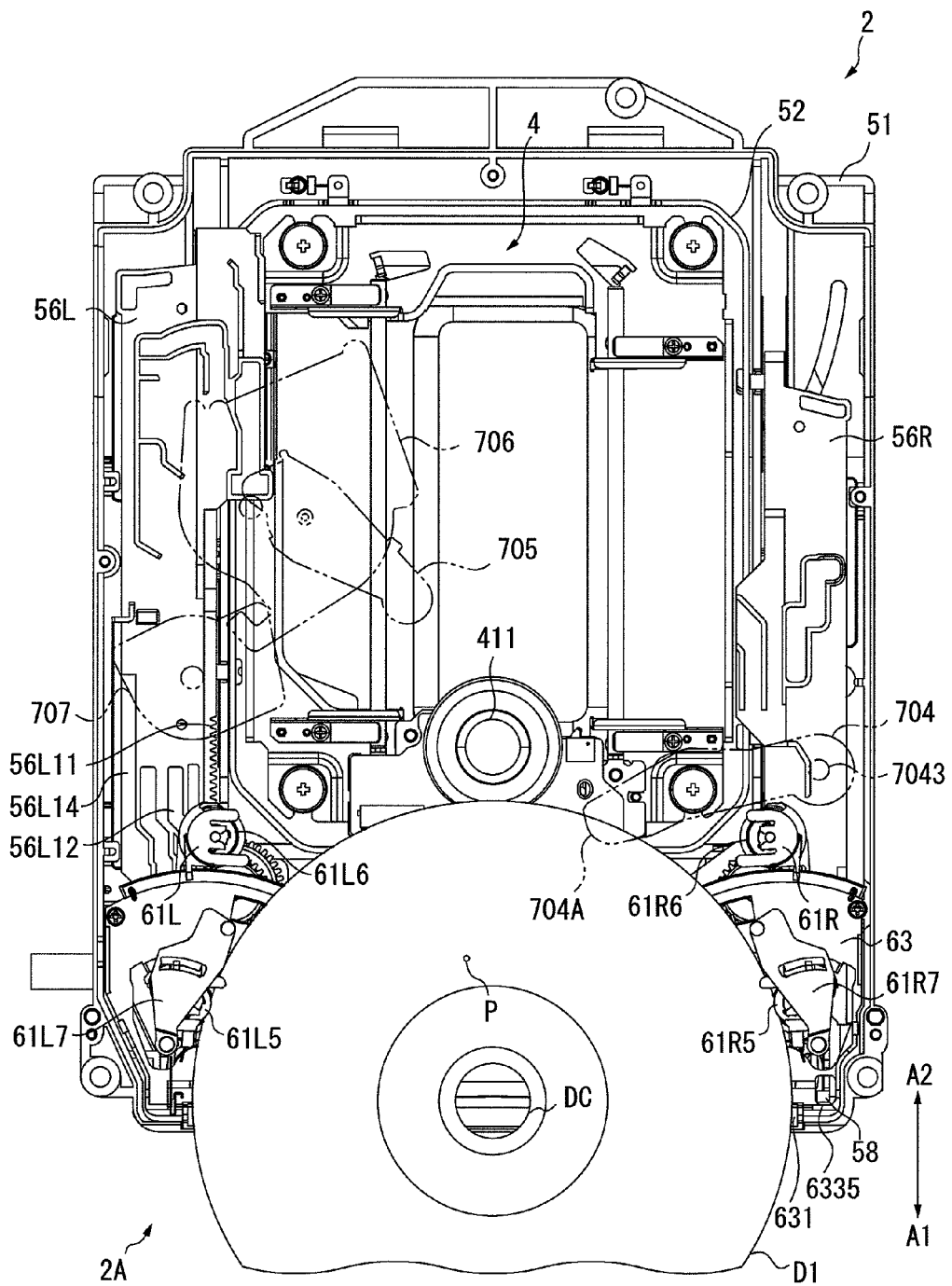

If the first rollers 61L5 and 61R5 continue to rotate to further carry the first disk D1 in the direction indicated by the arrow mark A2, then the end edge of the first disk D1 contacts with the contacting portion 704A of the support arm 704 which forms the upper unit 7 as shown in FIG. 50. Then, the support arm 704 pivots in response to the carrying in of the first disk D1 in the direction indicated by the arrow mark A2. In this state, the pressing portion 61R18 of the front arm 61R presses the second switch 543, and the second switch 543 is in an on state as seen in FIG. 60.

Figure 51:
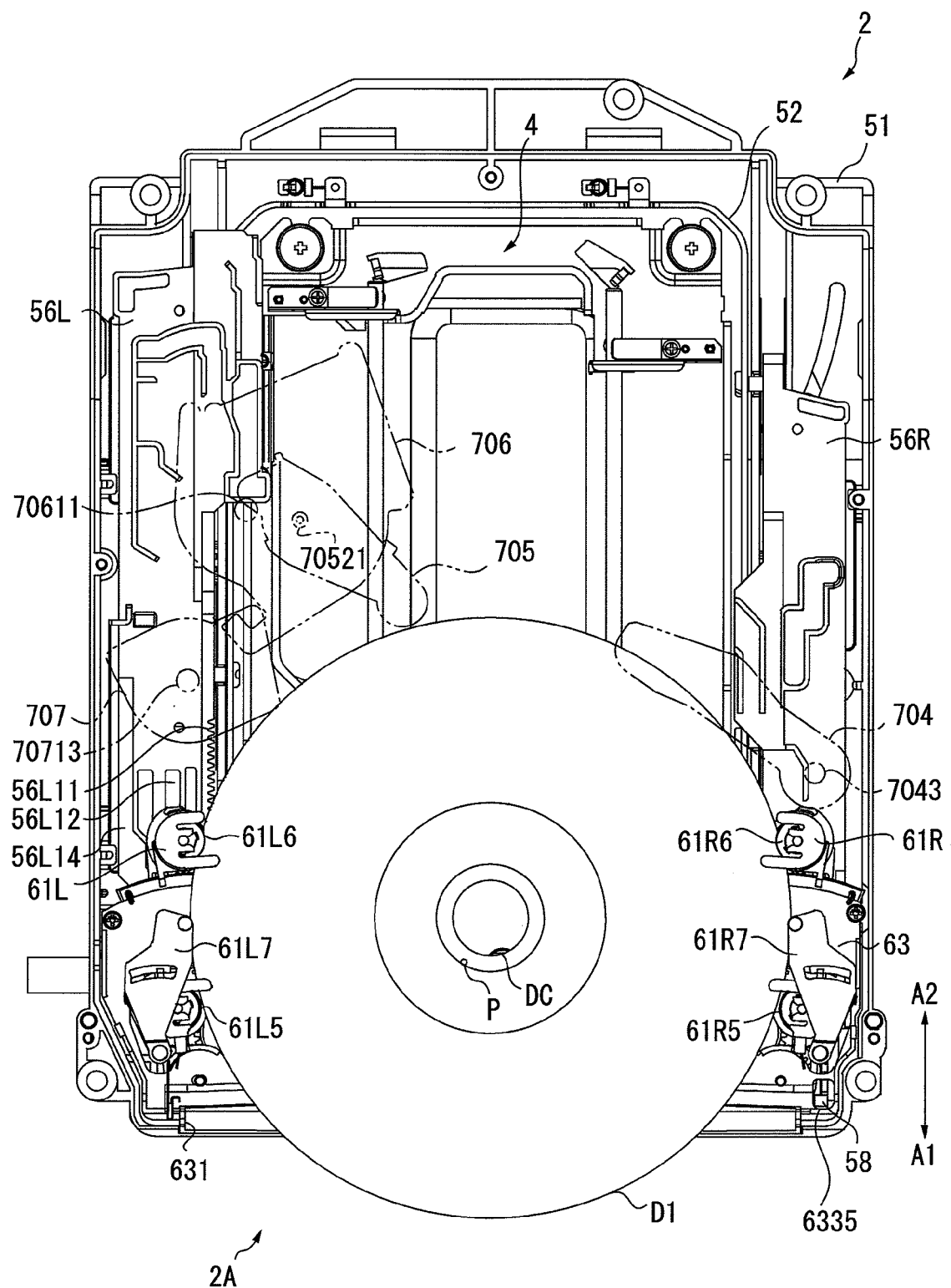

If the first disk D1 is carried in the direction indicated by the arrow mark A2 until the center of the first disk D1 passes a straight line interconnecting the first rollers 61L5 and 61R5, then the second rollers 61L6 and 61R6 grip left and right end edges of the first disk D1 as seen in FIG. 51. At this time, the engagement between the first rollers 61L5 and 61R5 and the first disk D1 is cancelled, and the second rollers 61L6 and 61R6 grip and carry in the first disk D1.

Figure 52:
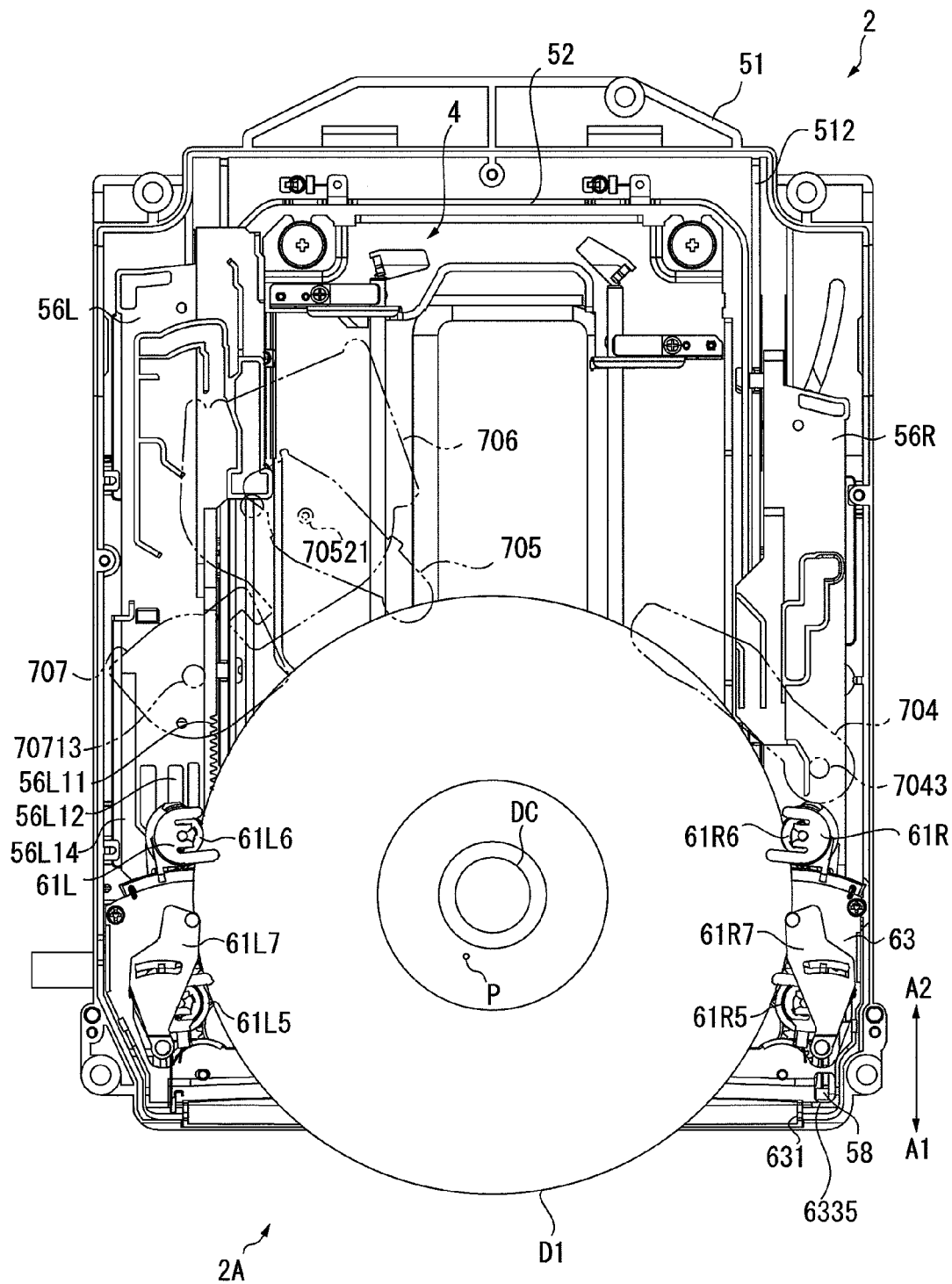

If the first disk D1 is carried further in the direction indicated by the arrow mark A2 by the second rollers 61L6 and 61R6, then the end edge of the first disk D1 contacts with the cylindrical portion 7074 (refer to FIGS. 25 and 26) of the guide lock 707 as seen in FIG. 52. Then, the guide lock 707 pivots in the counterclockwise direction in FIG. 52 in response to the carrying in of the first disk D1 in the direction indicated by the arrow mark A2. By the pivotal motion of the guide lock 707, the engagement between the guide lock 707 and the guide arm 706 is cancelled to permit pivotal motion of the guide arm 706.

Figure 53:
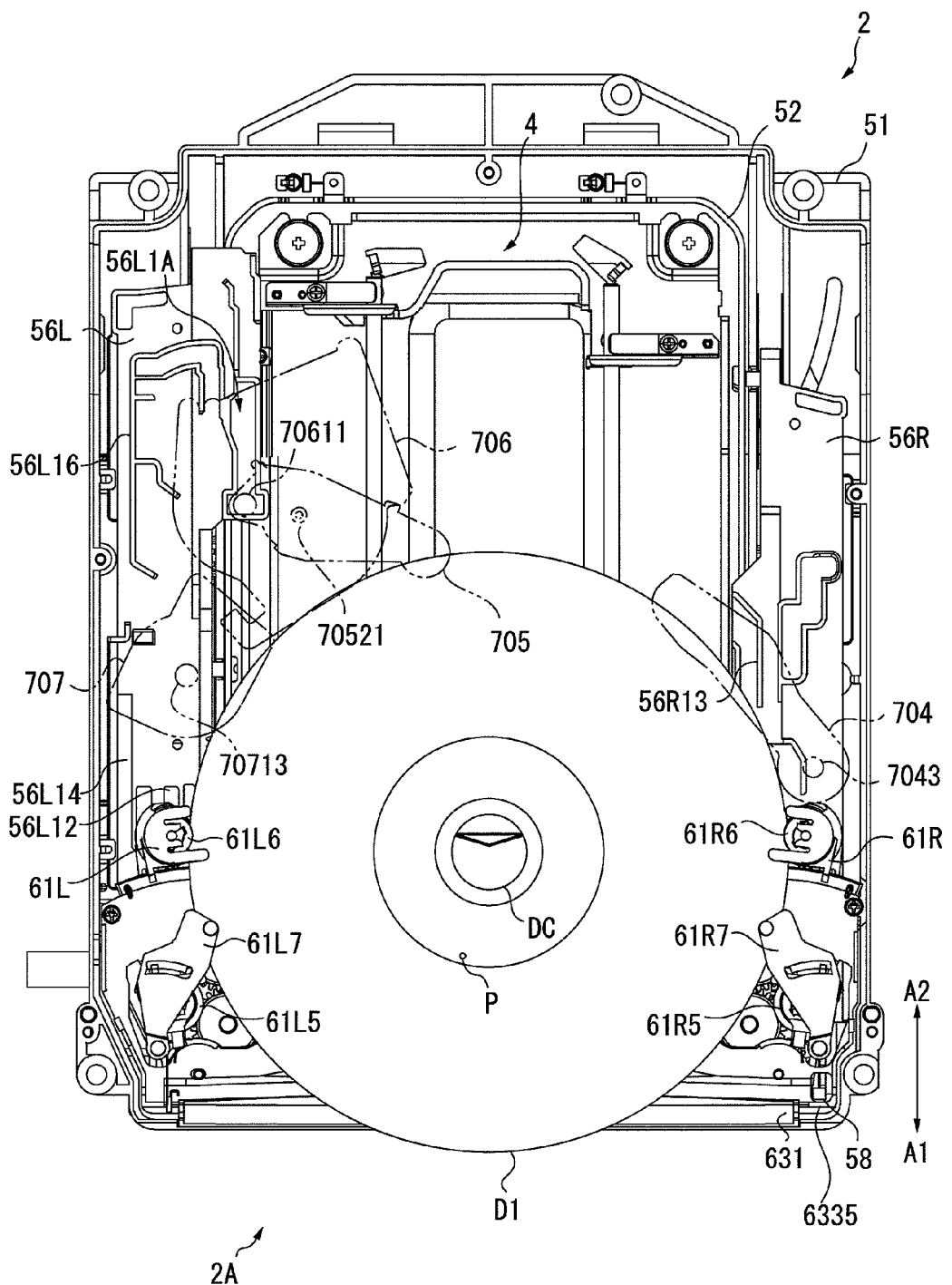
Figure 54:
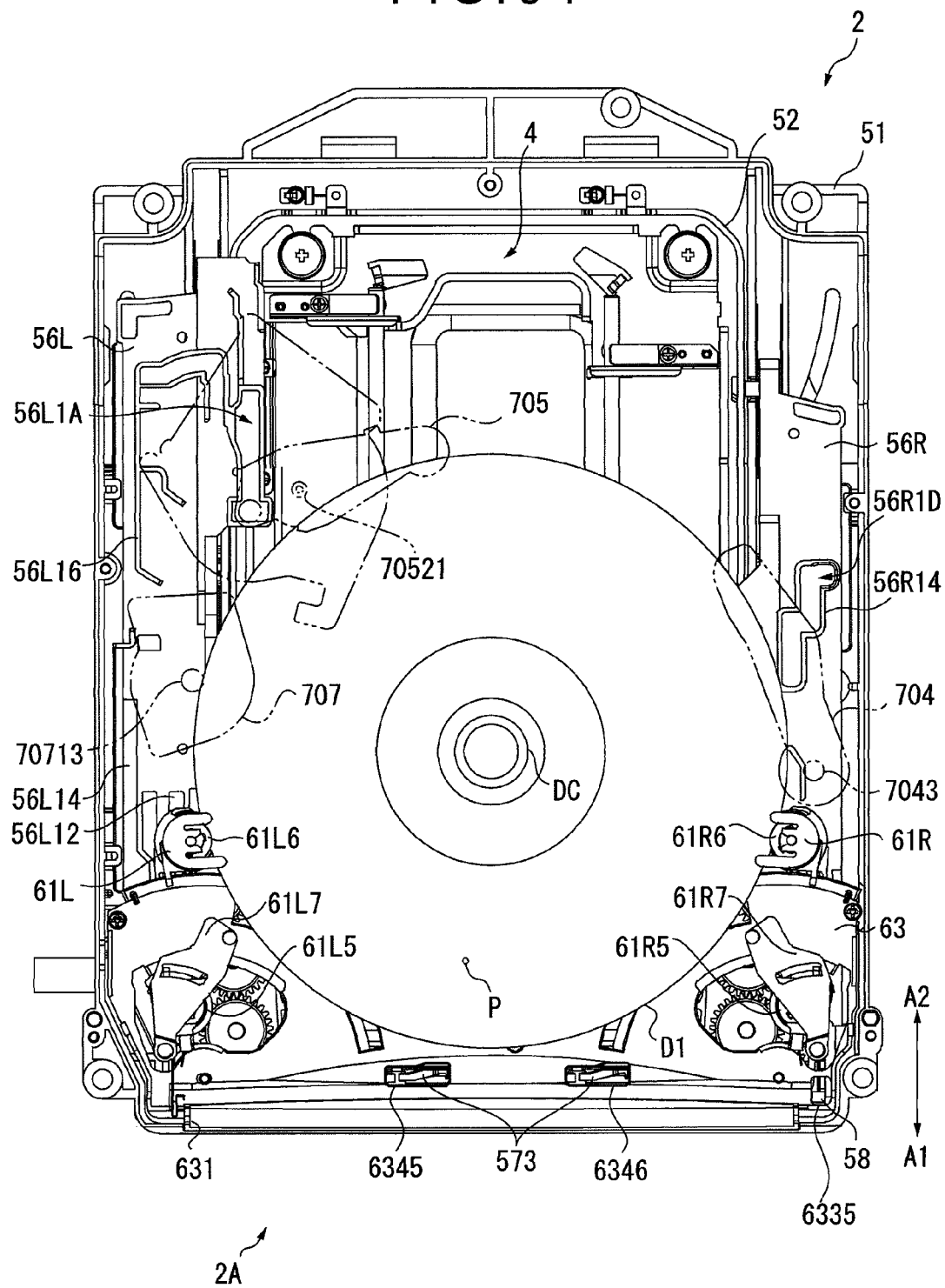

If the first disk D1 is carried further in the direction indicated by the arrow mark A2 after the guide lock 707 is pivoted, then the end edge of the first disk D1 contacts with the top member 7058 (refer to FIG. 21) of the detection arm 705 to pivot the detection arm 705 in the counterclockwise direction in FIG. 53 so that the regulation portion 70531 (refer to FIG. 22) contacts with the side face portion 70622 of the guide arm 706 as seen in FIG. 53. By the pivotal motion of the detection arm 705, the cylindrical portion 70561 (refer to FIGS. 21 and 22) of the detection arm 705 causes the slide cam 56L to perform sliding movement in the direction indicated by an arrow mark A1 as seen in FIG. 54.

Figure 55:
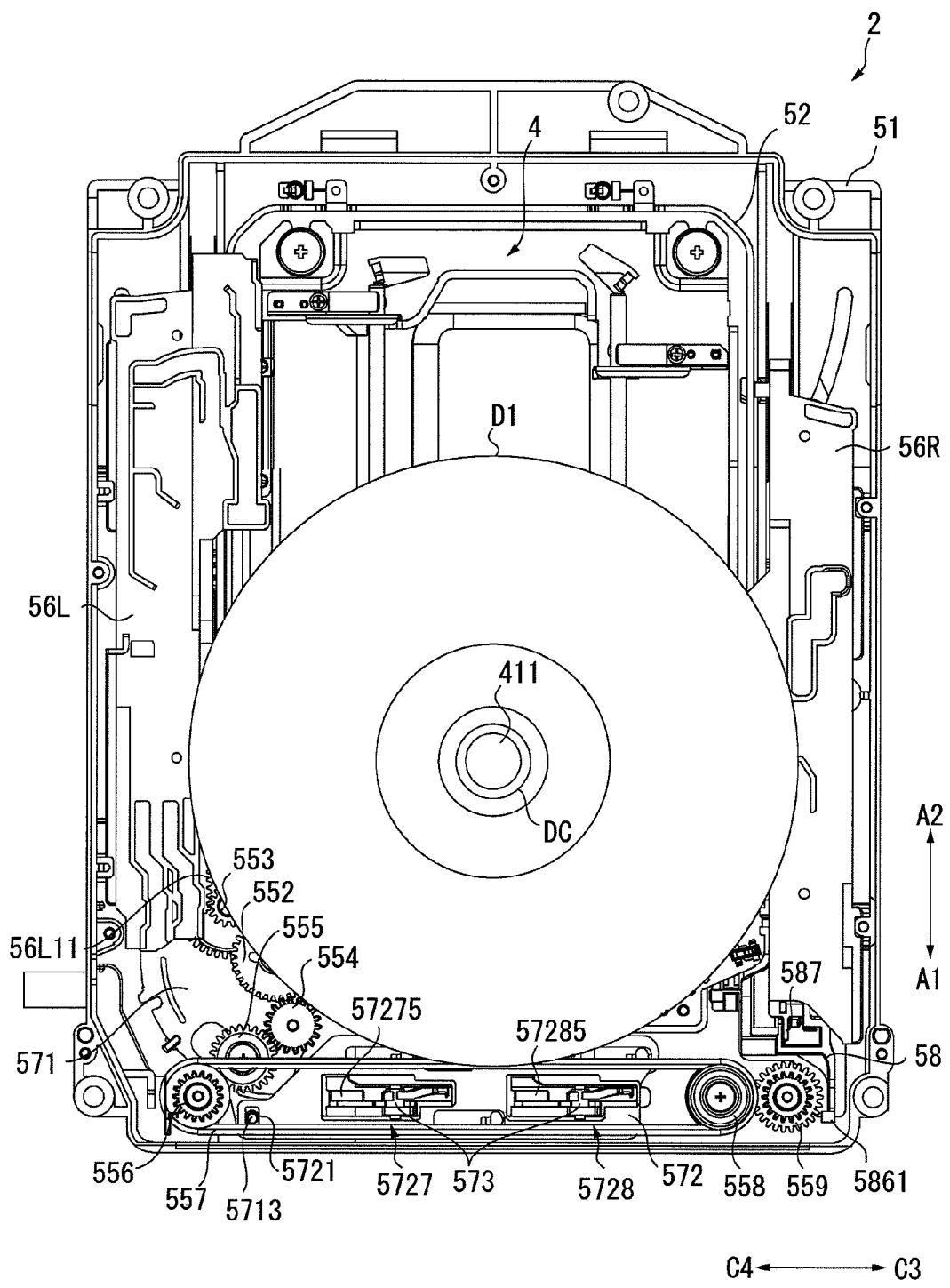

By the movement of the slide cam 56L, the rack portion 56L11 (refer to FIGS. 29 and 30) of the slide cam 56L and the second gear 553 are engaged with each other as shown in FIG. 55, and the slide cam 56L further slidably moves in the direction indicated by the arrow mark A1. Further, the link arm 561 (refer to FIG. 7) pivots in response to the sliding movement of the slide cam 56L and the slide cam 56R slidably moves in the arrow mark A2 direction as seen in FIG. 56.

Figure 57:
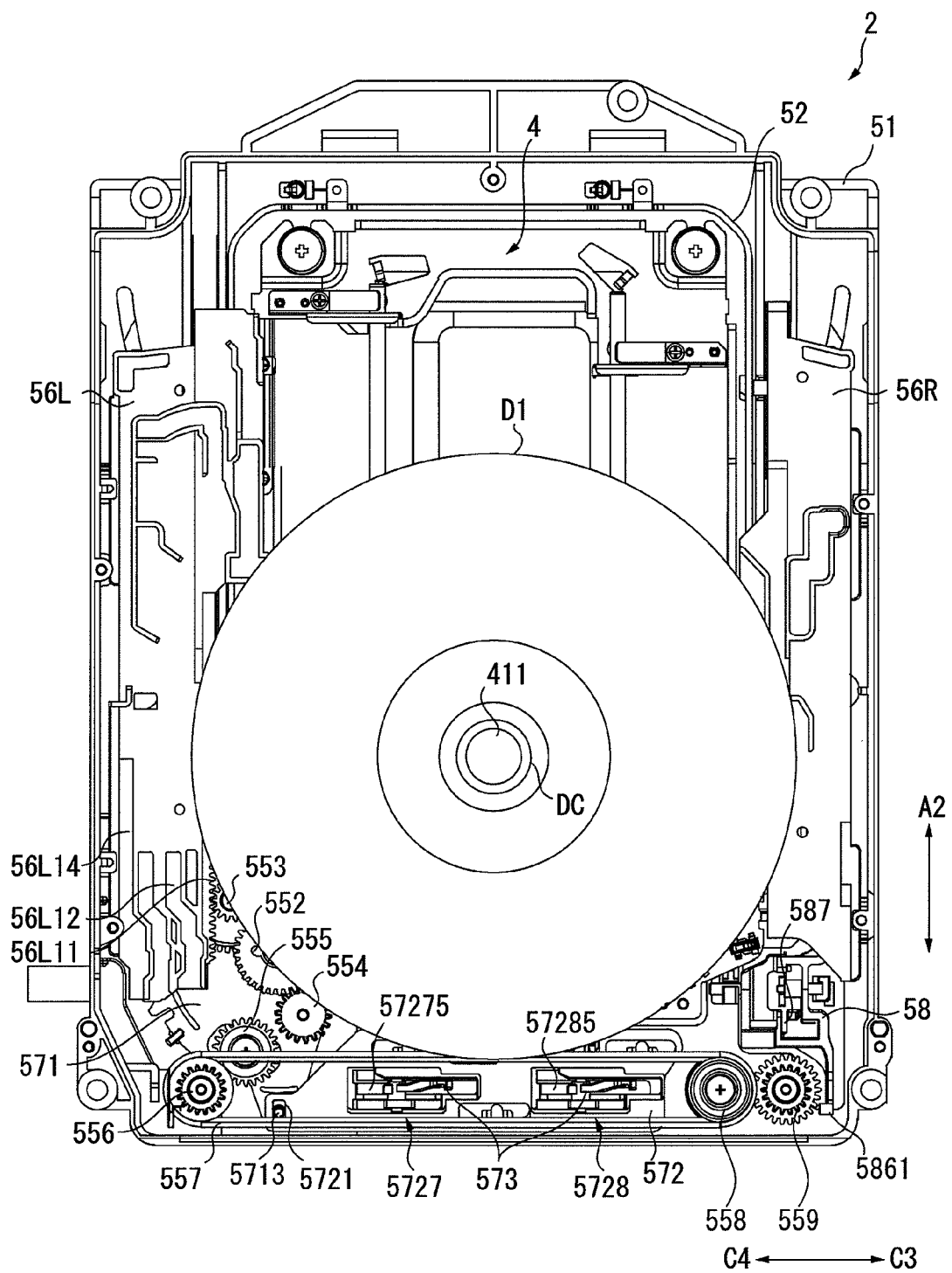

In this instance, the projection 61L182 (refer to FIG. 10) of the front arm 61L is engaged with the groove 56L12 of the slide cam 56L and the projection 61L181 is engaged with the groove 56L14 as seen in FIG. 57.

Figure 56:
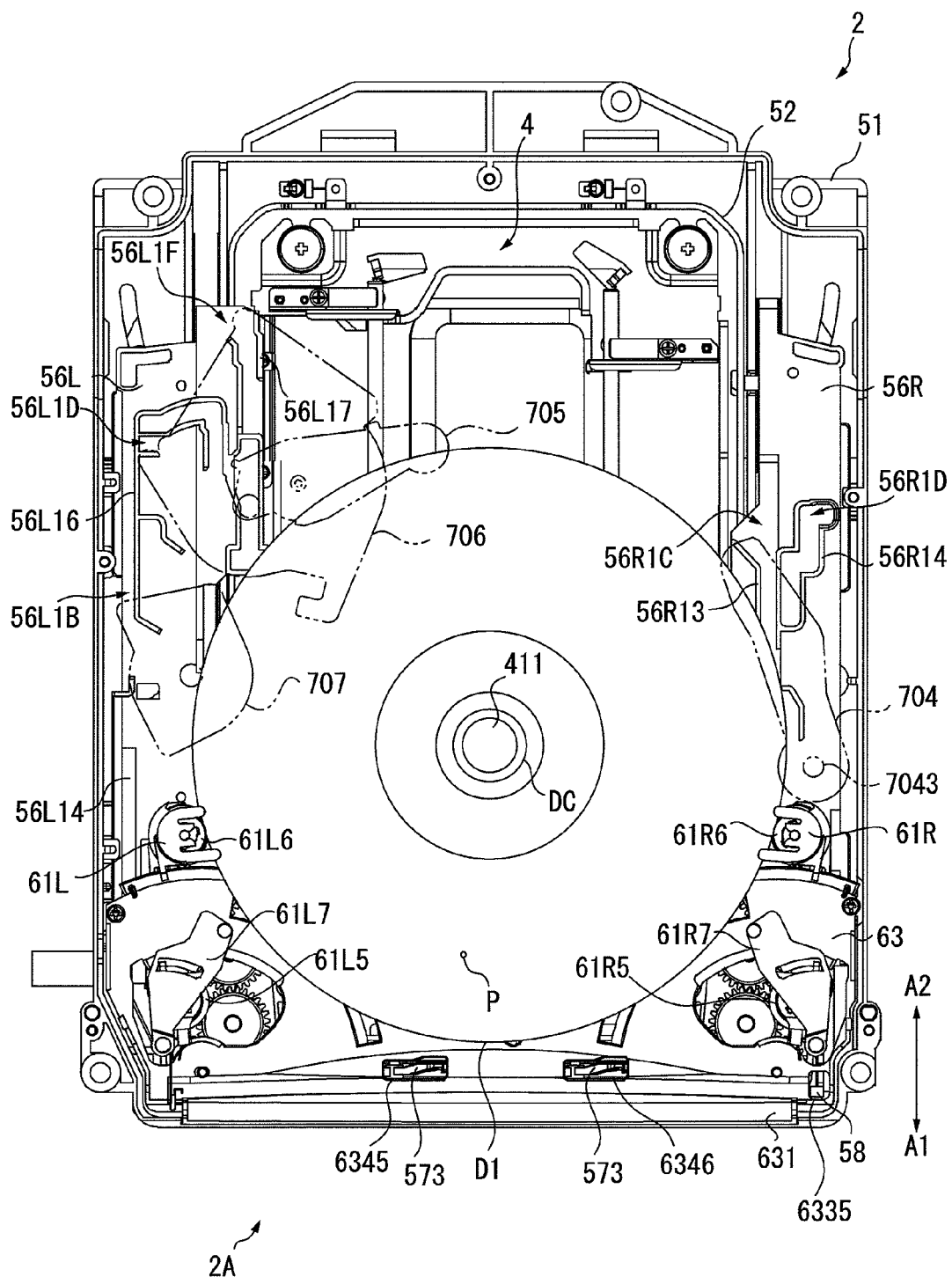

Further, the cylindrical portions 70625 and 70626 (refer to FIG. 24) of the guide arm 706 advance into the grooves 56L1D and 56L1F (refer to FIG. 30) of the slide cam 56L, respectively, and the cylindrical portion 7073 (refer to FIGS. 25 and 26) of the guide lock 707 advances into the groove 56L1B as shown in FIG. 56.

Further, in this state, the swing arm 571 which composes the insertion prevention mechanism 57 pivots in the counterclockwise direction (direction indicated by the arrow mark C1 described above) in FIG. 57 so that the lock slider 572 is slidably moved in the direction indicated by the arrow mark C3 and the third gear 554 is spaced away from the fourth gear 555. Therefore, transmission of the driving force of the motor 53 to the front arms 61L and 61R is stopped. In this state, the hole DC of the first disk D1 is already at the position which coincides with that of the turntable 411 as viewed in plan as seen in FIGS. 56 and 57. Therefore, the first disk D1 need not be carried any more.

In addition, while detailed illustration is omitted in FIGS. 56 and 57, the chuck arm 708 (refer to FIG. 17) pivots in response to the sliding movement of the slide cam 56R to pivot the chuck arm 709.

If the slide cams 56L and 56R move from the state illustrated in FIGS. 56 and 57, then the projections 61L182 and 61L181 of the front arm 61L engaged with the grooves 56L12 and 56L14 of the slide cam 56L move to the outside of the first disk D1 along the grooves 56L12 and 56L14 and the front arms 61L and 61R are stopped in a state wherein the second rollers 61L6 and 61R6 and the end edge of the first disk D1 are spaced from each other.

Further, by the sliding movement of the slide cam 56R in the direction indicated by the arrow mark A2, the cylindrical portion 704B of the support arm 704 is fitted into the groove 56R1C of the slide cam 56R. Consequently, the support arm 704 is stopped at a position spaced from the end edge of the first disk D1.

Further, by the sliding movement of the slide cam 56R, the chuck arms 708 and 709 are pivoted to fully separate the contacting portions 7083 and 7092 of the chuck arms 708 and 709 from the chuck pulley 710.

In addition, by the sliding movement of the slide cam 56L in the direction indicated by the arrow mark A1, the cylindrical portion 70625 of the guide arm 706 and the cylindrical portion 7073 of the guide lock 707 are fitted into the grooves 56L1D and 56L1B of the slide cam 56L, respectively. Consequently, the guide arm 706 and the guide lock 707 are stopped at a position spaced from the end edge of the first disk D1.

Here, by the sliding movement of the slide cams 56L and 56R in the directions indicated by the arrow marks A1 and A2, respectively, the holder 52 is moved upwardly until the turntable 411 of the optical unit 4 is fitted into the hole DC of the first disk D1 and the chuck pulley 710 and the turntable 411 perform chucking of the first disk D1. Then, upon completion of the chucking of the first disk D1, a contacting state between the pressing portion 56R33 of the slide cam 56R and the third switch 544 is cancelled, and consequently, the third switch 544 is changed over to an off state as seen in FIG. 60.

Figure 58:
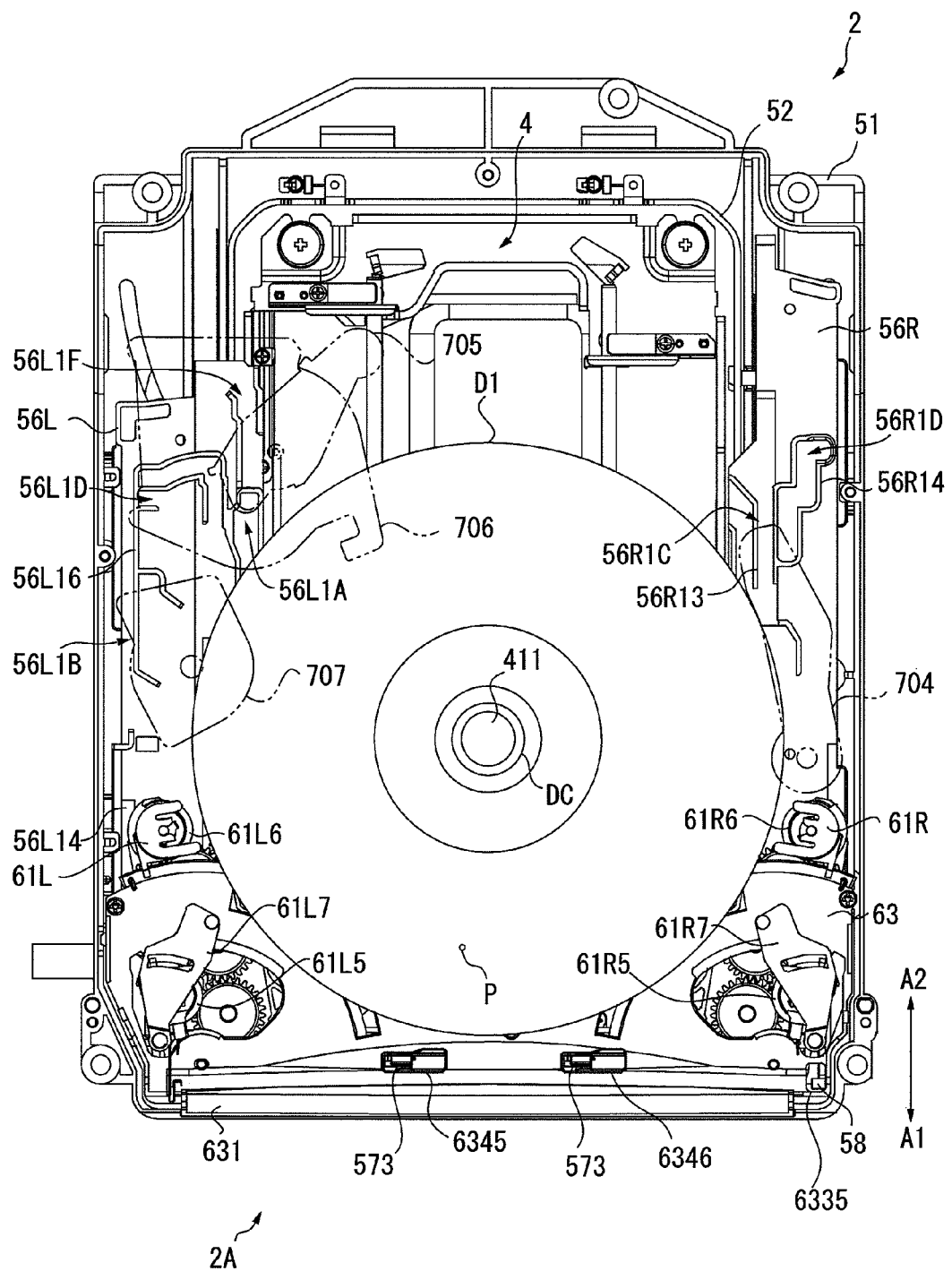
Figure 59:
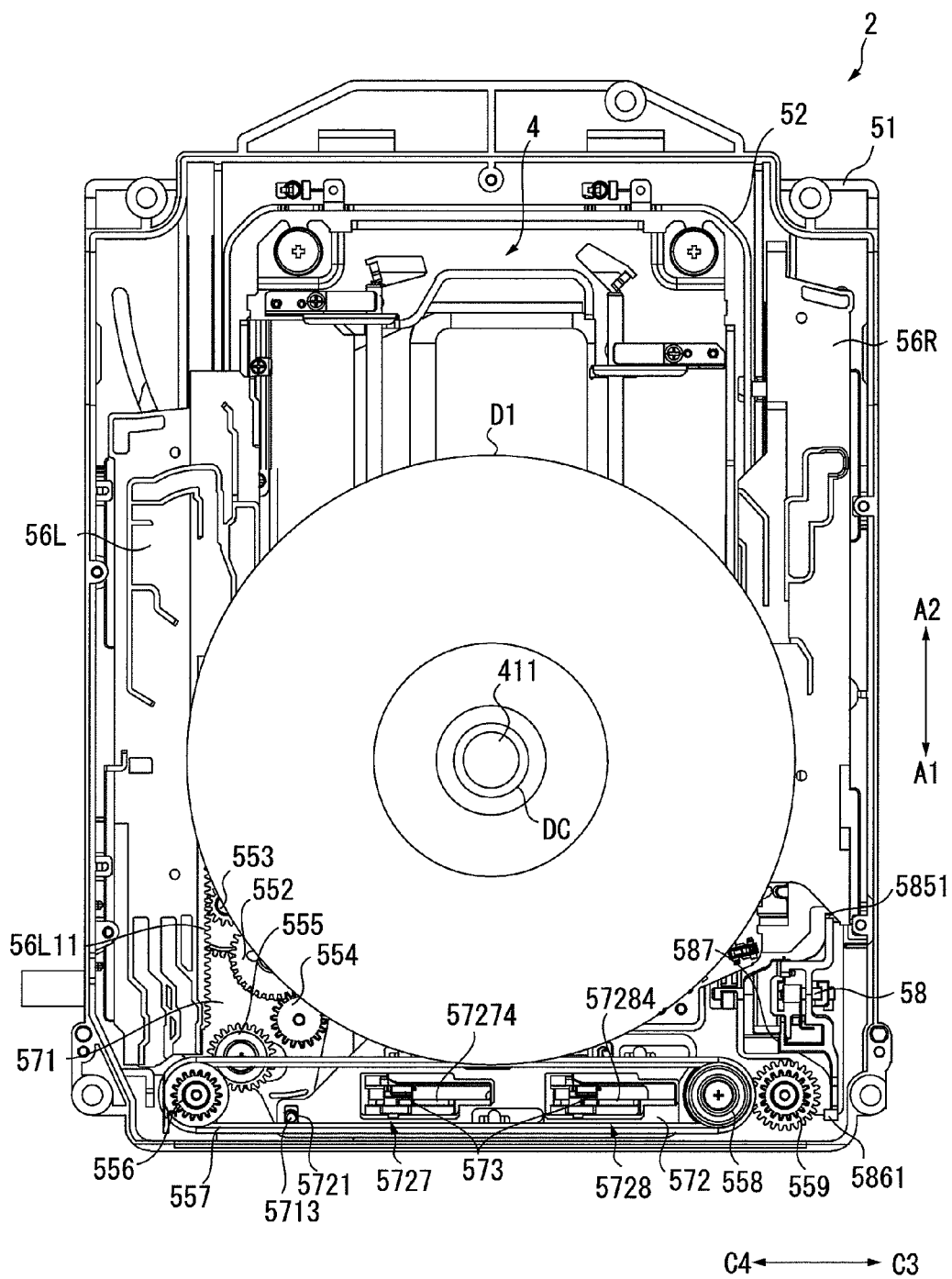

Further, by the sliding movement of the lock slider 572 in the direction indicated by the arrow mark C3, the lock slider 572 presses the lock lever 573 to pivot the lock lever 573 as seen in FIG. 59. Consequently, since the lock lever 573 projects from the lock slider 572 and is exposed from the openings 6345 and 6346 of the bracket 63 as seen in FIG. 58, a different disk D can be prevented from being inserted through the opening 2A.

Then, the control unit 3 detects changeover of the third switch 544 to an off state and stops driving of the motor 53.

Consequently, carrying in (carrying-in in the direction indicated by the arrow mark A2) of the first disk D1 into the apparatus body 2 is ended.

On the other hand, while carrying out (carrying-out in the direction indicated by an arrow mark A1) of the first disk D1 from the apparatus body 2 is performed through a procedure reverse to that of the carrying into the apparatus body 2, in this instance, upward pressing of the shutter 702 by the shutter lever 58 and dropping of the optical unit 4 and the holder 52 by the lifting mechanism 56 described above are performed.

It is to be noted that pivotal motion of the front arms 61L and 61R upon contacting with the end edge of the first disk D1 is performed by biasing force of the torsion spring 621 engaged with the link arm 62R. Further, pivotal motion of the support arm 704, detection arm 705, guide arm 706 and guide lock 707 is performed by biasing force of torsion springs (not shown) individually attached thereto. Further, since, upon starting of carrying out of the first disk D1, light from the photo-sensor 703 (refer to FIGS. 15 and 17) is intercepted by the first disk D1, the light receiving element 541 is in an off state as seen in FIG. 61.

In particular, the motor 53 rotates reversely to that upon carrying-in of the first disk D1 to slidably move the slide cams 56L and 56R in the direction indicated by the arrow mark A2 and A1, respectively. In response to the sliding movement, the third switch 544 is pressed by the pressing portion 56R33 of the slide cam 56R and changed over into an on state as seen in FIG. 61. Thereupon, the curved portion 5851 of the shutter lever 58 moves along the tapering portion 56R211 of the slide cam 56R to pivot the shutter lever 58 so that the pressing portion 5861 of the shutter lever 58 is projected from the opening 6335 of the bracket 63 to push up the shutter 702. Consequently, the opening 2A is opened. It is to be noted that, as described above, the shutter lever 58 is pivoted reversely by pressing of the projection 61R19 of the front arm 61R and the contacting state between the pressing portion 5861 and the contacting portion 7024 of the shutter 702 is cancelled.

Further, by the movement of the slide cam 56L in the direction indicated by the arrow mark A2, the swing arm 571 is pivoted to slidably move the lock slider 572 in the direction indicated by an arrow mark C4. Consequently, the offset portions 57274 and 57284 of the lock slider 572 are contacted with the cutaway portion 57321 of the lock lever 573 so that the lock lever 573 is accommodated into the lever exposure portions 5727 and 5728 of the lock slider 572.

Further, as described above, the holder 52 drops in an inclined state with respect to the plane of the first disk D1 and also to the downward direction of the holder 52 in response to the sliding movement of the slide cams 56L and 56R.

In addition, if the front arms 61L and 61R pivot in the direction toward each other, then the second switch 543 and the first switch 542 are changed over in order into an off state by the pressing portion 61R18 of the front arm 61R as seen in FIG. 61. At this time, if an off signal which indicates that the second switch 543 is changed over into an off state is inputted to the control unit 3, then the control unit 3 outputs a motor driving stopping signal to the control board 54. Consequently, the driving of the motor 53 is stopped in a state (state shown in FIG. 49) wherein the first rollers 61L5 and 61R5 grip the end edge of the first disk D1 which a substantially ⅔ portion of the first disk D1 is exposed from the opening 2A. Therefore, the first disk D1 is prevented from dropping from the opening 2A.

(11-2) Carrying of the Second Disk D2

Figure 62:
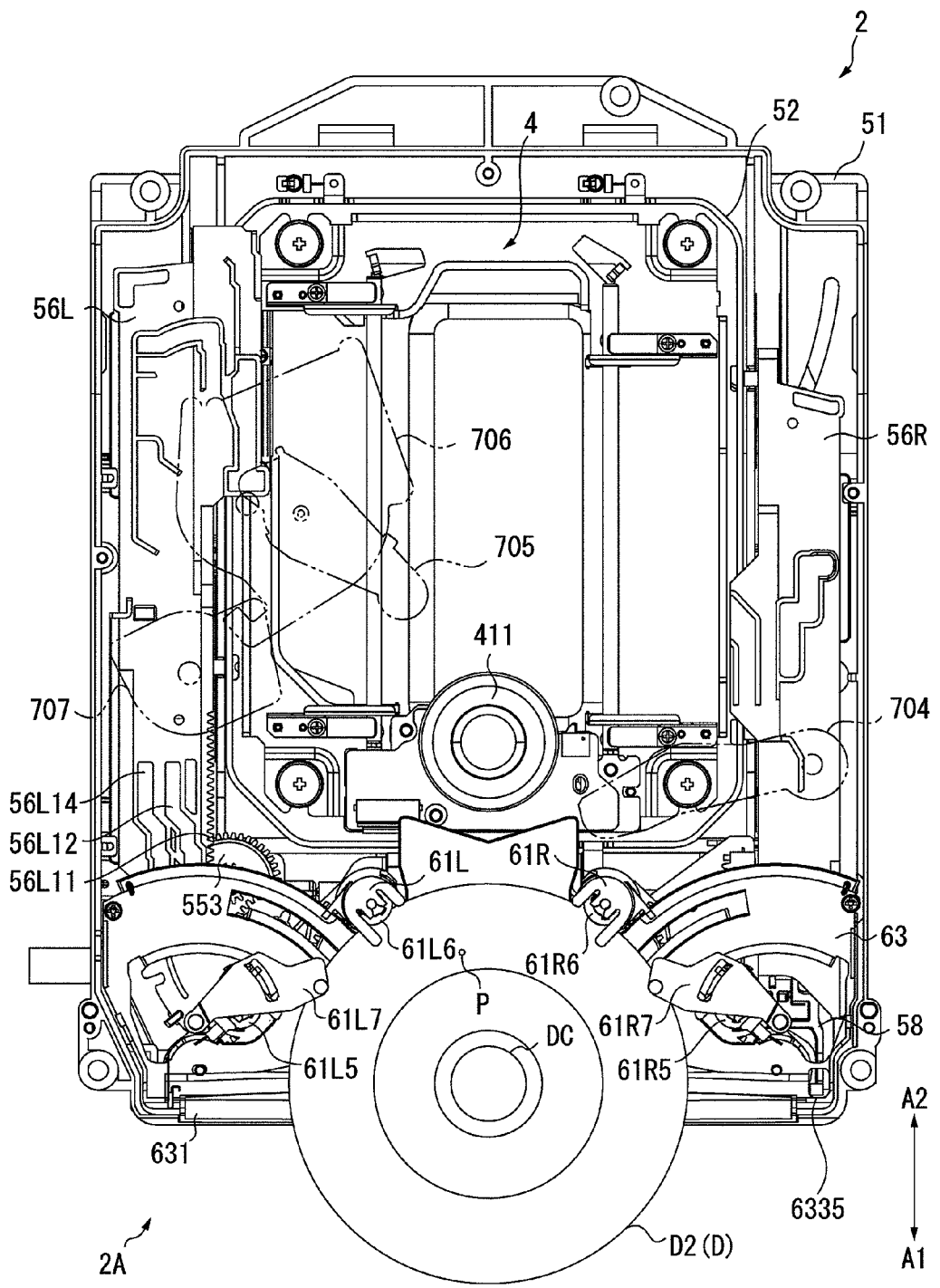
FIGS. 62 and 63 are views illustrating a carrying process of a second disk in the disk apparatus.
Figure 63:
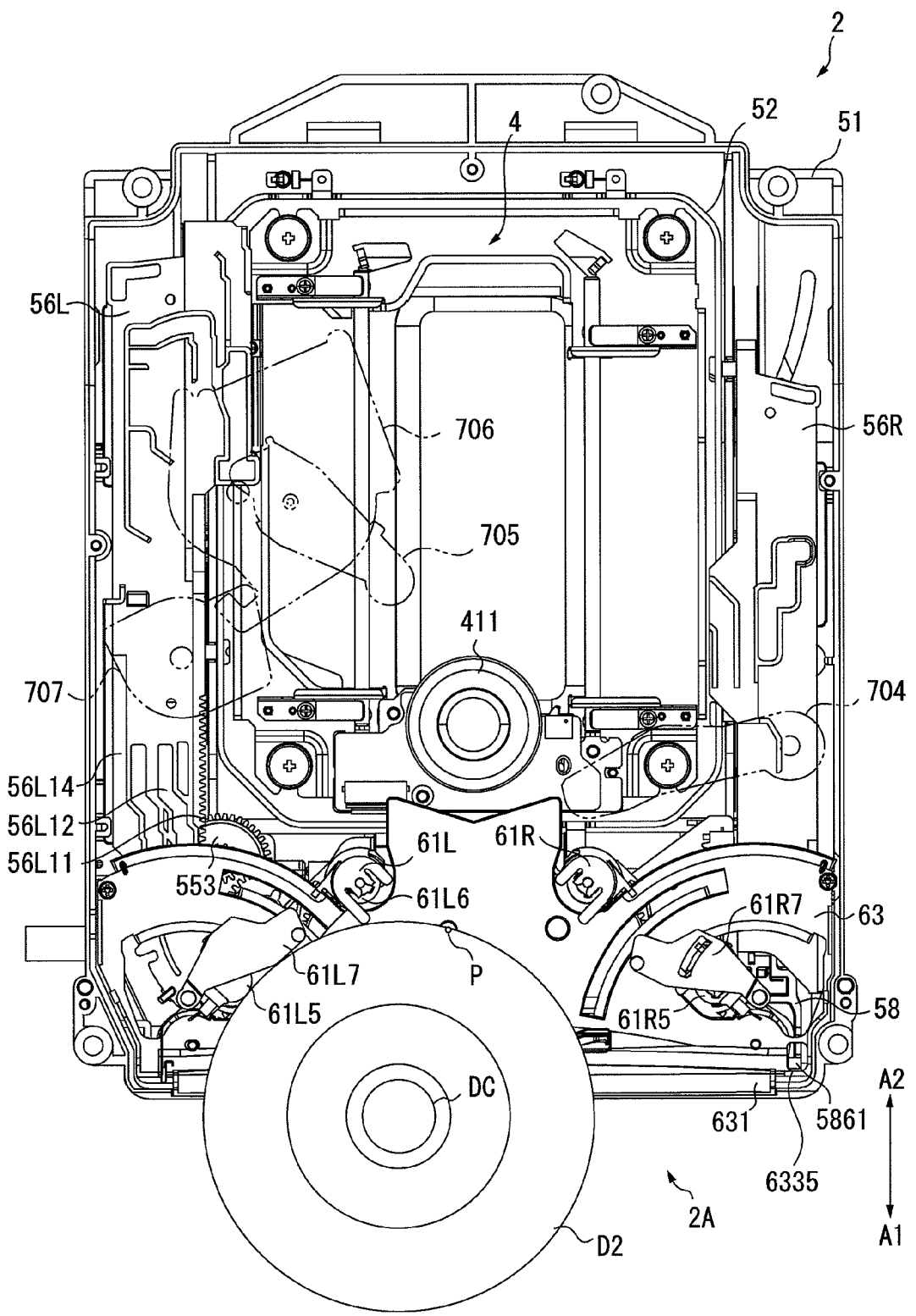
Figure 64:
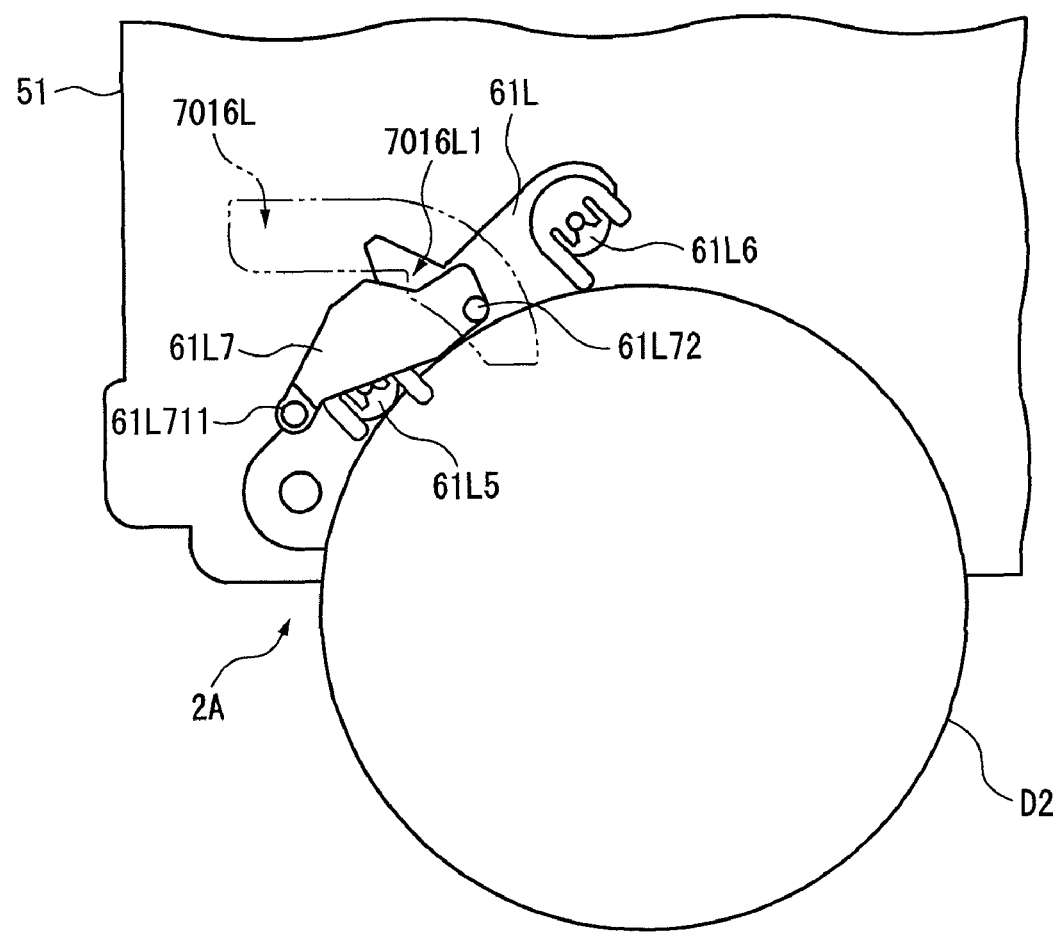
FIGS. 64 and 65 are views illustrating engagement states between the lock arm and a groove upon carrying-in of the second disk in the disk apparatus.
Figure 65:
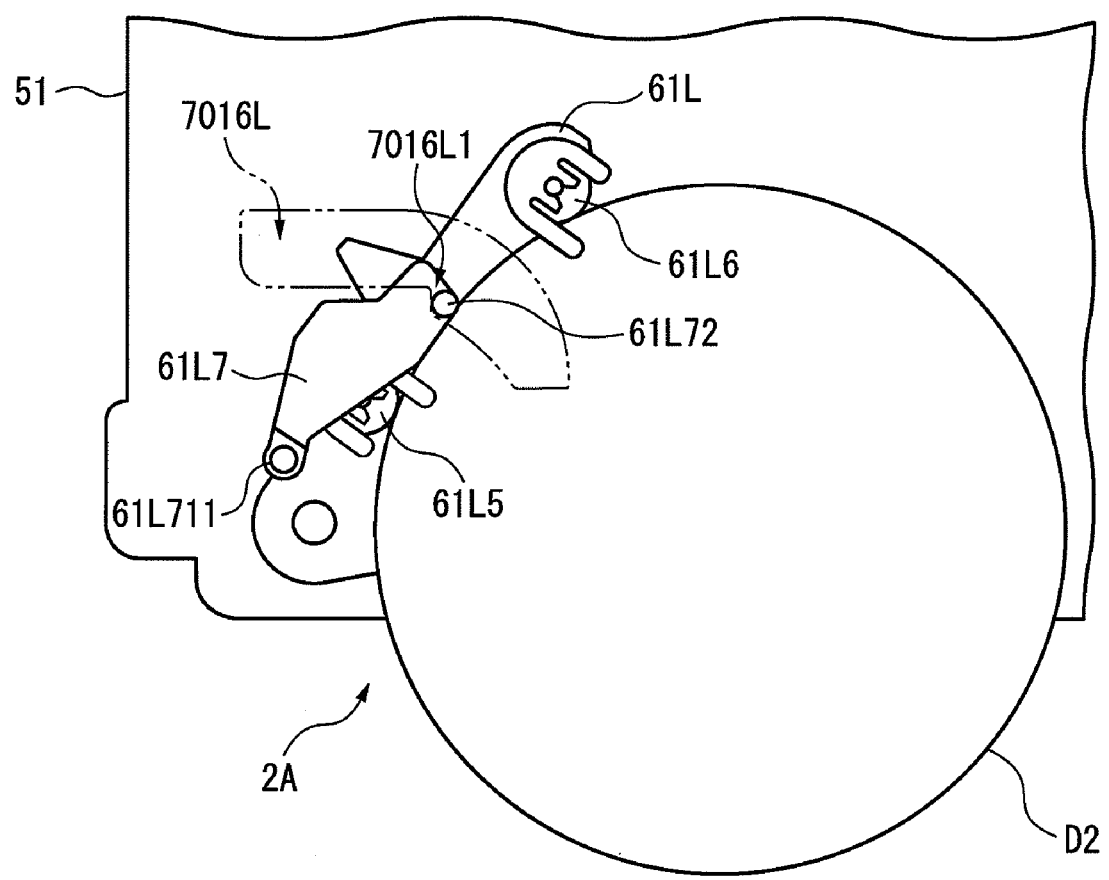
Figure 73:
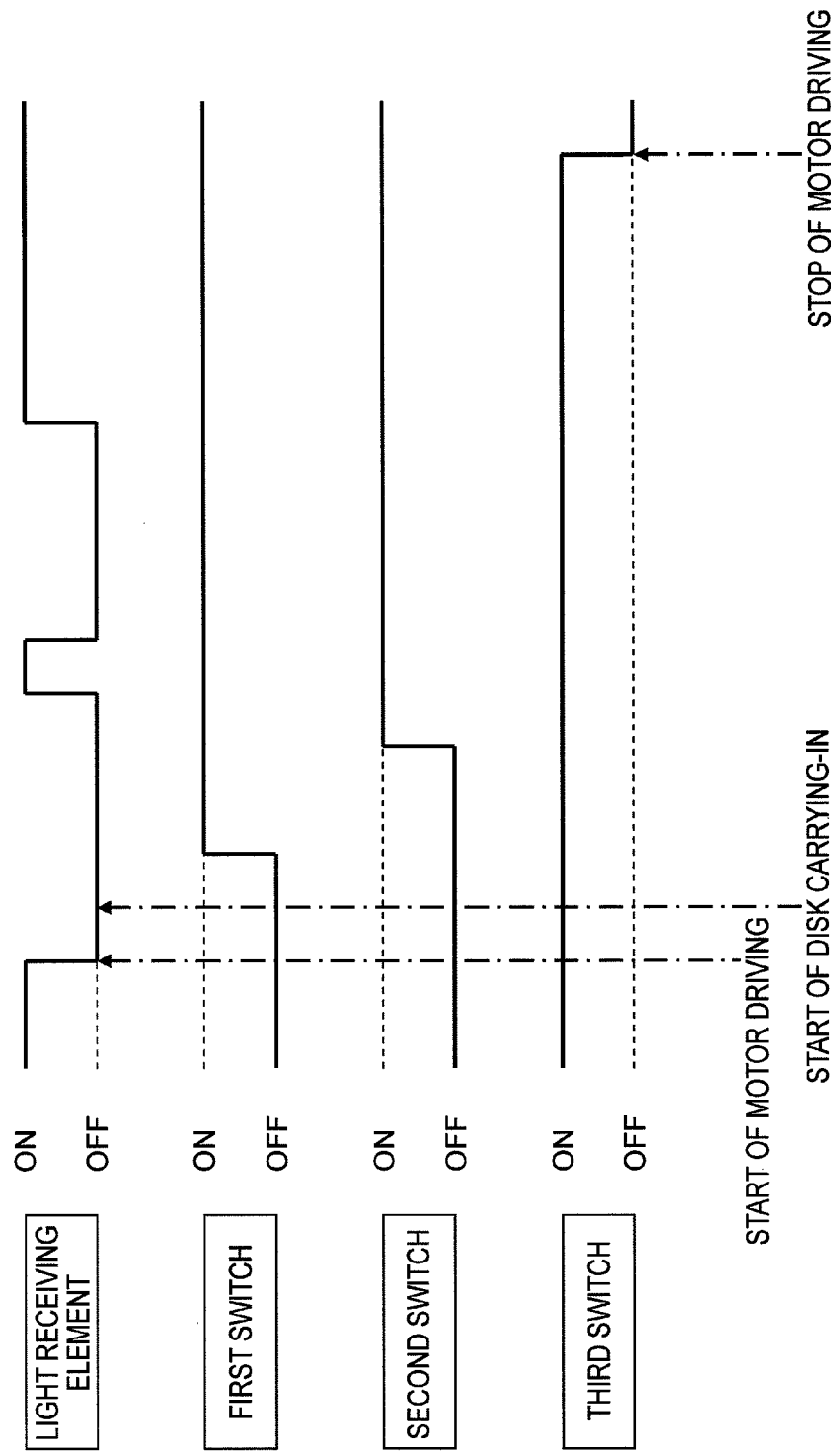
FIG. 73 is a time chart illustrating on/off states of the light reception section and first, second and third switches upon carrying-in of the second disk in the disk apparatus.
Figure 74:
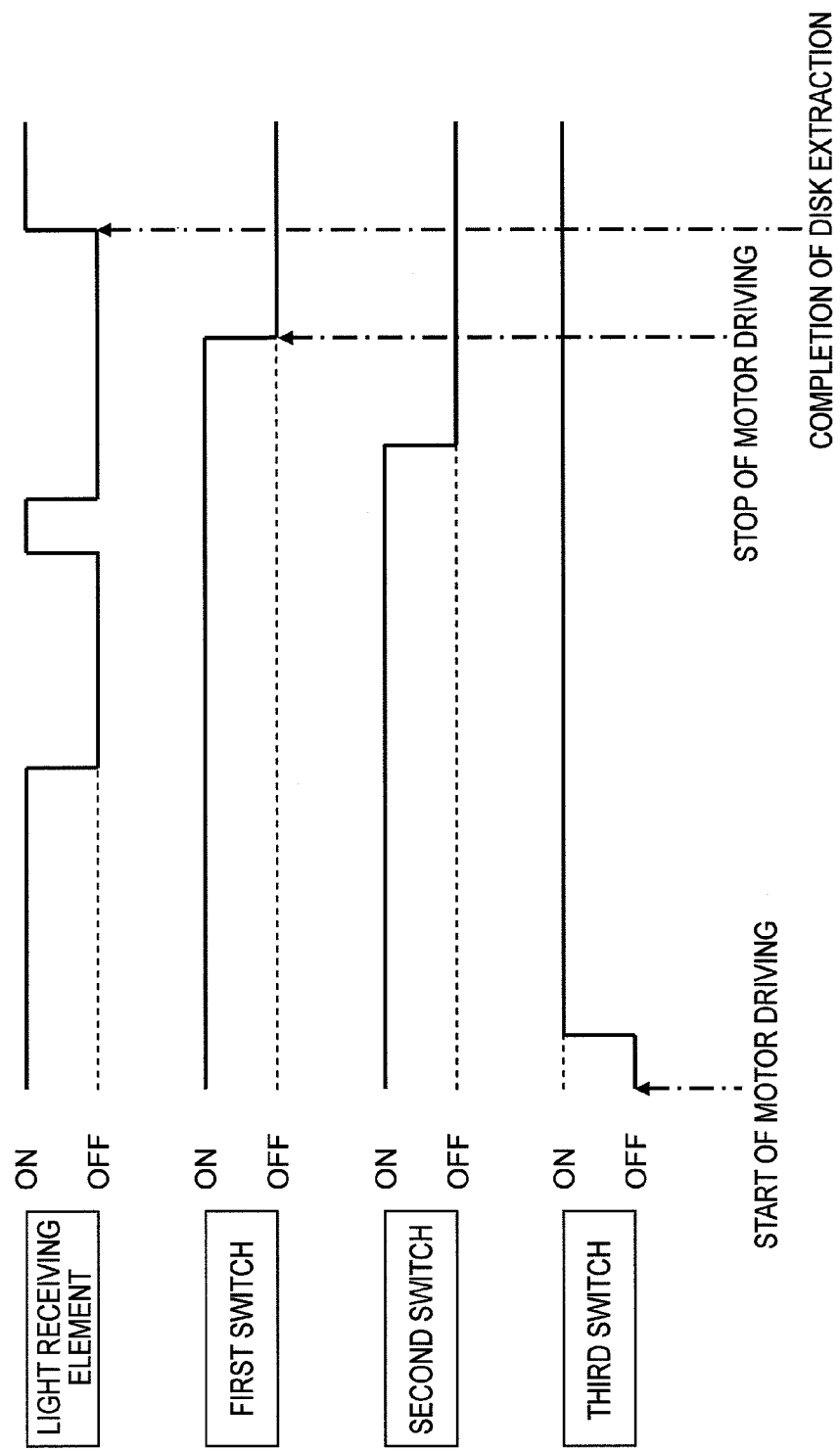
FIG. 74 is a time chart illustrating on/off states of the light reception section and first, second and third switches upon carrying-out of the second disk in the disk apparatus.

FIGS. 62 to 72 illustrate a carrying process of the second disk D2 into the apparatus body 2. FIGS. 73 and 74 illustrate on/off states of the light receiving element 541 and the switches 542 to 544 upon carrying in and carrying out of the second disk D2. It is to be noted that, in FIGS. 62, 63 and 66 to 72, the apparatus body 2 is shown wherein the top frame 701 is removed therefrom and the members 704 to 707 attached the top frame 701 are indicated by alternate long and two short dashes lines. Further, in FIGS. 62, 63 and 66 to 72, as regards the optical unit 4, only the turntable 411 is shown while the configuration of the other part is not shown. Further, FIGS. 64 and 65 show the lock arm 61L7 and the groove 7016L engaged with each other.

While the carrying process for the second disk D2 having a diameter size smaller than that of the first disk D1 into the apparatus body 2 is similar to that for the first disk D1, stopping positions of the front arms 61L and 61R, support arm 704, detection arm 705, guide arm 706 and guide lock 707 are different from those in the carrying process of the first disk D1.

In particular, if the second disk D2 is inserted into the opening 2A, then incoming light (position of the irradiation point P of the light is same as in the case of the first disk D1, refer to FIGS. 62, 63 and 66 to 72) from the photo-sensor 703 to the control board 54 is intercepted by the second disk D2. Consequently, as seen in FIG. 73, the light receiving element 541 of the control board 54 is changed over into an off state thereby to detect the insertion of the second disk D2, and the motor 53 is energized. In this instance, if the second disk D2 is inserted to a substantially central position of the opening 2A, then an end edge of the second disk D2 is gripped by the second rollers 61L6 and 61R6 of the front arms 61L and 61R as seen in FIG. 62. It is to be noted that, in this instance the first switch 542 and the second switch 543 of the control board 54 are in an off state while the third switch 544 is in an on state as shown in FIG. 73.

On the other hand, if the second disk D2 is inserted to a position rather near to an end on the left side of the opening 2A as seen in FIGS. 63 and 64, then the end edge of the second disk D2 is first gripped by the first roller 61L5 of the front arm 61L. Then, the first roller 61L5 is rotated by driving of the motor 53 to draw the second disk D2 into the apparatus body 2. At this time, the end edge of the second disk D2 contacts with the contacting portion 61L74 (refer to FIG. 11) of the lock arm 61L7 as shown in FIG. 64 to pivot the lock arm 61L7 in the direction (counterclockwise direction in FIG. 64) in which it moves away from the other front arm 61R around the hole 61L711.

If the second disk D2 is further pushed into the apparatus body 2 from the state just described by the user, then the front arm 61L pivots in the direction (counterclockwise direction in FIG. 65) in which it moves away from the front arm 61R together with the lock arm 61L7. However, since the projection 61L72 of the lock arm 61L7 fits into the pivotal motion regulation portion 7016L1 of the groove 7016L formed on the top frame 701, further pivotal motion of the lock arm 61L7 is regulated.

In this state, even if it is tried to pivot the front arm 61L, since the front arm 61L is contacted with the regulation portion 61L73 (refer to FIG. 11) of the lock arm 61L7, further pivotal motion of the front arm 61L is regulated. Consequently, the distance between the second rollers 61L6 and 61R6 is prevented from increasing further than the diametrical dimension of the second disk D2.

Figure 66:
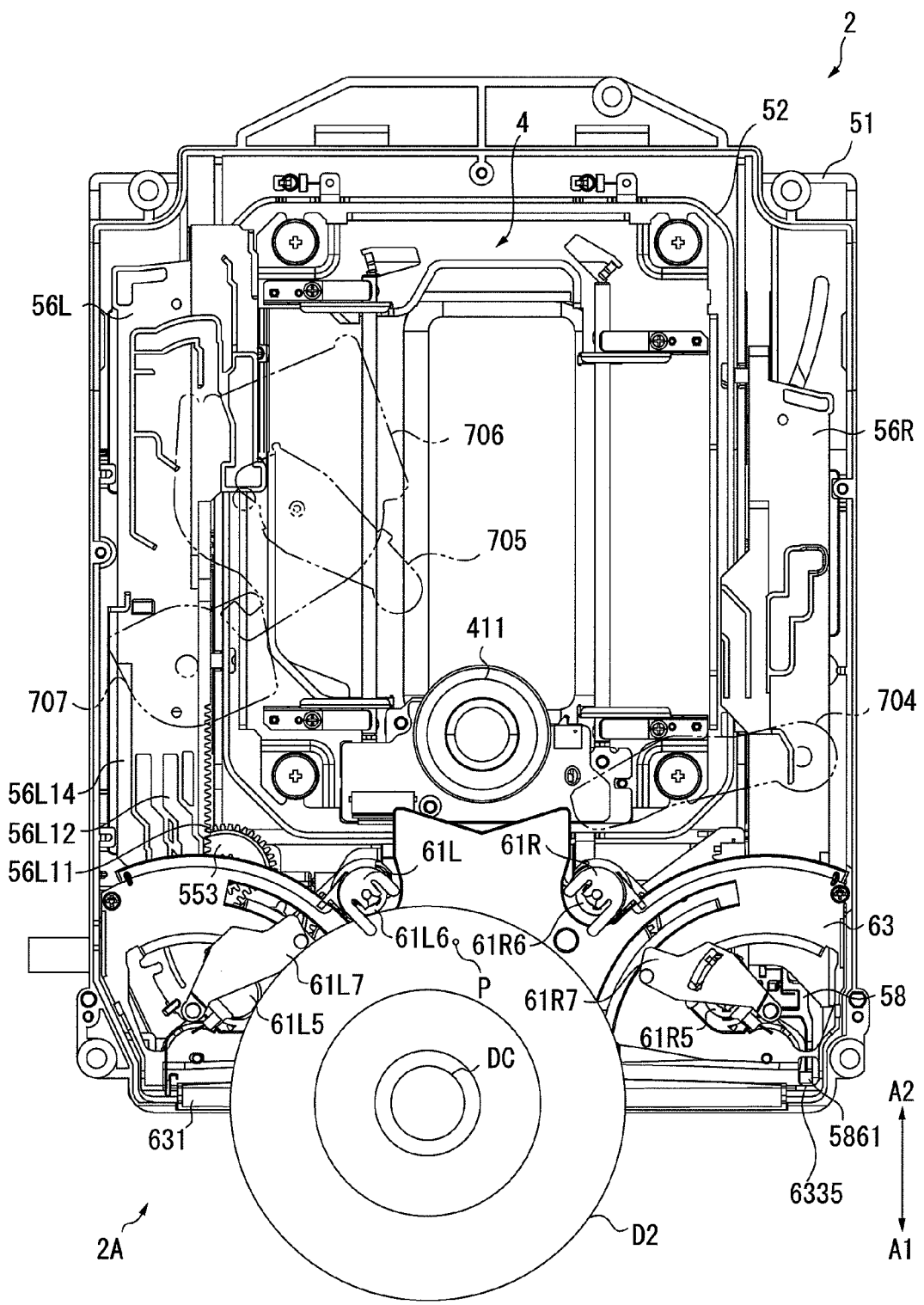
FIGS. 66 to 72 are views illustrating a carrying process of the second disk in the disk apparatus.

Thereafter, the second disk D2 is drawing into the inside of the apparatus body 2 in response to the rotation of the first roller 61L5 until the end edge of the second disk D2 is passed to and gripped by the second roller 61L6 as seen in FIGS. 65 and 66. Then, the second disk D2 is further drawn into the inside of the apparatus body 2 by rotation of the second roller

61L6. At this time, since the distance between the second rollers 61L6 and 61R6 is smaller than the diametrical dimension of the second disk D2, the second roller 61R6 provided on the front arm 61R grips the end edge of the second disk D2 with certainty. Consequently, the second disk D2 is positioned to the center of the opening 2A and the end edge of the second disk D2 is gripped by the second rollers 61L6 and 61R6 thereby to establish such a state as seen in FIG. 62.

It is to be noted that, if the second disk D2 is inserted to a position rather near to the right side end of the opening 2A, then the first roller 61R5, lock arm 61R7 and second roller 61R6 of the front arm 61R move the second disk D2 to the central position of the opening 2A similarly as in the case described above.

Accordingly, even if the second disk D2 is inserted to a position rather near to an end of the opening 2A, the second disk D2 is gripped by the second rollers 61L6 and 61R6.

Further, if the second disk D2 is gripped by the second rollers 61L6 and 61R6 in such a manner as described above, then, for example, the lock arm 61L7 contacted with the second disk D2 is pivoted in the direction toward the opening 2A by the biasing force of a torsion spring (not shown) engaged with the lock arm 61L7. Here, since the lock arm 61L7 does not contact with the second disk D2, the sliding position of the projection 61L72 in the groove 7016L upon pivoting of the front arm 61L is displaced.

Therefore, the projections 61L72 and 61R72 of the lock arms 61L7 and 61R7 are not permitted to fit into the pivotal motion regulation portions 7016L1 and 7016R1, respectively, and pivotal motion of the front arms 61L and 61R in the direction in which they move away from each other is permitted.

Figure 67:
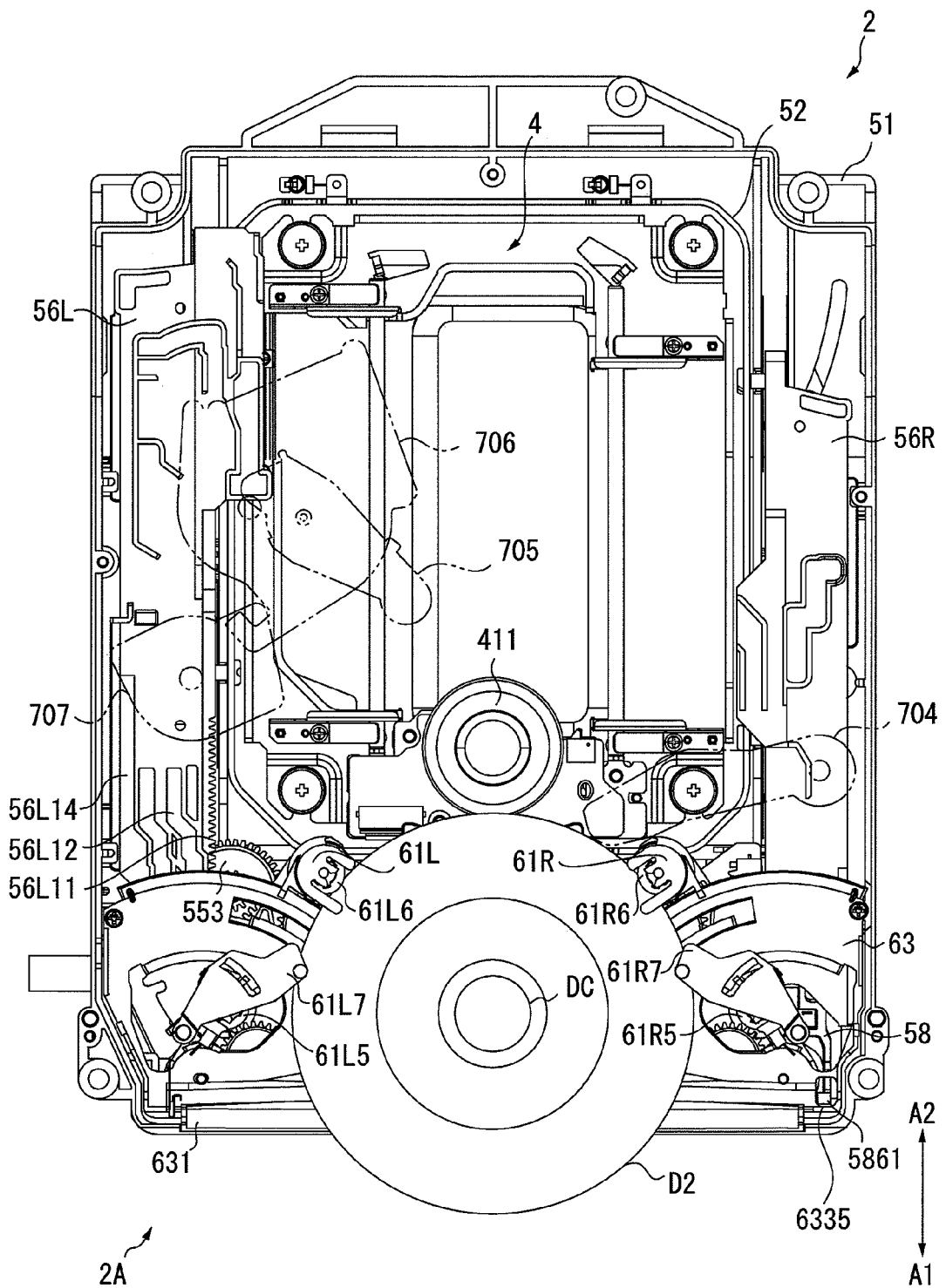

Then, the second rollers 61L6 and 61R6 are rotated in the directions opposite to each other (the second roller 61L6 rotates in the counterclockwise direction and the second roller 61R6 rotates in the clockwise direction in FIG. 67) in the state wherein the end edge of the second disk D2 is gripped while the front arms 61L and 61R pivot in synchronism with each other in the direction in which they move away from each other so as to spread in a sectoral form. The pressing portion 61R18 of the front arm 61R presses the first switch 542 in the state just described thereby to change over the first switch 542 into an on state as seen in FIG. 73.

Figure 68:
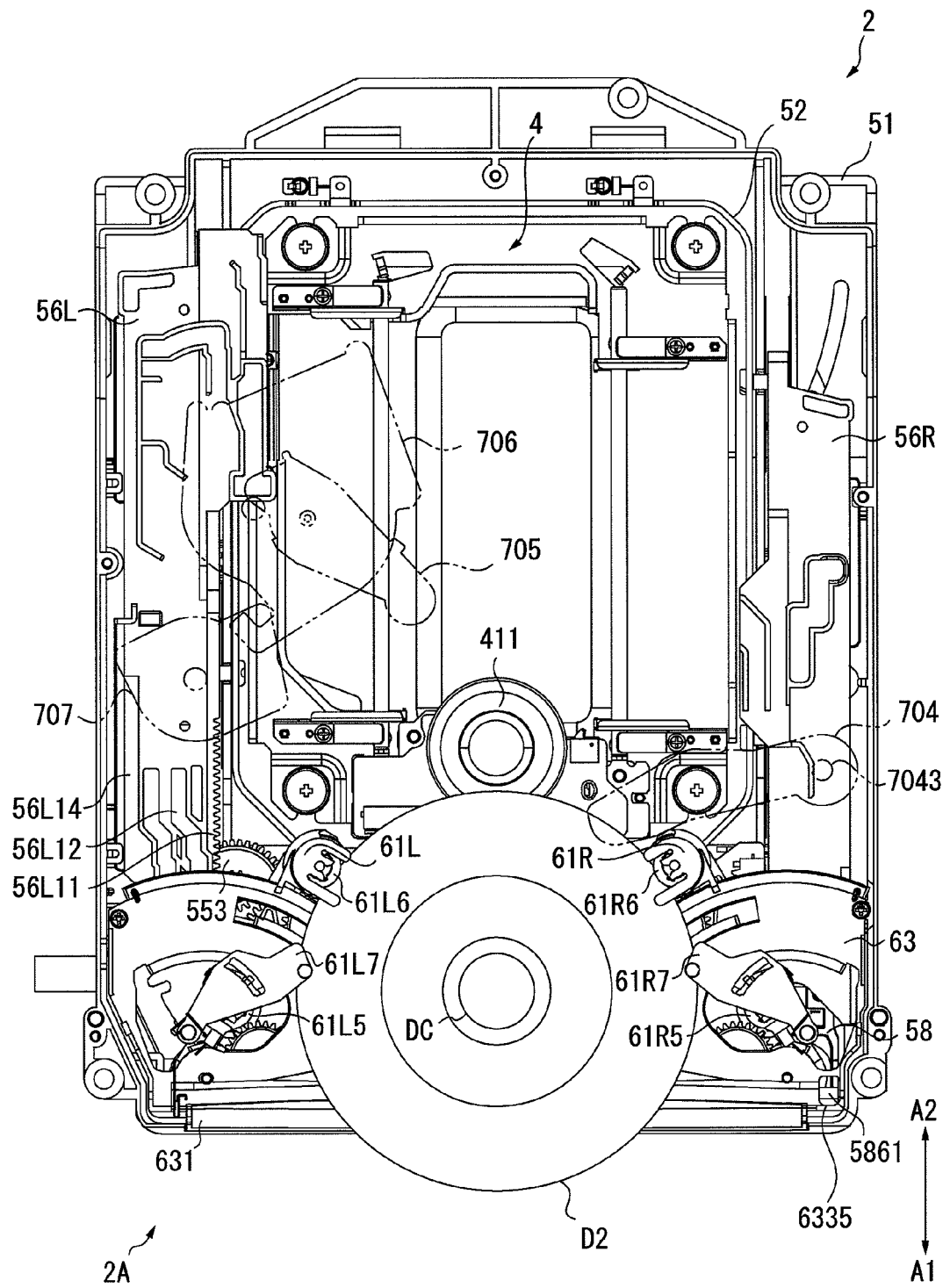

If the second disk D2 is further carried in the direction indicated by the arrow mark A2, then the support arm 704 contacts with the end edge of the second disk D2 as seen in FIG. 68 and is pivoted in the clockwise direction in FIG. 68. In this state, the pressing portion 61R18 of the front arm 61R presses the second switch 543 thereby to change over the second switch 543 into an on state as shown in FIG. 73.

Figure 69:
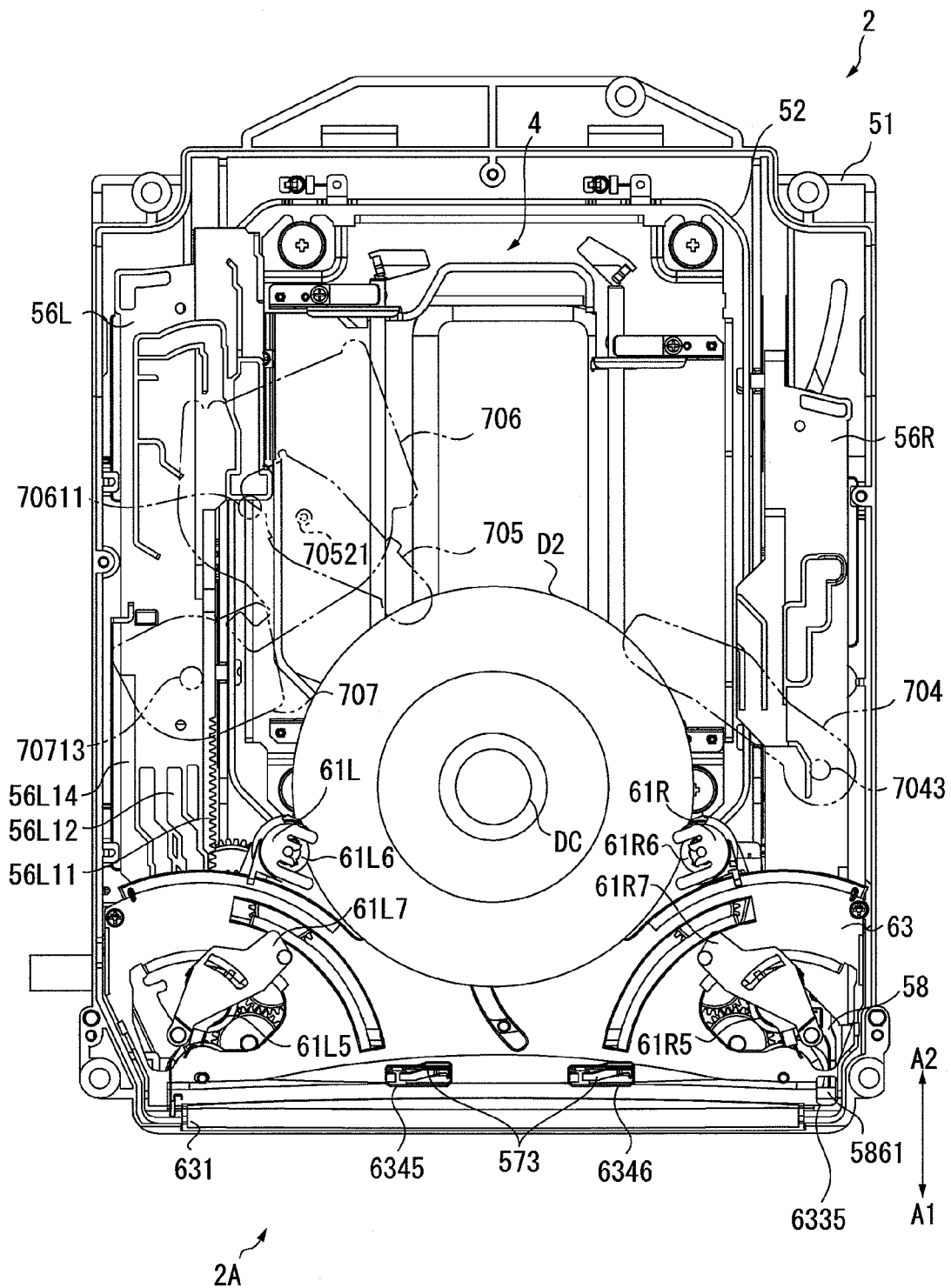
Figure 70:
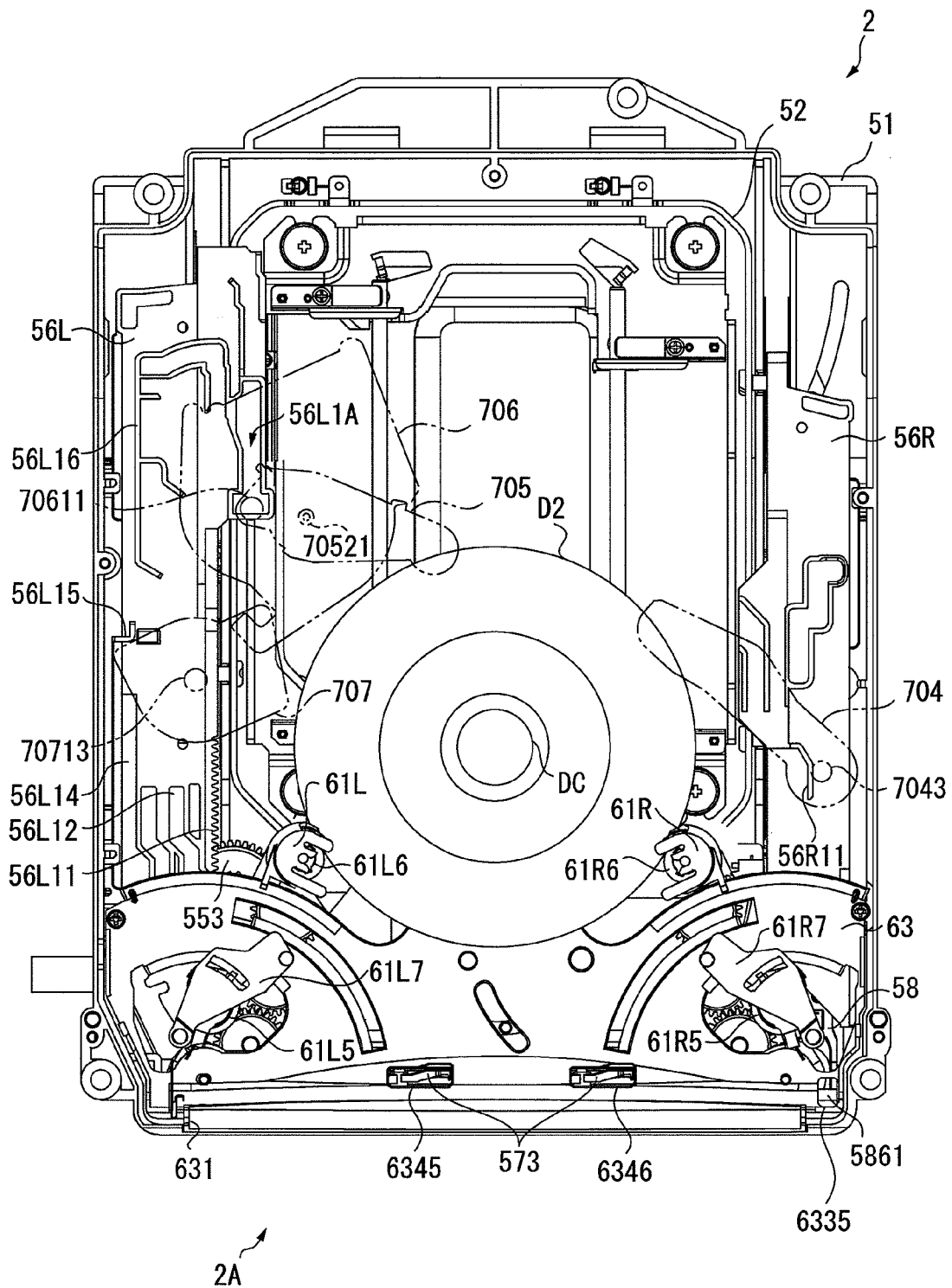
Figure 71:
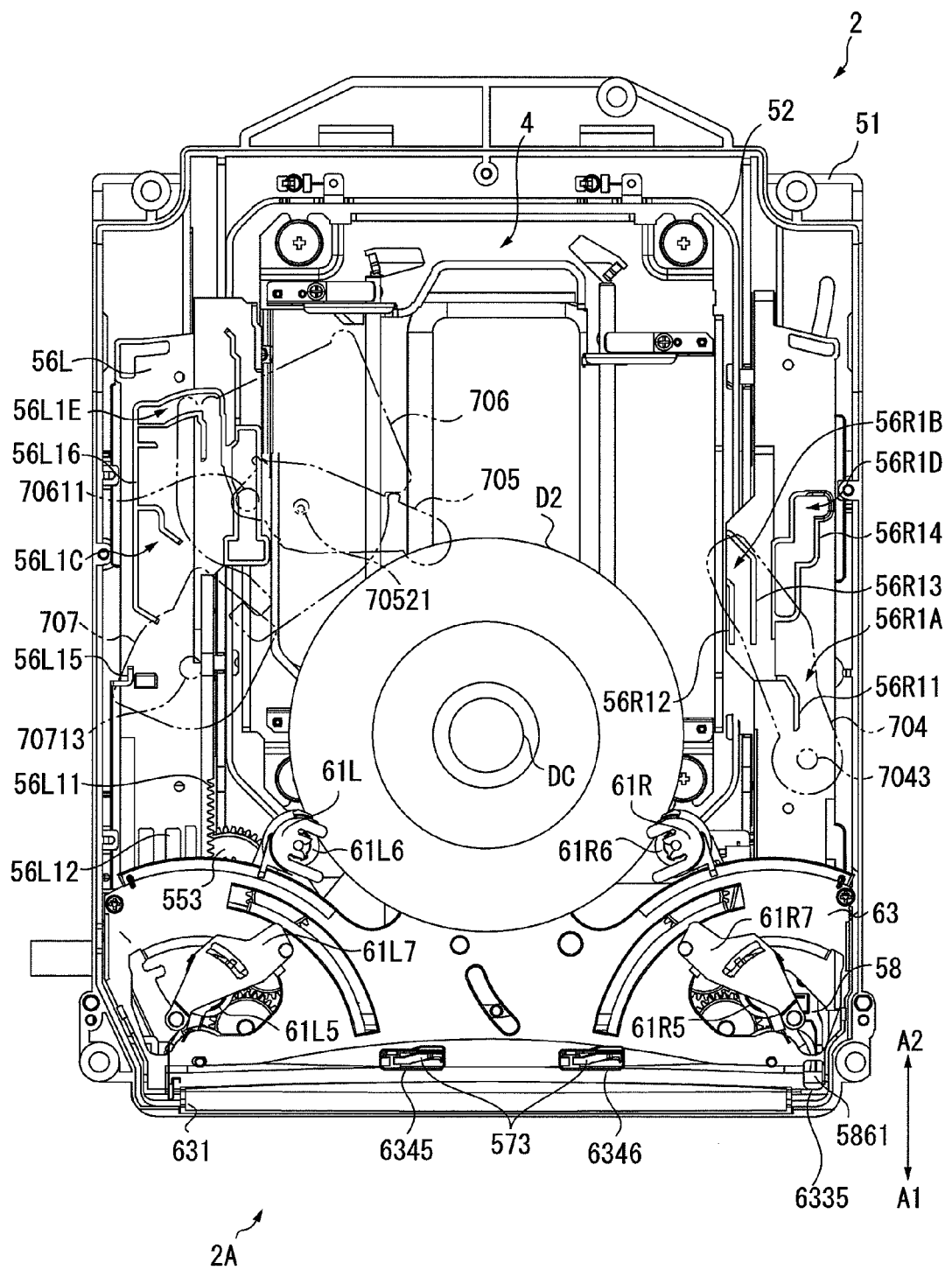

When the second disk D2 is carried in further and the front arms 61L and 61R are opened further, the end edge of the second disk D2 contacts with the detection arm 705 as seen in FIG. 69. Consequently, the detection arm 705 is pivoted in the counterclockwise direction in FIG. 70 until the regulation portion 70531 thereof contacts with the side face portion 70622 of the guide arm 706.

Thereupon, the cylindrical portion 70561 of the detection arm 705 presses the upright portion 56L16 of the slide cam 56L in the direction indicated by the arrow mark A1 so that the slide cam 56L is slidably moved in the direction indicated by the arrow mark A1.

By the sliding movement of the slide cam 56L, the rack portion 56L11 and the second gear 553 are placed into meshing engagement with each other. Then, by rotation of the second gear 553, the slide cam 56L is further moved in the direction indicated by the arrow mark A1, and in response to the movement of the slide cam 56L, the slide cam 56R slidably moves in the direction indicated by the arrow mark A2. In this state, light from the photo-sensor 703 is not intercepted by the second disk D2 any more. Therefore, the light receiving element 541 of the control board 54 changes over from an off state to an on state as seen in FIG. 73.

When the slide cam 56L moves in the direction indicated by the arrow mark A1, the upright portion 56L15 formed on the slide cam 56L presses the cylindrical portion 7072 of the guide lock 707 to pivot the guide lock 707 around the hole 70713 thereby to cancel the regulation against the pivotal motion of the guide arm 706.

Meanwhile, as a result of the movement of the slide cam 56R in the direction indicated by the arrow mark A1, the cylindrical portion 7049 of the support arm 704 moves along the groove 56R1A. Consequently, the support arm 704 is spaced away from the second disk D2.

Further, the projection 61L181 of the front arm 61L advances into the groove 56L12 of the slide cam 56L.

Figure 72:
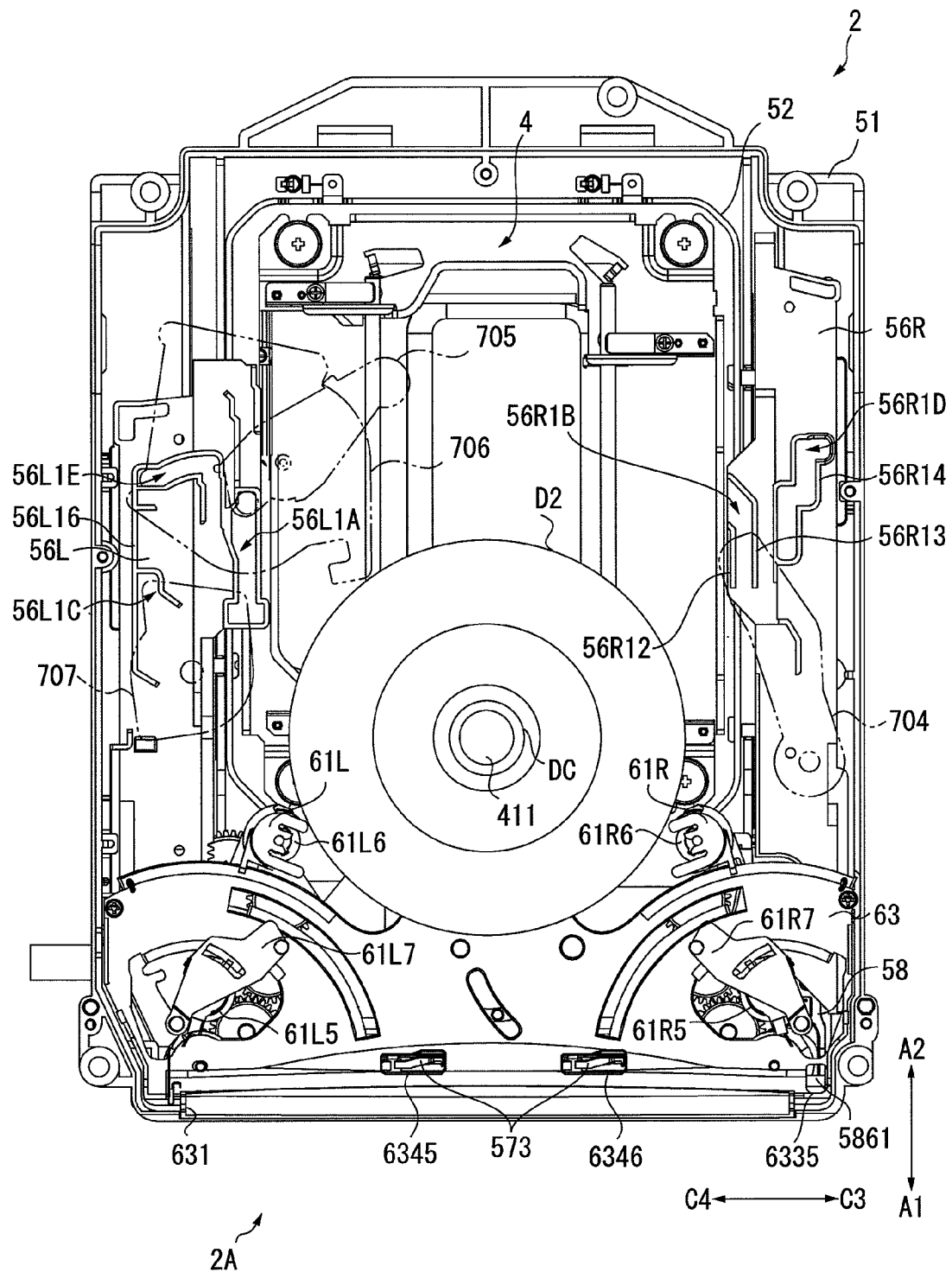

Then, when the second disk D2 is further carried in the direction indicated by the arrow mark A2 until the hole DC of the second disk D2 comes to a position corresponding to the turntable 411 of the optical unit 4, the front arm 61L is pivoted to the outer side of the second disk D2 along the groove 56L12 as seen in FIG. 72. Then, the front arms 61L and 61R are locked at positions spaced from the end edge of the second disk D2.

As a result of the movement of the front arms 61L and 61R and the second disk D2 away from each other and the pivotal motion of the swing arm 571, the third gear 554 is spaced away from the fourth gear 555 and the rotation of the second rollers 61L6 and 61R6 stops.

Further, in this instance, the cylindrical portion 704B (refer to FIG. 16) of the support arm 704 is fitted into the groove 56R1B of the slide cam 56R. Consequently, the support arm 704 is locked at a position spaced from the second disk D2.

Further, the chuck arm 708 (refer to FIG. 27) is pivoted by the movement of the cylindrical portion 7084 along the groove 56R1D to pivot the chuck arm 709.

Furthermore, in synchronism with the movements described, the cylindrical portion 70625 of the guide arm 706 and the cylindrical portion 7073 of the guide lock 707 are fitted into the grooves 56L1C and 56L1E of the slide cam 56L, respectively, and consequently, the guide arm 706 and the guide lock 707 are locked in a spaced relationship from the second disk D2.

Accordingly, in this state, the second disk D2 is spaced from the arms 61L, 61R, 704, 705 and 706 and the guide lock 707.

Then, when the slide cam 56L slidably moves further in the direction indicated by the arrow mark A1, the holder 52 on which the optical unit 4 is placed moves up vertically with respect to the plane of the second disk D2 until the turntable 411 of the optical unit 4 and the chuck pulley 710 sandwich the second disk D2 therebetween as described hereinabove, thereby completing chucking of the second disk D2. Thereupon, the contacting state between the pressing portion 56R33 of the slide cam 56R and the third switch 544 is canceled, and consequently, the third switch 544 changes over to an off state as seen in FIG. 73. Consequently, the control unit 3 stops the driving of the motor 53.

Then, by such sliding movement of the slide cam 56L as described above, the swing arm 571 is further pivoted to slidably move the lock slider 572 in the direction indicated by the arrow mark C3. Consequently, the lock lever 573 is projected from the openings 6345 and 6346 of the bracket 63 and can thereby prevent insertion of another disk D.

The carrying (carrying-in in the direction indicated by the arrow mark A2) of the second disk D2 into the apparatus body 2 ends therewith.

On the other hand, upon carrying out (carrying out in the direction indicated by the arrow mark A1) of the second disk D2 to the outside of the apparatus body 2, pushing up of the shutter 702 by the shutter lever 58, retraction of the lock lever 573 by sliding movement of the lock slider 572 in the direction indicated by the arrow mark C4, downward movement of the optical unit 4 in an inclined relationship to the plane of the second disk D2 and the downward direction by the lifting mechanism 56 and so forth are performed similarly as upon carrying out of the first disk D1. Thus, the second disk D2 is carried out through a process opposite to that upon carrying of the disk D into the apparatus body 2. Then, when the second disk D2 is to be taken out from the opening 2A, the shutter 702 is moved down by the biasing force of the pertaining torsion spring to close up the opening 2A for disk accommodation.

In particular, when the slide cam 56R slidably moves in the direction indicated by the arrow mark A1, the pressing portion 56R33 of the slide cam 56R and the third switch 544 of the control board 54 are brought into a contacting state with each other. Consequently, the third switch 544 changes over to an on state as seen in FIG. 74. Then, in response to sliding movement of the slide cam 56L in the direction indicated by the arrow mark A2, the second disk D2 is carried in the direction indicated by the arrow mark A1 from the state of the illustrated in FIG. 72 through the states thereof illustrated in FIGS. 71 and 70 by the support arm 704 and the detection arm 705 which are pivoted by the biasing force of the respective torsion springs (not shown). When the slide cam 56L slidably moves further in the direction indicated by the arrow mark A2, the front arms 61L and 61R are pivoted in the direction in which they approach each other until the second rollers 61L6 and 61R6 grip an end edge of the second disk D2 as described hereinabove with reference to FIG. 69.

Thereafter, the second disk D2 is carried in the direction indicated by the arrow mark A1 by the second rollers 61L6 and 61R6 as seen in FIG. 68. Then, when the front arms 61L and 61R are pivoted in the direction in which they approach each other upon such carrying of the second disk D2 (state illustrated in FIG. 67), the pressing portion 61R18 of the front arm 61R is spaced away from the second switch 543 and the first switch 542. Thereupon, the second switch 543 changes over to an off state first, and then the first switch 542 changes over to an off state as seen in FIG. 74. In response to the changeover of the first switch 542 into an off state, the control unit 3 stops the driving of the motor 53.

In this state, a region of substantially one fourth of the second disk D2 is exposed from the opening 2A while the end edge of the second disk D2 is gripped by the second rollers 61L6 and 61R6. Therefore, the second disk D2 is prevented from dropping from the opening 2A while it can be taken out from the opening 2A. Then, after the second disk D2 is taken out from the opening 2A, the light receiving element 541 of the control board 54 receives light from the photo-sensor 703 and changes over to an on state as seen in FIG. 74.

(12) Carrying Process by the Control Unit 3

Now, a carrying-in process SA and a carrying-out process SB executed by the control unit 3 (refer to FIG. 47) are described.

(12-1) Carrying-in Process SA

Figure 75:
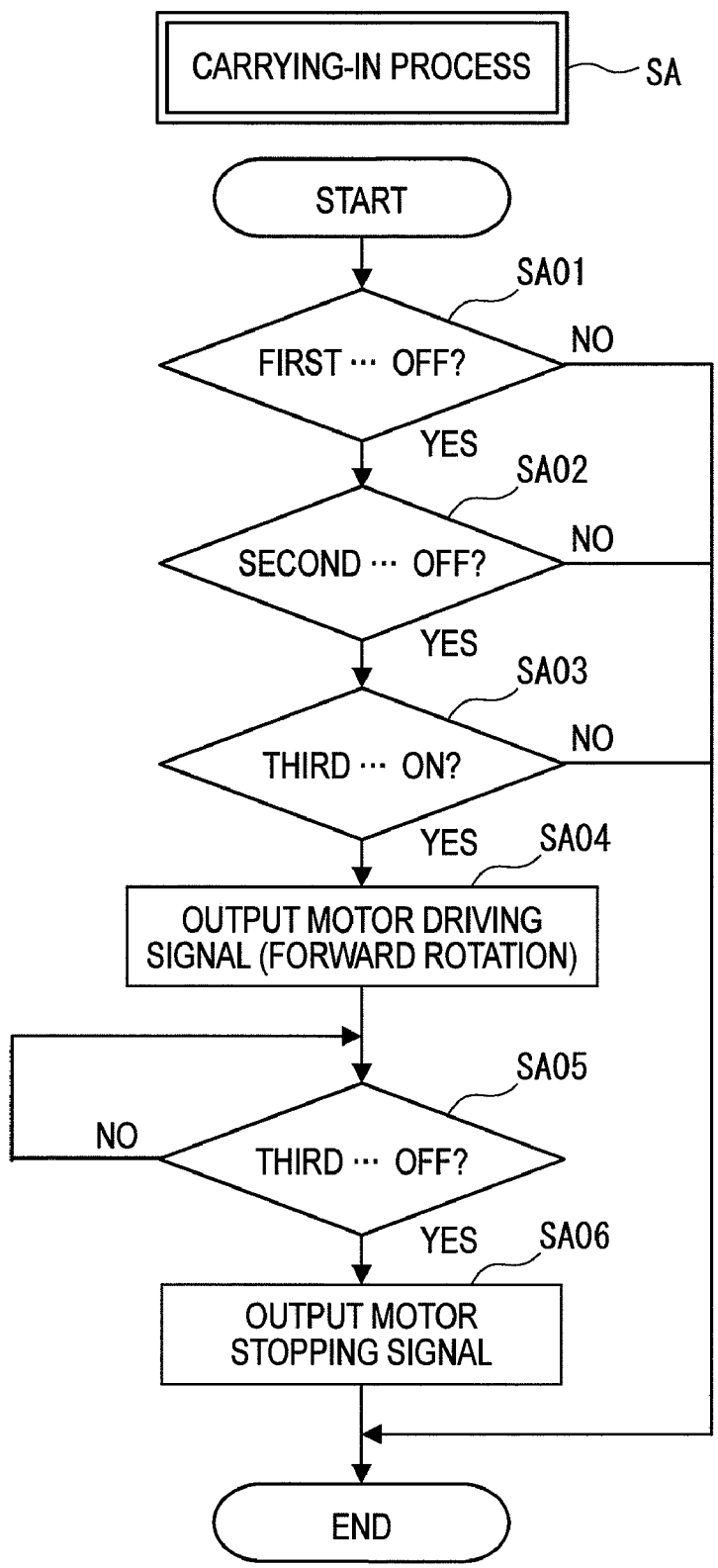
FIG. 75 is a flow chart illustrating a carrying-in process in the disk apparatus.

FIG. 75 illustrates a processing flow of the carrying-in process SA executed by the control unit 3.

The carrying-in process SA is executed by the control unit 3 when light emitted from the light emitting element of the photo-sensor 703 is intercepted by a disk D inserted in the opening 2A to place the light receiving element 541 of the control board 54 into an off state.

In particular, in the carrying-in process SA, if an off signal representing that the light receiving element 541 is placed into an off state is inputted from the control board 54, then the state decision section 32 of the control unit 3 decides based on a signal representative of the state of the first switch 542 whether or not the first switch 542 is in an off state as seen in FIG. 75 (step SA01).

Then, if it is decided that the first switch 542 is in an on state, then the state decision section 32 decides that a disk D is inserted already and ends the carrying-in process SA.

On the other hand, if it is decided that the first switch 542 is in an off state, then the state decision section 32 decides based on a signal representing the state of the second switch 543 whether or not the second switch 543 is in an off state at step SA02. Then, if it is decided that the second switch 543 is in an on state, then the state decision section 32 ends the carrying-in process SA similarly.

On the other hand, if it is decided that the second switch 543 is in an off state, then the state decision section 32 decides based on a signal representing the state of the third switch 544 whether or not the third switch 544 is in an on state at step SA03. Then, if it is decided that the third switch 544 is in an off state, then the state decision section 32 ends the carrying-in process SA similarly.

It is to be noted that the state that the first switch 542 or the second switch 543 is in an on state or the state that the third switch 544 is in an off state in the decision at step SA01, SA02 or SA03 after the light receiving element 541 is placed into an off state does not occur if a disk D is accommodated already in the inside of the apparatus body 2 and the insertion preventing mechanism 57 described hereinabove is functioning. However, in order to prevent malfunction of the apparatus body 2, the steps SA01 to SA03 are incorporated in the carrying-in process SA. Therefore, the steps SA01 to SA03 may be omitted.

On the other hand, if the state decision section 32 decides at step SA03 that the third switch 544 is in an on state, the driving control section 33 outputs a motor driving signal for causing the motor 53 to rotate forwardly to the motor driver 545 at step SA04. Since the motor 53 is driven to rotate forwardly by the motor driver 545, carrying-in of the disk D is started as described hereinabove with reference to FIGS. 60 and 73.

After the step SA04, the state decision section 32 decides at step SA05 whether or not the third switch 544 is in an off state. Here, if the disk D is being carried in and is not fully chucked as yet as described above, then the third switch 544 is in an on state. Thus, when the state decision section 32 decides that the third switch 544 is in an on state, the state decision section 32 waits that the third switch 544 is placed into an off state.

On the other hand, if the chucking of the disk D is completed and the state decision section 32 decides changeover of the third switch 544 into an off state as described hereinabove with reference to FIGS. 60 and 73, then the driving control section 33 outputs a motor stopping signal to the motor driver 545 at step SA06. Consequently, the driving of the motor 53 is stopped, and the carrying in of the disk D is completed.

The carrying-in process SA by the control unit 3 ends therewith.

(12-2) Carrying-Out Process SB

Figure 76:
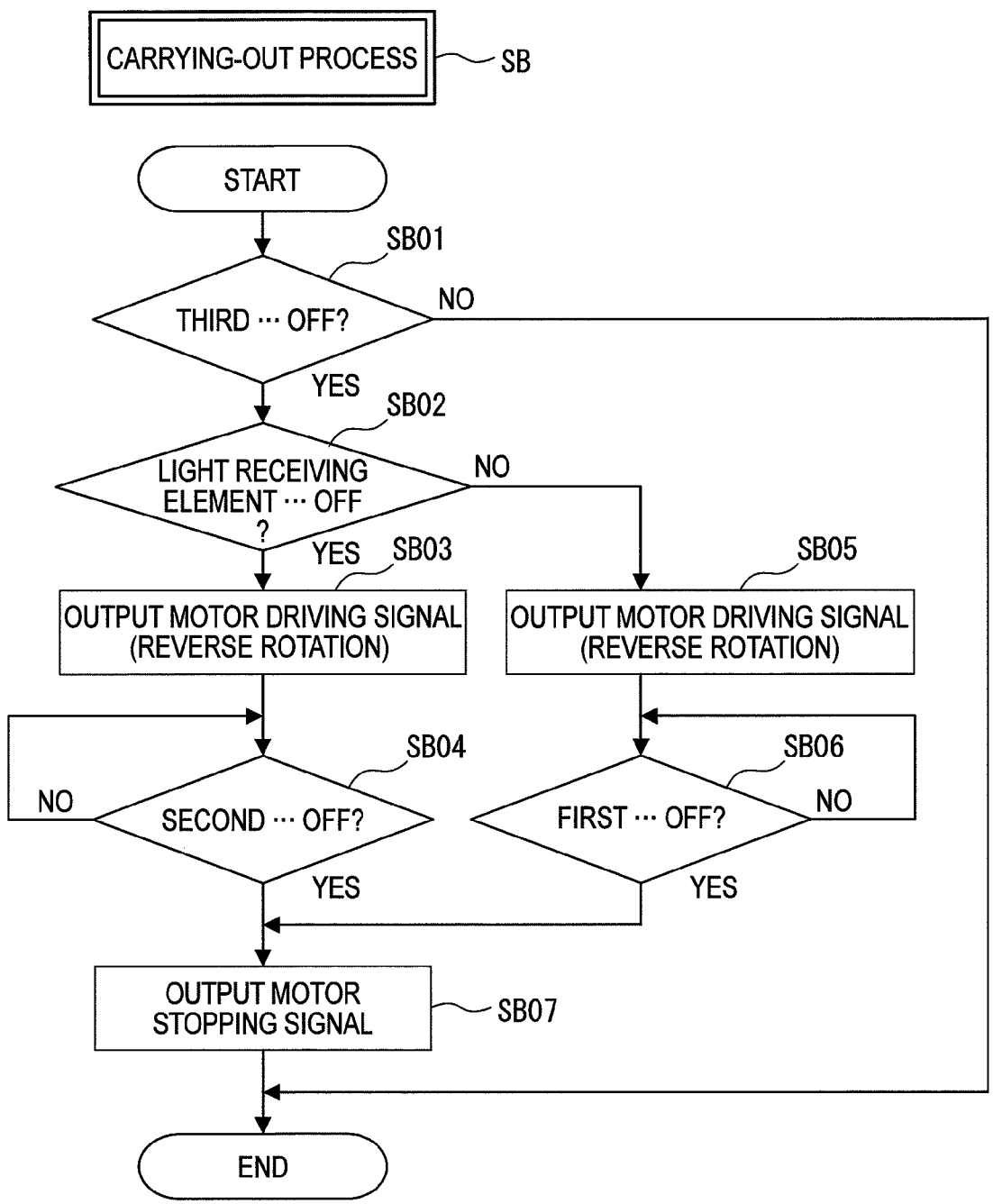
FIG. 76 is a flow chart illustrating a carrying-out process in the disk apparatus.

FIG. 76 illustrates a processing flow of the carrying-out process SB executed by the control unit 3.

The carrying-out process SB is executed by the control unit 3 when a detection signal of a disk D is inputted to the control unit 3 in response to operation of an eject switch (not shown) or the like.

In particular, referring to FIG. 76 which illustrates the carrying-out process SB, the state decision section 32 decides at step SB01 whether or not the third switch 544 is in an off state. In other words, at step SB01, the state decision section 32 decides whether or not a disk D is chucked.

If the state decision section 32 decides at step SB01 that the third switch 544 is in an on state, the state decision section 32 decides that chucking of the disk D is not performed, that is, no disk D is accommodated in the inside of the apparatus body 2, and ends the carrying-out process SB.

On the other hand, if the state decision section 32 decides at step SB01 that the third switch 544 is in an off state, that is, a disk D is chucked, then the state decision section 32 decides at step SB02 whether or not the light receiving element 541 is in an off state.

In particular, where the first disk D1 is accommodated in the apparatus body 2, light to be introduced to the light receiving element 541 is intercepted by the first disk D1, and consequently, the light receiving element 541 remains in an off state as seen in FIG. 61. On the other hand, where the second disk D2 is accommodated in the apparatus body 2, light to be introduced to the light receiving element 541 is not intercepted, and consequently, the light receiving element 541 is in an on state as seen in FIG. 74. Then, by deciding an on/off state of the light receiving element 541, the state decision section 32 can decide whether the disk D accommodated in the apparatus body 2 is the first disk D1 or the second disk D2.

If the state decision section 32 decides at step SB02 that the light receiving element 541 is in an off state, that is, the disk D accommodated in the apparatus body 2 is the first disk D1, then the driving control section 33 outputs a motor driving signal for rotating the motor 53 in the opposite direction to that upon carrying in of the disk D at step SB03. Consequently, the motor 53 rotates reversely thereby to start carrying out of the first disk D1 accommodated in the apparatus body 2.

After step SB03, the state decision section 32 decides at step SB04 whether or not the second switch 543 is in an off state. Then, if the state decision section 32 decides that the second switch 543 is in an on state, then it waits that the second switch 543 is placed into an off state. However, if the state decision section 32 decides that the second switch 543 is in an off state, then the processing advances to step SB07.

On the other hand, if the state decision section 32 decides at step SB02 that the light receiving element 541 is in an on state, that is, the disk D accommodated in the apparatus body 2 is the second disk D2, then the driving control section 33 outputs a motor driving signal to the motor driver 545 similarly as at step SB05. Consequently, carrying out of the second disk D2 is started.

After step SB05, the state decision section 32 decides at step SB06 whether or not the first switch 542 is in an off state. Then, if the state decision section 32 decides that the first switch 542 is in an on state, then it waits that the first switch 542 is placed into an off state. On the other hand, if the state decision section 32 decides that the first switch 542 is in an off state, then the processing advances to step SB07.

Then at step SB07, the driving control section 33 outputs a motor stopping signal to the motor driver 545. Consequently, the driving of the control unit 3 stops in a state wherein the disk D is gripped by the first rollers 61L5 and 61R5 or the second rollers 61L6 and 61R6.

The carrying-out process SB by the control unit 3 ends therewith.

(13) Effects of the Embodiment

According to the disk apparatus 1 of the embodiment having such a configuration as described above, the following effects can be anticipated.

In particular, according to a first mode, if the state decision section which forms the control means decides that a disk is carried out to the outside of the housing, then the driving control section which similarly forms the control means stops the driving of the driving means in a state wherein the disk is gripped by the rollers provided on the arms. By the configuration just described, when a disk is to be carried out, dropping of the disk from the opening can be prevented.

In particular, upon carrying out of the disk D, when the state decision section 32 of the control unit 3 decides that part of the disk D is exposed to the outside of the apparatus body 2 through the opening 2A, the driving control section 33 stops the driving of the motor 53. In this state, the first disk D1 is gripped by the first rollers 61L5 and 61R5 of the front arms 61L and 61R whereas the second disk D2 is gripped by the second rollers 61L6 and 61R6 of the front arms 61L and 61R. According to the configuration, in a state wherein the disk D can be extracted, dropping of the disk D from the opening 2A can be prevented. Further, also where a cloth curtain having a cut corresponding to the opening 2A is provided on the outside of the housing including the top frame 701 and the base frame 51, dropping of the disk D from the opening 2A can be prevented without relying upon the force of friction of the cloth curtain. Consequently, even where the disk apparatus 1 is placed vertically, the disk D can be retained in the opening 2A with certainty.

Preferably, the disk apparatus according to the present first mode is configured such that any of a first disk and a second disk having a diametrical size smaller than that of the first disk is inserted and extracted as the disk through the opening and the opening is formed with a size conforming to the first disk, the distance between ends of the arms remote from the opening being set smaller than the diametrical size of the second disk, the rollers being provided for rotation at a substantially central position between the arms and the remote ends of the arms.

In particular, the first rollers 61L5 and 61R5 and the second rollers 61L6 and 61R6 for gripping and carrying the disk D are provided for rotation on the front arms 61L and 61R which serve as the pair of arms, respectively. The first rollers 61L5 and 61R5 are provided at substantially central portions of the hypotenuses of the arm bodies 61L1 and 61R1 which form the front arms 61L and 61R, that is, at substantially central portions of the front arms 61L and 61R, respectively. Meanwhile, the second rollers 61L6 and 61R6 are provided at end portions of the arm bodies 61L1 and 61R1 remote from the opening side ends, that is, at ends of the front arms 61L and 61R remote from the opening side ends.

According to the configuration described, the front arms 61L and 61R are pivoted in synchronism in a direction in which they are spaced away from each other or approach each other from a state wherein they are disposed substantially symmetrically with respect to the carrying direction of the disk D. Therefore, the disk D can be carried appropriately on a straight line along the insertion direction of the disk D from a substantially central portion of the opening 2A. Accordingly, the disk D can be carried appropriately while it is being centered.

Further, the first disk D1 inserted into the opening 2A is gripped by the first rollers 61L5 and 61R5 provided at the substantially central portions of the front arms 61L and 61R. Then, the first rollers 61L5 and 61R5 receive driving force from the motor 53 and rotate in the opposite directions to each other while the front arms 61L and 61R are pivoted away from each other to carry in the first disk D1 in the direction indicated by the arrow mark A2. Here, since the first rollers 61L5 and 61R5 grip portions of the first disk D1 in the proximity of the opposite ends perpendicular to the insertion direction (direction indicated by the arrow mark A2) of the first disk D1, the force to draw in the first disk D1 by the first rollers 61L5 and 61R5 can be increased. Therefore, such a feeling that the first disk D1 is pulled in naturally can be provided to the user.

Thereafter, the first disk D1 is passed to the front arms 61L and 61R, by which it is carried in further in the direction indicated by the arrow mark A2. Consequently, the drawing in amount of the first disk D1 can be increased.

On the other hand, upon carrying out of the first disk D1, the first disk D1 is passed from the second rollers 61L6 and 61R6 which grip the end edge of the first disk D1 to the first rollers 61L5 and 61R5 and the front arms 61L and 61R are pivoted toward each other thereby to carry out the first disk D1 to the outside of the apparatus body 2 through the opening 2A. Consequently, since the first rollers 61L5 and 61R5 which are positioned adjacent the opening 2A push out the first disk D1 toward the opening 2A, the pushing out amount and the pushing out force for the first disk D1 can be increased.

Similarly, when the second disk D2 is to be carried in, the second rollers 61L6 and 61R6 provided at the ends of the front arms 61L and 61R remote from the opening 2A grip an end edge of the second disk D2. Then, the second disk D2 is drawn into the inside of the apparatus body 2 by rotation of the second rollers 61L6 and 61R6 and pivotal motion of the front arms 61L and 61R in a direction in which they are spaced away from each other. Consequently, since the second disk D2 is carried in by the second rollers 61L6 and 61R6 positioned remotely from the opening 2A, the drawing in amount of the second disk D2 can be increased. It is to be noted that, although the drawing in force for the second disk D2 in this instance is lower than that for the first disk D1 described hereinabove, since the second disk D2 is smaller and lighter than the first disk D1, it can be drawn in sufficiently.

Also when the second disk D2 is to be carried out, since the second rollers 61L6 and 61R6 whose arrangement positions are set so that the distance therebetween is smaller than the diametrical dimension of the second disk D2 push out the second disk D2 toward the opening 2A, the pushing out force for the second disk D2 can be increased.

Accordingly, not only the disks D having different diametrical dimensions can be carried in and carried out appropriately, but also the drawing in amount and the drawing in force upon carrying in of the disk D and the pushing out amount and the pushing out force upon carrying out of the disk D can be increased. Further, since the drawing in force for the disk D can be increased, a feeling that the disk D is carried in as if it were pulled in naturally by the carrying unit 6 serving as the carrying means can be provided to the user.

Further, since the disk D is carried in to a predetermined position (for example, a position corresponding to the turntable 411 of the motor 41 serving as the rotating means) in the housing formed from the top frame 701 and the base frame 51 by pivotal motion of a pair of front arms 61L and 61R each having at least two rollers and rotation of the rollers 61L5, 61L6 and 61R5, 61R6, the necessity to provide a slider which slidably moves in the disk carrying direction in a state wherein the disk is gripped by the rollers of the arms as in the disk apparatus disclosed in the document mentioned hereinabove is eliminated. Consequently, the disk apparatus 1 can be configured in a simplified structure and operation.

Further, in the first mode described above, preferably the disk apparatus is configured such that the arms are disposed such that a straight line interconnecting the rollers provided on one of the arms and another straight line interconnecting the rollers provided on the other one of the arms intersect substantially orthogonally with each other.

In particular, the front arms 61L and 61R are disposed such that a straight line interconnecting the centers of the first roller 61L5 and the second roller 61L6 and another straight line interconnecting the centers of the first roller 61R5 and the second roller 61R6 cross perpendicularly with each other.

Here, if the intersecting angle between the straight lines interconnecting the rollers individually provided on the front arms 61L and 61R (straight line interconnecting the rollers 61L5 and 61L6 and the straight line interconnecting the rollers 61R5 and 61R6) is greater than 90°, the rollers provided on the arms and the disk D contact with each other at positions near to the opening 2A. In such an instance, since the rollers contact with end portions of the disk D on the leading end side in the insertion direction, the drawing in force when the rollers and the disk D contact with each other is reduced. Further, since, in the process of pivotal motion of the arms, the rollers and the disk D are spaced away from each other at a comparatively early stage, the drawing in amount of the disk D by the rollers is reduced.

On the other hand, where the intersecting angle described above is smaller than 90°, since the contacting positions of the rollers provided on the front arms 61L and 61R and the disk D are positioned on the interior side of the housing, although the drawing in force for the disk D by the rollers can be increased, it is necessary for the user to insert the disk D deeply into the opening 2A. Further, since the disk D and the rollers are spaced away from each other at a comparatively early stage during carrying in of the disk D, the drawing in force of the disk D by the rollers is reduced.

In contrast, according to the mode described above, since the intersecting angle described above is approximately 90°, the rollers 61L5, 61R5 and 61L6, 61R6 grip the disk D at an appropriate position. Consequently, the drawing in force when the disk D is gripped by the first rollers 61L5, 61R5 and 61L6, 61R6 can be increased.

In particular, when the disk D is inserted into the opening 2A, an end edge of the first disk D1 can be gripped by the first rollers 61L5 and 61R5 readily whereas an end edge of the second disk D2 can be gripped by the second rollers 61L6 and 61R6 readily. Besides, the first rollers 61L5 and 61R5 can grip portions of the first disk D1 in the proximity of the ends in the direction perpendicular to the insertion direction of the first disk D1. Accordingly, the drawing in force for the first disk D1 can be increased.

Further, since the amount of pivotal motion of the front arms 61L and 61R upon carrying in of the first disk D1 and the second disk D2 can be increased, the drawing in amount of the disks D1 and D2 can be increased.

Further, in the present first mode, preferably the carrying means includes a link configured to pivot one of the arms in a direction opposite to a pivoting direction of the other one of the arms in response to pivotal motion of the other one of the arms.

According to the configuration described, since the carrying unit 6 serving as the carrying means includes the link arms 62L and 62R for synchronizing pivotal motions of the front arms 61L and 61R in the directions in which they are spaced away from each other and approach each other, the disk D can be carried in a centered state with a higher degree of certainty.

Further, where such front arms 61L and 61R as described above are provided, synchronism between the front arms 61L and 61R when they pivot in the directions in which they approach each other and are spaced away from each other upon carrying of the disk D can be established readily. Besides, the amounts of pivotal motion of the front arms 61L and 61R can be set to substantially equal to each other, and consequently, the necessity to adjust the amounts of pivotal motion is eliminated. Therefore, the disk apparatus 1 can be formed in a further simplified configuration. Further, the disk D can be carried appropriately and with certainty along the insertion direction of the disk D from a substantially central portion of the opening 2A.

Further, in the present first mode, preferably the disk apparatus further includes detection means (switch) for detecting a carrying state of the disk by the carrying means, the state decision section deciding, based on the carrying state of the disk detected by the detection means, whether or not part of the disk is carried out to the outside of the housing.

According to the configuration just described, since the carrying state of the disk is detected by the detection means, completion of carrying of the disk D can be decided appropriately by the state decision section 32. Then, based on the decision, the driving control section 33 can appropriately execute stopping of driving of the motor 53 serving as the driving means in a state wherein the rollers grip the disk D.

Further, in the present first mode, preferably the disk apparatus is configured such that the detection means includes a pivoting state detection section disposed within a range of the pivotal motion of at least one of the arms and configured to detect a pivoting state of the arm, and the state decision section decides the carrying state of the disk from the pivoting state of the arm detected by the pivoting state detection section.

According to the configuration just described, since the detection means is disposed within the range of pivotal motion of the arm 61R and the pivoting state of the arm 61R is detected, the carrying state of the disk D can be detected with a high degree of accuracy.

In particular, in the present first mode, preferably the disk apparatus is configured such that the opening is formed so as to have the size conforming to the first disk, the detection means including a disk detection section configured to detect whether the disk carried by the carrying means is a first disk or a second disk having a diametrical size smaller than that of the first disk, the pivoting state detection section being provided at least at each of a position corresponding to the arm when carrying-out of the first disk is completed and a position corresponding to the arm when carrying-out of the second disk is completed, the state decision sections deciding that the first disk is carried out to the outside of the housing where the disk detection section detects the first disk and the pivoting state detection sections detect the arm at the position when carrying-out of the first disk is completed, the state decision sections deciding that the second disk is carried out to the outside of the housing where the disk detection section detects the second disk and the pivoting state detection sections detect the arms at the position when carrying-out of the second disk is completed.

Here, upon carrying in and carrying out of the disk D, while the front arms 61L and 61R are pivoted in the direction in which they are spaced away from each other and approach each other, the amounts of pivotal motion of the front arms 61L and 61R vary in accordance with the position of the disk D. In particular, the amounts of pivotal motion of the front arms 61L and 61R when the first disk D1 is carried out until part of the first disk D1 is exposed to the outside of the housing and the amounts of pivotal motion of the front arms 61L and 61R when the second disk D2 is carried out until part of the second disk D2 is exposed to the outside of the housing are different from each other.

Therefore, where the pivoting state detection sections are disposed at the positions of the front arms 61L and 61R upon completion of carrying out of the first disk D1 and the second disk D2 and the amount of pivotal motion of at least one of the front arms 61L and 61R is detected by the pivoting state detection sections, the state decision section 32 of the control unit 3 serving as the control means can grasp the position of the disk D. Accordingly, the carrying out state of the disk D can be detected with a high degree of accuracy, and consequently, the state decision section 32 can decide it accurately and with certainty whether or not part of the disk D is carried out to the outside of the housing through the opening 2A. Further, since the detection means includes the disk detection section, it can be detected accurately upon carrying out of the disk D whether the disk D to be carried out is the first disk D1 or the second disk D2.

More particularly, in the present first mode, preferably the pivoting state detection section is formed from a switch whose on/off state is changed over by pressing by the arms, and the state decision section decides the carrying state of the disk based on the on/off state of the switch.

According to such a mode as described above, since the pivoting state detection section is formed from a switch which is pushed by the arm to change over the on/off state thereof, the pivoting state detection section can be formed simply and readily and the accuracy in detection of the position of the arm can be raised. Further, since the state decision section decides the carrying state of the disk based on the on/off state of the switch, the carrying state of the disk can be decided with a high degree of accuracy.

In particular, the control board 54 serving as the detection means connected to the control unit 3 includes the first switch 542 and the second switch 543 serving as the pivoting state detection section. The first switch 542 and the second switch 543 are disposed at positions of the arm 61R upon completion of carrying out of the first disk D1 and the second disk D2, respectively, such that the contacting states of the arm 61R with the first disk D1 and the second disk D2 are canceled at the positions so that the first switch 542 and the second switch 543 are placed into an off state.

According to the configuration just described, since the state decision section 32 of the control unit 3 decides completion of carrying out of the disk D based on the position of the arm 61R detected by means the first switch 542 and the second switch 543, the completion of carrying of the disk D by the state decision section 32 can be decided appropriately.

Further, if the light receiving element 541 serving as the disk detection section on the control board 54 is in an off state upon carrying out of the disk D, then the state decision section 32 decides that the disk D is the first disk D1, but if the light receiving element 541 is in an on state, then the state decision section 32 decides that the disk D is the second disk D2 having a different diametrical dimension from that of the first disk D1. Then, when the state decision section 32 decides that the second switch 543 is placed into an off state upon carrying out of the first disk D1 and when the state decision section 32 decides that the first switch 542 is placed into an off state upon carrying out of the second disk D2, the driving control section 33 stops driving of the motor 53.

According to the configuration described, the state wherein, upon carrying out of the disk D, part of the disk D is exposed to the outside of the opening 2A and an end edge of the disk D is gripped by the second rollers 61L6 and 61R6 or the first rollers 61L5 and 61R5 can be grasped appropriately and with certainty by the state decision section 32. Accordingly, upon carrying out of the disk D, it is possible to prevent dropping of the disk D from the opening 2A with a higher degree of certainty.

Further, since, as the pivoting state detection section for detecting the pivoting state of the arm 61R, the first switch 542 and the second switch 543 which are pressed by the arm 61R are provided on the control board 54, the pivoting state of the arm 61R can be detected with a simple configuration. Accordingly, the disk apparatus 1 can be configured in a simplified configuration and the pivoting state of the arm 61R can be detected accurately.

According to a second mode of the present invention, there is provided a disk apparatus including a housing having an opening through which any of a first disk and a second disk having a diametrical size smaller than that of the first disk inserted into and extracted from the housing, carrying means for carrying the disk inserted in the opening into the housing, driving means for rotating the disk carried in the housing, information reading/recording means for performing at least one of reading and recording of information from and on the disk rotated by the driving means, the opening being formed with a size conforming to the first disk, the carrying means including a pair of arms disposed in a substantially symmetrical relationship with respect to the carrying direction of the disk in the proximity of the opposite ends of the opening such that the arms pivot around end portions thereof adjacent the opening in a first direction in synchronism with each other in a first direction in which the arms approach each other and in a second direction in which the arms are spaced away from each other, and biasing means for biasing the arms in the direction in which end portions of the arms remote from the end portions adjacent the opening approach each other, the ends of the arms adjacent the opening being disposed in the proximity of the opening, the arms individually having rollers provided thereon and configured to contact with the disk and rotate in directions opposite to each other thereby to carry the disk contacting therewith to a predetermined position, the distance between the rollers being smaller than the diametrical size of the second disk until the second disk contacts with the rollers upon carrying-in of the second disk. The arms are disposed substantially symmetrically with respect to the carrying direction of the disk and biased by the biasing means in the direction in which the end portions on which the rollers are provided approach each other.

Here, the predetermined position may be a position, for example, corresponding to the rotating means as described hereinabove.

Further, the rotating means may typically be a motor having a turntable for contacting with the disk to rotate the disk. The information reading/recording means may be a pickup which irradiates a spot of light on a rotating disk to perform reading or recording of information from or on the disk.

It is to be noted that the carrying is carrying into the housing and carrying out from the housing.

According to the second mode having such a configuration as described above, where the second disk D2 having a smaller diametrical dimension than that of the first disk D1 is inserted to a position rather near to an end portion of the opening 2A, an end edge of the second disk D2 contacts with the front arms 61L and 61R provided on one of the front arms 61L and 61R which is on the side to which the second disk D2 is inserted. Here, when the second disk D2 is carried into the housing, since the second rollers 61L6 and 61R6 apply rotating force to the second disk D2, the second disk D2 is carried such that, while it moves toward the center side of the opening 2A, it approaches the other arm side. Also in this instance, the distance between the front arms 61L and 61R is smaller than the diametrical dimension of the second disk D2, and the arm having the rollers contacting with the second disk D2 is acted upon by biasing force in the direction in which the arm approaches the other arm. Therefore, the arm having the rollers does not pivot in the second direction in which it is spaced away from the other arm until the second disk D2 is carried in by the rollers. Therefore, the second disk D2 is contacted with certainty by the second rollers 61L6 and 61R6 of the front arms 61L and 61R provided substantially symmetrically with each other, and the second disk D2 is carried in while it is centered between the front arms 61L and 61R.

Further, even if the disk D is pushed into the opening 2A by the user and the arm on the side which contacts with an end edge of the second disk D2 is pushed wide open in the direction in which it is spaced away from the other arm, since the front arms 61L and 61R are biased by the biasing means in the direction in which the ends of the arms remote from the ends adjacent the opening 2A approach each other, the arm on which the rollers are provided and the other arm are pivoted in the first direction in which they approach each other in the carrying in process by that one of the second rollers 61L6 and 61R6 which contacts with the second disk D2 inserted in the opening 2A. Therefore, the arm having the roller contacting with the second disk D2 pivots in the first direction while it pushes in the second disk D2 so as to be positioned at the center between the front arms 61L and 61R, and cooperates with the other arm to carry in the second disk D2 in such a manner that the second disk D2 are sandwiched by the rollers of the arms.

Consequently, since the distance between the second rollers 61L6 and 61R6 is not increased further than the diametrical dimension of the second disk D2 in the carrying in process of the second disk D2, the second disk D2 can be contacted with certainty with the second rollers 61L6 and 61R6 provided on the front arms 61L and 61R. Consequently, the second disk D2 can be carried into the inside of the housing by the second rollers 61L6 and 61R6.

In this manner, not only when the first disk D1 having a diametrical dimension substantially same as the dimension of the opening 2A is inserted into the opening 2A, but also when the second disk D2 having a diametrical dimension small than that of the first disk D1, the disk D can be carried in by means of the second rollers 61L6 and 61R6 provided on the front arms 61L and 61R. Consequently, the direction of movement of the center of the disk D to be carried by the carrying means can be made substantially same as the insertion direction of the disk D at the center of the opening 2A. Accordingly, the disk D can be carried into the housing appropriately and can be disposed appropriately at the position at which the driving means is provided.

In particular, the front arms 61L and 61R are disposed on the arm attachment portions 632 and 633 of the bracket 63 attached to the base frame 51 such that the ends thereof adjacent the opening 2A are spaced from each other while the ends thereof remote from the ends adjacent the opening 2A are positioned near to each other. The front arms 61L and 61R are biased by the torsion spring 621 in the direction in which they approach each other through the link arms 62L and 62R, and are pivoted in the directions in which they approach each other and are spaced away from each other in synchronism with each other by the link arms 62L and 62R, respectively.

According to the configuration described, even if the second disk D2 is inserted to a position rather near to one of the opposite ends of the opening 2A and one of the front arms 61L and 61R is pushed wide open, the front arms 61L and 61R are pivoted in a direction in which they approach each other by the biasing force of the torsion spring 621. Since the distance between the second rollers 61L6 and 61R6 in a state before the second disk D2 is carried in is smaller than the diametrical dimension of the second disk D2, upon carrying in of the second disk D2, an end edge of the second disk D2 contacts with certainty with the second rollers 61L6 and 61R6. Then, since an end edge of the second disk D2 is gripped by the second rollers 61L6 and 61R6, the second disk D2 is carried in while it is centered between the second rollers 61L6 and 61R6, and consequently, the second disk D2 can be disposed appropriately at the chucking position.

Accordingly, when the first disk D1 having a diametrical dimension substantially equal to the dimension of the opening 2A and when the second disk D2 is inserted to a substantially center of the opening 2A and besides when the second disk D2 is inserted to a position rather near to an end portion of the opening 2A, the second disk D2 can be carried into the apparatus body 2 appropriately.

In the present second mode, the disk apparatus further includes a lever member provided for pivotal motion on at least one of the arms and configured to contact with the disk inserted in the opening and bias the disk toward the other one of the arms.

According to the configuration described, when the second disk D2 is inserted to a position rather near to an end portion of the opening 2A, the lever member provided on one of the front arms 61L and 61R contacts with the second disk D2 and urges the second disk D2 so as to be moved toward the other arm. Consequently, the second disk D2 moves to a position rather near to the center between the front arms 61L and 61R from the position rather near to the end portion of the opening 2A. Therefore, the second disk D2 contacts not only with the rollers provided on the one arm but also with the rollers provided on the other arm with certainty. Consequently, the second disk D2 can be carried in by the second rollers 61L6 and 61R6. Accordingly, the disk D can be carried into the housing appropriately without depending upon the position of the disk D inserted in the opening 2A.

In particular, the lock arms 61L7 and 61R7 serving as the lever members provided for pivotal motion on the front arms 61L and 61R contact with the second disk D2 inserted at a position rather near to an end portion of the opening 2A to push out the disk D2 toward the other front arm side to center the disk D2.

Accordingly, even if the second disk D2 is inserted to a position rather near to an end portion of the opening 2A, the second disk D2 can be gripped and carried in appropriately and with certainty by means of the second rollers 61L6 and 61R6.

Further, in the present second mode, preferably the lever member is provided at a position rather near to the end of the arm, on which the lever member is provided, adjacent to the opening.

According to such a mode as described above, since the lever member is provided at a position rather near to the end of any of the front arms 61L and 61R adjacent the opening 2A, the second disk D2 inserted to a position displaced to the end of the opening 2A can be contacted with certainty with the lever member. Consequently, the second disk D2 can be pushed out to the center between the front arms 61L and 61R. Accordingly, the second disk D2 inserted to a position rather near to an end of the opening 2A can be moved to the center between the front arms 61L and 61R with a higher degree of certainty. Therefore, the second disk D2 can be contacted with the front arms 61L and 61R provided on the front arms 61L and 61R so that it can be carried in appropriately by the rollers.

In particular, the lock arms 61L and 61R are attached for pivotal motion to the arm attachment portion 61L15 of the front arm 61L and the arm attachment portion not shown of the front arm 61R, respectively, in a state wherein they are biased in a direction in which they approach the opening 2A by a torsion spring not shown.

According to the configuration just described, when the second disk D2 is inserted to a position adjacent an end portion of the opening 2A, the contacting portion 61L74 of the lock arm 61L7 and the contacting portion of the lock arm 61R7 can be contacted with certainty with an end edge of the second disk D2. Accordingly, the second disk D2 can be centered with a higher degree of certainty.

Further, according to the present second mode, preferably the housing includes a pivotal motion regulation portion configured to regulate, when the second disk is inserted to a position in the proximity of one of the ends of the opening, pivotal motion of the arm toward which the second disk is inserted in the second direction.

In this instance, preferably the lever member includes a regulation portion configured to contact with the arm to regulate the pivotal motion of the arms, and the pivotal motion regulation portion regulating the pivotal motion of the lever member, which contacts with and is pivoted by the second disk inserted to the position in the proximity of the one of the ends of the opening thereby to regulate the pivotal motion of the arm on which the lever member is mounted.

According to such a mode as described above, pivotal motion of the front arms 61L and 61R in the second direction is permitted where the disk D contacts with the second rollers 61L6 and 61R6 provided on the arms. On the other hand, where no disk D contacts with the rollers, such pivotal motion is regulated with certainty.

In particular, the range of pivotal motion of the lever members provided on the front arms 61L and 61R and configured to contact with and be pivoted by the disk D varies depending upon whether the disk D is the first disk D1 or the second disk D2 and varies, where the disk D is the second disk D2, depending upon the insertion position of the disk D into the opening 2A. Therefore, when the second disk D2 is inserted to a position rather near to an end portion of the opening 2A and the corresponding lever member contacts with and tends to be pivoted by the second disk D2, the pivotal motion regulation portion of the housing regulates the pivotal motion of the lever member. Consequently, if the disk D is inserted substantially to the center of the opening 2A and contacts with the second rollers 61L6 and 61R6, then pivotal motion of the front arms 61L and 61R in the second direction is permitted. However, if the second disk D2 is inserted to a position rather near to an end portion of the opening 2A and the second disk D2 does not contact with the second rollers 61L6 and 61R6, then pivotal motion of the front arms 61L and 61R in the second direction can be regulated by the regulation portion of that one of the lever members whose pivotal motion is regulated. Accordingly, the pivotal motion of the front arms 61L and 61R can be regulated in response to the type and the insertion position of the disk D inserted in the opening 2A. Thus, when the second disk D2 is inserted to a position rather near to an end portion of the opening 2A, pivotal motion of the front arms 61L and 61R in the second direction can be regulated with certainty.

In particular, in the present mode, the pivotal motion regulation portions 7016L1 and 7016R1 are formed on the grooves 7016L and 7016R formed on the top frame 701. When the second disk D2 is inserted to a position rather near to an end portion of the opening 2A which is adjacent the front arm 61L, the projection 61L72 of the lock arm 61L7 which contacts with and is pivoted by the second disk D2 is fitted with the pivotal motion regulation portion 7016L1. Consequently, the pivotal motion of the lock arm 61L7 in a direction in which the lock arm 61L7 is spaced away from the arm 61R is regulated. Therefore, pivotal motion of the front arm 61L in the direction in which it is spaced away from the arm 61R is regulated by the regulation portion 71L73 of the lock arm 61L7.

On the other hand, in a state wherein the first disk D1 or the second disk D2 is inserted substantially to the center of the opening 2A and the disk D1 or D2 is gripped by the second rollers 61L6 and 61R6, the projection 61L72 of the lock arm 61L7 and the projection (not shown) of the lock arm 61R7 are not fitted with the pivotal motion regulation portions 7016L1 and 7016R1. Consequently, pivotal motion of the lock arms 61L7 and 61R7 in a direction in which they are spaced away from each other is permitted.

According to the configuration described, in a state wherein the second disk D2 is inserted at a position rather near to an end portion of the opening 2A but is not gripped by the second rollers 61L6 and 61R6, the distance between the second rollers 61L6 and 61R6 can be in a state wherein it is smaller than the diametrical dimension of the second disk D2. Consequently, the second disk D2 can be gripped with certainty by the second rollers 61L6 and 61R6. Accordingly, since the second rollers 61L6 and 61R6 can grip and carry in the second disk D2, the second disk D2 can be carried in with certainty without depending upon the insertion position of the second disk D2 in the opening 2A.

In particular, the pivotal motion regulation state of the front arms 61L and 61R and hence the distance between the second rollers 61L6 and 61R6 can be adjusted in response to the type and the insertion position into the opening 2A of the disk D and the engagement state between the disk D and the second rollers 61L6 and 61R6.

It is to be noted that similar action and effects can be achieved also by the projection and the pivotal motion regulation portion 7016R1 of the arm 61R.

In the present second mode, preferably the rollers are provided at the ends of the arms remote from the opening, and different rollers having a configuration substantially same as that of the rollers are provided for rotation on the arms in a predetermined spaced relationship from the rollers.

Here, the arrangement positions of the other rollers 61L5 and 61R5 may each be a substantially central position between the end of the arm adjacent the opening which serves as an axis of pivotal motion of the arm and the end portion at which the second roller 61L6 or 61R6 is provided.

According to such a mode as described above, since a plurality of rollers are provided on each of the front arms 61L and 61R, even where the second disk D2 is inserted to a position rather near to an end portion of the opening 2A, the end edge of the second disk D2 can be contacted readily with the rollers. In particular, since the front arms 61L and 61R are disposed substantially symmetrically such that the ends thereof remote from the opening 2A approach each other, the second disk D2 inserted to a position rather near to an end portion of the opening 2A can be contacted readily with the other rollers 61L5 and 61R5 provided in a spaced relationship by a predetermined distance from the ends on the remote side. Then, when the rollers provided on the one arm rotate in the same direction, the second disk D2 is passed from the first rollers 61L5 and 61R5 which contact with the second disk D2 to the second rollers 61L6 and 61R6 provided on the interior side (leading end side in the disk carrying in direction) of the housing with respect to the first rollers 61L5 and 61R5. Consequently, the second disk D2 can be carried into the inside of the housing while it is positioned to a substantially central portion between the front arms 61L and 61R.

In particular, the first rollers 61L5 and 61R5 having a configuration similar to that of the second rollers 61L6 and 61R6 are provided at a substantially central portion of a hypotenuse of the arm bodies 61L1 and 61R1 of the front arms 61L and 61R.

According to the configuration described, when the second disk D2 is inserted to a position rather near to an end portion of the opening 2A, the first rollers 61L5 and 61R5 can grip an end edge of the second disk D2 and pass the second disk D2 to the second rollers 61L6 and 61R6. Since the second disk D2 is centered by the lock arms 61L7 and 61R7 thereupon, the end edge of the second disk D2 can be gripped by the second rollers 61L6 and 61R6. Accordingly, even when the second disk D2 is inserted to a position rather near to one of the opposite ends of the opening 2A, the second disk D2 can be carried in with a higher degree of certainty and appropriateness.

In the present second mode, preferably the arms are disposed such that a straight line interconnecting one of the rollers and one of the different roller which are provided on one of the arms and another straight line interconnecting the other one of the rollers and the other one of the different rollers which are provided on the other one of the arms intersect substantially orthogonally with each other.

Here, where the intersecting angle between the straight lines interconnecting the rollers on one of the arms and the straight line interconnecting the rollers on the other arm is greater than 90°, the disk can be contacted readily with the rollers provided on the arms as described hereinabove. However, since the disk and the rollers contact with each other at a position near to the opening, it is necessary to increase the drawing in force for the disk by the rollers. Further, since the rollers and the disk are spaced away from each other at a comparatively early stage in the process of pivotal motion of the arms, the drawing in amount of the disk by the rollers becomes small. Therefore, the disk may not be carried in appropriately to a predetermined position (for example, the engagement position between the disk and the driving means) in the housing.

On the other hand, where the intersecting angle is smaller than 90° and the rollers are provided in the proximity of the end portions of the arms remote from the ends of the opening, it is necessary to insert the disk to an increased depth and it is difficult for the disk to contact with the rollers. On the other hand, where the rollers are provided in the proximity of the ends of the arms adjacent the opening, the drawing in amount of the disk by the rollers becomes smaller similarly as in the case wherein the intersecting angle described hereinabove is greater than 90°. Consequently, the disk may not be carried in to a predetermined position in the housing appropriately.

In contrast, according the mode described hereinabove, since the intersecting angle is set approximately to 90°, an end edge of the disk can contact readily with the rollers. Further, since the rollers of the arms grip portions of the disk in the proximity of ends of the disk in a direction perpendicular to the insertion direction, the drawing force for the disk when the rollers contact with the disk can be increased. Further, an end edge of the disk is successively gripped by the rollers provided at the central portions of the arms and the rollers provided at the ends of the arms remote from the opening, and the rollers are rotated and the arms are pivoted in the second direction. Consequently, the drawing in amount of the disk can be increased, and therefore, the disk can be carried to the predetermined position in the housing. Accordingly, the disk can be carried into the housing with a higher degree of certainty and appropriateness.

In particular, the front arms 61L and 61R are disposed such that the straight line interconnecting the centers of the first roller 61L5 and the second roller 61L6 and the straight line interconnecting the first roller 61R5 and the second roller 61R6 are inclined by approximately 45° with respect to the insertion direction of the disk D (in the present embodiment, same as the carrying direction of the disk D). Consequently, the interesting angle between the straight lines is approximately 90°. According to the configuration just described, the first rollers 61L5 and 61R5 can grip portions of the first disk D1 in the proximity of the end portions in the direction perpendicular to the carrying direction of the first disk D1 and carry in the first disk D1. Meanwhile, the second rollers 61L6 and 61R6 can grip portions of the second disk D2 in the proximity of the end portions of the first disk D1 in the direction perpendicular to the carrying direction of the second disk D2 and carry in the second disk D2. Consequently, the drawing in force for the first disk D1 and the second disk D2 can be increased.

Further, the contacting locations of an end edge of the disk D and the second rollers 61L6 and 61R6 can be positioned on the inner side of the apparatus body 2 with respect to the opening 2A, and the amount of pivotal motion of the front arms 61L and 61R can be increased. Accordingly, the drawing in amount of the disk D can be increased and the disk D can be carried with certainty into the inside of the apparatus body 2.

In the present second mode, preferably the carrying means includes a link configured to pivot one of the arms in a direction opposite to a pivoting direction of the other one of the arms in response to pivotal motion of the other one of the arms.

According to such a mode as described above, not only synchronism when the arms are pivoted in the directions in which they are moved toward and away from each other can be established readily through the link as described hereinabove, but also the amounts of pivotal motion of the arms can be set substantially equal to each other. Accordingly, since the arms can be pivoted with substantially equal amounts of pivotal motion in synchronism with each other, the disk can be carried appropriately with certainty along the insertion direction of the disk from a substantially central portion of the opening.

In particular, the carrying unit 6 includes the link arms 62L and 62R for synchronizing the pivotal motions of the front arms 61L and 61R with each other. According to the configuration just described the disk D can be carried in a centered state with a higher degree of certainty. Further, where such link arms 62L and 62R as described above are provided, there is no necessity to adjust the amounts of pivotal motion of the front arms 61L and 61R upon carrying in of the disk D. Consequently, the disk apparatus 1 can be formed with a simpler configuration.

According to a third mode of the present invention, there is provided a disk apparatus for reproducing information recorded on a disk accommodated therein and writing information on the disk, including a housing on which an opening which has a shape conforming to the disk and through which the disk is inserted into the housing is formed, and carrying means for performing carrying-in of the disk inserted in the opening into the housing and carrying-out of the disk to the outside of the housing, the housing including a lid member for closing up the opening and opening means for moving, upon carrying out of the disk by the carrying means, the lid member to open the opening.

According to such a present third mode as just described, since the opening formed in the housing of the disk apparatus is closed up with the lid member, admission of dust and so forth into the inside of the housing can be prevented. Then, when the carrying means is to carry out the disk to the outside of the housing through the opening, the opening means moves the lid member to open the opening. Therefore, the lid member for closing up the opening can be prevented from obstructing carrying out of the disk.

In particular, the opening 2A composed of the concave portion 631 formed on the bracket 63 of the carrying unit 6 as the carrying means which composes the apparatus body 2 of the disk apparatus 1 and the concave portion 7013 formed on the top frame 701 is closed up with the shutter 702 serving as the lid member attached for pivotal motion to the top frame 701. Then, upon insertion of a disk D, the shutter 702 is pushed and pivoted to the inner side of the housing by the disk D to open the opening thereby to permit insertion of the disk D into the inside of the housing. Further, when the slide cam 56R pivots the shutter lever 58 serving as the opening means, the shutter 702 is pushed up by the pressing portion 5861 of the shutter lever 58. Consequently, upon carrying out of the disk D, the opening 2A can be opened.

Accordingly, the open/closed state of the opening 2A formed on the housing can be changed over as occasion demands by means of the shutter 702 and the shutter lever 58, and except upon insertion and carrying out of the disk D, the opening can normally be kept closed. Consequently, admission of dust into the inside of the apparatus body 2 through the opening 2A can be suppressed by the simple configuration.

Further, in the present third mode, preferably the lid member is supported for pivotal motion on the inner side of the housing, and biasing means for biasing the lid member in a direction in which the lid member closes up the opening is provided for the lid member.

In particular, the shutter 702 is supported for pivotal motion on the shutter attachment portion 7014 formed on the inner side of the top frame 701 and is normally biased in a direction in which it closes up the opening 2A by the torsion spring 7025 serving as the biasing means.

According to the configuration just described, when a disk D is inserted into the opening 2A, the shutter 702 is pushed to pivot to the inner side by an end edge of the disk D, and consequently, the opening 2A can be opened. On the other hand, when the disk D is to be carried out, since the shutter 702 is pivoted to the inner side by the shutter lever 58, the opening 2A can be opened. In any other case, the shutter 702 can close up the opening 2A under the biasing force of the torsion spring 7025. Accordingly, although the shutter 702 opens the opening 2A as occasion demands, admission of dust and so forth into the apparatus body 2 can be prevented.

In the present third mode, preferably the disk apparatus further includes insertion preventing means for preventing, after a disk is inserted into the housing by the carrying means, a different disk into the opening.

According to such a configuration as just described, after a disk inserted through the opening is carried into the inside of the housing by the carrying means, if it is tried to insert a different disk into the opening, then the insertion preventing means prevents the insertion of the different disk into the opening. Consequently, the different disk can be prevented from being inserted into the inside of the housing, and consequently, otherwise possible damage to the disk carried in the inside of the housing and the different disk to be inserted newly can be prevented and also damage to various components and so forth provided in the housing can be prevented. As a result, malfunction of the disk apparatus can be prevented. Accordingly, damage to the disks and the disk apparatus and malfunctioning and so forth of the disk apparatus can be prevented.

Further, in the present third mode, preferably the insertion preventing means includes a slide member configured to slidably move along a bottom face of the housing, and a first lever provided for pivotal motion in the housing and configured to contact with and be rotated by the slide member upon sliding movement of the slide member to close up the opening.

According to such a mode as just described, when a disk D is already accommodated in the inside of the housing, if the slide member is slidably moved, then the first lever is pivoted to close up the opening 2A. Consequently, when a disk D is accommodated or a different disk D is inserted newly, if the slide member is slidably moved, then insertion of the different disk D can be prevented with certainty by the first lever. Accordingly, where a disk D is already accommodated in the inside of the housing, insertion of a different disk D can be prevented with certainty.

Further, in the present third mode, preferably the disk apparatus further includes two cam members configured to slidably move in the opposite directions to each other along a direction along which the disk is carried when the disk is carried by the carrying means, the insertion preventing means including a connection member configured to connect the slide member and one of the two cam members to each other such that the slide member is slidably moved in response to sliding movement of the cam member.

According to such a configuration as just described, when a disk D is carried by the carrying means, that is, when a disk D is carried in or carried out, operation of the slide cams 56L and 56R as the cam members which slidably move in the opposite directions and insertion regulation of another disk D by the insertion regulation means can be interlocked with each other.

In particular, when a disk D inserted in the opening 2A is to be carried in by the carrying means, in response to sliding movement of one of the two cam members, that one of the slide members which is connected through the corresponding connection member to the cam member slidably moves so that the opening 2A is closed up with the first lever. Consequently, insertion of a different disk D into the opening 2A can be prevented.

On the other hand, when the disk D accommodated in the inside of the housing is to be carried out to the outside of the housing by the carrying means, the slide member pivots in response to sliding movement of the cam member in the reverse direction to pivot the first lever in the direction opposite to the direction in which the opening 2A is closed up. Consequently, the first lever is placed out of the position on the carrying path of the disk D by the carrying means. Therefore, carrying out of the disk D by the carrying means is not obstructed.

Accordingly, the insertion regulation state of the different disk D by the insertion regulation means can be changed over in response to carrying in and carrying out of the disk D.

In the present third mode, preferably the opening means is a second lever supported for pivotal motion in the housing and configured to engage with and be pivoted by the other one of the two cam members upon carrying out of the disk by the carrying means to move the lid member in the direction in which the opening is opened.

According to such a configuration as just described, the other cam member different from the one cam member which slidably moves the slide member of the insertion regulation means from between the cam members which slidably move in response to carrying in and carrying out of the disk D is engaged with the second lever serving as the opening means upon carrying out of the disk D. Then, the second lever is pivoted through engagement between the second cam member and the second lever to move the lid member in a direction in which the second lever opens the opening 2A. Consequently, the opening 2A can be opened with certainty upon carrying out of the disk D. Further, since the opening means is formed from the second lever, the configuration of the disk apparatus 1 can be simplified and the movement of the lid member and the opening movement of the opening 2A upon carrying out of the disk can be performed with certainty. Accordingly, opening movement of the opening 2A upon carrying out of a disk can be performed with certainty with a simple configuration.

In particular, in the present third mode, the insertion preventing mechanism 57 is provided on the base frame 51. The insertion preventing mechanism 57 includes the lock slider 572 serving as the slide member, and the lock lever 573 serving as the first lever. If the lock slider 572 moves in the direction indicated by the arrow mark C3, then the lock lever 573 pivots in the direction indicated by the arrow mark C5 and projects through the openings 6345 and 6346. As a result, the opening 2A is closed up and insertion of a different disk D is prevented. On the other hand, if the lock slider 572 slidably moves in the direction indicated by the arrow mark C4, then the lock lever 573 pivots in the direction indicated by the arrow mark C6 until the lock lever 573 and the lock slider 572 come to extend substantially in parallel to each other. As a result, the opening 2A is opened, and not only carrying out of the disk D accommodated in the apparatus body 2 is permitted but also insertion of another disk D is permitted.

Accordingly, where a disk D is accommodated in the apparatus body 2, insertion of another disk D can be prevented. Consequently, damage to the disks D and internal components of the apparatus body 2 can be prevented. Further, since the control board 54 does not detect a different disk D, the carrying unit 6 is not driven, and consequently, malfunctioning of the apparatus body 2 can be prevented.

Further, the insertion preventing mechanism 57 includes the slide cam 56L serving as one of the cam members and the swing arm 571 serving as the connection member connected to the lock slider 572. Then, when the slide cam 56L moves in the direction indicated by the arrow mark A1 or A2 upon carrying of the disk D, the swing arm 571 pivots in the direction indicated by the arrow mark C1 or C2 to slidably move the lock slider 572 in the direction indicated by the arrow mark C3 or C4. Consequently, the lock slider 572 can be slidably moved in the direction indicated by the arrow mark C3 or C4 through the swing arm 571 in response to the slide cams 56L and 56R upon carrying in and carrying out of the disk D, and consequently, the projecting or retreating state of the lock lever 573 into the carrying path for the disk D can be changed over. Accordingly, the insertion prevention state of a different disk D can be changed over in response to carrying in or carrying out of the disk D.

Further, since the opening means for opening the shutter 702 serving as the lid member is formed from the shutter lever 58 serving as the second lever which contacts with the slide cam 56R as the second cam member upon carrying out of the disk D and pivots in response to the sliding movement of the slide cam 56R in the direction indicated by the arrow mark A1, the opening means can be configured simply and readily. Consequently, the opening 2A can be opened with certainty by means of the slide cam 56R which slidably moves upon carrying out of the disk D.

Further, in the present third mode, preferably the carrying means includes two arms individually supporting a plurality of rollers configured to grip an end edge of the disk to carry the disk, a support member secured in the housing and supporting the two arms for pivotal motion, and a link supported on the support member and configured to pivot the two arms in synchronism with each other in directions in which the two arms move toward and away from each other, one of the two arms moving the opening means in the direction opposite to the direction in which the lid member is opened upon carrying out of the disk by the carrying means.

According to such a configuration as just described, the arm 61R from between the two front arms 61L and 61R which configurate a part of the carrying means and pivot in a direction in which they move toward each other upon carrying out of the disk D moves the opening means in the direction opposite to the direction in which the lid member is opened. Consequently, when carrying out of the disk D is started, movement of the lid member and opening of the opening 2A by the opening means are performed. Then, when the carrying out of the disk D ends, the arm 61R moves the opening means in the opposite direction to close up the opening 2A. Therefore, opening and closing up of the opening 2A can be performed in response to the carrying out operation of the disk D by the carrying means. Accordingly, when the carrying out of the disk D ends, the opening 2A can be prevented from being left in an open state, and consequently, admission of dust into the housing can be prevented with a higher degree of certainty.

More particularly, the projection 61R19 formed on the arm 61R pivots the shutter lever 58, which pivots in the direction (direction indicated by the arrow mark E1) in which the shutter 702 is pushed up, in the opposite direction (direction indicated by the arrow mark E2) to the direction (direction indicated by the arrow mark E1) thereby to cancel the engagement between the pressing portion 5861 of the shutter lever 58 and the contacting portion 7024 of the shutter 702. Then, when the disk D carried out through the opening 2A is removed, the shutter 702 closes up the opening 2A under the biasing force of the torsion spring 7025. Accordingly, admission of dust and so forth into the inside of the apparatus body 2 through the opening 2A can be prevented with a higher degree of certainty.

2. Second Embodiment

In the following, a disk apparatus according to a second embodiment of the present invention is described.

The disk apparatus of the present embodiment has a configuration similar to that of the disk apparatus 1 described hereinabove but is different from the disk apparatus 1 in the driving stopping timing of the motor 53 upon carrying-out of a disk D.

Figure 77:
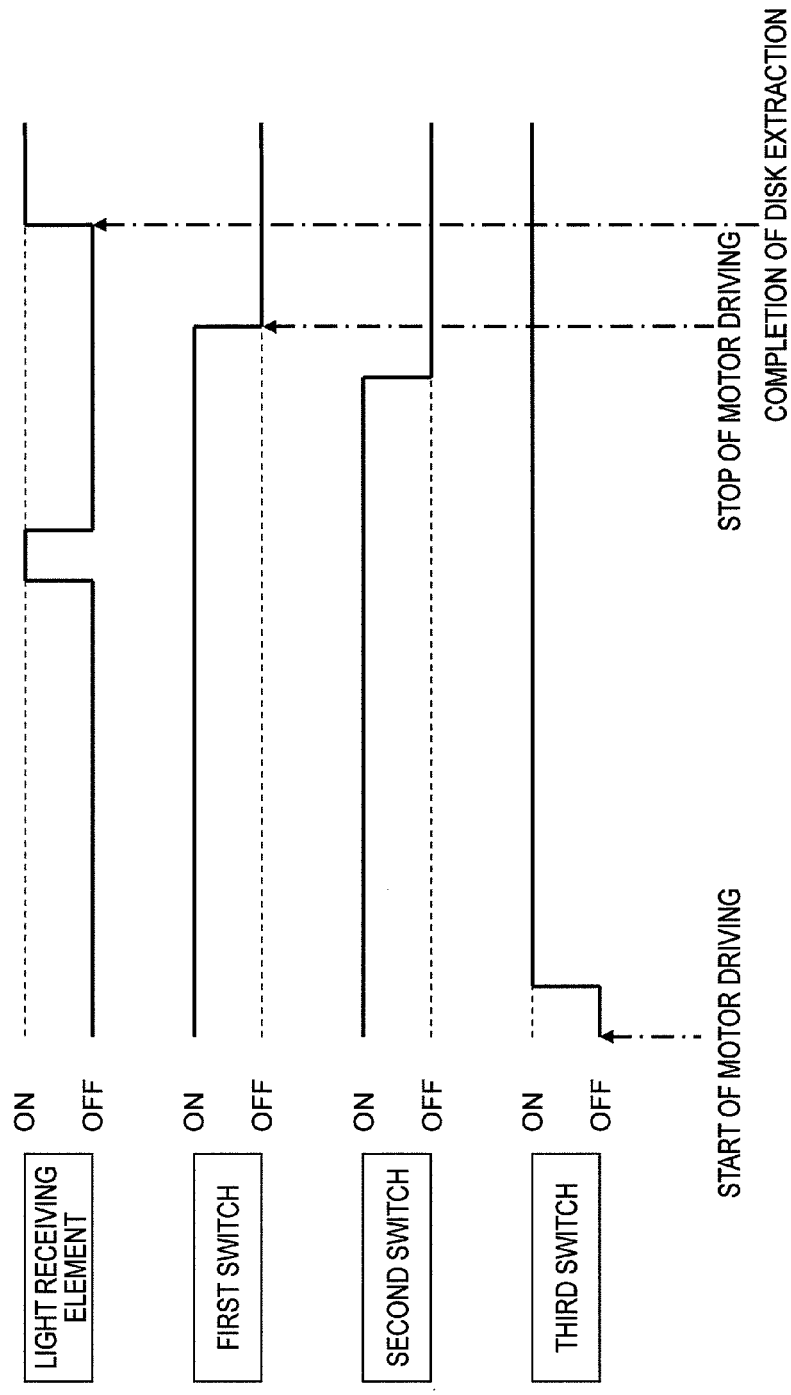
FIG. 77 is a time chart illustrating on/off states of a light reception section and first, second and third switches upon carrying-out of a first disk in a disk apparatus according to a second embodiment of the present invention.
Figure 78:
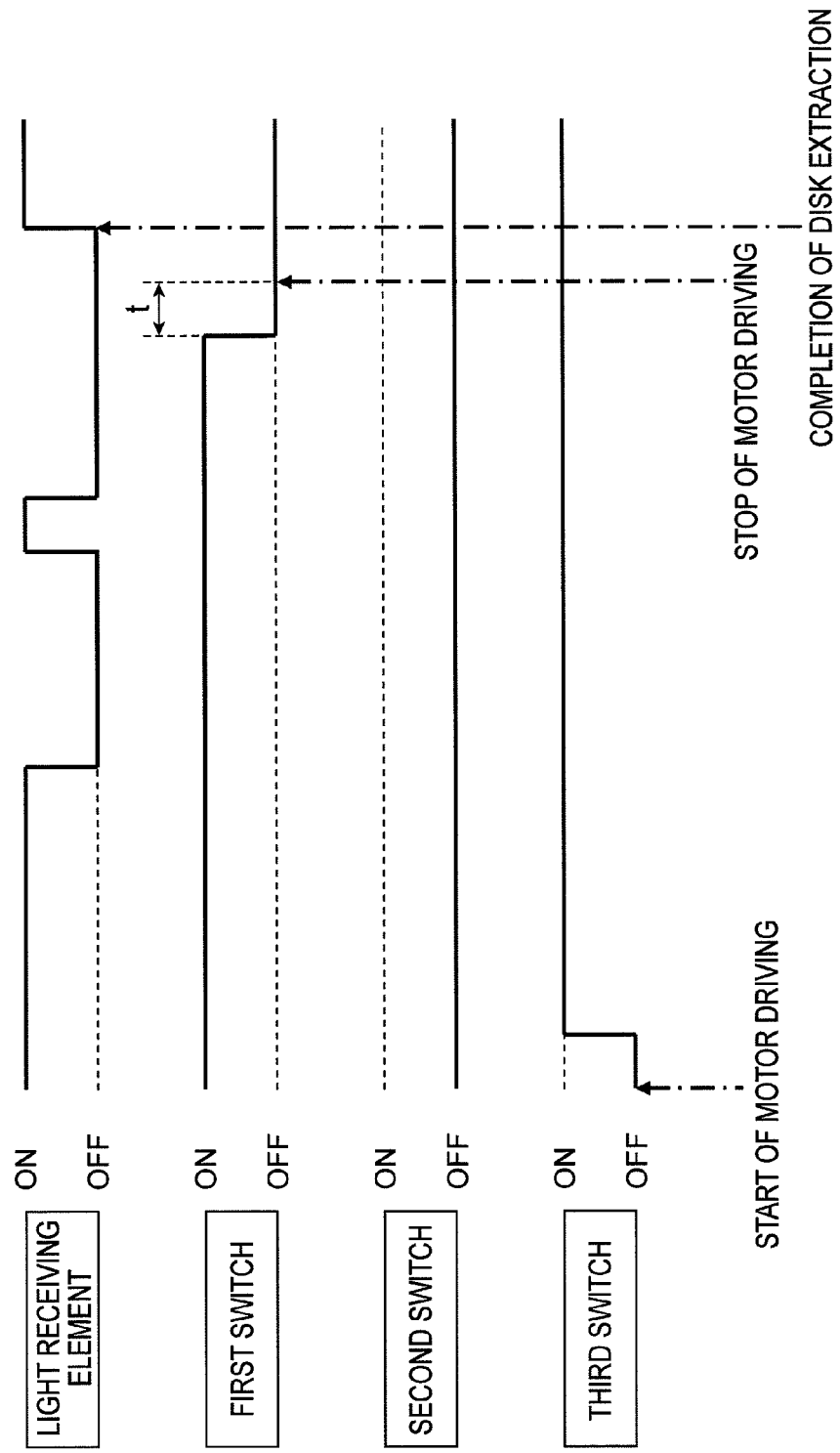
FIG. 78 is a similar view but illustrating on/off states of the light reception section and first, second and third switches upon carrying-out of a second disk in the disk apparatus according to the second embodiment of the present invention.

FIGS. 77 and 78 illustrate on/off states of the light reception section 541 and the switches 542 to 544 upon carrying out of the first disk D1 and the second disk D2 in the disk apparatus of the present embodiment, respectively.

In the disk apparatus of the present embodiment, the first switch 542 is disposed in a corresponding relationship to the position (completion position) of the front arm 62 upon completion of carrying-out of the first disk D1.

Meanwhile, the second switch 543 is provided at a position at which it contacts with the front arm 62 upon carrying-in of the first disk D1, but does not contact with the front arm 62 upon carrying-in of the second disk D2. Therefore, upon carrying-out of the first disk D1, the second switch 543 changes over from an on state to an off state when the amount of pivotal motion of the front arm 62 reaches a predetermined amount as seen in FIG. 77. However, upon carrying-out of the second disk D2, the second switch 543 remains in the off state as seen in FIG. 78. Therefore, in the disk apparatus of the present embodiment, the first switch 542 corresponds to the pivotal motion detection section, and the second switch 543 corresponds to the disk detection section.

Figure 79:
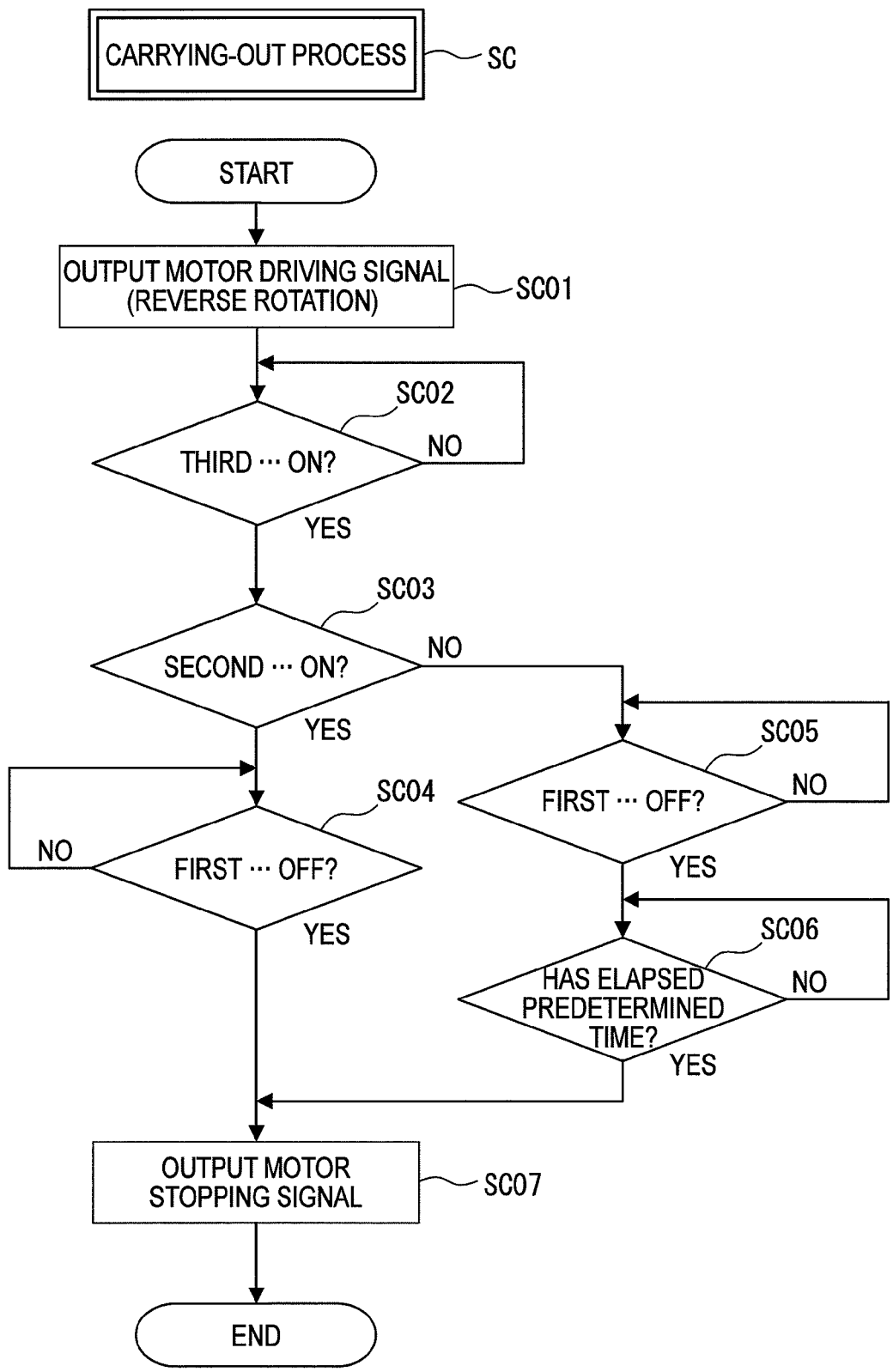
FIG. 79 is a flow chart illustrating a processing flow of a carrying-out process of the disk apparatus according to the second embodiment of the present invention.

FIG. 79 illustrates a processing flow of a carrying-out process SC which is executed by the control unit 3 of the disk apparatus of the present embodiment.

Referring to FIG. 79, in the carrying-out process SC for carrying out a disk D in the disk apparatus 2, the driving control section 33 of the control unit 3 outputs a motor driving signal for rotating the motor 53 in the opposite direction to that upon carrying-in of a disk D to the motor driver 545 first at step SC01. Thereafter, the state decision section 32 decides at step SC02 whether or not the third switch 544 is in an on state. If the state decision section 32 decides that the third switch 544 is not in an on state, then it monitors the third switch 544 until the third switch 544 changes over to an on state.

Then, if the state decision section 32 decides that the third switch 544 is in an on state, then it further decides at step SC03 whether or not the second switch 543 is in an on state. In this instance, if the state decision section 32 decides that the second switch 543 is in an on state, then it determines that the disk D being carried out is the first disk D1 and decides whether or not the first switch 542 is in an off state at step SC04. If the state decision section 32 decides here that the first switch 542 is not in an off state, then it monitors the first switch 542 until after the first switch 542 changes over to an off state. Then, after the first switch 542 changes over to an off state, the control unit 3 advances its processing to step SC07.

On the other hand, if the state decision section 32 decides at step SC03 that the second switch 543 is not in an on state, then it determines that the disk D being carried out is the second disk D2 and decides whether or not the first switch 542 is in an off state at step SC05. Then, the state decision section 32 monitors the first switch 542 until after the first switch 542 changes over to an off state. Then, after the first switch 542 changes over to an off state, the state decision section 32 decides at step SC06 whether or not the elapsed time after the first switch 542 changes over to an off state reaches predetermined time t which is, for example, 200 msec. Here, the state decision section 32 monitors the elapsed time until after the elapsed time reaches the predetermined time t. Then, when the elapsed time reaches the predetermined time t, the control unit 3 advances the processing to step SC07.

Then at step SC07, the driving control section 33 outputs a motor stopping signal to the motor driver 545 to stop the driving of the motor 53. The carrying-out process SC is completed thereby.

With the disk apparatus of the present embodiment described above, similar effects to those of the disk apparatus 1 described hereinabove can be anticipated.

(14) Modifications to the Embodiment

Although the best mode for carrying out the invention is disclosed above, the present invention is not limited to the best mode described above. In particular, the description which defines the shapes, materials and so forth in the disclosure above is for illustrative purpose only for facilitating understandings of the present invention but is not restrictive to the present invention. Therefore, description under the names of the members from which part or all of restrictions to the shape, material and so forth is all included in the present invention.

In the embodiment described above according to the first mode of the present invention, the carrying unit 6 includes the link arms 62L and 62R for synchronizing the pivotal motions of the front arms 61L and 61R with each other. However, according to the present invention, the configuration for synchronizing the front arms 61L and 61R is not limited to this, and any other configuration may be adopted to synchronize the pivotal motions of the front arms 61L and 61R with each other.

In the embodiment described above according to the first mode of the present invention, in order to decide whether the disk D to be carried out upon carrying out of the disk D is the first disk D1 or the second disk D2, the state decision section 32 detects whether or not light emitted from the light emitting element of the photo-sensor 703 is received by the light receiving element 541 of the control board 54. However, according to the present invention, the decision is not limited to this. In particular, for example, information of whether the disk D to be accommodated into the apparatus body 2 is the first disk D1 or the second disk D2 may be detected and stored through a transition history of on/off states of the first switch 542 and the second switch 543 upon carrying in of the disk D. Or, whether the disk D is the first disk D1 or the second disk D2 may be decided from a period of time required for carrying in of the disk D, and information of a result of the decision may be stored.

In the embodiment described above according to the first mode of the present invention, the disk detection section is formed from light receiving element 541 which receives light emitted from the light emitting element of the photo-sensor 703. However, according to the present invention, the disk detection section is not limited to this, but it may be formed otherwise, for example, from a switch which is pressed by the disk D to change its on/off state.

In the embodiment described above according to the first mode of the present invention, the state decision section 32 decides whether or not carrying out of a disk D is completed from a transition history of on/off states of the first switch 542 and the second switch 543 upon carrying out of the disk D. However, according to the present invention, the decision is not limited to this. In particular, for example, it may be decided based on the time required for carrying out of the disk D to be carried out whether or not the carrying out of the disk D is completed. In such an instance as just described, when the disk D passes through the hole DC upon carrying out of the disk D, the light receiving element 541 of the control board 54 is placed into an on state. Thus, whether or not carrying out of the disk D is completed may be decided based on the period of time elapsed after the light receiving element 541 is changed over to an on state in this manner, or may be decided based on the other information.

In the embodiment described above according to the first mode of the present invention, each of the first switch 542 and the second switch 543 serving as the pivoting state detection section is formed from a push switch. However, according to the present invention, the pivoting state detection section is not limited to this, but, for example, a photo-sensor or the like may be used for the pivoting state detection section.

Further, in the embodiment described above according to the first mode of the present invention, the first switch 542 and the second switch 543 are provided at a position at which they are pressed by the arm 61R. However, according to the present invention, the position is not limited to this, but the first switch 542 and the second switch 543 may be provided at another position at which they are pressed by the front arm 61L.

In the embodiment described above according to the first mode of the present invention, in order that any of the first disk D1 and the second disk D2 may not drop from the opening 2A when it is carried out, driving of the motor 53 is stopped in a state wherein the disk D is gripped by the first rollers 61L5 and 61R5 or the second rollers 61L6 and 61R6. However, according to the present invention, the stopping of driving of the motor 53 is not limited to this. In particular, driving of the motor 53 may be stopped in a state wherein, when any of the first disk D1 and the second disk D2 is to be carried out, it is gripped by the rollers 61L5 and 61R5 or 61L6 and 61R6. Further, where the disk apparatus has an opening formed in accordance with the dimension of the second disk D2, driving of the motor upon carrying out of the second disk D2 may be stopped while the second disk D2 remains gripped by the rollers.

In the embodiment described above according to the second mode of the present invention, the lock arms 61L7 and 61R7 each serving as the lever member are provided on the front arms 61L and 61R, respectively. However, according to the present invention, the lever member is not limited to this but may be provided at least one of the front arms 61L and 61R. Further, the lock arms 61L7 and 61R7 may be attached for pivotal motion not to the front arms 61L and 61R but to any of the bracket 63, base frame 51 and top frame 701. In other words, the lock arms 61L7 and 61R7 may be provided at a position at which they contact with the second disk D2 inserted to a position rather near to an end portion of the opening 2A and move the second disk D2 to a substantially central portion between the front arms 61L and 61R.

In the embodiment described above according to the first and second modes of the present invention, the first rollers 61L5 and 61R5 are provided at a substantially central portion of a hypotenuse portion of the arm bodies 61L1 and 61R1 of the front arms 61L and 61R while the second rollers 61L6 and 61R6 are provided at end portions of the arm bodies 61L1 and 61R1 remote from the opening 2A. However, the arrangement of the first rollers 61L5 and 61R5 and the second rollers 61L6 and 61R6 is not limited to this. For example, the first rollers 61L5 and 61R5 may be disposed in the proximity of end portions of the hypotenuse portion of the arm bodies 61L1 and 61R1 adjacent the opening 2A. In other words, the arrangement positions of the first rollers 61L5 and 61R5 and the second rollers 61L6 and 61R6 and the number of such rollers may be set suitably depending upon the size of the front arms 61L and 61R, the drawing in amount and the pushing out amount of the disk D and so forth.

In the embodiment described above according to the first and second modes of the present invention, the front arms 61L and 61R are disposed such that the straight line interconnecting the centers of the first roller 61L5 and the second roller 61L6 and the straight line interconnecting the first roller 61R5 and the second roller 61R6 are inclined by approximately 45° with respect to the insertion direction of the disk D into the opening 2A and consequently the interesting angle between the straight lines is approximately 90°. However, according to the present invention, the arrangement of the front arms 61L and 61R is not limited to this. In other words, the arrangement positions of the first rollers 61L5 and 61R5 and the second rollers 61L6 and 61R6 of the front arms 61L and 61R may be set suitably depending upon the size of the front arms 61L and 61R, the drawing in amount and the pushing out amount of the disk D and so forth.

In the embodiment described above according to the second mode of the present invention, the first disk D1 having a diametrical dimension of 12 cm and the second disk D2 having another diametrical dimension of 8 cm are used as the disks having diametrical dimensions different from each other. However, according to the present invention, the disks having different diametrical dimensions are not limited to them. In particular, the present invention can be applied to a disk apparatus which has an opening through which disks having different diametrical dimensions can be inserted and carries the disk inserted into the opening to the inside of the apparatus, and the diametrical dimension of the disks to be inserted into the disk apparatus may be set suitably.

In the embodiment described above according to the third mode of the present invention, the torsion spring 7025 is used as the biasing means for biasing the shutter 702 in a direction in which the opening 2A is closed. However, according to the present invention, the biasing means is not limited to this, but, for example, a leaf spring, a tension spring, a compression spring or the like may be adopted. Further, not a spring but any other member which has elasticity may be used to apply biasing force to the shutter 702.

In the embodiment described above according to the third mode of the present invention, the shutter 702 is supported for pivotal motion on the shutter attachment portion 7014 formed on the inner side of the top frame 701 which forms the apparatus body 2. However, according to the present invention, the attachment of the shutter 702 is not limited to this, but the shutter attachment portion 7014 may be attached for pivotal motion otherwise on the bracket 63 side which has the concave portion 631 which defines the lower end of the opening 2A. Or, the shutter 702 may be provided on an outer face of the top frame 701 and base frame 51.

In the embodiment described above according to the third mode of the present invention, the lock slider 572 which forms the insertion preventing mechanism 57 slidably moves in the direction (direction indicated by the arrow mark C3 or C4) perpendicular to the carrying direction (direction indicated by the arrow mark A1 or A2) of the disk D when the apparatus body 2 is viewed in plan. However, according to the present invention, the direction of the sliding movement of the lock slider 572 is not limited to this, but the lock slider 572 may slidably move along the carrying direction of the disk D. For example, the lock lever 573 may be attached to the base frame 51 for sliding movement along the carrying direction of the disk D and for pivotal motion around an end portion thereof remote from the opening 2A. Where the lock lever 573 is attached in this manner, if the lock slider 572 is slidably moved in the direction indicated by the arrow mark A2, then the lock lever 573 may be pivoted to an upright position at which it blocks the carrying path for the disk D, but if the lock slider 572 is slidably moved in the direction indicated by the arrow mark A1, then the lock lever 573 is pivoted down to secure the carrying path for the disk D.

In the embodiment described above according to the third mode of the present invention, the insertion preventing mechanism 57 includes the swing arm 571 which serves as the connection member for connecting the slide cam 56L and the lock slider 572 to each other. However, according to the present invention, the insertion preventing mechanism 57 is not limited to this. For example, the lock slider 572 may be slidably moved in the direction indicated by the arrow mark C3 or C4 by a motor or the like. In this instance, the lock lever 573 may be configured such that, when chucking of the disk D by the turntable 411 of the optical unit 4 and the chuck pulley 710 is completed, the motor is rotated in one direction to slidably move the lock slider 572 in the direction indicated by the arrow mark C3 to cause the lock lever 573 to project, but when the chucking is canceled, the motor is rotated in the opposite direction to slidably move the lock slider 572 in the direction indicated by the arrow mark C4 to cause the lock lever 573 to retreat thereby to achieve projection and retraction of the lock lever 573. In this instance, similarly as in the case of the insertion preventing mechanism 57 described hereinabove, the lock lever 573 can be projected and retracted in response to carrying in and carrying out of the disk D, and insertion of a different disk D can be prevented thereby.

In the embodiment described above according to the third mode of the present invention, upon carrying out of the disk D, the projection 61R19 formed on the arm 61R of the carrying unit 6 contacts with the inclined portion 587 formed on the shutter lever 58 to pivot the shutter lever 58 in a direction opposite to the direction (direction indicated by the arrow mark E2) in which the shutter 702 is pushed up (direction indicated by the arrow mark E1). However, according to the present invention, the configuration for pivotally moving the shutter lever 58 is not limited to this. For example, a portion of the tapering portion 56R211 of the slide cam 56R on the side in the direction indicated by the arrow mark A2 is formed in a tapering fashion such that, after the shutter lever 58 pushes up the shutter 702, it is pivoted in the direction indicated by the arrow mark E naturally by the tapering portion.

It should be understood by those skilled in the art that various modifications, combinations, sub-combinations and alterations may occur depending on design requirements and other factor in so far as they are within the scope of the appended claims or the equivalents thereof.

What is claimed is:

1. A disk apparatus, comprising:
    a housing on which an opening through which a disk is inserted into and extracted from the housing is formed;
    a carrying unit that performs carrying-in of the disk into the housing and carrying-out of the disk to the outside of the housing;
    a driving unit that drives the carrying unit;
    a rotating unit that rotates the disk inserted in the housing;
    an information reading/recording unit that performs at least one of reading and recording of information from and on the disk rotated by said the rotating unit; and
    a control unit that controls the entire apparatus;
    the carrying unit including a pair of arms disposed in a substantially symmetrical relationship with respect to the carrying direction of the disk in the proximity of the ends of the opening such that the arms pivot around end portions thereof adjacent to the opening in synchronism with each other in directions toward and away from each other;
    each of the pair of arms having rollers that grip the disk to a predetermined position, the rollers including a first roller being provided substantially at a center of the each of the pair of arms and a second roller provided at an end of each of the pair of arms remote from the opening,
    the rollers provided on at least one of the pair of arms being driven by the driving unit to be rotated to carry the gripped disk to a predetermined position;
    the control unit including:
    a state decision section configured to decide a carrying state of the disk by the carrying unit; and
    a driving control section configured to stop, if it is decided by the state decision section that a part of the disk is carried out to the outside of the housing through the opening, the driving of the driving unit in a state wherein either the first rollers or the second rollers grip the disk.

2. The disk apparatus according to claim 1, wherein
    any of a first disk and a second disk having a diametrical size smaller than that of the first disk is inserted and extracted as the disk through the opening and the opening is formed with a size conforming to the first disk;
    the distance between ends of the arms remote from the opening being set smaller than the diametrical size of the second disk; and
    at least one of the first rollers and at least one of the second rollers being rotated by the driving unit rollers being provided for rotation at a substantially central position between the arms and the remote ends of the arms.

3. The disk apparatus according to claim 1, wherein the arms are disposed such that a straight line interconnecting the first and second rollers provided on one of the arms and another straight line interconnecting the first and second rollers provided on the other one of the arms intersect substantially orthogonally with each other.

4. The disk apparatus according to claim 1, wherein the carrying unit includes a link configured to pivot one of the arms in a direction opposite to a pivoting direction of the other one of the arms in response to pivotal motion of the other one of the arms.

5. The disk apparatus according to claim 1, further comprising a detector that detects a carrying state of the disk by the carrying unit;
the state decision section deciding, based on the carrying state of the disk detected by the detector, whether or not part of the disk is carried out to the outside of the housing.

6. The disk apparatus according to claim 5, wherein the detector includes a pivoting state detection section disposed within a range of the pivotal motion of at least one of the arms and configured to detect a pivoting state of the arm, and
the state decision section decides the carrying state of the disk from the pivoting state of the arm detected by the pivoting state detection section.

7. The disk apparatus according to claim 6, wherein the disk includes a first disk and a second disk having a diametrical size smaller than that of the first disk;
the opening is formed so as to have the size conforming to the first disk;
the detector includes a disk detection section configured to detect whether the disk carried by the carrying unit is a first disk or a second disk having a diametrical size smaller than that of the first disk;
the pivoting state detection section is provided at least at a completion position corresponding to the arm upon completion of carrying-out of the first disk;
the state decision section decides that the first disk is carried out to the outside of the housing where the first disk is detected by the disk detection section and it is detected by the pivoting state detection section that the arm is positioned at the completion position; and
the state decision section decides that the second disk is carried out to the outside of the housing where the second disk is detected by the disk detection section and a predetermined interval of time elapses after it is detected by the pivoting state detection section that the arm is positioned at the completion position.

8. The disk apparatus according to claim 6, wherein the pivoting state detection section is formed from a switch whose on/off state is changed over by being pressed by the arms when the arms pivot, and
the state decision section decides the carrying state of the disk based on the on/off state of the switch.

9. The disk apparatus according to claim 1, wherein any of a first disk and a second disk having a diametrical size smaller than that of the first disk is inserted and extracted as the disk through the opening and the opening is formed with a size conforming to the first disk;
the carrying unit includes a spring for biasing the arms so that ends of the arms remote from the opening in a direction in which the ends approach each other;
the ends of the arms adjacent the opening are disposed in the proximity of the opening; and
the distance between the second rollers provided on each of the pair of arms is smaller than the diametrical size of the second disk until the second disk contacts with the second rollers upon carrying-in of the second disk.

10. The disk apparatus according to claim 9, further comprising a lever member provided for pivotal motion on at least one of the arms and configured to contact with the disk inserted in the opening and bias the disk toward the other one of the arms.

11. The disk apparatus according to claim 10, wherein the lever member is provided at a position near to the end of the arm, on which the lever member is provided, adjacent to the opening.

12. The disk apparatus according to claim 10, wherein the housing includes a pivotal motion regulation portion configured to regulate, when the second disk is inserted to a position in the proximity of one of the ends of the opening, pivotal motion of the arm toward which the second disk is inserted in a direction receding from the other arm side.

13. The disk apparatus according to claim 12, wherein the lever member includes a regulation portion configured to contact with the arm to regulate the pivotal motion of the arms, and
the pivotal motion regulation portion regulates the pivotal motion of the lever member, which contacts with and is pivoted by the second disk inserted to the position in the proximity of the one of the ends of the opening thereby to regulate the pivotal motion of the arm on which the lever member is mounted.

14. The disk apparatus according to claim 9, wherein the arms are disposed such that a straight line interconnecting the first and second rollers and provided on one of the arms and another straight line interconnecting the first and second rollers and provided on the other one of the arms intersect substantially orthogonally with each other.

15. The disk apparatus according to claim 1, wherein the disk includes a first disk and a second disk having a diameter smaller than that of the first disk, and
when it is determined by the state decision section that a part of the disk is carried out of the housing through the opening:
the driving unit is stopped by the drive control section while the first disk is gripped by the second rollers provided on the pair of arms; and
the driving unit is stopped by the drive control section while the second disk is gripped by the first rollers provided on the pair of arms.

16. The disk apparatus according to claim 1, wherein the rollers provided on the pair of arms are respectively rotated by the driving unit.

\* \* \* \* \*